United States Patent
Chiaramonte et al.

(10) Patent No.: US 11,334,854 B2
(45) Date of Patent: May 17, 2022

(54) SYSTEMS AND METHODS TO GENERATE AN ASSET WORKSCOPE

(71) Applicant: General Electric Company, Schenectady, NY (US)

(72) Inventors: Gregory Jon Chiaramonte, West Chester, OH (US); Donald Horn, West Chester, OH (US); Vijay John, West Chester, OH (US); Steven Richard Levin, West Chester, OH (US); Victor Manuel Perez Zarate, Niskayuna, NY (US); Charles Larry Abernathy, West Chester, OH (US)

(73) Assignee: General Electric Company, Schenectady, NY (US)

( * ) Notice: Subject to any disclaimer, the term of this patent is extended or adjusted under 35 U.S.C. 154(b) by 706 days.

(21) Appl. No.: 15/809,788

(22) Filed: Nov. 10, 2017

(65) Prior Publication Data
US 2019/0147412 A1    May 16, 2019

(51) Int. Cl.
G06G 7/48    (2006.01)
G06Q 10/00    (2012.01)
G06Q 10/06    (2012.01)

(52) U.S. Cl.
CPC ....... *G06Q 10/20* (2013.01); *G06Q 10/06311* (2013.01)

(58) Field of Classification Search
CPC ............ G06N 20/00; G06N 3/08; G06N 5/04; G06N 5/022; G06N 20/20; G06F 11/07;
(Continued)

(56) References Cited

U.S. PATENT DOCUMENTS 6,067,486 A    5/2000 Aragones et al.
6,732,040 B2    5/2004 Sangeeta et al.
(Continued)

OTHER PUBLICATIONS

Verneer et al. Asset-Management Decision-Support Modeling, Using a Health and Risk Model IEEE Xplore, Sep. 3, 2015 (Year: 2015).*
(Continued)

*Primary Examiner* — Rehana Perveen
*Assistant Examiner* — Cuong V Luu
(74) *Attorney, Agent, or Firm* — Wood IP LLC

(57) ABSTRACT

Methods, apparatus, systems, and articles of manufacture to generate an asset workscope are disclosed. An example system includes an asset health calculator to identify an asset on which to perform maintenance based on generating a first asset health quantifier corresponding to a first asset health status, a task generator to determine a first workscope including first asset maintenance tasks, and a task optimizer to determine a second workscope including second asset maintenance tasks based on the first asset health quantifier and/or first workscope. The example system includes a workscope effect calculator to generate a second asset health quantifier corresponding to a second asset health status when the second workscope is completed on the asset, and to update the asset health calculator, task generator, and/or task optimizer to improve determination of first and/or second workscopes to improve the second asset health quantifier relative to the first asset health quantifier.

18 Claims, 75 Drawing Sheets

(58) Field of Classification Search
CPC ........ G06F 17/50; G06F 17/30; G01M 99/00; G06Q 10/00; G06G 7/64; G07C 3/00
See application file for complete search history.

(56) References Cited

U.S. PATENT DOCUMENTS

| | | | |
|---|---|---|---|
| 6,832,205 B1 | 12/2004 | Aragones et al. | |
| 6,871,160 B2 | 3/2005 | Jaw | |
| 8,868,287 B2 | 10/2014 | Delaye et al. | |
| 9,477,224 B2 | 10/2016 | Khan et al. | |
| 2003/0167117 A1* | 9/2003 | Sangeeta | G07C 3/00 701/100 |
| 2006/0010152 A1 | 1/2006 | Catalano et al. | |
| 2007/0288295 A1* | 12/2007 | O'Brien | G06Q 10/06 705/7.28 |
| 2008/0172268 A1 | 7/2008 | Wingenter | |
| 2009/0048730 A1 | 2/2009 | Akkaram et al. | |
| 2010/0153080 A1* | 6/2010 | Khan | G05B 23/0283 703/7 |
| 2010/0262442 A1 | 10/2010 | Wingenter | |
| 2012/0166249 A1 | 6/2012 | Jackson | |
| 2013/0110587 A1 | 5/2013 | Nowicki et al. | |
| 2013/0179388 A1 | 7/2013 | Agarwal et al. | |
| 2014/0025414 A1* | 1/2014 | Worden | G06Q 10/06 705/7.12 |
| 2014/0058709 A1* | 2/2014 | Machado Viana | G01M 5/0075 703/2 |
| 2014/0365191 A1* | 12/2014 | Zyglowicz | G06Q 50/06 703/7 |
| 2017/0323403 A1* | 11/2017 | Johnson | G06Q 50/14 |
| 2018/0275044 A1* | 9/2018 | Surana | G01N 29/14 |
| 2019/0087256 A1* | 3/2019 | Horrell | H04L 45/22 |

OTHER PUBLICATIONS

Kwon et al. IoT-Based Prognostics and Systems Health Management for Industrial Applications IEEEAccess, vol. 4, 2015 (Year: 2016).*

Zachary Allen Weitz Integrating Disparate Nuclear Data Sources for Improved Predictive Maintenance Modeling: Maintenance-Based Prognostics for Long-Term Equipment Operation Doctoral Dissertations, University of Tennessee (Year: 2017).*

Donaldson et al., "Economic Impact of Derated Climb on Large Commercial Engines", 2007 Performance and Flight Operations Engineering Conference, 14 pages.

James et al., "Derated Climb Performance in Large Civil Aircraft", 2005 Performance and Flight Operations Engineering Conference, 14 Pages.

* cited by examiner

```
REQUIRE Set N of work orders
• initialSequence <- SortEnginesByIncreasingTPPDates(N)
• currentBestSequence <- initialSequence
• bestObjectiveValue <- ObjectiveFunctionCost(currentBestSequence)
• WHILE{timeElapsed <= timeLimit}
    ○ STATE newSequence = LocalSearchNeighbor(currentBestSequence)
    ○ IF{ObjectiveFunctionCost(newSequence) is less than bestObjectiveValue}
        ▪ bestObjectiveValue <- ObjectiveFunctionCost(newSequence)
        ▪ currentBestSequence <- newSequence
    ○ ENDIF
• ENDWHILE
```

- REQUIRE Set N of engines, planning horizon P, optimization window period R, freeze period F
- In optimization run 1, the planning window period is t_1 to t_1 + R
- WHILE{end of planning window in optimization run k given by (t_k +R) is less than or equal to P}
  ○ Solve problem using well-known method(s) of integer programming for the current planning window
  ○ Fix the assignment of engines assigned in the freeze period t_k to t_k + F
  ○ Move the rolling window forward in time equal to the freeze period, such that the new planning window is from t_{k+1} = t_k + F to t_{k+1} + R
- ENDWHILE

— 2000

- REQUIRE Set W of workscopes
- W = 0
- N = numStagesRemain
- minCost = initialCostEstimate
- WHILE{ 0 < N < M }
  ○ Cost = WorkScopeCost(WorkScope(W)) + ProbabilityIncurCost
  ○ IF{Cost is less than minCost}
    ▪ minCost = Cost
    ▪ currentBestWorkScope = WorkScope(W)
    ▪ W = W+1
    ▪ N = N-1
  ○ ENDIF
- ENDWHILE
- OUTPUT currentBestWorkScope
- OUTPUT minCost

FIG. 47

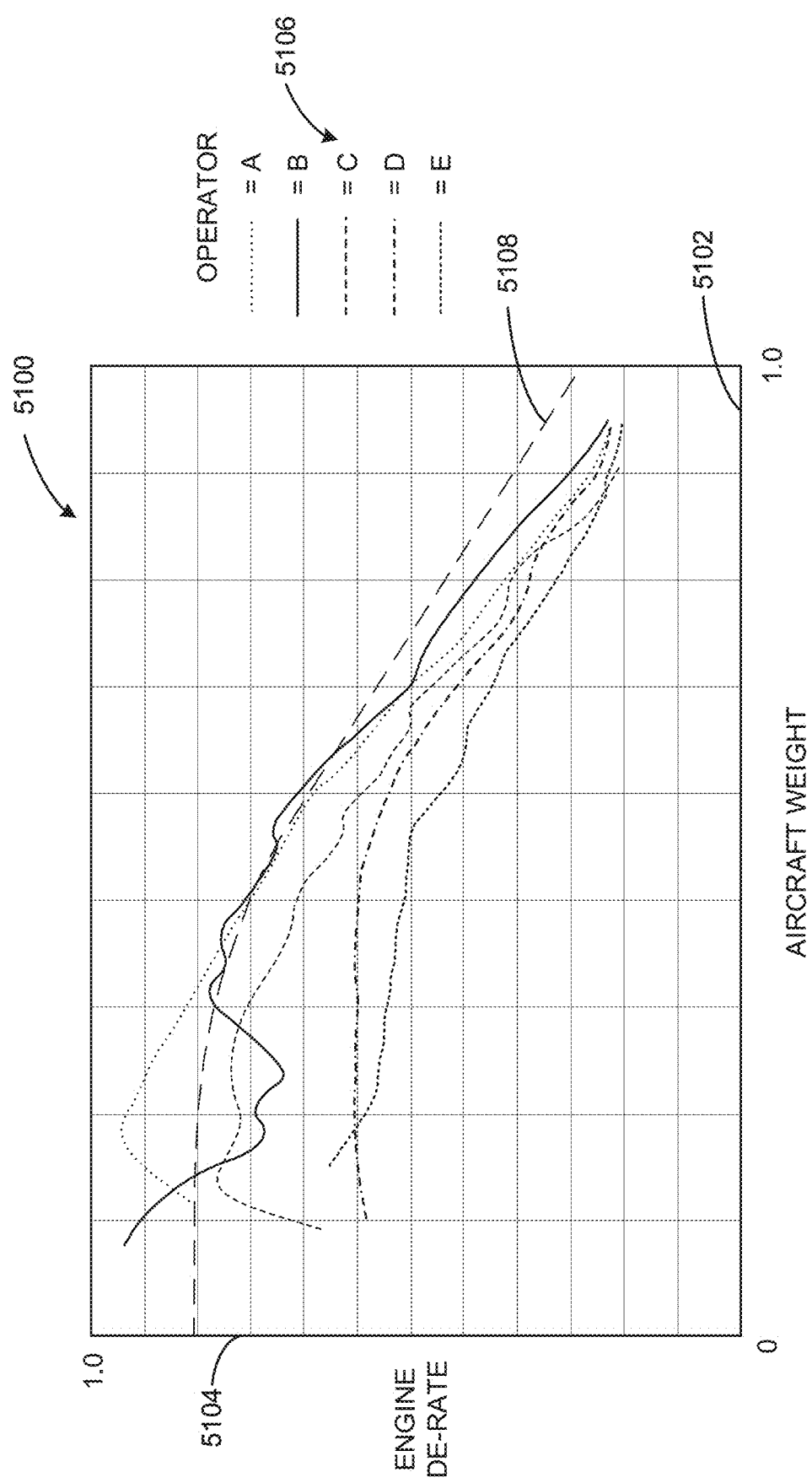

| OPERATOR | OPERATOR BEHAVIOR A | OPERATOR BEHAVIOR A (CHANGE) | OPERATOR BEHAVIOR B | OPERATOR BEHAVIOR B (CHANGE) | SEVERITY FACTOR A (CHANGE) | ASSET HEALTH QUANTIFIER |
|---|---|---|---|---|---|---|
| A | | | | | | ○ |
| B | | ⇦ | ○ | ⇨ | | |
| C | ○ | ⇦ | | | | |
| D | | | ○ | ⇨ | ⇦ | |
| E | | | ○ | ⇨ | ⇦ | |

⇦ 5214 CHANGE RELATIVE TO OPERATOR OVER TIME

⇨ 5216

○ 5218 CHANGE RELATIVE TO FLEET

FIG. 52

SYSTEMS AND METHODS TO GENERATE AN ASSET WORKSCOPE

FIELD OF THE DISCLOSURE

This disclosure relates generally to turbine engines and, more particularly, to system and methods to generate an asset workscope.

BACKGROUND

In recent years, turbine engines have been increasingly utilized in a variety of applications and fields. Turbine engines are intricate machines with extensive availability, reliability, and serviceability requirements. Traditionally, maintaining turbine engines incur steep costs. Costs generally include having exceptionally skilled and trained maintenance personnel service the turbine engines. In some instances, costs are driven by replacing expensive components or by repairing complex sub-assemblies.

The pursuit of increasing turbine engine availability while reducing premature maintenance costs requires enhanced insight. Such insight is needed to determine when to perform typical maintenance tasks at generally appropriate service intervals. Traditionally, availability, reliability, and serviceability increase as enhanced insight is deployed.

The market for long-term contractual agreements has grown at high rates over recent years for many service organizations. As the service organizations establish long-term contractual agreements with their customers, it becomes important to understand the expected scope of work (also referred to as "workscope") including product, service, and/or other project result. In addition, the service organizations need to have an understanding of the planning of repairs (e.g., shop workload and/or workscope planning) and how the maintenance of components will affect management of their service contracts including time, cost, risk, etc.

BRIEF DESCRIPTION OF THE DRAWINGS

FIG. 18 illustrates example source code representative of example computer readable instructions that can be executed to implement the example asset health calculator of FIGS. 3-4 that can be used to implement the examples disclosed herein.

FIG. 20 illustrates example source code representative of example computer readable instructions that can be executed to implement the example asset health calculator of FIGS. 3-4 that can be used to implement the examples disclosed herein.

FIG. 47 illustrates example source code representative of example computer readable instructions that may be executed to implement the example asset workscope generation system of FIGS. 3 and/or 36-39 that may be used to implement the examples disclosed herein.

FIG. 51A is a schematic illustration of an example performance reference model.

FIG. 52 is an example alert dashboard including recommendations to optimize and/or otherwise improve operator asset behavior.

The figures are not to scale. Wherever possible, the same reference numbers will be used throughout the drawing(s) and accompanying written description to refer to the same or like parts.

BRIEF SUMMARY

Figure 1:
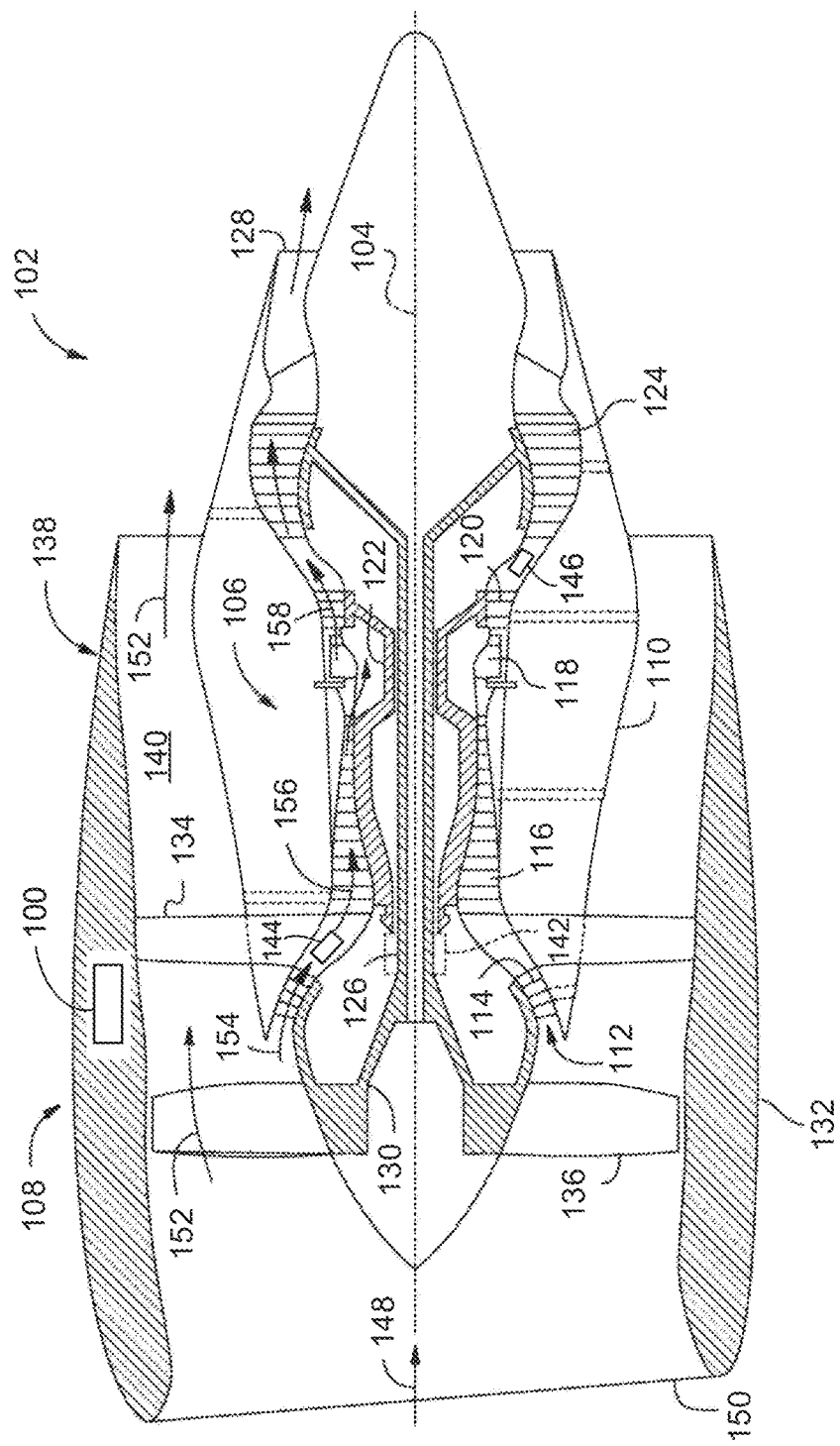
FIG. 1 illustrates an example gas turbine engine that can be utilized within an aircraft in which the examples disclosed herein can be implemented.

Methods, apparatus, systems, and articles of manufacture to generate an asset health quantifier of a turbine engine are disclosed.

Certain examples provide an example system for generating an asset workscope. The example system includes an asset health calculator to identify a component of an asset to be removed from operation to perform maintenance based on generating a first asset health quantifier corresponding to a first health status of the asset component, a task generator to determine a first workscope including a first set of maintenance tasks to perform maintenance on the asset component, a task optimizer to determine a second workscope including a second set of maintenance tasks for the asset component based on at least one of the first asset health quantifier and the first workscope, and a workscope effect calculator to generate a second asset health quantifier corresponding to a second health status of the asset component when the second workscope is completed on the asset, and update at least one of the asset health calculator, the task generator, or the task optimizer to improve a determination of at least one of the first and the second workscopes to improve the second asset health quantifier relative to the first asset health quantifier.

Certain examples provide an example method for generating an asset workscope. The example method includes identifying, using an asset workscope generation system (AWGS), a component of an asset to be removed from operation to perform maintenance based on generating a first asset health quantifier corresponding to a first health status of the asset component, determining, using the AWGS, a first workscope including a first set of maintenance tasks to perform maintenance on the asset component, determining, using the AWGS, a second workscope including a second set of maintenance tasks for the asset component based on at least one of the first asset health quantifier and the first workscope, generating, using the AWGS a second asset health quantifier corresponding to a second health status of the asset component when the second workscope is completed on the asset, and updating, using the AWGS, a component of the AWGS to improve a determination of at least one of the first and the second workscopes to improve the second asset health quantifier relative to the first asset health quantifier.

Certain examples provide an example non-transitory computer-readable storage medium including instructions that, when executed, cause a machine to at least generate an asset workscope. The example instructions, when executed, cause the machine to at least identify, using an asset health calculator, a component of a asset to be removed from operation to perform maintenance based on generating a first asset health quantifier corresponding to a first health status of the asset component, determine, using a task generator, a first workscope including a first set of maintenance tasks to perform maintenance on the asset component, determine, using a task optimizer, a second workscope including a second set of maintenance tasks for the asset component based on at least one of the first asset health quantifier and the first workscope, generate, using a workscope effect calculator, a second asset health quantifier corresponding to a second health status of the asset component when the second workscope is completed on the asset, and update, using the workscope effect calculator, at least one of the asset health calculator, the task generator, or the task optimizer to improve a determination of at least one of the first and the second workscopes to improve the second asset health quantifier relative to the first asset health quantifier.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

A turbine engine (e.g., an aircraft turbine engine) typically includes components (e.g., asset components, etc.) or modules (e.g., asset modules or assemblies including one or more components, etc.) for operation such as a fan (e.g., a fan section), a booster compressor, a high-pressure compressor, a high-pressure turbine, and a low-pressure turbine. The components can degrade over time due to demanding operating conditions such as extreme temperature and vibration. In some instances, debris or other objects enter the turbine engine via the fan and cause damage to one or more components. Routine maintenance intervals and service checks can be implemented to inspect for degradation and/or damage. However, in some instances, taking the turbine engine offline or off wing to perform maintenance includes taking an entire system, such as an aircraft, offline. In addition to prematurely replacing expensive components, aircraft non-operation can incur additional costs such as lost revenue, labor costs, etc. Monitoring components for degradation can provide actionable information for maintenance personnel to replace a component of the turbine engine when necessary, to optimally schedule maintenance tasks of the turbine engine based on contractual and/or maintenance resources, etc.

Examples disclosed herein include an example asset workscope generation system (AWGS) to combine field data, statistical analytic tools, engineering physics-based models, prediction simulators integrated with forecasted mission requirements, etc., to develop a recommended modular workscope and a timing to perform the recommended modular workscope for an asset such as a turbine engine to satisfy customer contractual and field personnel expectations. As used herein, the term "workscope" refers to a set of tasks (e.g., one or more maintenance tasks, service tasks, etc.) executed by maintenance personnel to improve an operating condition of an asset, where the operating condition is determined based on requirements such as contractual requirements, environmental requirements, regulatory requirements, utilization requirements, etc., and/or a combination thereof. In some examples, the AWGS obtains asset monitoring information from one or more assets, a network, a server, etc. As used herein, the term asset monitoring information refers to information corresponding to one or more assets such as asset sensor information, asset environmental information, asset utilization information, asset configuration information, asset history information, asset class history information, asset workscope quantifiers, etc.

In some examples, the AWGS identifies target assets for removal from service (e.g., removal from an aircraft, removal from a facility, removal from use, etc.) based on calculating an asset health quantifier. As used herein, the term "asset health quantifier" refers to a numerical representation corresponding to a health status, an operational status, etc., of an asset, an asset component, etc. For example, the asset health quantifier can be represented by a percentage of useful life remaining, a number of flight cycles (e.g., a number of flight cycles to be executed before service is performed, etc.), a quantity of time-on-wing (TOW) hours (e.g., a number of time-on-wing hours before service is performed, etc.), etc. For example, an asset health quantifier of 75% for a turbine engine booster compressor can correspond to the booster compressor having 75% of useful life remaining before the booster compressor may become non-responsive or requires a maintenance action. In another example, an asset health quantifier of 500 cycles for a turbine engine fan section can correspond to the turbine engine fan section executing 500 cycles before the fan section can be serviced to satisfy a contractual requirement.

In some examples, the AWGS can execute one or more engineering physics-based models, historical information-based models, statistical models, etc., and/or a combination thereof to generate an actual asset health quantifier for an asset, an asset component, an asset module, etc. In some examples, the AWGS can generate a projected asset health quantifier based on forecasted mission requirements of the asset (e.g., forecasted contractual requirements, forecasted environmental information, etc.).

In some examples, the AWGS can identify one or more target assets for removal based on comparing one or more asset health quantifiers (e.g., an actual asset health quantifier, a projected asset health quantifier, etc.) to a threshold, determine whether the one or more asset health quantifiers satisfy the threshold, and identify the one or more target assets for removal based on the comparison.

In some examples, the AWGS generates a workscope task for the target asset. For example, the AWGS can identify a set of tasks (e.g., maintenance tasks, service tasks, etc.) to perform maintenance on a fan section (e.g., one or more fan blades, etc.) of a turbine engine. For example, the AWGS can identify maintenance costs corresponding to each task in the set of tasks. For example, the AWGS can calculate a cost based on a quantity of maintenance personnel and corresponding man-hours to perform a maintenance task, a quantity of components (e.g., a quantity of replacement parts, spare parts, shop-supplied parts, etc., and/or a combination thereof) to perform the maintenance task, a monetary cost for each of the components, etc.

In some examples, the AWGS optimizes and/or otherwise improves a workscope based on the generated workscope tasks for the target asset. For example, the AWGS can generate a plurality of workscopes in which each workscope includes a combination of one or more of the generated workscope tasks. The example AWGS can calculate an estimate asset health quantifier for the target asset based on estimating what the asset health quantifier for the target asset can be in response to performing a specified workscope on the target asset. The example AWGS can calculate an estimate asset health quantifier for each one of the generated workscopes. The example AWGS can identify a workscope for the target asset based on one or more factors such as comparing the calculated estimate asset health quantifiers to contractual requirements, customer requirements, operational constraints, etc., and/or a combination thereof.

In some examples, the AWGS calculates a workscope quantifier based on comparing a first asset health quantifier for a target asset to a second asset health quantifier for the target asset. For example, the first asset health quantifier can be an asset health quantifier (e.g., an actual asset health quantifier, a projected asset health quantifier, etc.) of the target asset prior to completing a workscope on the target asset. The second asset health quantifier can be an asset health quantifier (e.g., an actual asset health quantifier, a projected asset health quantifier, etc.) of the target asset after completing the workscope on the target asset. For example, the AWGS can calculate a workscope quantifier by calculating a difference between the first and the second asset health quantifiers.

In some examples, the AWGS can compare the workscope quantifier to a workscope quantifier threshold and determine whether the workscope quantifier threshold has been satisfied based on the comparison. In some examples, the AWGS can modify one or more components of the AWGS in response to the workscope quantifier threshold being satisfied. For example, the AWGS can update one or more models, one or more parameters corresponding to a maintenance task, improve an optimization parameter for evaluating generated workscopes, etc., and/or a combination thereof in response to the workscope quantifier threshold being satisfied. While example assets described herein have been illustrated in terms of engines, such as a turbine engine, diesel engine, etc., the systems and methods disclosed and described herein can also apply to assets such as wind turbines, additive printing machines, locomotive engines, health imaging equipment such as computed tomography scanners, etc., or any other type of mechanical, electrical, or electro-mechanical device. Additionally or alternatively, the systems and methods disclosed and described herein can also apply to any asset that has modular elements that require maintenance planning and scheduling a removal within requirement constraints such as contractual constraints corresponding to a management of spare assets.

Examples disclosed herein include an asset health calculator apparatus to identify a target asset for removal from service based on calculating an asset health quantifier of the target asset. In some examples, the asset health calculator apparatus obtains asset monitoring information corresponding to the target asset. For example, the asset health calculator apparatus can obtain asset sensor information, asset environmental information, asset utilization information, etc., and/or a combination thereof corresponding to the target asset.

In some examples, the asset health calculator apparatus executes one or more models such as an engineering physics-based model, a statistical model, etc., to generate an asset health quantifier for an asset, an asset component, an asset module, etc. In some examples, the asset health calculator apparatus generates a projected asset health quantifier based on forecasted mission requirements of the asset such as forecasted environmental information, forecasted utilization information, etc., to determine whether a degradation of the asset component will cause an unexpected shop visit (e.g., a shop visit prior to a next scheduled or anticipated shop visit, etc.).

In some examples, the asset health calculator apparatus calculates a projected asset health quantifier of an asset component by predicting an estimate of the actual asset health quantifier of the asset component based on an anticipated deterioration of the asset component over time. For example, the asset health calculator apparatus can predict the deterioration by using the actual asset health quantifier as an initial actual asset health quantifier of the asset component, and extrapolating the initial actual asset health quantifier to the projected asset health quantifier by executing one or more models using forecasted mission requirements including a number of flight cycles, a quantity of time-on-wing hours, etc.

In some examples, the asset health calculator apparatus aggregates and ranks the actual asset health quantifiers, the projected asset health quantifiers, etc. For example, the asset health calculator apparatus can rank assets or components of the assets based on the generated asset health quantifiers. In some examples, the asset health calculator apparatus compares an asset health quantifier to a threshold (e.g., an asset health quantifier threshold, a maintenance quantifier threshold, etc.) and determines whether the asset health quantifier satisfies the threshold based on the comparison.

In some examples, the asset health calculator apparatus identifies a first set of candidate assets including one or more assets as candidate(s) for removal based on comparing an asset health quantifier of an asset to a threshold and determining whether the asset health quantifier satisfies the threshold based on the comparison. For example, the asset health calculator apparatus can identify a turbine engine for removal from service to perform a maintenance activity on the turbine engine based on an asset health quantifier for the turbine engine satisfying a threshold.

In some examples, the asset health calculator apparatus identifies a second set of candidate assets including one or more assets as candidate(s) for removal based on non-asset monitoring information. For example, the asset health calculator apparatus can identify a turbine engine for removal based on a time interval between maintenance tasks specified in a contract, customer technical forecast information, customer spare part information, etc., for the turbine engine. As used herein, the term "contract" refers to an agreement between a turbine engine operator (e.g., an airline, a manufacturing plant, a power plant, etc.) and a turbine engine maintenance provider in which the turbine engine maintenance provider performs maintenance, service, etc., on an asset owned by the turbine engine operator.

In some examples, the asset health calculator apparatus compares candidate assets in the first set to the second set. In some examples, the asset health calculator apparatus identifies target assets for removal based on the comparison. In some examples, the asset health calculator apparatus generates a removal schedule for the identified target assets. For example, the asset health calculator apparatus can determine that the identified target assets correspond to one contract or more than one contract. For example, in response to determining that the target assets correspond to one contract, the asset health calculator apparatus can generate an optimal removal schedule of the target assets based on performing an optimization process such as an iterated local search.

In another example, in response to determining that the target assets correspond to more than one contract, the asset health calculator apparatus can generate a removal schedule for the target assets using methods such as integer programming, myopic optimization (e.g., a rolling optimization method, etc.), single level optimization, top-down optimization, bottom-up optimization, etc., and/or a combination thereof. For example, the asset health calculator apparatus can generate a removal schedule using single level optimization by optimizing and/or otherwise improving each asset corresponding to each contract simultaneously (or substantially simultaneously given data processing, transmission, and storage latency).

In another example, the asset health calculator apparatus can generate a removal schedule using top-down optimization by generating a high-level, top-level, etc., target removal schedule for each contract, generating a candidate removal schedule for each contract, and generating an optimized and/or otherwise improved removal schedule for the contracts based on the comparison of the target removal schedules to the candidate removal schedules. In another example, the asset health calculator apparatus can generate a removal schedule using bottom-up optimization by generating candidate removal schedules for each contract, combining the candidate removal schedules, and re-adjusting the candidate removal schedules to help ensure global feasibility with respect to one or more factors such as customer constraints, maintenance facility constraints, spare part availability constraints, etc., and/or a combination thereof.

In certain examples, the AWGS includes a Workscope Strategy Analyzer (WSA) that evaluates, for each possible workscope strategy, a financial, availability (e.g., uptime vs. downtime), resource, and/or other impact of a series of possible workscopes over the life of a service contract. The WSA facilitates creation of an optimized and/or otherwise improved workscope selection with associated predicted outcomes. For example, a workscope selection can be generated by obtaining specific contract information and mapping failure mode distributions to workscope models to construct a workscope model with associated price, cost and billing structure. For a given shop visit, probabilities associated with failure modes for workscope options can be determined using a dynamic programming approach which is propagated to the end of the contract.

In certain examples, for each analytical tool available that can trigger work on a part or module, the analytical tool can be mapped to a minimum workscope and multiple analytical tools can be combined to define a minimum workscope. Then, uncertainty cam be propagated for each analytic and combine at the part/module and engine level. The combined uncertainty feeds an algorithm to perform analytical trade-offs related to a cost of overhauling and benefits to financial and time-on-wing terms.

In certain examples, a prediction tool generates or identifies one or more workscopes from which a workscope that meets a predefined criterion or criteria can be selected. The prediction tool receives inputs from other tools, from the user, and/or from another system or device. In an example, the prediction tool receives engine information from an analyzer tool and receives workscope financial information from a financial model tool. More specifically, in an example, the engine information received from the analyzer tool includes, without limitation, an amount of time that engine has been in use since a most recent maintenance event, an amount of time that one or more engine components have been in use since the most recent maintenance or repair event, one or more components that have failed, and/or any other data that enables the prediction tool. The workscope financial information received from the financial model tool includes a financial impact of each maintenance activity defined within each workscope, such as a financial impact of maintenance or repair of each component at one or more future dates. In an example, the financial impact includes a cost of performing maintenance activities on the components. However, the financial impact additionally or alternatively includes a price, a profit, and/or any other financial effect associated with performing maintenance activities on the components. Alternatively or additionally, the prediction tool may receive other inputs, such as an engine condition, diagnostics data, workscope requirements, and/or any other input.

As used herein, the term "maintenance event" refers to an event in which the system (e.g., the engine) or components thereof are taken to a maintenance or repair facility, or "shop," to perform one or more maintenance activities on the system or components. Maintenance events are also known as "shop visits." These maintenance events may include failure driven events, where the system or component is taken to the facility as a result of a failure, and may also include non-failure driven visits, such as visits to the facility for preventative maintenance. As used herein, the term "maintenance activity" refers to performing maintenance on a system or component, and/or repairing the system or component.

In an example, the prediction tool generates an output indicative of one or more workscopes that are available to be performed on the engine (hereinafter referred to as "available workscopes"). In one embodiment, each workscope defines a different set of maintenance activities to be performed on the components than each other workscope. In an example, the prediction tool identifies or generates a "base" workscope, a "full" workscope, and/or one or more alternative workscopes that are available to be performed on the engine. In an example, the base workscope is a minimal set of maintenance activities to be performed on the engine and/or engine components. Alternatively, the base workscope may be a predetermined or "default" set of repair and/or maintenance activities to be performed on the engine and/or engine components. For example, the base workscope may include only repairing components that have failed and/or that are identified as "life-limited" components. As used herein, the term "life-limited" refers to a component that is required to be replaced and/or repaired within a predetermined time period. The alternative workscopes include additional, and/or different, repair and/or maintenance activities that may be performed on the engine and/or engine components as compared to the activities identified in the base workscope. The full workscope is a full set of maintenance activities to be performed on each component of the system. For example, the full workscope may include performing a maintenance activity on each component of the system when the system and/or components are taken to the maintenance facility, even if the components are not identified as requiring maintenance or repair. The available workscopes (e.g., the base workscope, the full workscope, and/or the alternative workscopes) are transmitted to the financial model tool and/or to analyzer tool.

In an example, the financial model tool receives inputs from the prediction tool and analyzer tool. The financial model tool generates outputs indicative of financial information (e.g., the financial impact) associated with each workscope and transmits the outputs to the prediction tool and the analyzer tool. The financial information includes, for example, a cost of each maintenance activity of each workscope and/or any other financial impact of each maintenance activity. In an example, the financial model tool receives a list of available workscopes from the prediction tool and/or from the analyzer tool. In an example, the financial model tool also receives data regarding a service contract or another instrument identifying repair and/or maintenance obligations for the engine and/or engine components, and a time period in which the service contract is in force. In an example, the financial model tool calculates the cost and/or price (or other financial impact) of each maintenance activity of each workscope by calculating the repair and/or maintenance costs and/or prices, for example, associated with each activity identified in each workscope. In an example, the financial model tool generates quotations for approval for one or more workscopes for a given set of requirements and generates a cost and price for the workscopes based on historical records and/or business plans. The financial model tool transmits the determined cost and/or price, or other financial impact, of each available workscope (e.g., the cost of the maintenance activities of the base workscope, the full workscope, and/or of each alternative workscope) to the prediction tool and/or to the analyzer tool.

In an example, the analyzer too receives inputs from the prediction tool and the financial model tool. Moreover, the analyzer tool generates outputs and transmits the outputs to the prediction tool and the financial model tool. The analyzer tool receives the list of available workscopes and the financial information from the prediction tool and/or from the financial model tool. The analyzer tool selects and/or presents to the user a recommended workscope based on the inputs received. For example, the analyzer tool calculates a probability distribution of expected maintenance activities within each workscope and selects a workscope with the lowest expected cost and/or price. Alternatively, the analyzer tool selects a workscope that satisfies any other criterion or criteria identified by the user or by a system or device. For example, the analyzer tool determines an expected effect of each workscope and selects the workscope that has the expected effect that best satisfies the criterion or criteria. The expected effect may include, for example, one or more of an expected cost, an expected price, an expected profit, an expected cash flow, an expected maintenance facility loading, an expected spare engine capacity or availability, and/or an expected "time on wing" interval of the workscope. Accordingly, in the example, the analyzer tool may select a workscope that has a lowest expected cost for the maintenance activities expected to be performed during a predefined time interval. However, it should be recognized that analyzer tool may select a workscope in which the expected effect of the workscope satisfies any other criterion or criteria during the time interval.

In an example, the analyzer tool quantifies the benefits and costs of the workscopes received by, for example, calculating the probability (e.g., a Weibull distribution, etc.) of each workscope's "time on wing" (TOW) (e.g., each workscope's effect on the engine's time in operation) and financial output (e.g., an effect of each workscope on an amount of revenue expected to be generated by the engine as a result of each workscope). In an example, for each available workscope, the analyzer tool presents to the user a series of probability distributions representing expected financial and operational future outcomes of performing the workscopes on the engine and/or engine components throughout a plurality of future repair and/or maintenance events.

In the example, the analyzer tool receives inputs (hereinafter referred to as "external inputs") from an external source such as from a user or from a remote device or system. The external inputs include one or more of an engine condition, a condition of one or more engine components, an amount of time or engine cycles in which the engine and/or engine components have been in operation, an indication of a failing or failed engine component, a set or list of business constraints and/or constraints due to one or more service or other contracts, an amount of time that one or more service or other contracts are in force, a notification or an indication that one or more components are or include life-limited parts, and/or failure distributions computed from historical field data. Alternatively, any of the external inputs may be received by other tools and may be transmitted to the analyzer tool.

In an example, the analyzer tool uses a state-based solution or model to provide a logistical framework for selecting among workscope alternatives (e.g., to facilitate selecting an optimal or recommended workscope from the list of available workscopes). In an example, the analyzer tool determines which workscope should be performed at each failure driven shop visit in order to minimize the total expected cost (e.g., of maintenance activities within a service contract) over a specified time interval (e.g., during the remaining time that the service contract is in effect). The analyzer tool determines the lowest expected maintenance cost (or determines an expected effect that satisfies any other criterion or criteria) for the system associated with the service contract using a dynamic programming solution, for example.

Asset maintenance management involves a detailed knowledge of the durability of the parts, modules and interactions due to assembly of the asset plus. As more analytic models are available that track the durability of components and modules, along with complexities in how different maintenance contracts are engineered, it becomes very complex to evaluate the financial implications of different workscoping decisions. Certain examples combine available technical, analytical and financial information to compute the financial implications for different workscoping scenarios.

In certain examples, the AWGS includes a Workscope Strategy Analyzer (WSA) that evaluates, for each possible workscope strategy, a financial, availability (e.g., uptime vs. downtime), resource, and/or other impact of a series of possible workscopes over the life of a service contract. The WSA facilitates creation of an optimized and/or otherwise improved workscope selection with associated predicted outcomes. For example, a workscope selection can be generated by obtaining specific contract information and mapping failure mode distributions to workscope models to construct a workscope model with associated price, cost and billing structure. For a given shop visit, probabilities associated with failure modes for workscope options can be determined using a dynamic programming approach which is propagated to the end of the contract.

In certain examples, for each analytical tool available that can trigger work on a part or module, the analytical tool can be mapped to a minimum workscope and multiple analytical tools can be combined to define a minimum workscope. Then, uncertainty cam be propagated for each analytic and combine at the part/module and engine level. The combined uncertainty feeds an algorithm to perform analytical trade-offs related to a cost of overhauling and benefits to financial and time-on-wing terms.

In certain examples, a prediction tool generates or identifies one or more workscopes from which a workscope that meets a predefined criterion or criteria can be selected. The prediction tool receives inputs from other tools, from the user, and/or from another system or device. In an example, the prediction tool receives engine information from an analyzer tool and receives workscope financial information from a financial model tool. More specifically, in an example, the engine information received from the analyzer tool includes, without limitation, an amount of time that engine has been in use since a most recent maintenance event, an amount of time that one or more engine components have been in use since the most recent maintenance or repair event, one or more components that have failed, and/or any other data that enables the prediction tool. The workscope financial information received from the financial model tool includes a financial impact of each maintenance activity defined within each workscope, such as a financial impact of maintenance or repair of each component at one or more future dates. In an example, the financial impact includes a cost of performing maintenance activities on the components. However, the financial impact additionally or alternatively includes a price, a profit, and/or any other financial effect associated with performing maintenance activities on the components. Alternatively or additionally, the prediction tool may receive other inputs, such as an engine condition, diagnostics data, workscope requirements, and/or any other input.

As used herein, the term "maintenance event" refers to an event in which the system (e.g., the engine) or components thereof are taken to a maintenance or repair facility, or "shop," to perform one or more maintenance activities on the system or components. Maintenance events are also known as "shop visits." These maintenance events may include failure driven events, where the system or component is taken to the facility as a result of a failure, and may also include non-failure driven visits, such as visits to the facility for preventative maintenance. As used herein, the term "maintenance activity" refers to performing maintenance on a system or component, and/or repairing the system or component.

In an example, the prediction tool generates an output indicative of one or more workscopes that are available to be performed on the engine (hereinafter referred to as "available workscopes"). In one embodiment, each workscope defines a different set of maintenance activities to be performed on the components than each other workscope. In an example, the prediction tool identifies or generates a "base" workscope, a "full" workscope, and/or one or more alternative workscopes that are available to be performed on the engine. In an example, the base workscope is a minimal set of maintenance activities to be performed on the engine and/or engine components. Alternatively, the base workscope may be a predetermined or "default" set of repair and/or maintenance activities to be performed on the engine and/or engine components. For example, the base workscope may include only repairing components that have failed and/or that are identified as "life-limited" components. As used herein, the term "life-limited" refers to a component that is required to be replaced and/or repaired within a predetermined time period. The alternative workscopes include additional, and/or different, repair and/or maintenance activities that may be performed on the engine and/or engine components as compared to the activities identified in the base workscope. The full workscope is a full set of maintenance activities to be performed on each component of the system. For example, the full workscope may include performing a maintenance activity on each component of the system when the system and/or components are taken to the maintenance facility, even if the components are not identified as requiring maintenance or repair. The available workscopes (e.g., the base workscope, the full workscope, and/or the alternative workscopes) are transmitted to the financial model tool and/or to analyzer tool.

In an example, the financial model tool receives inputs from the prediction tool and analyzer tool. The financial model tool generates outputs indicative of financial information (e.g., the financial impact) associated with each workscope and transmits the outputs to the prediction tool and the analyzer tool. The financial information includes, for example, a cost of each maintenance activity of each workscope and/or any other financial impact of each maintenance activity. In an example, the financial model tool receives a list of available workscopes from the prediction tool and/or from the analyzer tool. In an example, the financial model tool also receives data regarding a service contract or another instrument identifying repair and/or maintenance obligations for the engine and/or engine components, and a time period in which the service contract is in force. In an example, the financial model tool calculates the cost and/or price (or other financial impact) of each maintenance activity of each workscope by calculating the repair and/or maintenance costs and/or prices, for example, associated with each activity identified in each workscope. In an example, the financial model tool generates quotations for approval for one or more workscopes for a given set of requirements and generates a cost and price for the workscopes based on historical records and/or business plans. The financial model tool transmits the determined cost and/or price, or other financial impact, of each available workscope (e.g., the cost of the maintenance activities of the base workscope, the full workscope, and/or of each alternative workscope) to the prediction tool and/or to the analyzer tool.

In an example, the analyzer too receives inputs from the prediction tool and the financial model tool. Moreover, the analyzer tool generates outputs and transmits the outputs to the prediction tool and the financial model tool. The analyzer tool receives the list of available workscopes and the financial information from the prediction tool and/or from the financial model tool. The analyzer tool selects and/or presents to the user a recommended workscope based on the inputs received. For example, the analyzer tool calculates a probability distribution of expected maintenance activities within each workscope and selects a workscope with the lowest expected cost and/or price. Alternatively, the analyzer tool selects a workscope that satisfies any other criterion or criteria identified by the user or by a system or device. For example, the analyzer tool determines an expected effect of each workscope and selects the workscope that has the expected effect that best satisfies the criterion or criteria. The expected effect may include, for example, one or more of an expected cost, an expected price, an expected profit, an expected cash flow, an expected maintenance facility loading, an expected spare engine capacity or availability, and/or an expected "time on wing" interval of the workscope. Accordingly, in the example, the analyzer tool may select a workscope that has a lowest expected cost for the maintenance activities expected to be performed during a predefined time interval. However, it should be recognized that analyzer tool may select a workscope in which the expected effect of the workscope satisfies any other criterion or criteria during the time interval.

In an example, the analyzer tool quantifies the benefits and costs of the workscopes received by, for example, calculating the probability (e.g., a Weibull distribution, etc.) of each workscope's "time on wing" (TOW) (e.g., each workscope's effect on the engine's time in operation) and financial output (e.g., an effect of each workscope on an amount of revenue expected to be generated by the engine as a result of each workscope). In an example, for each available workscope, the analyzer tool presents to the user a series of probability distributions representing expected financial and operational future outcomes of performing the workscopes on the engine and/or engine components throughout a plurality of future repair and/or maintenance events.

In the example, the analyzer tool receives inputs (hereinafter referred to as "external inputs") from an external source such as from a user or from a remote device or system. The external inputs include one or more of an engine condition, a condition of one or more engine components, an amount of time or engine cycles in which the engine and/or engine components have been in operation, an indication of a failing or failed engine component, a set or list of business constraints and/or constraints due to one or more service or other contracts, an amount of time that one or more service or other contracts are in force, a notification or an indication that one or more components are or include life-limited parts, and/or failure distributions computed from historical field data. Alternatively, any of the external inputs may be received by other tools and may be transmitted to the analyzer tool.

In an example, the analyzer tool uses a state-based solution or model to provide a logistical framework for selecting among workscope alternatives (e.g., to facilitate selecting an optimal or recommended workscope from the list of available workscopes). In an example, the analyzer tool determines which workscope should be performed at each failure driven shop visit in order to minimize the total expected cost (e.g., of maintenance activities within a service contract) over a specified time interval (e.g., during the remaining time that the service contract is in effect). The analyzer tool determines the lowest expected maintenance cost (or determines an expected effect that satisfies any other criterion or criteria) for the system associated with the service contract using a dynamic programming solution, for example.

Asset maintenance management involves a detailed knowledge of the durability of the parts, modules and interactions due to assembly of the asset plus. As more analytic models are available that track the durability of components and modules, along with complexities in how different maintenance contracts are engineered, it becomes very complex to evaluate the financial implications of different workscoping decisions. Certain examples combine available technical, analytical and financial information to compute the financial implications for different workscoping scenarios.

Examples disclosed herein include a workscope effect calculator (WEC) apparatus to generate a predictive asset health quantifier of a turbine engine. In some examples, the WEC apparatus identifies leading indicator signals or trends that improve operator behavior corresponding to operating a turbine engine. As used herein, the term "operator" refers to a manager, an owner, a user, etc., of one or more turbine engines (e.g., aircraft turbine engines, land-based turbine engines, etc.). For example, an operator can be an airline operator. Alternatively, the operator can be a wind turbine operator.

As used herein, the terms "operator behavior" and "operator asset behavior" are used interchangeably and refer to quantifications corresponding to how an operator deploys and/or otherwise uses an asset while in operation. For example, an operator asset behavior can refer to an airline operator using a climb de-rate parameter for a turbine engine while the turbine engine is operating in a climb flight segment in a flight cycle. In another example, an operator asset behavior can refer to a land-based turbine engine operator using a de-rate parameter for a turbine engine while the turbine engine is operating in an environment with a specific ambient temperature, an elevation, airborne particulate matter exposure (e.g., an amount of dust present in an airport environment, etc.), etc. As used herein, the term "de-rate" refers to an operation of a turbine engine at less than a rated maximum capacity of the turbine engine to prolong a useful life, reduce a maintenance cost, etc., of the turbine engine. For example, a de-rate value of 20% can refer to operating a turbine engine at 80% of the maximum capacity of the turbine engine.

In some examples, the WEC apparatus obtains asset monitoring information to determine a de-rate value of the turbine engine during a duty cycle (e.g., an airline flight cycle, a duty cycle for a land-based operation gas turbine, etc.). In some examples, the WEC apparatus obtains asset monitoring information to determine a de-rate value of the turbine engine during a specific flight stage. As used herein, the terms "flight segment" or "flight stage" are used interchangeably and refer to a point in an aircraft flight cycle or aircraft operation cycle in which the turbine engine is operating when installed on an aircraft. For example, the flight stage can be a parked stage (e.g., the aircraft is parked at a gate, etc.), a taxi stage (e.g., the aircraft is taxiing to a runway for takeoff, etc.), a takeoff stage, a climb stage, a cruise stage, a descent stage, an approach stage, a landing stage, etc.

In some examples, the WEC apparatus functions as an early warning system that identifies shifts in operator behavior (e.g., de-rate behavior, takeoff de-rate behavior, etc.) leading to reduced time-on-wing and higher maintenance costs based on evaluating a de-rate parameter. For example, the WEC apparatus can identify that an operator is using a non-optimized and/or otherwise unfavorable de-rate parameter value when performing an aircraft operation such as taking off or climbing. In some examples, the WEC apparatus determines one or more de-rate parameters of the turbine engine based on the asset monitoring information. For example, the WEC apparatus can determine a value for a takeoff de-rate parameter, a climb de-rate parameter, etc., based on obtaining information from a turbine engine controller, information from an aircraft control system, etc. The example WEC apparatus can analyze the de-rate parameters to identify opportunities for increasing TOW, lowering turbine engine maintenance cost, etc., while respecting operator metrics (e.g., fuel burn, mission times, etc.).

In some examples, the WEC apparatus generates predictive asset health quantifiers by identifying leading indicators by comparing asset monitoring information (e.g., asset sensor data, etc.) to data obtained from executing one or more models (e.g., physics-based models, fleet average regression models, historical trend models, etc.) and identifying deviations of specific engines and/or operators based on the comparison. For example, the WEC apparatus can execute a physics-based model of the turbine engine to determine an asset health quantifier of the turbine engine as a function of operator behavior (e.g., de-rate behavior, takeoff de-rate behavior, etc.) and aircraft weight to predict anticipated maintenance costs, estimated turbine engine health, etc., of the turbine engine. In some examples, a physics-based model is used to simulate a new asset when historical data is not available. In some examples, a physics-based model is used to simulate an existing asset including a new or an upgraded asset component that can change a performance, an AHQ, etc., of the asset when historical data may not include data corresponding to the new or upgraded asset component.

In some examples, the WEC apparatus generates asset and/or asset component performance and severity models based on the deviations. For example, the WEC apparatus can translate the impact of severity factors (e.g., environmental factors, operational factors, etc.), to asset and/or asset component health factors that drive maintenance operations of the asset and/or the asset components. In some examples, the WEC apparatus generates a performance model using a physics-based model, historical information, etc. In some examples, the WEC apparatus generates a performance model based on comparing a first asset health quantifier for an asset or a collection of assets owned by an operator to a plurality of asset health quantifiers calculated for a plurality of other operators. For example, the WEC apparatus can compare an exhaust gas-path temperature (EGT) rate of change value for assets owned by the operator and compare the EGT rate of change value to EGT rate of change values calculated for other operators to identify opportunities of improvement for the operator.

In some examples, the WEC apparatus generates a severity model using historical information. For example, the WEC apparatus can generate an asset health quantifier of an asset component as a function of TOW and an environmental or an operational condition. For example, the WEC apparatus can generate a severity model that maps TOW of an asset component such as a high-pressure turbine to a severity factor input (e.g., an ambient temperature, an exposure to an airborne particulate matter, etc.) for a region in which the asset operates. In some examples, the WEC apparatus incorporates multiple severity models per turbine engine that enable a quantification (e.g., an accurate quantification, an improved quantification, etc.) of competition among failure modes (e.g., potential failure modes, etc.) as a function of the turbine engine operating conditions (e.g., a booster compressor shows a higher sensitivity to ambient temperature than a high-pressure compressor, etc.) in the maintenance cost model. For example, the WEC apparatus can generate a severity model that maps TOW of a high-pressure compressor, a high-pressure turbine nozzle, a low-pressure turbine nozzle, etc., of an asset to a takeoff temperature (e.g., an average takeoff temperature, a peak takeoff temperature, etc.), a climb temperature (e.g., an average climb temperature, a peak climb temperature, etc.), etc., for a region in which the asset operates.

In some examples, the WEC apparatus generates recommendations to optimize and/or otherwise improve operator behavior corresponding to de-rate parameters when the asset is installed on an aircraft. For example, the WEC apparatus can identify an operator as a candidate improvement target based on the performance models, the severity models, etc., and/or a combination thereof. For example, the WEC apparatus can identify an operator for improvement and generate a recommendation to adjust operator behavior to increase TOW and/or improve turbine engine performance. For example, the WEC apparatus can generate a recommendation to change a climb time, a taper schedule, a de-rate parameter, etc., of the asset when installed on an aircraft. In some examples, the WEC apparatus generates a report including the recommendations. For example, the WEC apparatus can generate a report including a candidate improvement plan such as adjusting an engine de-rate parameter, adjusting a taper schedule, etc. In some examples, the WEC apparatus generates an alert dashboard (e.g., an alert dashboard in a report, an alert dashboard in a web-based software application, etc.) indicating areas of improvement for an operator to improve TOW and to reduce maintenance cost of an asset.

In some examples, the WEC apparatus can direct the AWGS to modify one or more components of the AWGS to optimize and/or otherwise improve workscope recommendations based on the operator behavior. For example, the WEC apparatus can direct the AWGS to update one or more models, one or more parameters corresponding to a maintenance task, improve an optimization parameter for evaluating generated workscope s, etc., and/or a combination thereof to meet a current operator behavior (e.g., an instant operator behavior, an observed operator behavior, etc.), a forecasted operator behavior, etc. For example, the WEC apparatus can direct the AWGS to update a physics-based model to be based on a takeoff de-rate parameter used by the operator. In such an example, the AWGS can generate asset health parameters of assets owned by the operator based on the takeoff de-rate parameter and/or other significant operating parameters used by the operator to generate improved workscope recommendations.

In some examples, the WEC apparatus can direct the AWGS to modify one or more components of the AWGS to optimize and/or otherwise improve workscope recommendations based on a comparison of pre-workscope asset related data (e.g., asset health quantifiers, asset monitoring information, inspection results, etc.), to post-workscope asset related data. For example, the WEC apparatus can compare a first asset health quantifier of an asset prior to a workscope being completed on the asset (e.g., when the asset is installed on the aircraft, removed from service but prior to completing an inspection, etc.) to a second asset health quantifier of the asset after the workscope has been completed on the asset.

For example, the WEC apparatus can calculate a workscope quantifier based on calculating a difference between a pre-workscope asset health quantifier and a post-workscope asset health quantifier. For example, the WEC apparatus can be used to optimize and/or otherwise improve a predictability of turbine engine maintenance management recommendations of the AWGS based on the workscope quantifier. For example, the WEC apparatus can direct a modification of one or more components of the AWGS based on comparing the workscope quantifier to a workscope quantifier threshold, and determining whether the workscope quantifier threshold has been satisfied based on the comparison. For example, the WEC apparatus can direct the AWGS to update one or more models, one or more parameters corresponding to a maintenance task, improve an optimization parameter for evaluating generated workscopes, etc., and/or a combination thereof based on the workscope quantifier satisfying the workscope quantifier threshold.

Examples disclosed herein include a fielded asset health advisor (FAHA) apparatus to calculate and analyze an asset health quantifier of an asset and corresponding asset components prior to performing a maintenance operation on the asset. For example, the FAHA can calculate and analyze the asset health quantifier of an asset and corresponding asset components while the asset is fielded (e.g., while on-wing of an aircraft, while in operation, etc.). For example, a fielded asset can refer to an asset performing an operation, an asset in operation generating revenue, or can refer to an asset in service consuming a portion of useful life of the asset in typical operation rather than in test, development, demonstration, maintenance, or other special use activity of the asset. Additionally or alternatively, the example FAHA can calculate and analyze the asset health quantifier after performing the maintenance operation on the asset to determine a quantity of asset health recovered in response to performing the maintenance operation (e.g., the workscope, etc.).

In some examples, the FAHA apparatus is a software application provided by an asset maintenance provider to an asset operator (e.g., an airline company, a manufacturing facility, etc.). For example, the FAHA apparatus can be a web-based application accessible via a computing device such as a personal computer (e.g., a desktop computer, a laptop computer, etc.), an Internet-enabled mobile handset (e.g., a smartphone, an Apple® iPod®, etc.), a tablet computer (e.g., an Apple® iPad®, a Microsoft® SURFACE™, etc.), etc. In another example, the FAHA apparatus can be a smartphone application (e.g., an Apple® iOS application, an ANDROID™ application, etc.), a tablet computer application (e.g., an Apple® iOS application for an Apple® iPad®, a Microsoft® Windows® application for a Microsoft® Surface™, etc.). Alternatively, the example FAHA apparatus can be any other type of software-based application executing on any type of computing device.

In some examples, the FAHA apparatus calculates and analyzes asset health quantifiers of the asset while the asset is in operation (e.g., while on-wing of an aircraft, while an asset is fielded, etc.). In some examples, the FAHA apparatus calculates and analyzes asset health quantifiers of the asset after the asset has been removed from operation but prior to performing an inspection (e.g., a maintenance inspection, a service inspection, etc.) of the asset. The example FAHA apparatus calculates and analyzes the asset health quantifiers based on obtaining sensor data (e.g., real-time sensor data, real-time operational data, etc.), executing one or more computer-based models to generate simulated asset sensor data, calibrating the simulated asset sensor data using a tracking filter, generating the asset health quantifiers (e.g., the actual asset health quantifiers, the projected asset health quantifiers, etc.) based on the calibrated simulated asset sensor data, and generating a report including the asset health quantifiers and workscope recommendations for the asset based on the asset health quantifiers.

In some examples, the FAHA apparatus obtains asset monitoring information. For example, the FAHA apparatus can obtain asset sensor information, asset environmental information, asset utilization information, etc., and/or a combination thereof. For example, the FAHA apparatus can obtain asset sensor information corresponding to a fielded asset while in operation (e.g., while on-wing of an aircraft, while an asset is fielded, etc.) or removed from operation but prior to an inspection (e.g., the asset is removed from the aircraft but prior to a performance of an inspection of the asset, etc.). In some examples, the FAHA apparatus determines a flight segment of the selected asset. For example, the FAHA apparatus can determine that the asset is coupled to an aircraft when the aircraft is parked, taxiing, taking off, climbing, cruising, descending, approaching, landing, etc.

In some examples, the FAHA apparatus executes one or more models such as an engineering physics-based model, a statistical model, etc., to generate an asset parameter for an asset, an asset component, an asset module, etc. For example, the asset parameter can be a value measured by a sensor monitoring one or more components of the asset. For example, the asset parameter can be a sensor value such as a turbine engine speed, a pressure, a pressure ratio, a temperature, a flow rate, etc. In another example, the asset parameter can be a value corresponding to cooling flows, bleeds, pressure losses, clearance or nozzle area changes, etc., of the asset. In yet another example, the asset parameter can be a sensor value corresponding to an aircraft to which the asset is coupled. For example, the asset parameter can be an altitude, a Mach number, etc., of the aircraft.

In some examples, the one or more models calculates an asset characteristic parameter such as an efficiency modifier (e.g., an efficiency adder, etc.), a flow modifier (e.g., a flow scalar, etc.). As used herein, the terms "efficiency modifier" and "efficiency adder" are used interchangeably and refer to a characteristic parameter used to determine an actual efficiency (e.g., an actual turbine engine efficiency) of a turbine engine based on a baseline (nominal) efficiency for the turbine engine. As used herein, the terms "flow modifier" and "flow scalar" are used interchangeably and refer to a characteristic parameter used to determine an actual flow rate based on a baseline (nominal) flow rate, where the flow rate refers to air flow or gas flow through a turbine engine.

In some examples, the FAHA apparatus generates the asset parameters by using steady-state asset data, transient asset data, etc., and/or a combination thereof. For example, the FAHA apparatus can execute one or more models such as an engineering physics-based model, a statistical model, etc., to generate a steady-state asset parameter for an asset, an asset component, an asset module, etc., using steady-state asset data. For example, the FAHA apparatus can generate a steady-state asset parameter of the asset during a cruising flight segment of the aircraft. In another example, the FAHA apparatus can execute one or more models such as an engineering physics-based model, a statistical model, etc., to generate a transient asset parameter for an asset, an asset component, an asset module, etc., using transient asset data. For example, the FAHA apparatus can generate a transient asset parameter of the asset during a transition period between a climbing flight segment and a cruising flight segment of the aircraft. In another example, the FAHA apparatus can generate a transient asset parameter of the asset during a transient flight segment such as a takeoff and departure flight segment.

In some examples, the FAHA apparatus selects tracking filter data to be used by a tracking filter based on the steady-state asset parameters and the transient asset parameters. For example, the tracking filter data can include steady-state asset parameters, transient asset parameters, etc. For example, the FAHA apparatus can merge steady-state operation points with snapshots, snippets, etc., of transient operation periods compared to using a long window of transient operation data. In some examples, the FAHA apparatus obtains the steady-state asset data and/or the transient asset data from the one or more models. In some examples, the FAHA apparatus obtains the steady-state asset data and/or the transient asset data from a database, from a server communicatively coupled to a network, etc.

In some examples, the FAHA apparatus utilizes a model that implements a tracking filter. The example FAHA apparatus can utilize the tracking filter to estimate an effect of component deterioration, sensor biases, turbine engine-to-turbine engine variations, etc., using the tracking filter data. In some examples, the tracking filter is a classical observer, an inverse Jacobian tracking filter, a least-squares tracking filter, a Kalman Filter (optimal observer), etc. The example FAHA apparatus can utilize the model and sensor outputs to obtain, track, and analyze sensor data and sensor data trends over time to determine differences between (1) model outputs, sensor outputs, etc., obtained and/or calculated during a calibration (e.g., an initial) process, and (2) model outputs, sensor outputs, etc., obtained and/or calculated during an operational process.

In some examples, the tracking filter is a parameter identification algorithm that tunes one or more parameters (e.g., steady-state asset parameters, transient asset parameters, etc.) in the model (e.g., the engineering-physics based model, the statistical model, etc.) to adjust model outputs to match sensor outputs. For example, the FAHA apparatus can obtain sensor data (e.g., an analog signal such as a current, a resistance, or a voltage) from a turbine engine sensor. For example, the turbine engine sensor can measure a speed of a rotor, a pressure, a temperature, etc. The example FAHA apparatus can convert or scale the sensor data to yield a sensor output in engineering units such as rpm, psi, or degrees Rankine. The example FAHA apparatus can calculate a model output (e.g., an output from the engineering-physics based model, the statistical model, etc.), where the model output is an estimate value for the sensor output based on a set of operating conditions or parameters of the turbine engine in the model. The example FAHA apparatus can compare the model output to the sensor output to determine a difference. The example FAHA apparatus can adjust simulated asset sensor data (e.g., simulated steady-state asset sensor data, simulated transient asset sensor data, etc.) of the model to eliminate and/or otherwise minimize the difference. For example, the FAHA apparatus can utilize the tracking filter to calibrate simulated asset sensor data to generate one or more asset health quantifiers.

In some examples, the FAHA apparatus executes one or more models such as an engineering physics-based model, a statistical model, etc., to generate an asset health quantifier for an asset, an asset component, an asset module, etc., based on the calibrated asset sensor data. In some examples, the asset health calculator apparatus generates a projected asset health quantifier based on forecasted mission requirements of the asset such as forecasted environmental information, forecasted utilization information, etc. In some examples, the FAHA aggregates and ranks the asset health quantifiers, the projected asset health quantifiers, etc. For example, the FAHA apparatus can rank assets or components of the assets based on the generated asset health quantifiers. In some examples, the FAHA apparatus compares an asset health quantifier to a threshold (e.g., an asset health quantifier threshold, a maintenance quantifier threshold, etc.) and determines whether the asset health quantifier satisfies the threshold based on the comparison.

In some examples, the FAHA apparatus generates a report based on the calibrated simulated asset sensor data, the asset health quantifiers, etc. For example, the FAHA apparatus can generate a report including the calibrated asset sensor data, the asset health quantifiers, etc., of the asset. In another example, the FAHA apparatus can generate a report including an identification of one or more assets as candidates for removal from service. In another example, the FAHA apparatus can generate a report including an identification of one or more asset components as candidates for refurbishment, maintenance, replacement, etc. In yet another example, the FAHA apparatus can generate a report including diagnostic support for asset management (e.g., fleet management, etc.), overhaul shops, maintenance facilities, etc., to help make more optimized and/or otherwise more improved targeted workscope plans, reduce shop turn-around time (TAT), and reduce cost (e.g., monetary cost, resource cost, etc.).

FIG. 1 is a schematic illustration of an example turbine engine controller 100 monitoring an example gas turbine engine 102. In the illustrated example, the turbine engine controller 100 is a full-authority digital engine control (FADEC) unit. For example, the turbine engine controller 100 can include a closed loop control module to generate a control input (e.g., a thrust command, a de-rate parameter, etc.) to the engine 102 based on an engine input (e.g., a pilot command, an aircraft control system command, etc.). Alternatively, the turbine engine controller 100 may be any other type of data acquisition and/or control computing device. FIG. 1 illustrates a cross-sectional view of the engine 102 that can be utilized within an aircraft in accordance with aspects of the disclosed examples. The gas turbine engine 102 is shown having a longitudinal or axial centerline axis 104 extending throughout the gas turbine engine 102 for reference purposes. In general, the engine 102 can include a core gas turbine engine 106 and a fan section 108 positioned upstream thereof. The core gas turbine engine 106 can generally include a substantially tubular outer casing 110 that defines an annular inlet 112. In addition, the outer casing 110 can further enclose and support a booster compressor 114 for increasing the pressure of the air that enters the core gas turbine engine 106 to a first pressure level. A high-pressure, multi-stage, axial-flow compressor 116 can then receive the pressurized air from the booster compressor 114 and further increase the pressure of such air to a second pressure level. Alternatively, the high-pressure, multi-stage compressor 116 can be a high-pressure, multi-stage centrifugal compressor or a high-pressure, multi-stage axial-centrifugal compressor.

In the illustrated example of FIG. 1, the pressurized air exiting the high-pressure compressor 116 can then flow to a combustor 118 within which fuel is injected into the flow of pressurized air, with the resulting mixture being combusted within the combustor 118. The high-energy combustion products are directed from the combustor 118 along the hot gas path of the engine 102 to a first (high-pressure) turbine 120 for driving the high-pressure compressor 116 via a first (high-pressure) drive shaft 122, and then to a second (low-pressure) turbine 124 for driving the booster compressor 114 and fan section 108 via a second (low-pressure) drive shaft 126 that is generally coaxial with first drive shaft 122. After driving each of the turbines 120 and 124, the combustion products can be expelled from the core gas turbine engine 106 via an exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, with each stage including both an annular array of stationary nozzle vanes and an annular array of rotating turbine blades positioned immediately downstream of the nozzle vanes.

Additionally, as shown in FIG. 1, the fan section 108 of the engine 102 can generally include a rotatable, axial-flow fan rotor assembly 130 that is configured to be surrounded by an annular fan casing 132. The fan casing 132 can be configured to be supported relative to the core gas turbine engine 106 by a plurality of substantially radially-extending, circumferentially-spaced outlet guide vanes 134. As such, the fan casing 132 can enclose the fan rotor assembly 130 and its corresponding fan rotor blades 136. Moreover, a downstream section 138 of the fan casing 132 can extend over an outer portion of the core gas turbine engine 106 to define a secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via a speed reduction device 142 (e.g., a reduction gear or gearbox) to provide an indirect-drive or geared drive configuration. Such a speed reduction device(s) can also be provided between any other suitable shafts and/or spools within the engine 102 as desired or required.

In the illustrated example of FIG. 1, the engine 102 includes sensors 144, 146 communicatively coupled to the turbine engine controller 100. Alternatively, the sensors 144, 146 can be communicatively coupled to a control system of an aircraft coupled to the engine 102, in which the control system is communicatively coupled to the example turbine engine controller 100. In the illustrated example, the sensors 144, 146 are gas-path temperature sensors (e.g., exhaust gas-path temperature sensors, etc.). For example, the sensors 144, 146 can be monitoring a compressor inlet temperature and a temperature of gas exiting the high-pressure turbine 120. Alternatively, the sensors 144, 146 can be chip detector sensors (e.g., magnetic chip detector sensors, etc.), dust sensors, flow sensors, gas-path pressure sensors, rotor speed sensors, vibration sensors, position sensors (e.g., actuator position sensors, sensors detailing variable geometry, etc.), etc. Although the sensors 144, 146 are depicted in FIG. 1 as being at specific locations, the sensors 144, 146 can be located elsewhere on the engine 102. Additionally or alternatively, there can be more than two sensors 144, 146 located on the engine 102. A typical implementation has six gas-path temperature sensors 144, 146. Additionally or alternatively, there can be more than one example turbine engine controller 100 coupled to the engine 102. Although the example turbine engine controller 100 is depicted in FIG. 1 as being proximate the fan section 108, the turbine engine controller 100 can be located elsewhere on the engine 102 or elsewhere on the aircraft coupled to the engine 102.

During operation of the engine 102, an initial air flow (indicated by arrow 148) can enter the engine 102 through an associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the engine 102.

Figure 2:
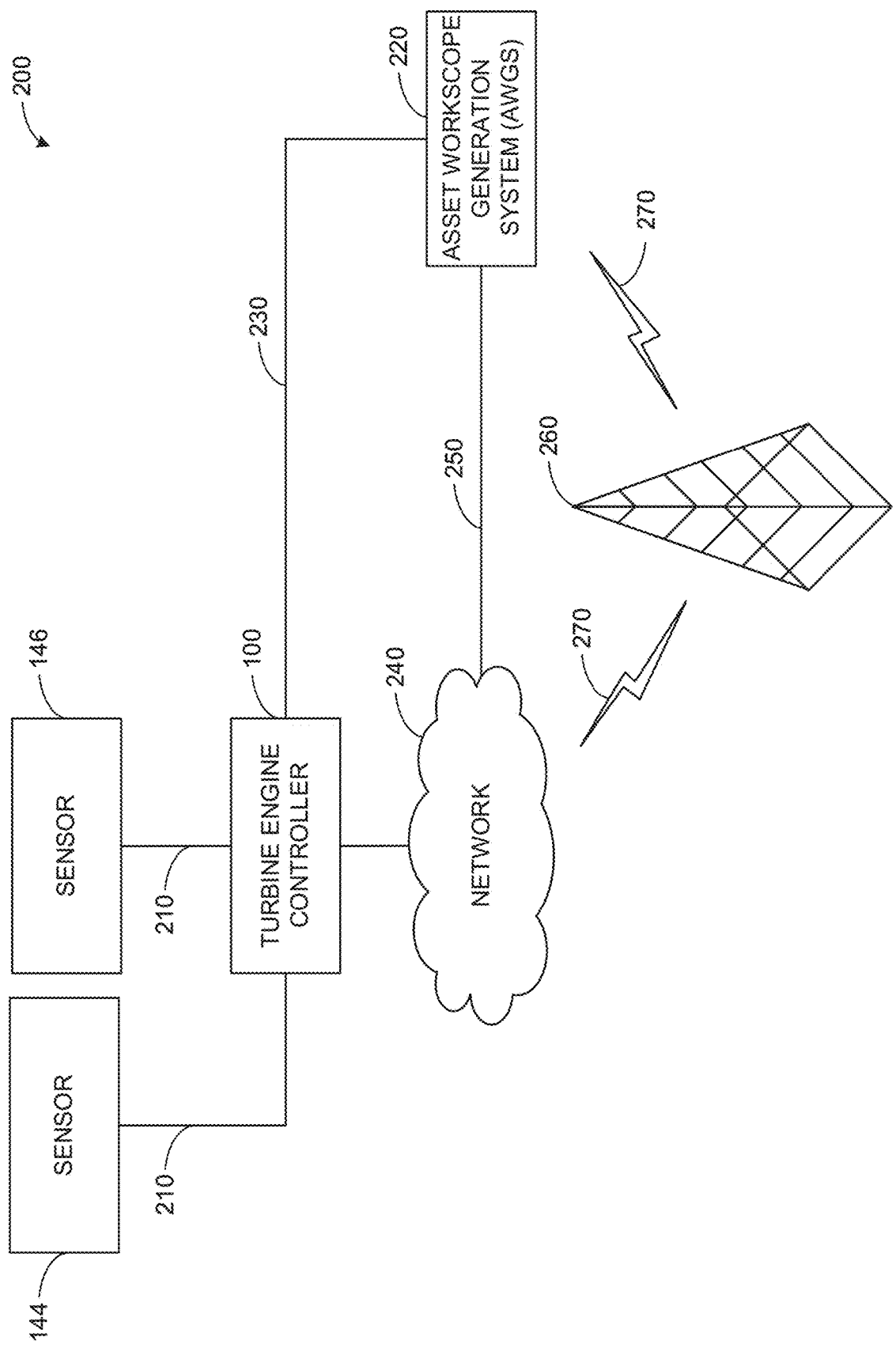
FIG. 2 is a block diagram of an example environment in which an example asset workscope generation system monitors the example gas turbine engine of FIG. 1.

FIG. 2 is a schematic illustration of an example asset monitoring system 200 for the gas turbine engine 102 of FIG. 1. In the illustrated example of FIG. 2, the sensors 144, 146 of FIG. 1 are communicatively coupled to the turbine engine controller 100 via sensor connections 210. The example turbine engine controller 100 obtains asset sensor information (e.g., a pressure, a temperature, a speed of a rotor, etc.) from the sensors 144, 146 to monitor an operation of the gas turbine engine 102. The sensor connections 210 can include direct wired or direct wireless connections. For example, a direct wired connection can involve a direct connection using wires in a harness connecting the sensors to the turbine engine controller 100, or a bus such as the Engine Area Distributed Interconnect Network (EADIN) bus. In another example, the direct wireless connections can implement a Bluetooth® connection, a Wi-Fi Direct® connection, or any other wireless communication protocol. Further shown in FIG. 2 are an example asset workscope generation system (AWGS) 220, an example AWGS direct connection 230, an example network 240, an example AWGS network connection 250, an example wireless communication system 260, and an example wireless communication links 270.

In the illustrated example of FIG. 2, the example turbine engine controller 100 is shown to be communicatively coupled to the AWGS 220 via the AWGS direct connection 230. For example, the AWGS 220 can obtain asset operation information such as flight data (e.g., altitudes, turbine engine speeds, engine exhaust temperatures, etc.), asset sensor information, etc., from the turbine engine controller 100 via the AWGS direct connection 230. The example AWGS direct connection 230 can be a direct wired or a direct wireless connection. For example, the AWGS 220 can download asset information (e.g., asset operation information, asset sensor information, etc.) of the engine 102 via a manual download of the data from the turbine engine controller 100 to a computing device such as a laptop, a server, etc., followed by a subsequent upload to the AWGS 220. Alternatively, the example AWGS 220 can be directly connected to the turbine engine controller 100 to obtain asset information.

The AWGS 220 of the illustrated example is a server that collects and processes asset information of the engine 102. Alternatively or in addition, the example AWGS 220 can be a laptop, a desktop computer, a tablet, or any type of computing device or a network including any number of computing devices. The example AWGS 220 analyzes the asset information of the engine 102 to determine an asset workscope. For example, the AWGS 220 can determine that the high-pressure compressor 116 of FIG. 1 requires a water-wash based on a comparison of an asset health quantifier of the high-pressure compressor 116 to an asset health quantifier threshold corresponding to the high-pressure compressor 116, an elapsing of a time interval specified in a contract, etc.

Additionally or alternatively, the example AWGS 220 can obtain asset information from the example turbine engine controller 100 via the network 240. For example, the AWGS 220 can obtain asset information of the engine 102 from the turbine engine controller 100 by connecting to the network 240 via the AWGS network connection 250. The example AWGS network connection 250 can be a direct wired or a direct wireless connection. For example, the turbine engine controller 100 can transmit asset information to a control system of an aircraft coupled to the engine 102. The aircraft control system can subsequently transmit the asset information to the example AWGS 220 via the network 240 (e.g., via the AWGS network connection 250, the wireless communication links 270, etc.).

The example network 240 of the illustrated example of FIG. 2 is the Internet. However, the example network 240 can be implemented using any suitable wired and/or wireless network(s) including, for example, one or more data buses, one or more Local Area Networks (LANs), one or more wireless LANs, one or more cellular networks, one or more private networks, one or more public networks, etc. The example network 240 enables the example turbine engine controller 100 to be in communication with the example AWGS 220. As used herein, the phrase "in communication," including variances therefore, encompasses direct communication and/or indirect communication through one or more intermediary components and does not require direct physical (e.g., wired) communication and/or constant communication, but rather includes selective communication at periodic and/or aperiodic intervals, as well as one-time events.

In some examples, the turbine engine controller 100 is unable to transmit asset information to the AWGS 220 via the AWGS direct connection 230, the AWGS network connection 250, etc. For example, a routing device upstream of the AWGS 220 can stop providing functional routing capabilities to the AWGS 220. In the illustrated example, the turbine engine health monitoring system 200 includes additional capabilities to enable communication (e.g., data transfer) between the AWGS 220 and the network 240. As shown in FIG. 2, the example AWGS 220 and the example network 240 include the capabilities to transmit and/or receive asset information through the example wireless communication system 260 (e.g., the cellular communication system, the satellite communication system, the air band radio communication system, the Aircraft Communications Addressing and Reporting System (ACARS), etc.) via the example wireless communication links 270.

The wireless communication links 270 of the illustrated example of FIG. 2 are cellular communication links. However, any other method and/or system of communication can additionally or alternatively be used such as an Ethernet connection, a Bluetooth connection, a Wi-Fi connection, a satellite connection, etc. Further, the example wireless communication links 270 of FIG. 2 can implement cellular connections via a Global System for Mobile Communications (GSM). However, any other systems and/or protocols for communications can be used such as Time Division Multiple Access (TDMA), Code Division Multiple Access (CDMA), Worldwide Interoperability for Microwave Access (WiMAX), Long Term Evolution (LTE), etc.

Figure 3:
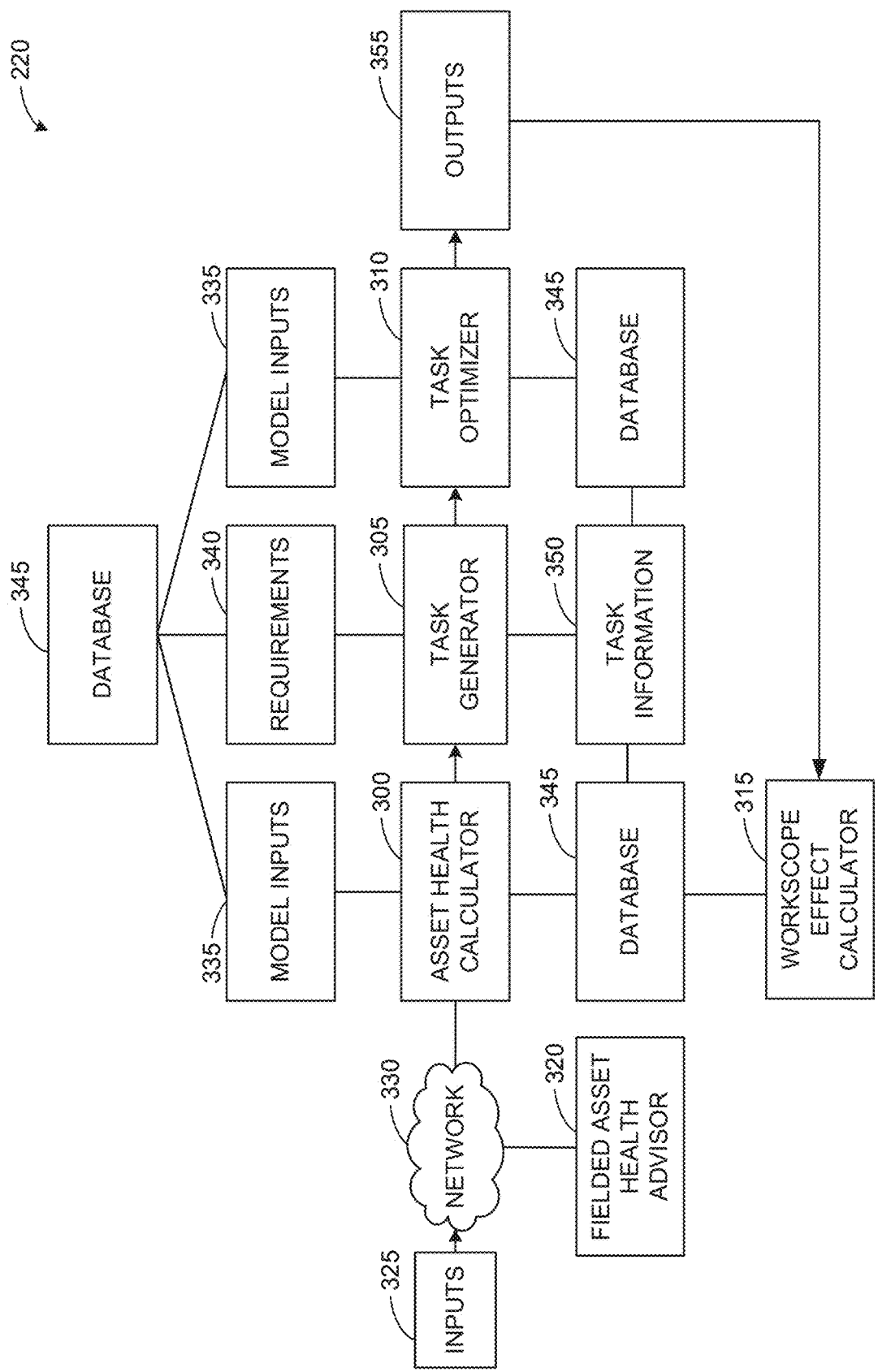
FIG. 3 is a block diagram of an example implementation of the example asset workscope generation system of FIG. 2.

FIG. 3 is a block diagram of an example implementation of the example AWGS 220 of FIG. 2. The example AWGS 220 includes an example asset health calculator 300, an example task generator 305, an example task optimizer 310, an example workscope effect calculator 315, an example fielded asset health advisor (FAHA) 320, example inputs 325, an example network 330, example model inputs 335, example requirements 340, an example database 345, example task information 350, and example outputs 355.

In the illustrated example of FIG. 3, the AWGS 220 includes the example asset health calculator 300 to identify a target asset such as the engine 102 of FIG. 1 for removal to perform a task to improve an operating condition of the target asset. In some examples, the asset health calculator 300 calculates an actual asset health quantifier (AHQ) of an asset based on the inputs 325 (e.g., asset sensor data, engine control inputs, etc.) obtained via the network 330. The example network 330 can implement or correspond to the example network 240 of FIG. 2. For example, the asset health calculator 300 can obtain inputs based on an inspection of the asset by an asset maintenance technician. In another example, the asset health calculator 300 can obtain asset information from the turbine engine controller 100 of the engine 102 of FIGS. 1-2 via the AWGS direct connection 230 of FIG. 2, the AWGS network connection 250 of FIG. 2, the wireless communication links 270 of FIG. 2, etc.

In some examples, the asset health calculator 300 calculates a projected AHQ based on the model inputs 335. For example, the asset health calculator 300 can estimate an operating condition of the engine 102 after the engine 102 completes a specified number of cycles (e.g., flight cycles, operation cycles, etc.). For example, the asset health calculator 300 can simulate the engine 102 completing the specified number of flight cycles by executing a digital twin model of the engine 102 for the specified number of flight cycles. As used herein, the term "flight cycle" refers to a complete operation cycle of an aircraft flight executed by an asset including a take-off operation and a landing operation.

As used herein, the term "digital twin" refers to a digital representation, a digital model, or a digital "shadow" corresponding to a digital informational construct about a physical system. That is, digital information can be implemented as a "twin" of a physical device/system (e.g., the engine 102, etc.) and information associated with and/or embedded within the physical device/system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces. The links for data flow or information flow correspond to a digital thread that represents a communication framework between sources of data and the digital twin model. The digital thread can enable an integrated view of asset data throughout a lifecycle of the asset. For example, the digital twin model can correspond to the virtual model of the asset and the digital thread can represent the connected data flow between an asset data source and the virtual model.

In some examples, the asset health calculator 300 identifies a target asset for removal based on comparing an actual AHQ to an actual AHQ threshold and identifying the target asset for removal based on the comparison. In some examples, the asset health calculator identifies a target asset for removal based on comparing a projected AHQ to a projected AHQ threshold and identifying the target asset for removal based on the comparison. In some examples, the asset health calculator 300 generates a removal schedule for one or more target assets based on requirements such as contractual requirements, maintenance resources, spare part inventory, etc., and/or a combination thereof.

In some examples, the AHQ threshold (e.g., the actual AHQ threshold, the projected AHQ threshold, etc.) of an asset, an asset component, etc., represents an indicator, which when satisfied, corresponds to the asset, the asset component, etc., being identified as a candidate for removal to perform maintenance, service, etc. For example, the asset health calculator 300 can compare an actual AHQ of 50 cycles (e.g., flight cycles, flight operations, etc.) remaining (e.g., until service can be performed, until the asset component is taken off-wing, etc.) for the booster compressor 114 of FIG. 1 to an actual AHQ threshold of 100 cycles remaining and identify the booster compressor 114 of FIG. 1 as a candidate for removal based on the actual AHQ being less than the actual AHQ threshold. In another example, the asset health calculator 300 can compare an actual AHQ of 200 hours operating remaining for the booster compressor 114 of FIG. 1 to an actual AHQ threshold of 250 hours operating remaining and identify the booster compressor 114 of FIG. 1 as a candidate for removal based on the actual AHQ being less than the actual AHQ threshold. For example, the actual AHQ threshold, the projected AHQ threshold, etc., can be determined based on a contractual requirement, historical-based information of previously repaired assets and/or asset components, etc.

In the illustrated example of FIG. 3, the AWGS 220 includes the task generator 305 to generate a workscope task for the target asset based on obtaining an AHQ from the asset health calculator 300. For example, the task generator 305 can obtain an AHQ for the engine 102, an AHQ for the booster compressor 114 of the engine 102, etc. In some examples, the task generator 305 identifies an asset component to be processed based on comparing an AHQ to an AHQ threshold and identifying the asset component based on the comparison. For example, the task generator 305 can compare an actual AHQ of 30% useful life remaining for the booster compressor 114 to an actual AHQ threshold of 50% useful life remaining and identify the booster compressor 114 for replacement based on the actual AHQ being less than the actual AHQ threshold.

In some examples, the task generator 305 identifies an asset component to be processed based on the requirements 340 obtained from the database 345. For example, the task generator 305 can compare an actual AHQ of 100 cycles for the booster compressor 114 to an actual AHQ threshold of 200 cycles for the booster compressor 114 based on contractual requirements (e.g., a contract specifies that a booster compressor must be serviced when the actual AHQ goes below 200 cycles). In such an example, the task generator 305 can identify the booster compressor 114 for processing based on the actual AHQ being less than the actual AHQ threshold.

In response to identifying one or more asset components to be processed, the example task generator 305 can generate a set of workscope tasks that can be performed on the one or more asset components. For example, the task generator 305 can determine the set of tasks based on obtaining the task information 350 from the database 345. For example, the task generator 305 can query the database 345 with the identified component for processing (e.g., the booster compressor 114) and the actual AHQ of the component, and the database 345 can return task information including a list of tasks that can be performed with corresponding costs (e.g., labor costs, monetary costs, etc.), spare parts, tools, etc., for each task in the list.

In the illustrated example of FIG. 3, the AWGS 220 includes the task optimizer 310 to identify an optimized workscope for a target asset based on the generated workscope tasks for the target asset and the model inputs 335. For example, the task optimizer 310 can generate a plurality of workscopes in which each workscope includes a combination of one or more of the workscope tasks obtained from the task generator 305. In such an example, the task optimizer 310 can store the plurality of workscopes in the database 345.

In some examples, the task optimizer 310 calculates an estimate asset health quantifier for the target asset to generate quantifiable metrics to evaluate an accuracy or an efficiency of the AWGS 220 in improving an operating condition of the engine 102. For example, the task optimizer 310 can calculate an asset health quantifier for the target asset in response to performing a specified workscope on the target asset. For example, the task optimizer 310 can obtain an actual AHQ of the target asset calculated by the asset health calculator 300, select a workscope of interest for the target asset, and calculate an estimate AHQ of the target asset if the selected workscope were to be performed on the target asset. In some examples, the workscope effect calculator 315 calculates an actual AHQ of the target asset after the selected workscope is completed on the target asset and compares the actual AHQ to the estimate asset health quantifier calculated by the task optimizer 310 to determine an accuracy of the AWGS 220 based on the comparison.

In some examples, the task optimizer 310 calculates an estimate AHQ by executing one or models such as a digital twin model of the target asset to generate the model inputs 335. For example, a digital twin model can be implemented using an artificial neural network and/or other machine learning/artificial intelligence to form connections between inputs and outputs and drive evaluation and behavior through patterns, feedback, optimization, etc.

In some examples, the task optimizer 310 calculates an estimate asset health quantifier for each one of the generated workscopes. In some examples, the task optimizer 310 selects a workscope to be performed on the target asset based on one or more factors such as comparisons of the calculated estimate asset health quantifiers to contractual requirements, customer requirements, operational constraints, etc., and/or a combination thereof. In such examples, the outputs 355 correspond to the selected workscope including a set of tasks to be performed on the target asset and corresponding workscope information. For example, the workscope information can include an assignment of maintenance personnel, a service facility, spare parts, tools, etc., to the workscope based on a removal schedule identified by the asset health calculator 300.

In the illustrated example of FIG. 3, the AWGS 220 includes the workscope effect calculator 315 to generate a predictive asset health quantifier of a turbine engine. For example, the workscope effect calculator 315 can determine one or more de-rate parameters of the turbine engine based on the inputs 325. For example, the workscope effect calculator 315 can determine a value for a takeoff de-rate parameter, a climb de-rate parameter, etc., of the engine 102. The example workscope effect calculator 315 can analyze the de-rate parameters to identify opportunities for increasing TOW, lowering turbine engine maintenance cost, etc., of the engine 102 while respecting operator metrics (e.g., fuel burn, mission times, etc.).

In some examples, the workscope effect calculator 315 generates asset and/or asset component performance and severity models based on the deviations. For example, the workscope effect calculator 315 can translate the impact of environmental factors, operational factors, etc., to asset and/or asset component health factors that drive maintenance operations of the asset and/or the asset components. In some examples, the workscope effect calculator 315 generates a severity model using historical information. For example, the workscope effect calculator 315 can generate an asset health quantifier of an asset component as a function of TOW and an environmental or an operational condition. For example, the workscope effect calculator 315 can generate a severity model that maps TOW of an asset component such as a high-pressure compressor to one or more environmental parameters of significance to component life (e.g., TOW, etc.).

In some examples, the workscope effect calculator 315 generates recommendations to optimize and/or otherwise improve operator behavior corresponding to takeoff de-rate parameters, climb de-rate parameters, etc., when the asset is on-wing of an aircraft. For example, the workscope effect calculator 315 can generate a recommendation to adjust the operator behavior to increase TOW and improve turbine engine performance. For example, the workscope effect calculator 315 can generate a recommendation to change a climb time, a taper schedule (e.g., a turbine engine de-rate taper schedule, etc.), a de-rate parameter, etc., of the asset when on-wing of the aircraft. As used herein, the term "taper schedule" refers to a scheduled de-rating operation of a turbine engine as the turbine engine transitions between flight segments of a flight cycle. For example, the taper schedule can include instructions to operate the turbine engine at 5% de-rate during a takeoff and departure flight segment, at 15% de-rate during a climb flight segment, and at 40% de-rate during a cruise flight segment.

In some examples, the workscope effect calculator 315 generates a report including the recommendations. For example, the workscope effect calculator 315 can generate a report including a candidate improvement plan for identified operators as candidate improvement targets. For example, the candidate improvement plan can include a recommendation to change the climb time, the taper schedule, the de-rate parameter, etc., of the asset when on-wing of the aircraft. In some examples, the workscope effect calculator 315 generates an alert dashboard (e.g., an alert dashboard in a report, an alert dashboard in a web-based software application, etc.) indicating areas of improvement for an operator to improve TOW and to reduce maintenance cost of an asset.

In some examples, the workscope effect calculator 315 calculates an effect of performing a workscope on a target asset. In some examples, the workscope effect calculator 315 calculates a workscope quantifier which represents an accuracy or an efficiency of the AWGS 220 in improving an operating condition of the engine 102. In some examples, the workscope effect calculator 315 calculates an actual AHQ of the target asset in response to the selected workscope being performed on the target asset. In some examples, the workscope effect calculator 315 calculates the actual AHQ based on an inspection (e.g., a visual inspection, etc.) from maintenance personnel, sensor data from the sensors 144, 146 of FIG. 2, etc., and/or a combination thereof. For example, the workscope effect calculator 315 can calculate an actual AHQ of the high-pressure turbine 120 based on comparing (1) a first pressure value and/or a first temperature value of the high-pressure turbine 120 obtained from the sensors 144, 146 of FIG. 2 prior to the selected workscope being performed to (2) a second pressure value and/or a second temperature value of the high-pressure turbine 120 obtained from the sensors 144, 146 after the selected workscope being performed. In such an example, the workscope effect calculator 315 can calculate the actual AHQ based on the comparison.

In some examples, the workscope effect calculator 315 calculates a workscope quantifier based on comparing a first asset health quantifier of a target asset to a second asset health quantifier of the target asset. For example, the workscope effect calculator 315 can calculate a workscope quantifier based on a first actual AHQ calculated by the task optimizer 310 prior to a workscope being performed on the engine 102 and a second actual AHQ calculated by the workscope effect calculator 315 after a completion of the workscope. For example, the workscope quantifier can be a difference between the first and the second actual AHQ, a ratio of the first and the second actual AHQ, etc. For example, the workscope effect calculator 315 can calculate a workscope quantifier of 10% based on a difference between a first actual AHQ of 90% calculated by the task optimizer 310 and a second actual AHQ of 80% calculated by the workscope effect calculator 315 (e.g., 10%=90%–80%, etc.). In such an example, the workscope effect calculator 315 can determine that the AWGS 220 can be improved because the selected workscope did not improve an operating condition of the engine 102 to a level anticipated by the AWGS 220.

In some examples, the workscope effect calculator 315 modifies one or more components of the AWGS 220 based on the operator behavior (e.g., a de-rating behavior of owner assets, etc.). In some examples, the workscope effect calculator 315 modifies the one or more components of the AWGS 220 by calculating a workscope quantifier, comparing the workscope quantifier to a workscope quantifier threshold, and determining whether the workscope quantifier satisfies the workscope quantifier threshold based on the comparison. In some examples, the workscope quantifier threshold represents an indicator, when satisfied, identifies that the AWGS 220 can be improved by updating one or more components of the AWGS 220. For example, the workscope effect calculator 315 can obtain a first actual AHQ for the booster compressor 114 from the database 345 corresponding to an actual AHQ of 90% useful life remaining calculated by the task optimizer 310. The example workscope effect calculator 315 can generate a second actual AHQ of 70% useful life remaining based on an inspection of the booster compressor 114, the sensor data from the sensors 144, 146, etc.

The example workscope effect calculator 315 can calculate a workscope quantifier of 20% based on calculating a difference between the first and the second actual AHQ (e.g., 20%=90%–70%, etc.). In another example, the workscope effect calculator 315 can calculate a workscope quantifier of 0.78 based on calculating a ratio of the first and the second actual AHQ (e.g., 0.78=0.70÷0.90, etc.). In such an example, the workscope effect calculator 315 can compare the workscope quantifier of 0.78 to a workscope quantifier threshold of 0.85 and determine whether the workscope quantifier satisfies the workscope quantifier threshold. For example, the workscope effect calculator 315 can determine to modify a component of the AWGS 220 based on the workscope quantifier being less than the workscope quantifier threshold.

In response to determining that the workscope quantifier satisfies the workscope quantifier threshold, the example workscope effect calculator 315 can regenerate the example asset health calculator 300, the example task generator 305, the example task optimizer 310, the example model inputs 335, the example requirements 340, the example database 345, the example task information 350, etc., and/or a combination thereof. For example, the workscope effect calculator 315 can direct a digital twin model of the engine 102 to update to a latest version of the digital twin model incorporating up-to-date historical trend information, model parameters, model algorithms, etc. In another example, the workscope effect calculator 315 can direct the database 345 to update to include a latest version of the task information 350. In yet another example, the workscope effect calculator 315 can direct the task optimizer 310 to update one or more algorithms, calculation parameters, etc., used by the task optimizer 310 to a latest version.

In the illustrated example of FIG. 3, the AWGS 220 includes the FAHA 320 to generate a recommendation to improve operational usage of an asset. In some examples, the FAHA 320 obtains sensor data from the sensors 144, 146 of FIG. 2, model information (e.g., outputs from a physics-based model of an asset, a stochastic model of an asset, etc.), etc., to generate analytics and diagnostics corresponding to a health of the asset. For example, the FAHA 320 can be a software application executing on a computing device (e.g., a desktop computer, a tablet, a smartphone, etc.) to generate asset health information (e.g., an actual AHQ, a projected AHQ, etc.), asset usage recommendations, etc. In other examples, the FAHA 320 can be implemented as a dedicated hardware device (e.g., an application-specific integrated circuit, firmware device, etc.) to monitor asset operation and generate asset health information, asset usage recommendation, etc.

In the illustrated example, the FAHA 320 is communicatively coupled to the network 330. For example, the FAHA 320 can obtain sensor data from the sensors 144, 146, obtain an up-to-date version of one or more models, obtain an up-to-date version of an algorithm or a calculation parameter used by the asset health calculator 300, etc., via the network 330. Alternatively, the example FAHA 320 may not be communicatively coupled to the network 330 (e.g., the FAHA 320 is executing on a standalone device not communicatively coupled to the network 330, etc.).

In the illustrated example of FIG. 3, the AWGS 220 includes the database 345 to record data (e.g., asset health quantifiers, workscope quantifiers, the inputs 325, the model inputs 335, the requirements 340, the task information 350, etc.). In the illustrated example, the database 345 is communicatively coupled to the asset health calculator 300, the task generator 305, the task optimizer 310, the workscope effect calculator 315, and the FAHA 320 (e.g., when communicatively coupled to the network 330, etc.). The example database 345 can respond to queries for information related to data in the database 345. For example, the database 345 can respond to queries for additional data by providing the additional data (e.g., the one or more data points), by providing an index associated with the additional data in the database 345, etc. The example database 345 can additionally or alternatively respond to queries when there is no additional data in the database 345 by providing a null index, an end of database identifier, etc. For example, the asset health calculator 300 can query the database 345 for asset sensor data, asset environmental data, utilization data, etc., corresponding to the engine 102. In response to the query, the example database 345 can transmit the data and corresponding information such as data logs, maintenance history, etc., to the example asset health calculator 300.

The example database 345 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 345 can additionally or alternatively be implemented by one or more double data rate (DDR) memories, such as DDR, DDR2, DDR3, DDR4, mobile DDR (mDDR), etc. The example database 345 can additionally or alternatively be implemented by one or more mass storage devices such as hard disk drive(s), compact disk drive(s) digital versatile disk drive(s), solid-state drives, etc. While in the illustrated example the database 345 is illustrated as a single database, the database 345 can be implemented by any number and/or type(s) of databases.

While an example implementation of the AWGS 220 of FIG. 2 is illustrated in FIG. 3, one or more of the elements, processes, and/or devices illustrated in FIG. 3 may be combined, divided, re-arranged, omitted, eliminated, and/or implemented in any other way. Further, the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 of FIG. 3 may be implemented by hardware, software, firmware and/or any combination of hardware, software and/or firmware. Thus, for example, any of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, the example outputs 355 and/or, more generally, the example AWGS 220 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example asset health calculator 300, the example task generator 305, the example task optimizer 310, the example workscope effect calculator 315, the example FAHA 320, the example inputs 325, the example network 330, the example model inputs 335, the example requirements 340, the example database 345, the example task information 350, and/or the example outputs 355 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AWGS 220 of FIG. 2 may include one or more elements, processes and/or devices in addition to, or instead of, those illustrated in FIG. 3, and/or may include more than one of any or all of the illustrated elements, processes, and devices.

I. Asset Health Calculator

Figure 4:
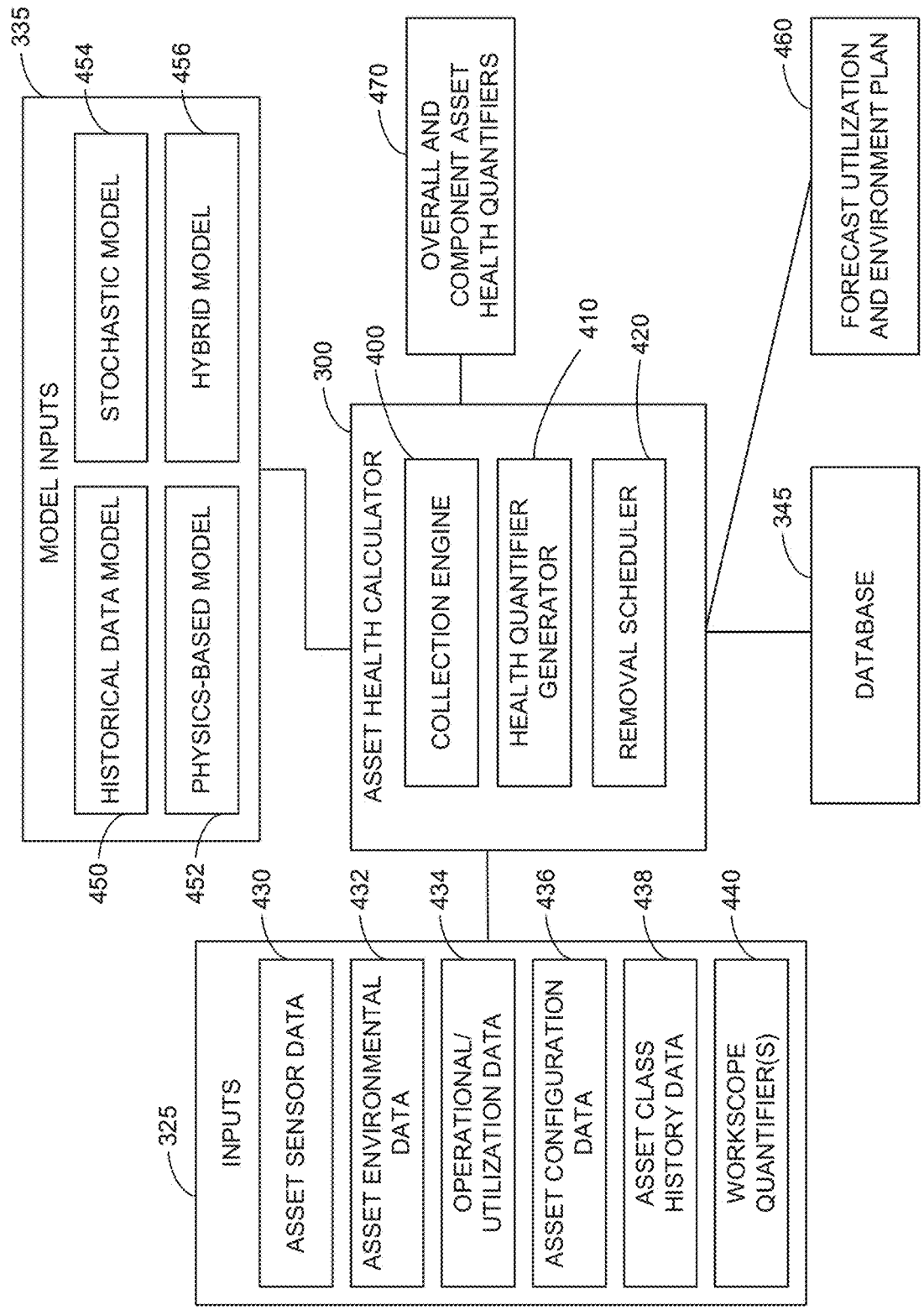
FIG. 4 is a block diagram of an example implementation of an example asset health calculator apparatus.

FIG. 4 is a block diagram of an example implementation of the example asset health calculator 300 of FIG. 3. The asset health calculator 300 of the illustrated example calculates, aggregates, and ranks AHQ (e.g., actual AHQ, projected AHQ, etc.) of an asset (e.g., the engine 102 of FIG. 1), an asset component (e.g., the booster compressor 114, the high-pressure turbine 120, etc.), etc. The asset health calculator 300 includes an example collection engine 400, an example health quantifier generator 410, and an example removal scheduler 420.

In the illustrated example of FIG. 4, the asset health calculator 300 includes the example collection engine 400 to obtain information of interest to process. In the illustrated example, the collection engine 400 obtains the inputs 325 to process. For example, the collection engine 400 can obtain the inputs 325 from the network 330 of FIG. 3. The inputs 325 of the illustrated example include example asset sensor data 430, example asset environmental data 432, example operational/utilization data 434, example asset configuration data 436, example asset class history data 438, and example workscope quantifier(s) 440.

In the illustrated example, the collection engine 400 obtains the asset sensor data 430 to determine operating conditions experienced by the engine 102 of FIG. 1. In some examples, the collection engine 400 obtains the asset sensor data 430 from the database 345 of FIG. 3. In some examples, the asset sensor data 430 corresponds to sensor data obtained from the sensors 144, 146 of FIG. 2. For example, the asset sensor data 430 can include sensor measurements such as a speed of a rotor, a pressure, a temperature, a vibration, etc., experienced by the engine 102 of FIG. 1. In some examples, the asset sensor data 430 includes a range of sensor measurements for an environmental parameter (e.g., a pressure, a temperature, etc.) measured by an environmental parameter sensor (e.g., a pressure sensor, a temperature sensor, etc.). In some examples, the asset sensor data 430 includes a duration of sensor measurements such as an amount of time the sensors 144, 146 measured a specific sensor measurement (e.g., an amount of time the sensors 144, 146 measured a pressure value of 100 PSI, an amount of time the sensors 144, 146 measured a temperature value of 2400 Rankine, etc.).

In the illustrated example, the collection engine 400 obtains the asset environmental data 432 to determine environmental conditions experienced by the engine 102. In some examples, the collection engine 400 obtains the asset environmental data 432 from the database 345 of FIG. 3. In some examples, the asset environmental data 432 includes a range of environmental condition parameters experienced by the engine 102. For example, the asset environmental data 432 can include a range of ambient temperatures (e.g., a range of 10-40 degrees Celsius, etc.), precipitation amounts, salt atmosphere percentages (e.g., a range of 5-55% salt atmosphere, etc.), a range of airborne particulate matter sizes (e.g., a size of a man-made airborne particulate matter, a size of a naturally occurring airborne particulate matter, etc.), humidity percentages (e.g., a range of 40-95% humidity, etc.), etc., experienced by the engine 102. In some examples, the asset environmental data 432 includes a duration of environmental condition parameters experienced by the engine 102. For example, the asset environmental data 432 can include an amount of time the engine 102 experienced a salt atmosphere of 30%, 40%, 50%, etc.

In the illustrated example of FIG. 4, the collection engine 400 obtains the operational/utilization data 434 to determine a usage of the engine 102. In some examples, the operational/utilization data 434 includes a utilization plan of the engine 102. For example, the operational/utilization data 434 can include a number of cycles (e.g., flight cycles, operation cycles, etc.), a number of hours in operation, types of flight routes (e.g., flights from a first destination to a second destination, etc.), a number of flight legs (e.g., a number of hours from a first destination to a second destination, etc.), etc., completed by the engine 102. In some examples, the operational/utilization data 434 includes operating behavior of one or more assets by one or more airline operators. For example, the operational/utilization data 434 can include operating rating information corresponding to an operation of the engine 102 compared to a rated maximum capacity of the turbine engine. For example, the operational/utilization data 434 can include average takeoff de-rate information, average climb de-rate information, etc. In another example, the operational/utilization data 434 can include an average thrust parameter of the engine 102, a percentage indicating how often the engine 102 is at full power during one or more cycles, etc.

In the illustrated example of FIG. 4, the collection engine 400 obtains the asset configuration data 436 to determine a current or an instant configuration of the engine 102. In some examples, a physical and/or software configuration of the engine 102 can be updated, upgraded, etc., over time as maintenance is performed on the engine 102. For example, the engine 102 can be refurbished with new components, upgraded components, etc. In another example, software of the turbine engine controller 100 of the engine 102 can be upgraded to adjust or control a variable geometry of the engine 102 when in operation. In such examples, the asset configuration data 436 can include a current list of components in the engine 102, a current software version of the turbine engine controller 100, etc.

In the illustrated example of FIG. 4, the collection engine 400 obtains the asset class history data 438 to determine a baseline operation parameter, performance parameter, reliability parameter, etc., of an asset in response to upgrading a hardware and/or a software component of the asset. For example, an asset class can correspond to a fleet of substantially similar assets used to generate a baseline durability parameter or a baseline reliability parameter by analyzing durability parameters, reliability parameters, etc., for the fleet. For example, the engine 102 can belong to a first asset class corresponding to a first baseline durability parameter, a first baseline reliability parameter, etc.

In such an example, an upgrade in a hardware and/or a software component of the engine 102 can cause the engine 102 to correspond to a second asset class corresponding to a second baseline durability parameter, a second baseline reliability parameter, etc., where the second parameters can be an improvement compared to the first parameters. In some examples, the collection engine 400 obtains the asset class history data 438 to ensure that the parameter tracker 405, the health quantifier generator 410, etc., uses the model inputs 335 based on the current asset class of the engine 102 compared to a previous asset class of the engine 102 (e.g., an asset class of the engine 102 prior to an upgrade, etc.).

In the illustrated example of FIG. 4, the collection engine 400 obtains the one or more workscope quantifiers 440 to determine an accuracy of AHQ generated by the asset health calculator 300. For example, the collection engine 400 can obtain a workscope quantifier of 10%, 20%, 30%, etc., calculated by the workscope effect calculator 315. For example, the asset health calculator 300 can determine to update one or more parameters of the asset health calculator 300 based on the workscope quantifier. For example, the asset health calculator 300 can update the model inputs 335 by updating a historical data model 450, a physics-based model 452, a stochastic model 454, a hybrid model 456, etc., and/or a combination thereof to incorporate a latest version of information, parameter values, etc.

In the illustrated example of FIG. 4, the asset health calculator 300 includes the health quantifier generator 410 to calculate actual AHQ, projected AHQ, etc., based on the model inputs 335. For example, the health quantifier generator 410 can obtain the model inputs 335 based on executing one or more of the historical data model 450, the physics-based model 452, the stochastic model 454, and the hybrid model 456. In such an example, the health quantifier generator 410 can use the model inputs 335 that are the most restrictive or the health quantifier generator 410 can use an average of one or more of the model inputs 335.

In some examples, the health quantifier generator 410 uses the historical data model 450 to generate the model inputs 335. For example, the historical data model 450 can generate the model inputs 335 by performing a statistical analysis on previous workscope operations. For example, the historical data model 450 can obtain information corresponding to assets similar in asset configuration, asset class, environment, utilization, etc., to the engine 102. In such an example, the historical data model 450 can generate metrics and quantifiers that can be applied to the engine 102. For example, the historical data model 450 can calculate a percentage of useful life remaining, a quantity of flight cycles remaining, a quantity of TOW hours remaining, etc., for the engine 102 based on how similar assets (e.g., assets with a substantially similar asset configuration, asset class history, etc.) have previously performed (e.g., previously performed after completing a similar workscope, etc.).

In some examples, the health quantifier generator 410 uses the physics-based model 452 to generate the model inputs 335. The example physics-based model 452 can be a digital twin model of the engine 102. For example, the digital twin model can simulate physics behavior, a thermodynamic health, a performance health, etc., of the engine 102. For example, the physics-based model 452 of the engine 102 can include one or more vibration models, stress models, thermo-mechanical models, aero-thermal models, aero-mechanical models, etc., of one or more sensors, asset components, etc., of the engine 102. For example, the physics-based model 452 can simulate inputs and outputs of the sensors 144, 146 of the engine 102. In some examples, the physics-based model 452 can simulate an operability of the engine 102 (e.g., an efficiency of the engine 102, etc.), a durability of the engine 102 (e.g., a mechanical stress on the fan section 108, the booster compressor 114, etc.), etc., based on simulating the engine 102 executing one or more flight cycles, flight legs, flight operations, etc.

In some examples, the health quantifier generator 410 uses the stochastic model 454 to generate metrics based on estimating probability distributions of potential outcomes by allowing for random variation in one or more inputs over time. In some examples, the stochastic model 454 generates the random variation based on fluctuations observed in historical data (e.g., the model inputs 335 based on the historical data model 450, etc.) for a selected time period using time-series techniques. For example, the stochastic model 454 can calibrate the random variation to be within limits set forth by the outputs from the historical data model 450. In some examples, the stochastic model 454 includes generating continuous probability distributions (e.g., Weibull distributions, reliability curves, etc.) to determine a distribution of failure rates over time due to one or more asset components. For example, the stochastic model 454 can generate a failure rate of the engine 102 based on determining failure rates for the fan section 108, the booster compressor 114, etc., of the engine 102.

In some examples, the health quantifier generator 410 uses the hybrid model 456 to generate the model inputs 335 using one or more of the historical data model 450, the physics-based model 452, and the stochastic model 454 of FIG. 4. For example, the hybrid model 456 can be the stochastic model 454 in which the outputs from the stochastic model 454 are compared to the physics-based model 452 and the outputs are adjusted based on the comparison. In another example, the hybrid model 456 can be the stochastic model 454 in which the outputs from the stochastic model 454 can be compared to the historical data model 450 and the outputs are adjusted or calibrated based on the comparison.

In some examples, the health quantifier generator 410 calculates an actual AHQ of an asset component based on actual AHQ of sub-components of the asset component. For example, the health quantifier generator 410 can calculate an actual AHQ for the fan section 108 of FIG. 1 based on calculating an actual AHQ for sub-components of the fan section 108 based on the model inputs 335. For example, the health quantifier generator 410 can calculate an actual AHQ of sub-components such as a fan blade, a bearing, a speed sensor, etc., of the fan section 108 by executing the physics-based model 452 of the engine 102. In such an example, the health quantifier generator 410 can generate an actual AHQ of the fan section 108 based on calculating an average (e.g., a weighted average, etc.) of the actual AHQ of the fan blade, the bearing, the speed sensor, etc., of the fan section 108. In some examples, the health quantifier generator 410 can rank the actual AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier generator 410 calculates projected AHQ based on the model inputs 335. In some examples, the projected AHQ represents what an actual AHQ of an asset component can be based on forecast operating conditions. For example, the health quantifier generator 410 can calculate a projected AHQ for the booster compressor 114 of FIG. 1 based on an actual AHQ for the booster compressor 114 and generating the model inputs 335 based on a forecast utilization and environment plan 460. In some examples, the forecast utilization and environment plan 460 corresponds to future utilization (e.g., a number of flight cycles, flight legs, operation hours, etc.) and environments (e.g., ambient temperature ranges of 25-40 degrees Celsius, salt atmosphere percentage ranges of 15-35%, etc.) to be endured by the engine 102 in future operations.

For example, the health quantifier generator 410 can calculate the projected AHQ for the booster compressor 114 by calculating a change in the actual AHQ over time based on the forecast utilization and environment plan 460. For example, the health quantifier generator 410 can calculate a projected AHQ of 30% for the booster compressor 114 based on an actual AHQ of 70% for the booster compressor 114 and executing the models 450, 452, 454, 456 for an additional 500 flight cycles in a geographic region in which ambient temperatures range from 25-40 degrees Celsius and salt atmosphere percentages range of 15-35%.

In some examples, the health quantifier generator 410 calculates a projected AHQ of an asset component based on a projected AHQ of sub-components of the asset component. For example, the health quantifier generator 410 can calculate a projected AHQ for the fan section 108 of FIG. 1 based on calculating a projected AHQ for sub-components of the fan section 108 based on the model inputs 335. For example, the health quantifier generator 410 can calculate a projected AHQ of sub-components such as a fan blade, a bearing, a speed sensor, etc., of the fan section 108 by executing the physics-based model 452 of the engine 102. In such an example, the health quantifier generator 410 can generate a projected AHQ of the fan section 108 based on calculating an average (e.g., a weighted average, etc.) of the projected AHQ of the fan blade, the bearing, the speed sensor, etc., of the fan section 108. In some examples, the health quantifier generator 410 can rank the projected AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier generator 410 deploys an automated (e.g., an unmanned, a computer-operated, etc.) imaging system to inspect the engine 102 to generate an AHQ. For example, the health quantifier generator 410 can use an imaging system including one or more cameras (e.g., digital cameras, video cameras, etc.) to capture one or more images of an asset component of the engine 102. For example, the health quantifier generator 410 can use an object-recognition system (e.g., a machine-learning system, a deep-learning system, etc.) to compare an image of the booster compressor 114 of FIG. 1 to an image in an object-recognition database. In some examples, the object-recognition system compares the images using an appearance-based method such as divide-and-conquer search, edge matching, greyscale matching, gradient matching, etc. In some examples, the object-recognition system compares the images using a feature-based method.

In some examples, the health quantifier generator 410 calculates an AHQ of the booster compressor 114 based on the comparison of an image of the booster compressor 114 captured during an inspection process, a real-time operation, a maintenance period, etc., to an image stored in the object-recognition database. For example, the health quantifier generator 410 can determine an AHQ of the booster compressor 114 by matching a captured image (e.g., matching a captured image within a specified object-recognition tolerance, etc.) of the booster compressor 114 with an unknown AHQ to an image stored in the object-recognition database with a known AHQ, and determining the AHQ based on the match.

In the illustrated example of FIG. 4, the asset health calculator 300 includes the removal scheduler 420 to identify one or more candidate assets for removal from service and generate a removal schedule based on the one or more identified candidate assets. In some examples, the removal scheduler 420 identifies a first set of candidate assets including one or more assets as candidate(s) for removal based on comparing an AHQ (e.g., an actual AHQ, a projected AHQ, etc.) of an asset (e.g., the engine 102) to a threshold (e.g., an AHQ threshold, a maintenance threshold, a removal threshold, etc.) and determining whether the AHQ satisfies the threshold based on the comparison.

In some examples, the removal scheduler 420 identifies a second set of candidate assets including one or more assets as candidate(s) for removal based on non-asset monitoring information obtained from the database 345. For example, the removal scheduler 420 can identify the engine 102 for removal based on a time interval between maintenance tasks specified in a contract, customer technical forecast information, customer spare part information, etc., for the engine 102.

In some examples, the removal scheduler 420 compares candidate assets in the first set to the second set. In some examples, the removal scheduler 420 identifies target assets for removal based on the comparison. In some examples, the removal scheduler 420 generates a removal schedule for the identified target assets. For example, the removal scheduler 420 can determine that the identified target assets correspond to one contract or more than one contract. For example, in response to determining that the target assets correspond to one contract, the removal scheduler 420 can generate an optimal and/or otherwise improved removal schedule of the target assets based on performing an optimization/improvement process such as an iterated local search.

In another example, in response to determining that the target assets correspond to more than one contract, the removal scheduler 420 can generate a removal schedule for the target assets using methods such as single level optimization, top-down optimization, bottom-up optimization, etc., and/or a combination thereof. For example, the removal scheduler 420 can generate a removal schedule using single level optimization by optimizing and/or otherwise improving each asset corresponding to each contract simultaneously (or substantially simultaneously given data processing, transmission, and storage latency).

In another example, the removal scheduler 420 can generate a removal schedule using top-down optimization. For example, the "top" in the top-down optimization can correspond to a maintenance facility and the "down" in the top-down optimization can correspond to an operator contract. For example, top-down optimization can include generating a removal schedule where slots in a maintenance facility work flow are given priority and assets included in contracts to fill the slots are re-arranged to fit the constraints of the maintenance facility. For example, the removal scheduler 420 can generate the removal schedule using top-down optimization by generating a high-level, top-level, etc., target removal schedule for each contract, generating a candidate removal schedule for each contract, and generating an optimized and/or otherwise improved removal schedule for the contracts based on the comparison of the target removal schedules to the candidate removal schedules.

In another example, the removal scheduler 420 can generate a removal schedule using bottom-up optimization. For example, the "bottom" in the bottom-up optimization can correspond to an operator contract and the "up" in the bottom-up optimization can correspond to a maintenance facility. For example, bottom-up optimization can include generating a removal schedule where assets included in contracts are given priority and slots in a maintenance facility work flow are re-arranged to fit the constraints of the contracts. For example, the removal scheduler 420 can generate the removal schedule using bottom-up optimization by generating candidate removal schedules for each contract, combining the candidate removal schedules, and re-adjusting the candidate removal schedules to help ensure global feasibility with respect to one or more factors such as customer constraints, maintenance facility constraints, spare part availability constraints, etc., and/or a combination thereof.

In the illustrated example of FIG. 4, the health quantifier generator 410 and/or the removal scheduler 420 generate outputs 470. In some examples, the outputs 470 include AHQ (e.g., actual AHQ, projected AHQ, etc.) of an asset (e.g., the engine 102, etc.), an asset component (e.g., the fan section 108, the booster compressor 114, etc.), etc. In some examples, the outputs 470 include a removal schedule of one or more assets including corresponding removal schedule information (e.g., maintenance logistic information, service logistic information, etc.). For example, the outputs 470 can include a removal schedule of the engine 102 including a maintenance facility in which the engine 102 can be serviced and a timeline in which the engine 102 can be removed, serviced, and re-deployed.

While an example implementation of the asset health calculator 300 of FIG. 3 is illustrated in FIG. 4, one or more of the elements, processes and/or devices illustrated in FIG. 4 may be combined, divided, re-arranged, omitted, eliminated and/or implemented in any other way. Further, the example collection engine 400, the example health quantifier calculator 410, the example removal scheduler 420, and/or, more generally, the example asset health calculator 300 of FIG. 3 may be implemented by hardware, software, firmware and/or any combination of hardware, software and/or firmware. Thus, for example, any of the example collection engine 400, the example health quantifier calculator 410, the example removal scheduler 420 and/or, more generally, the example asset health calculator 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 400, the example health quantifier generator 410, and/or the example removal scheduler 420 is/are hereby expressly defined to include a non-transitory computer readable storage device or storage disk such as a memory, a digital versatile disk (DVD), a compact disk (CD), a Blu-ray disk, etc. including the software and/or firmware. Further still, the example asset health calculator 300 of FIG. 3 may include one or more elements, processes and/or devices in addition to, or instead of, those illustrated in FIG. 4, and/or may include more than one of any or all of the illustrated elements, processes and devices.

Flowcharts representative of example machine readable instructions for implementing the asset health calculator 300 of FIGS. 3-4 are shown in FIGS. 5-16. In these examples, the machine readable instructions comprise a program for execution by a processor such as a processor 2412 shown in the example processor platform 2400 discussed below in connection with FIG. 24. The program may be embodied in software stored on a non-transitory computer readable storage medium such as a CD-ROM, a floppy disk, a hard drive, a DVD, a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowcharts illustrated in FIGS. 5-16, many other methods of implementing the example asset health calculator 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-16 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 5:
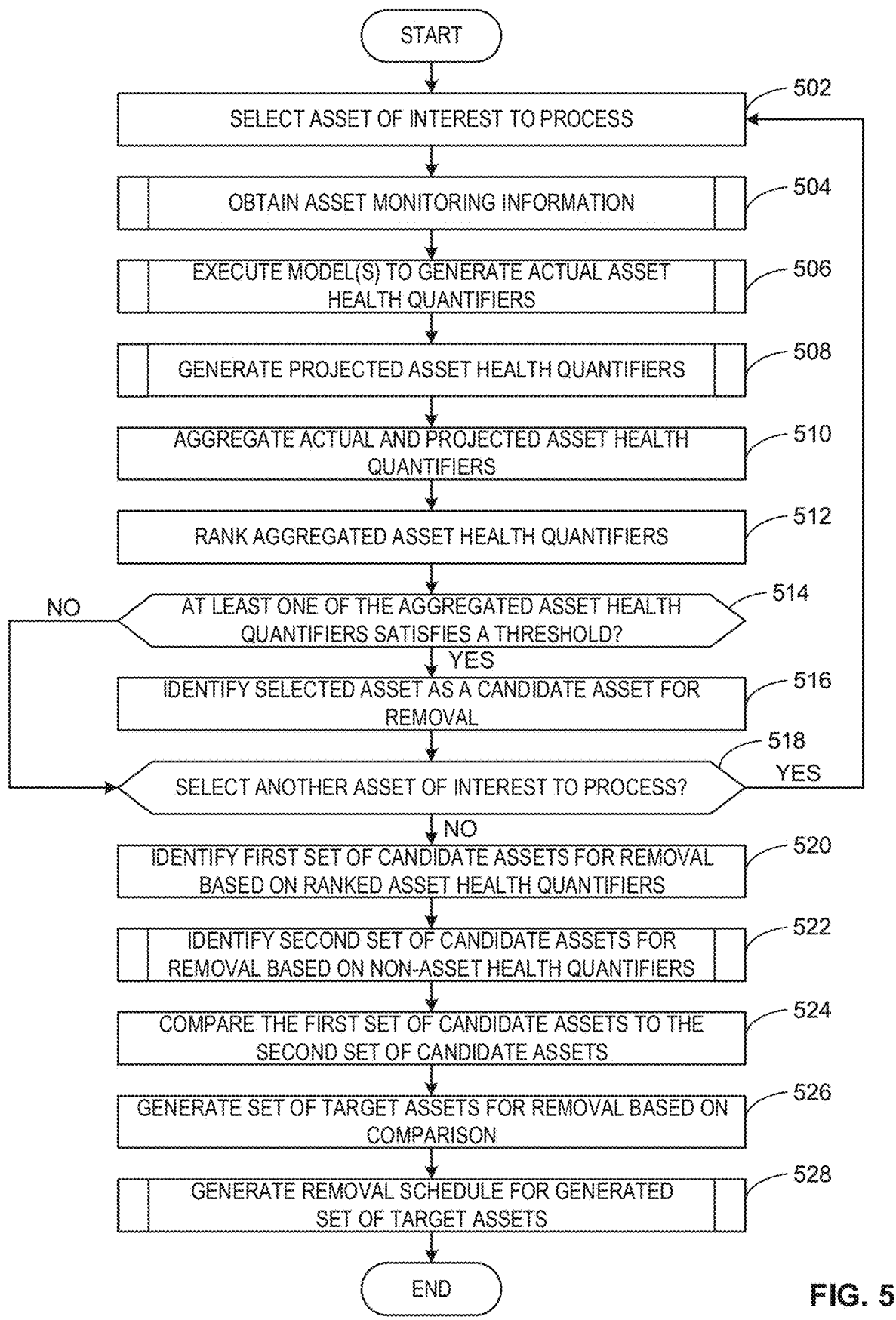
FIGS. 5-16 are flowcharts representative of example methods that can be executed by the example asset workscope generation system of FIGS. 2-3 and/or the example asset health calculator apparatus of FIGS. 3-4 to implement the examples disclosed herein.

FIG. 5 is a flowchart representative of an example method that can be performed by the example asset health calculator 300 of FIGS. 3-4 to identify one or more target assets for removal and generate a removal schedule of the one or more identified target assets. The example method begins at block 502 at which the example asset health calculator 300 selects an asset of interest to process. For example, the collection engine 400 can select the engine 102 of FIG. 1 to process. At block 504, the example asset health calculator 300 obtains asset monitoring information. For example, the collection engine 400 can obtain the inputs 325 of FIGS. 3-4. An example process that can be used to implement block 504 is described below in connection with FIG. 6.

At block 506, the example asset health calculator 300 executes model(s) to generate actual asset health quantifiers. For example, the health quantifier generator 410 can generate an actual AHQ of the engine 102, the booster compressor 114 of the engine 102, etc. An example process that can be used to implement block 506 is described below in connection with FIG. 7. At block 508, the example asset health calculator 300 generates projected asset health quantifiers. For example, the health quantifier generator 410 can generate a projected AHQ of the engine 102, the booster compressor 114 of the engine 102, etc. An example process that can be used to implement block 508 is described below in connection with FIG. 8.

At block 510, the example asset health calculator 300 aggregates actual and projected asset health quantifiers. For example, the health quantifier generator 410 can aggregate a plurality of the actual and the projected AHQ for the engine 102. At block 512, the example asset health calculator 300 can rank the aggregated asset health quantifiers. For example, the health quantifier generator 410 can rank the plurality of the actual and the projected AHQ for the engine 102.

At block 514, the example asset health calculator 300 determines whether at least one of the aggregated asset health quantifiers satisfies a threshold. For example, the removal scheduler 420 can compare an actual AHQ of 75% of the booster compressor 114 to an actual AHQ threshold of 80%. In such an example, the removal scheduler 420 can determine that the actual AHQ satisfies the actual AHQ threshold based on the actual AHQ being less than the AHQ threshold.

If, at block 514, the example asset health calculator 300 determines that at least one of the aggregated asset health quantifiers does not satisfy a threshold, control proceeds to block 518 to determine whether to select another asset of interest to process. If, at block 514, the example asset health calculator 300 determines that at least one of the aggregated asset health quantifiers satisfies a threshold, then, at block 516, the asset health calculator 300 identifies the selected asset as a candidate asset for removal. For example, the removal scheduler 420 can identify the engine 102 as a candidate asset for removal from service and add the engine 102 to a set of candidate assets identified for removal based on the ranked asset health quantifiers.

At block 518, the example asset health calculator 300 determines whether to select another asset of interest to process. For example, the collection engine 400 can determine that there is another turbine engine of interest to process. If, at block 518, the example asset health calculator 300 determines to select another asset of interest to process, control returns to block 502 to select another asset of interest to process. If, at block 518, the example asset health calculator 300 determines not to select another asset of interest to process, then, at block 520, the asset health calculator 300 identifies a first set of candidate assets for removal based on ranked asset health quantifiers. For example, the removal scheduler 420 can identify the set of candidate assets for removal including the engine 102 based on one or more AHQ (e.g., ranked AHQ, etc.) of the engine 102.

At block 522, the example asset health calculator 300 identifies a second set of candidate assets for removal based on non-asset health quantifiers. For example, the removal scheduler 420 can identify a set of candidate assets for removal based on non-asset monitoring information such as contractual requirements. An example process that can be used to implement block 522 is described below in connection with FIG. 9.

At block 524, the example asset health calculator 300 compares the first set of candidate assets to the second set of candidate assets. For example, the removal scheduler 420 can compare assets included in the first set to assets included in the second set to determine if any assets are not included in one set compared to the other set.

At block 526, the example asset health calculator 300 generates a set of target assets for removal based on the comparison. For example, the removal scheduler 420 can generate a set of target assets including the engine 102 based on the comparison. At block 528, the example asset health calculator 300 generates a removal schedule for the generated set of target assets. For example, the removal scheduler 420 can generate a removal schedule for the engine 102. An example process that can be used to implement block 528 is described below in connection with FIG. 10. In response to generating the removal schedule for the generated set of target assets, the example method concludes.

Figure 6:
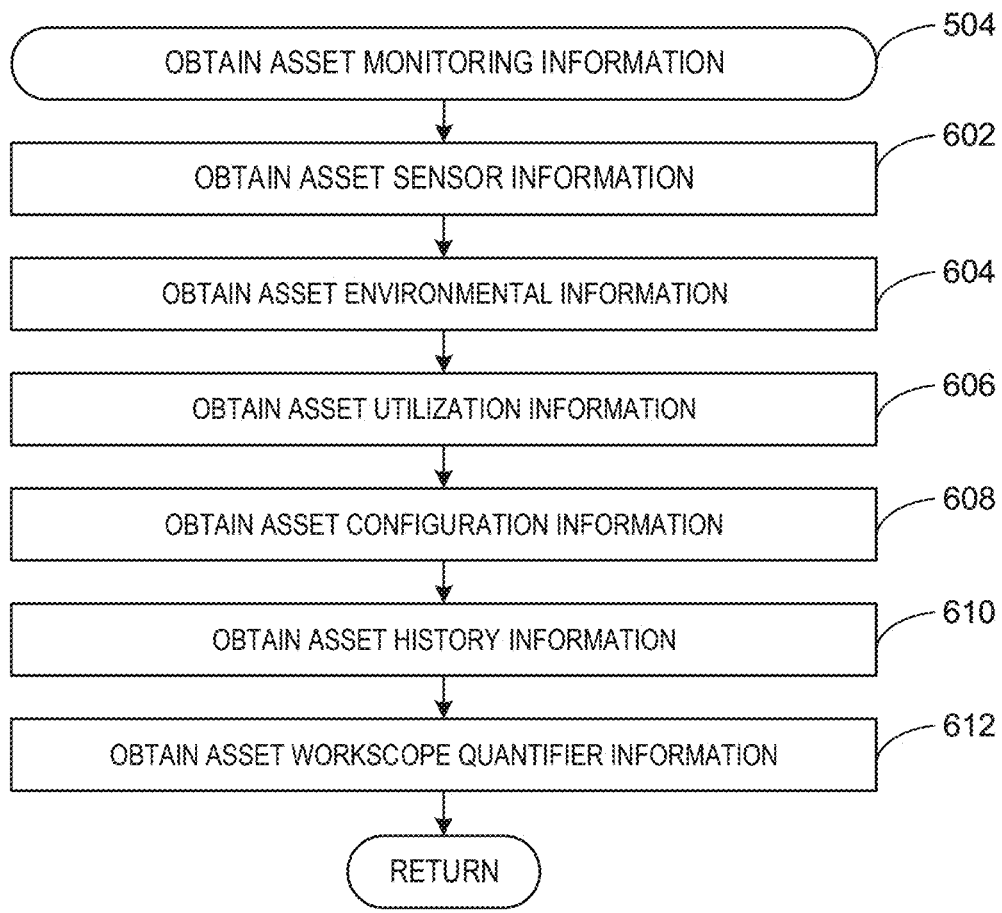

FIG. 6 is a flowchart representative of an example method that can be performed by the example asset health calculator 300 of FIGS. 3-4 to obtain asset monitoring information. The example process of FIG. 6 can be used to implement the operation of block 504 of FIG. 5. The example method begins at block 602 at which the example asset health calculator 300 obtains asset sensor information. For example, the collection engine 400 can obtain the asset sensor data 430 of FIG. 4.

At block 604, the example asset health calculator 300 obtains asset environmental information. For example, the collection engine 400 can obtain the asset environmental data 432 of FIG. 4. At block 606, the example asset health calculator 300 obtains asset utilization information. For example, the collection engine 400 can obtain the operational/utilization data 434 of FIG. 4.

At block 608, the example asset health calculator 300 obtains asset configuration information. For example, the collection engine 400 can obtain the asset configuration data 436 of FIG. 4. At block 610, the example asset health calculator 300 obtains asset class history information. For example, the collection engine 400 can obtain the asset class history data 438 of FIG. 4. At block 612, the example asset health calculator 300 obtains asset workscope quantifier information. For example, the collection engine 400 can obtain the workscope quantifiers 440 of FIG. 4. In response to obtaining the asset workscope quantifier information, the example method returns to block 506 of the example of FIG. 5 to execute model(s) to generate actual asset health quantifiers.

Figure 7:
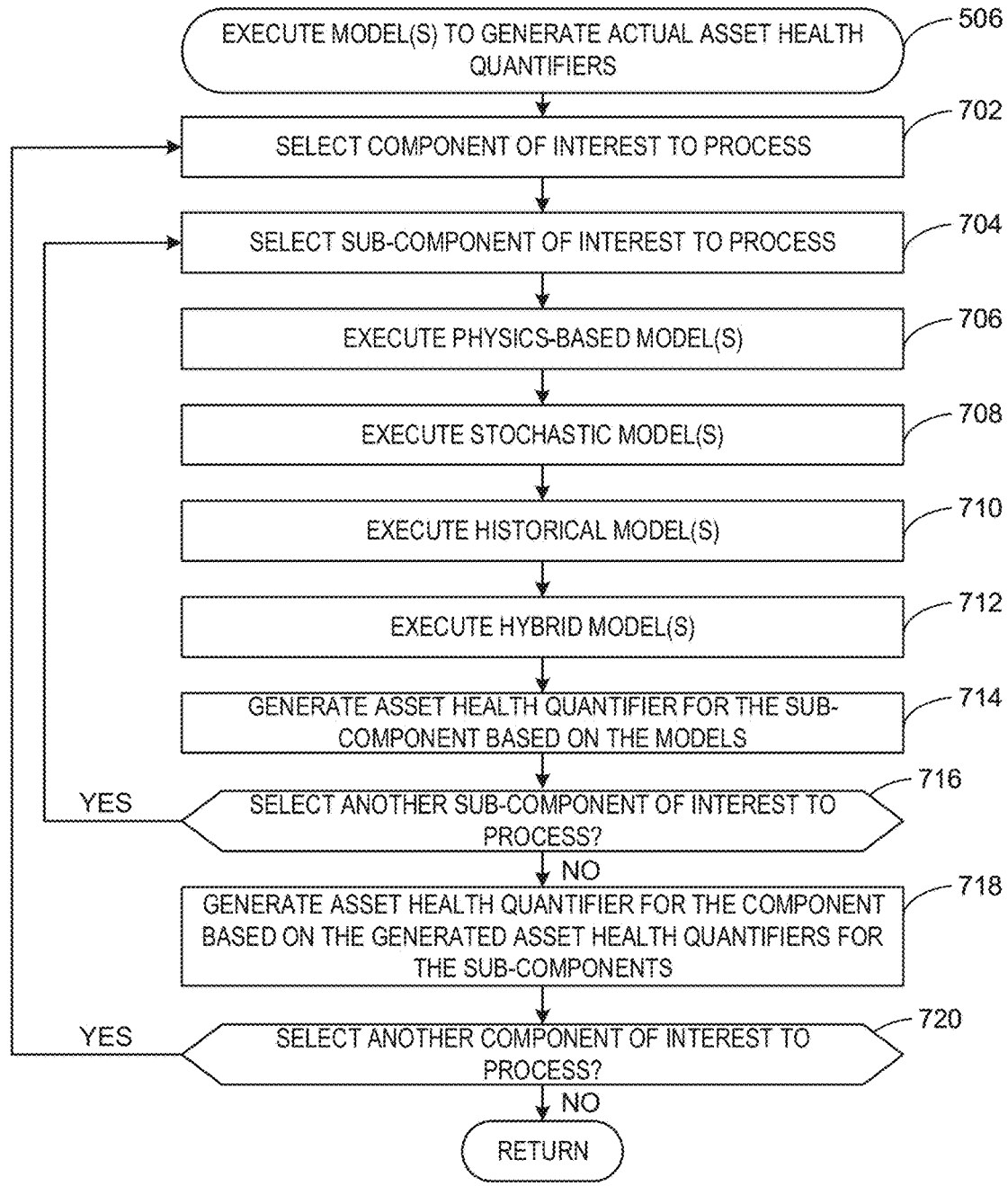

FIG. 7 is a flowchart representative of an example method that can be performed by the example asset health calculator 300 of FIGS. 3-4 to execute model(s) to generate actual asset health quantifiers. The example process of FIG. 7 can be used to implement the operation of block 506 of FIG. 5. The example method begins at block 702 at which the example asset health calculator 300 selects a component of interest to process. For example, the collection engine 400 can select the fan section 108 of FIG. 1 to process. At block 704, the example asset health calculator 300 selects a sub-component of interest to process. For example, the collection engine 400 can select a fan blade of the fan section 108 to process.

At block 706, the example asset health calculator 300 executes physics-based model(s) with respect to the sub-component of interest. For example, the health quantifier generator 410 can execute the physics-based model 452 of FIG. 4 to simulate an operation of the fan blade of the fan section 108. At block 708, the example asset health calculator 300 executes stochastic model(s) with respect to the sub-component of interest. For example, the health quantifier generator 410 can execute the stochastic model 454 of FIG. 4 to estimate a failure rate of the fan blade of the fan section 108 using a continuous probability distribution. In such an example, the asset health calculator 300 can execute the stochastic model 454 using the asset monitoring information obtained by using the example method of FIG. 6.

At block 710, the example asset health calculator 300 executes historical model(s) with respect to the sub-component of interest. For example, the health quantifier generator 410 can execute the historical data model 450 of FIG. 4 to estimate a failure rate of the fan blade of the fan section 108 using historical data collected for fan blades operating on similar (e.g., substantially similar, etc.) assets as the engine 102. In such an example, the asset health calculator 300 can execute the historical data model 450 using the asset monitoring information obtained by using the example method of FIG. 6

At block 712, the example asset health calculator 300 executes hybrid model(s) with respect to the sub-component of interest. For example, the health quantifier generator 410 can execute the hybrid model 456 to estimate a failure rate of the fan blade of the fan section using the stochastic model 454 and comparing an output of the stochastic model 454 to an output of the physics-based model 452, the historical data model, etc., and/or a combination thereof. In such an example, the asset health calculator 300 can execute the hybrid model 456 using the asset monitoring information obtained by using the example method of FIG. 6

At block 714, the example asset health calculator 300 generates an asset health quantifier for the sub-component. For example, the health quantifier generator 410 can calculate an actual AHQ for the fan blade of the fan section 108 based on the model inputs 335. At block 716, the example asset health calculator 300 determines whether to select another sub-component of interest to process. For example, the collection engine 400 can determine to select a bearing of the fan section 108 to process.

If, at block 716, the example asset health calculator 300 determines to select another sub-component of interest to process, control returns to block 704 to select another sub-component of interest to process. If, at block 716, the example asset health calculator 300 determines not to select another sub-component of interest to process, then, at block 718, the asset health calculator 300 generates an asset health quantifier for the component based on the generated asset health quantifiers for the sub-components. For example, the health quantifier generator 410 can generate an actual AHQ for the fan section 108 based on actual AHQ of the sub-components (e.g., the fan blade, the bearing, etc.) of the fan section 108. In the illustrated example of FIG. 7, the asset health calculator 300 generates the actual AHQ based on executing the models described with respect to blocks 706, 708, 710, and 712. Alternatively, the example asset health calculator 300 can generate the actual AHQ based on executing one or fewer models than the models described with respect to blocks 706, 708, 710, and 712.

At block 720, the example asset health calculator 300 determines whether to select another component of interest to process. For example, collection engine 400 can determine to select the booster compressor 114 of FIG. 1 to process. If, at block 720, the example asset health calculator 300 determines to select another component of interest to process, control returns to block 702 to select another component of interest to process, otherwise the example method returns to block 508 of the example of FIG. 5 to generate projected asset health quantifiers.

Figure 8:
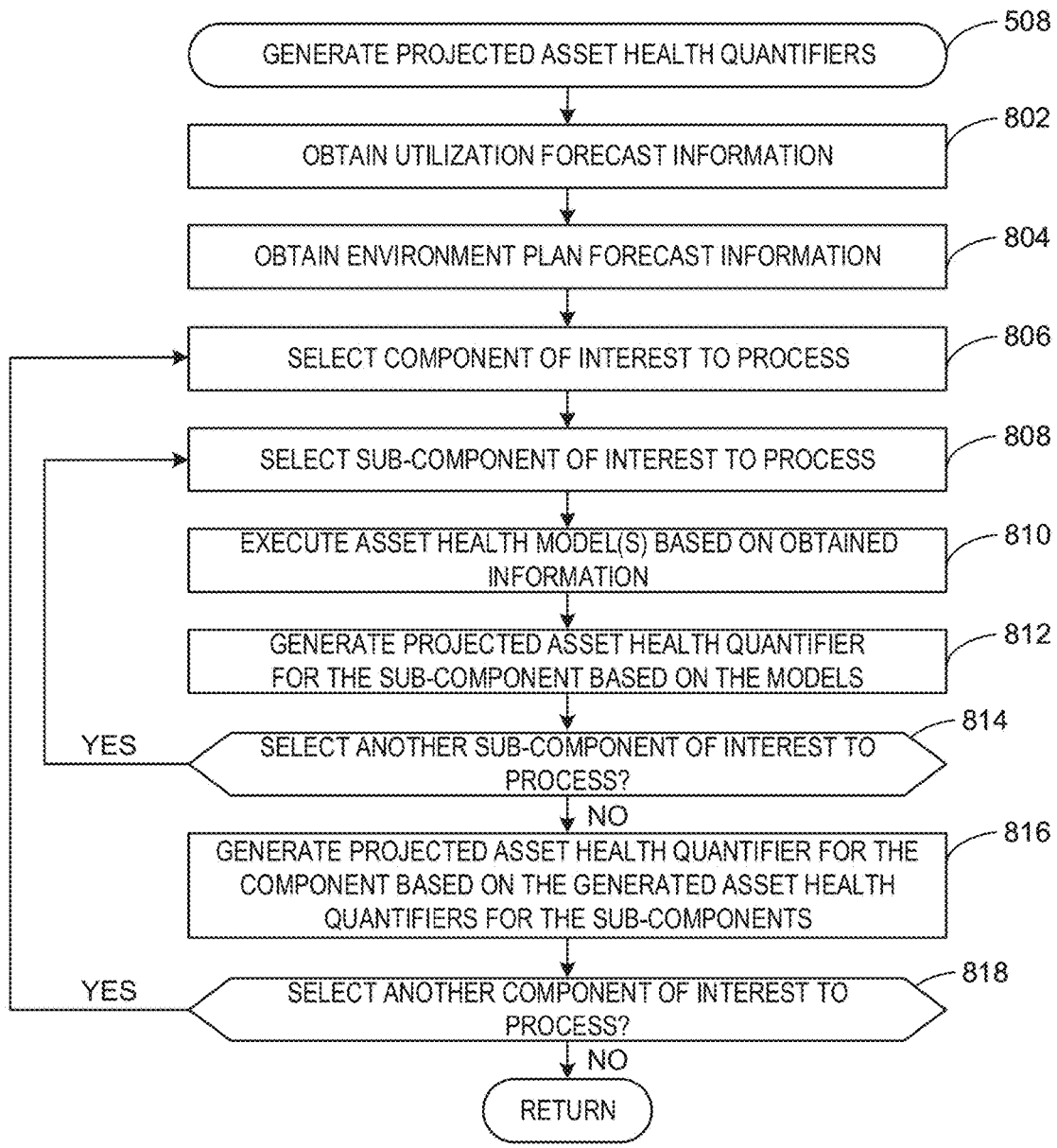

FIG. 8 is a flowchart representative of an example method that can be performed by the example asset health calculator 300 of FIGS. 3-4 to generate projected asset health quantifiers. The example process of FIG. 8 can be used to implement the operation of block 508 of FIG. 5. The example method begins at block 802 at which the example asset health calculator 300 obtains utilization forecast information. For example, the collection engine 400 can obtain the forecast utilization and environment plan 460 of FIG. 4 for the engine 102.

At block 804, the example asset health calculator 300 obtains environment plan forecast information. For example, the collection engine 400 can obtain the forecast utilization and environment plan 460 for the engine 102. At block 806, the example asset health calculator 300 selects a component of interest to process. For example, the collection engine 400 can select the fan section 108 of FIG. 1 to process.

At block 808, the example asset health calculator 300 selects a sub-component of interest to process. For example, the collection engine 400 can select a fan blade of the fan section 108 to process. At block 810, the example asset health calculator 300 executes asset health model(s) based on obtained information. For example, the health quantifier generator 410 can execute one or more of the historical data model 450, the physics-based model 452, the stochastic model 454, the hybrid model 456, etc., using the forecast utilization and environment plan 460 for the engine 102.

At block 812, the example asset health calculator 300 generates a projected asset health quantifier for the sub-component based on the models. For example, the health quantifier generator 410 can generate a projected asset health quantifier for the fan blade of the fan section 108 based on executing one or more of the models 450, 452, 454, 456 of FIG. 4. At block 814, the example asset health calculator 300 determines whether to select another sub-component of interest to process. For example, the collection engine 400 can determine to select a bearing of the fan section 108 to process. For example, the collection engine 400 can determine to select the bearing of the fan section 108 based on comparing the fan section 108 to a configuration file, a part list, etc., in the database 345 of FIGS. 3-4. For example, the collection engine 400 can map the fan section 108 to the configuration file and determine a list of components included in the fan section 108 based on the mapping. For example, the collection engine 400 can determine whether the bearing has not been processed based on comparing components of the fan section 108 already processed to components defined in the configuration file, the part list, etc., for the fan section 108 that has not been processed.

If, at block 814, the example asset health calculator 300 determines to select another sub-component of interest to process, control returns to block 808 to select another sub-component of interest to process. If, at block 814, the example asset health calculator 300 determines not to select another sub-component of interest to process, then, at block 816, the asset health calculator 300 generates a projected asset health quantifier for the component based on the generated asset health quantifiers for the sub-components. For example, the health quantifier generator 410 can generate a projected AHQ for the fan section 108 based on projected AHQ of the sub-components (e.g., the fan blade, the bearing, etc.) of the fan section 108.

At block 818, the example asset health calculator 300 determines whether to select another component of interest to process. For example, the collection engine 400 can determine to process the low-pressure turbine 124 of FIG. 1. If, at block 818, the example asset health calculator 300 determines to select another component of interest to process, control returns to block 806 to select another component of interest to process, otherwise the example method returns to block 510 of the example of FIG. 5 to aggregate actual and projected asset health quantifiers.

Figure 9:
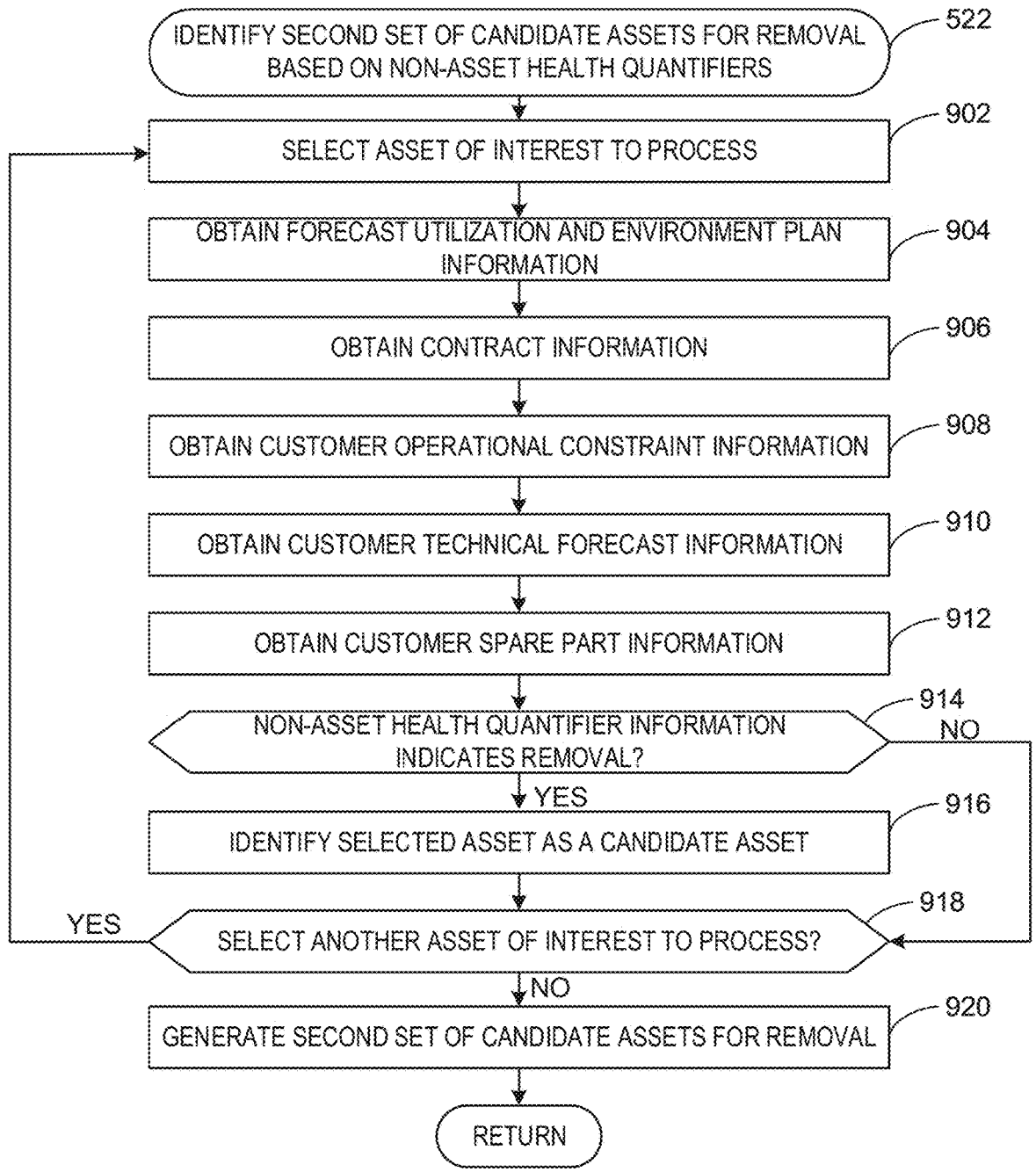

FIG. 9 is a flowchart representative of an example method that can be performed by the example asset health calculator 300 of FIGS. 3-4 to identify a second set of candidate assets for removal based on non-asset health quantifiers. The example process of FIG. 9 can be used to implement the operation of block 522 of FIG. 5. The example method begins at block 902 at which the example asset health calculator 300 selects an asset of interest to process. For example, the collection engine 400 can select the engine 102 of FIG. 1 to process.

At block 904, the example asset health calculator 300 obtains forecast utilization and environment plan information. For example, the collection engine 400 can obtain the forecast utilization and environment plan 460 of FIG. 4 for the engine 102. At block 906, the example asset health calculator 300 obtains contract information. For example, the collection engine 400 can obtain contract information corresponding to the engine 102 from the database 345 of FIGS. 3-4. In such an example, the contract information can include information such as time intervals between service, whether to replace or refurbish a component of the engine 102, etc.

At block 908, the example asset health calculator 300 obtains customer operational constraint information. For example, the collection engine 400 can obtain information from the database 345 such as how many assets can be out of service during a time period for a customer, how many service locations are accessible by the customer, etc. At block 910, the example asset health calculator 300 obtains customer technical forecast information. For example, the collection engine 400 can obtain information from the database 345 such as a number of expected flight cycles to be completed by the customer, a number of assets to be serviced, a time-on-wing metric (e.g., a target goal of 90% of a useful life of an asset is on-wing of an aircraft), etc.

At block 912, the example asset health calculator 300 obtains customer spare part information. For example, the collection engine 400 can obtain information from the database 345 such as a number of spare components (e.g., a number of spares of the booster compressor 114, the high-pressure turbine 120, etc.) the customer has in inventory.

At block 914, the example asset health calculator 300 determines whether the non-asset health quantifier information indicates removal. For example, the health quantifier generator 410 can identify the engine 102 as a candidate asset for removal based on the forecast utilization and environment plan 460, contractual information, customer spare part information, etc.

If, at block 914, the example asset health calculator 300 determines that the non-asset health quantifier information does not indicate removal, control proceeds to block 918 to determine whether to select another asset of interest to process. If, at block 914, the example asset health calculator 300 determines that the non-asset health quantifier information indicates removal, then, at block 916, the asset health calculator 300 identifies the selected asset as a candidate asset. For example, the health quantifier generator 410 can identify the engine 102 as a candidate asset for removal based on the engine 102 elapsing a time interval between service intervals as specified in a contract.

At block 918, the example asset health calculator 300 determines whether to select another asset of interest to process. For example, the collection engine 400 can determine to select another turbine engine of interest to process. If, at block 918, the example collection engine 400 determines to select another asset of interest to process, control returns to block 902 to select another asset of interest to process. If, at block 918, the example collection engine 400 determines not to select another asset of interest to process, then, at block 920, the asset health calculator 300 generates a second set of candidate assets for removal. For example, the health quantifier generator 410 can generate a second set of candidate assets for removal including the engine 102 based on non-AHQ information. In response, to generating the second set of candidate assets for removal, the example method returns to block 524 of the example of FIG. 5 to compare the first set of candidate assets to the second set of candidate assets.

Figure 10:
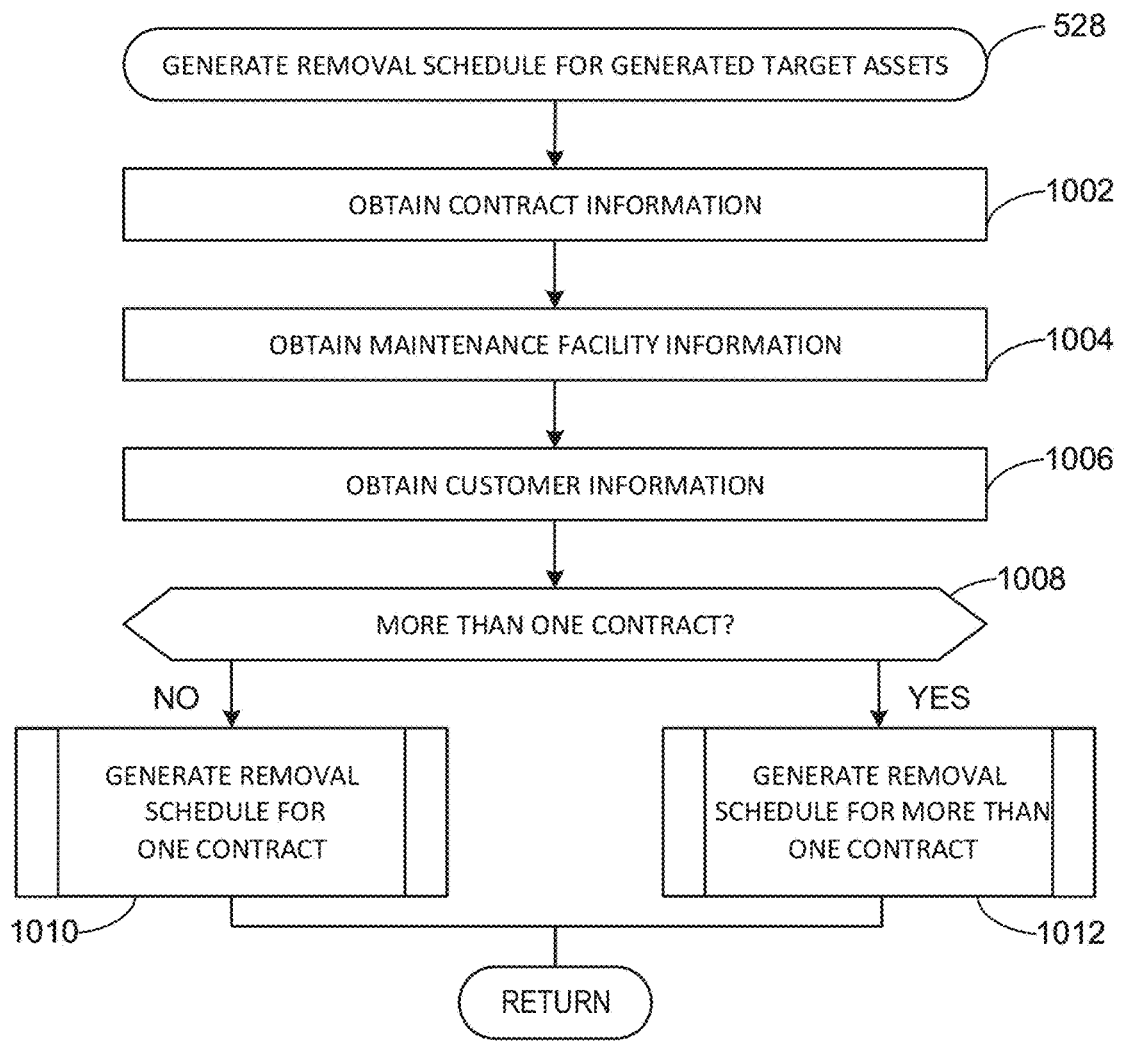

FIG. 10 is a flowchart representative of an example method that can be performed by the example asset health calculator 300 of FIGS. 3-4 to generate a removal schedule for generated target assets. The example process of FIG. 10 can be used to implement the operation of block 528 of FIG. 5. The example method begins at block 1002 at which the example asset health calculator 300 obtains contract information. For example, the collection engine 400 can collect contract information corresponding to target assets for removal such as the engine 102 of FIG. 1.

At block 1004, the example asset health calculator 300 obtains maintenance facility information. For example, the removal scheduler 420 can obtain information from the database 345 of FIGS. 3-4 such as a number of maintenance facilities capable of servicing the engine 102, a number of maintenance personnel and corresponding skill-sets at a maintenance facility, etc.

At block 1006, the example asset health calculator 300 obtains customer information. For example, the collection engine 400 can obtain information from the database 345 such as the capacity of the customer to remove a number of assets (e.g., turbine engines, etc.) during a certain period of time. At block 1008, the example asset health calculator 300 determines whether there more than one contract corresponding to the generated target assets. For example, the removal scheduler 420 can determine that there are two contracts corresponding to eight assets identified for removal.

If, at block 1008, the example asset health calculator 300 determines that there is not more than one contract, control proceeds to block 1010 to generate a removal schedule for one contract. An example process that can be used to implement block 1010 is described below in connection with FIG. 11. If, at block 1008, the example asset health calculator 300 determines that there is more than one contract, control proceeds to block 1012 to generate a removal schedule for more than one contract. An example process that can be used to implement block 1012 is described below in connection with FIG. 12. In response to generating a removal schedule for one contract or in response to generating a removal schedule for more than one contract, control returns to the example of FIG. 5 to conclude.

Figure 11:
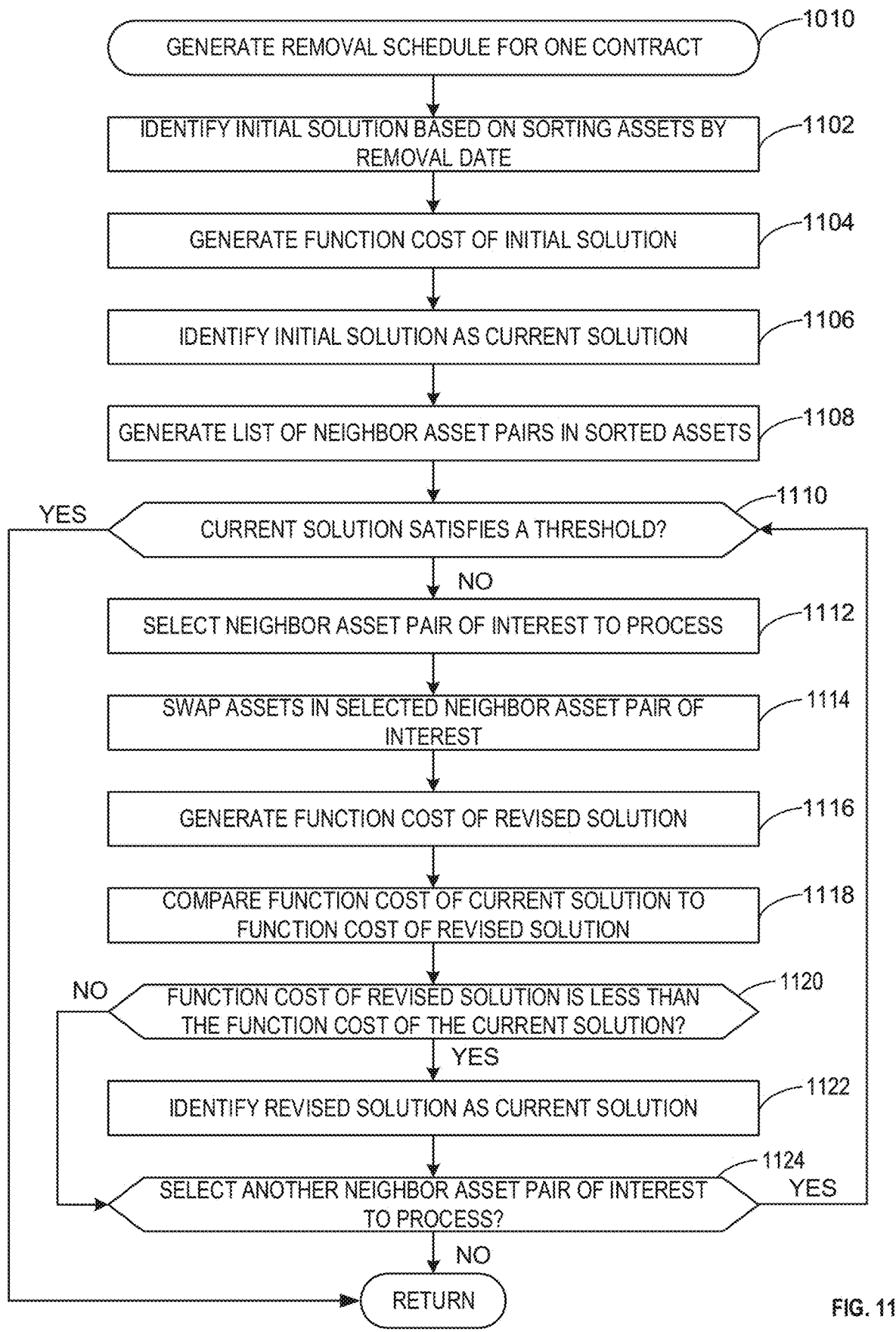

FIG. 11 is a flowchart representative of an example method that can be performed by the example asset health calculator 300 of FIGS. 3-4 to generate a removal schedule for one contract based on an iterated local search. The example process of FIG. 11 can be used to implement the operation of block 1010 of FIG. 10. The example method begins at block 1102 at which the example asset health calculator 300 identifies an initial solution based on sorting assets by removal date. For example, the removal scheduler 420 identifies an initial solution 1700 of FIG. 17 as the initial solution, where the initial solution includes generating a slot order based on dates included in a Technical Product Plan (TPP) (e.g., contract removal dates, etc.). The example TPP can include a schedule of asset removals based on programmatic, contractual, and technical triggers. In such an example, the removal scheduler 420 sorts engine 1 1710, engine 2 1720, and engine 3 1730 based on removal date. For example, the removal scheduler 420 can generate a removal date of the engines 1710, 1720, 1730 based on actual AHQ, projected AHQ, non-AHQ information, etc., of the engines 1710, 1720, 1730. For example, the engine 1 1710 can have an earlier removal date than the engine 2 1720 based on the engine 1 1710 having an actual AHQ less than the actual AHQ of the engine 2 1720. In another example, the engine 1 1710 can have an earlier removal date than the engine 2 1720 based on the engine 1 1710 having a contract requirement to remove the engine 1 1710 by a specified date.

At block 1104, the example asset health calculator 300 generates a function cost of the initial solution. For example, a function cost can correspond to a monetary cost of performing maintenance on the assets in an order as outlined in the initial solution 1700 of FIG. 17. For example, the removal scheduler 420 can generate the function cost of the initial solution 1700 of FIG. 17 by calculating a cost of performing maintenance on engine 1 1710, engine 2 1720, and engine 3 1730 of FIG. 17 in order where the cost is based on contractual requirements, an amount of money an operator paid a turbine engine maintenance provider prior to the maintenance of the engines 1-3 1710, 1720, 1730, etc. For example, the function cost of the initial solution 1700 of FIG. 17 can correspond to an output of a probabilistic function that based on inputs including an anticipated maintenance cost for the engines 1-3 1710, 1720, 1730 over the life of a contract governing the engines 1-3 1710, 1720, 1730, revenue generated over the life of the contract, an operating margin corresponding to the contract, etc. At block 1106, the example asset health calculator 300 identifies the initial solution as a current solution. For example, the removal scheduler 420 can identify the initial solution 1700 of FIG. 17 as the current solution.

At block 1108, the example asset health calculator 300 generates a list of neighbor asset pairs in the sorted assets. For example, the removal scheduler 420 can identify (1) the engine 1 1710 and the engine 2 1720 of FIG. 17 as a first neighbor asset pair, (2) the engine 2 1720 and the engine 3 1730 of FIG. 17 as a second neighbor asset pair, and (3) the engine 1 1710 and the engine 3 1730 of FIG. 17 as a third neighbor asset pair.

At block 1110, the example asset health calculator 300 determines whether the current solution satisfies a threshold. For example, the removal scheduler 420 can compare the function cost of $80,000 of the current solution to a function cost threshold of $100,000 and determine that the function cost of the current solution satisfies the function cost threshold based on the comparison. In such an example, the function cost of the current solution satisfies the function cost threshold based on the function cost being less than the function cost threshold. For example, the removal scheduler 420 can determine whether the current solution has a function cost that minimizes and/or otherwise reduces a cost (e.g., a monetary cost, a labor cost, a utilization cost, etc.) absorbed or internally financed by the turbine engine maintenance provider.

In some examples, the threshold is a computation time limit threshold, a rate of change of slope, etc. For example, the removal scheduler 420 can compare a total elapsed time (e.g., 100 milliseconds, 5 seconds, etc.) of the method of FIG. 11 to a computation time limit threshold (e.g., 200 milliseconds, 10 seconds, etc.) and determine that the total elapsed time satisfies the computation limit threshold based on the comparison. In another example, the removal scheduler 420 can compare a time elapsed since the last solution improvement (e.g., 100 milliseconds, 5 seconds, etc.) to the computation time limit threshold and determine that the time elapsed satisfies the computation limit threshold based on the comparison. In yet another example, the removal scheduler 420 compares a rate of change of slope over previous recent improvements to a slope threshold and determine that the rate of change of slope satisfies the slope threshold based on the comparison.

If, at block 1110, the example asset health calculator 300 determines that the current solution satisfies the threshold, control proceeds to return to the example of FIG. 10 to return to the example of FIG. 5 to conclude. If, at block 1110, the example asset health calculator 300 determines that the current solution does not satisfy the threshold, then, at block 1112, the asset health calculator 300 selects a neighbor asset pair of interest to process. For example, the removal scheduler 420 can identify the first neighbor pair (e.g., the engine 1 1710 and the engine 2 1720, etc.) to process.

At block 1114, the example asset health calculator 300 swaps the assets in the selected neighbor asset pair of interest. For example, the removal scheduler 420 can swap the engine 1 1710 and the engine 2 1720 of FIG. 17 as depicted in the neighbor 1 solution 1740 of FIG. 17. At block 1116, the example asset health calculator 300 generates a function cost of the revised solution. For example, the removal scheduler 420 can generate a function cost of the neighbor 1 solution 1740 of FIG. 17.

Figure 17:
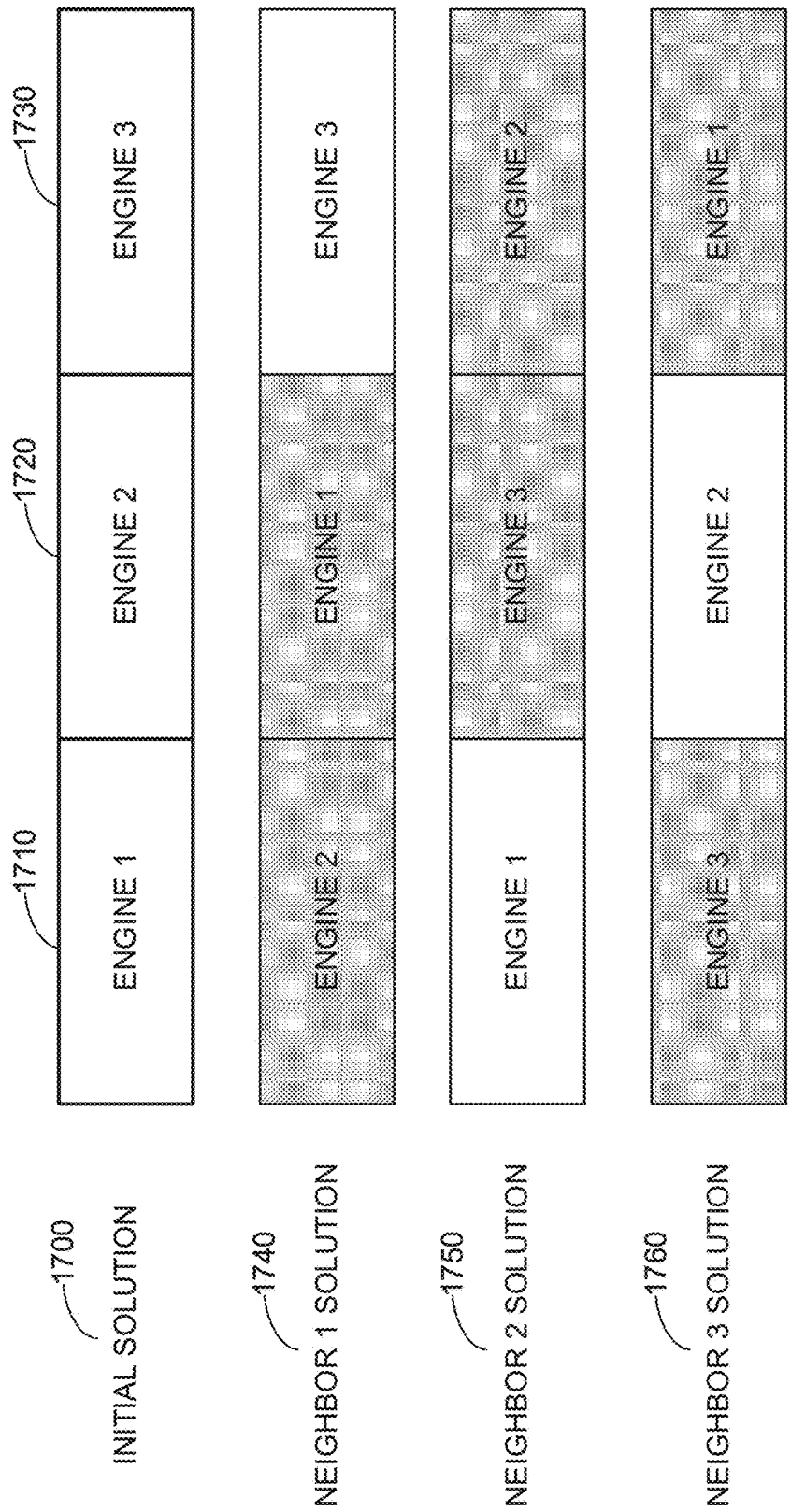
FIG. 17 is a schematic illustration of performing an iterated local search to generate a removal schedule for assets corresponding to a single contract.

At block 1118, the example asset health calculator 300 compares the function cost of the revised solution to the function cost of the current solution. For example, the removal scheduler 420 can compare the function cost of the neighbor 1 solution 1740 of FIG. 17 to the function cost of the initial solution 1700 of FIG. 17. At block 1120, the example asset health calculator 300 determines whether the function cost of the revised solution is less than the function cost of the current solution. For example, the removal scheduler 420 can determine that the function cost of the neighbor 1 solution 1740 of FIG. 17 is less than the function cost of the initial solution 1700 of FIG. 17 and, thus, indicating that the neighbor 1 solution 1740 is an improvement over the initial solution 1700.

If, at block 1120, the example asset health calculator 300 determines that the function cost of the revised solution is not less than the function cost of the current solution, control proceeds to block 1124 to select another asset of interest to process. If, at block 1120, the example asset health calculator 300 determines that the function cost of the revised solution is less than the function cost of the current solution, then, at block 1122, the asset health calculator 300 identifies the revised solution as the current solution. For example, the removal scheduler 420 can identify the neighbor 1 solution 1740 of FIG. 17 as the current solution.

At block 1124, the example asset health calculator 300 determines whether to select another neighbor asset pair of interest to process. For example, the removal scheduler 420 can select the second neighbor asset pair, the third neighbor asset pair, etc., to process. If, at block 1124, the example asset health calculator 300 determines to select another neighbor asset pair of interest to process, control returns to block 1110 to determine whether the current solution satisfies the threshold, otherwise the example method returns to the example of FIG. 10 to return to the example of FIG. 5 to conclude.

Figure 12:
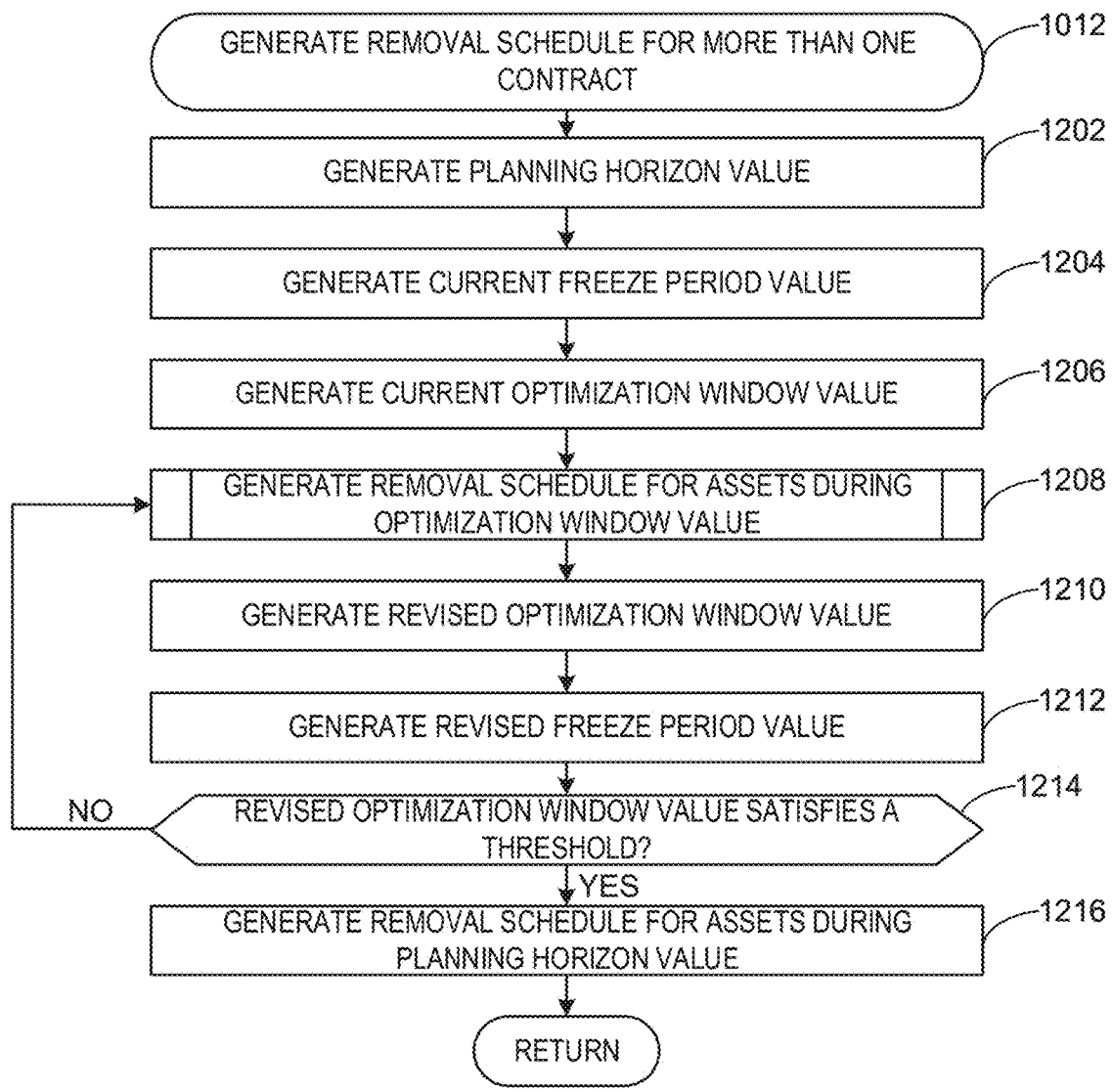

FIG. 12 is a flowchart representative of an example method that can be performed by the example asset health calculator 300 of FIGS. 3-4 to generate a removal schedule for more than one contract by performing integer programming using a myopic optimization method, a rolling optimization method, etc. The example process of FIG. 12 can be used to implement the operation of block 1012 of FIG. 10. The example method begins at block 1202 at which the example asset health calculator 300 generates a planning horizon value. For example, the removal scheduler 420 can generate a planning horizon value 1900, shown in the example of FIG. 19, of two years.

Figure 19:
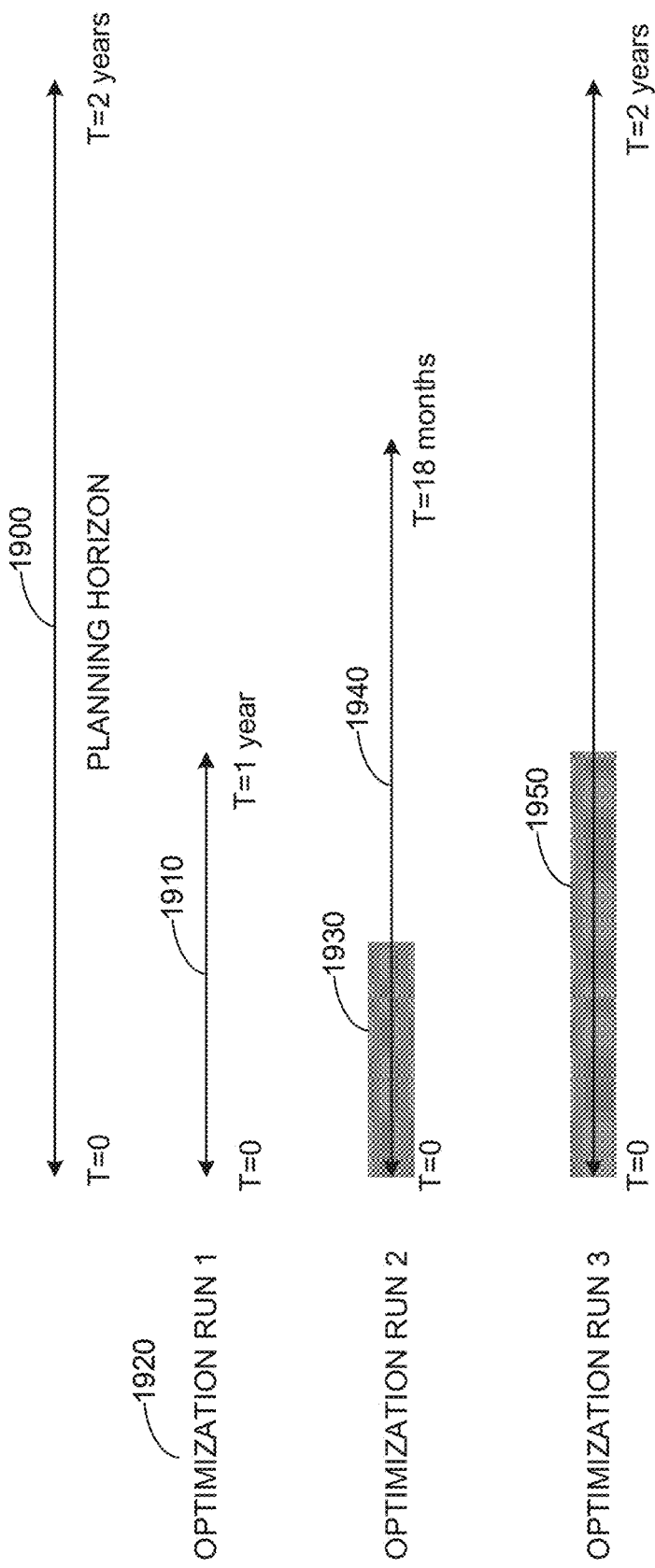
FIG. 19 is a schematic illustration of an example method of generating a removal schedule for assets corresponding to more than one contract

At block 1204, the example asset health calculator 300 generates a current freeze period value. For example, the removal scheduler 420 can generate a current freeze period value 1910 of six months (see FIG. 19). For example, the current freeze period value 1910 can correspond to a freezing of an assignment of assets in an order of a removal schedule. For example, an order of the assets in the removal schedule during the time period of T=0 to T=6 months in FIG. 19 is frozen and cannot be changed further. By freezing the order of the assets in the removal schedule within the current freeze period value 1910 of FIG. 19, the example removal scheduler 420 can help to ensure an avoidance of running out of computing memory when performing the integer programming. At block 1206, the example asset health calculator 300 generates a current optimization window value. For example, the removal scheduler 420 can generate a current optimization window value 1930 of FIG. 19 of one year.

At block 1208, the example asset health calculator 300 generates a removal schedule for assets during the optimization window value during optimization run 1 1920 of FIG. 19. For example, the removal scheduler 420 performs an integer programming based optimization of the removal schedule for the target assets (e.g., the target assets including the engine 102 of FIG. 1, etc.) for a planning period equal to a length of the optimization window value of one year. In such an example, restricting an optimization of the removal schedule during to a length of the optimization window value helps to ensure an avoidance of running out of computing memory when performing the integer programming. An example process that can be used to implement block 1208 is described below in connection with FIG. 13.

At block 1210, the example asset health calculator 300 generates a revised optimization window value. For example, the removal scheduler 420 can increment the current optimization window value 1930 of one year to a revised optimization window value 1940 of 18 months. At block 1212, the example asset health calculator 300 generates a revised freeze period value. For example, the removal scheduler 420 can increment the current freeze period value 1910 of six months to a revised freeze period value 1950 of FIG. 19 of one year.

At block 1214, the example asset health calculator 300 determines whether the revised optimization window value satisfies a threshold. For example, the removal scheduler 420 can compare the revised optimization window value 1940 of 18 months to the planning horizon value 1900 of two years and determine that the revised optimization window value 1940 does not satisfy the threshold based on the comparison (e.g., the revised optimization window value 1940 is less than the planning horizon value 1900, etc.).

If, at block 1214, the example asset health calculator 300 determines that the revised optimization window value does not satisfy the threshold, control returns to block 1208 to generate a removal schedule for assets during the revised optimization window value. If, at block 1214, the example asset health calculator 300 determines that the revised optimization window value satisfies the threshold, then, at block 1216, the asset health calculator 300 generates a removal schedule for the assets during the planning horizon value. For example, the removal scheduler 420 can generate the removal schedule for the assets (e.g., the assets including the engine 102 of FIG. 1, etc.) during the planning horizon value 1900 of FIG. 19. In response to generating the removal schedule for the assets during the planning horizon value, the example method returns to the example of FIG. 10 to return to the example of FIG. 5 to conclude.

Figure 13:
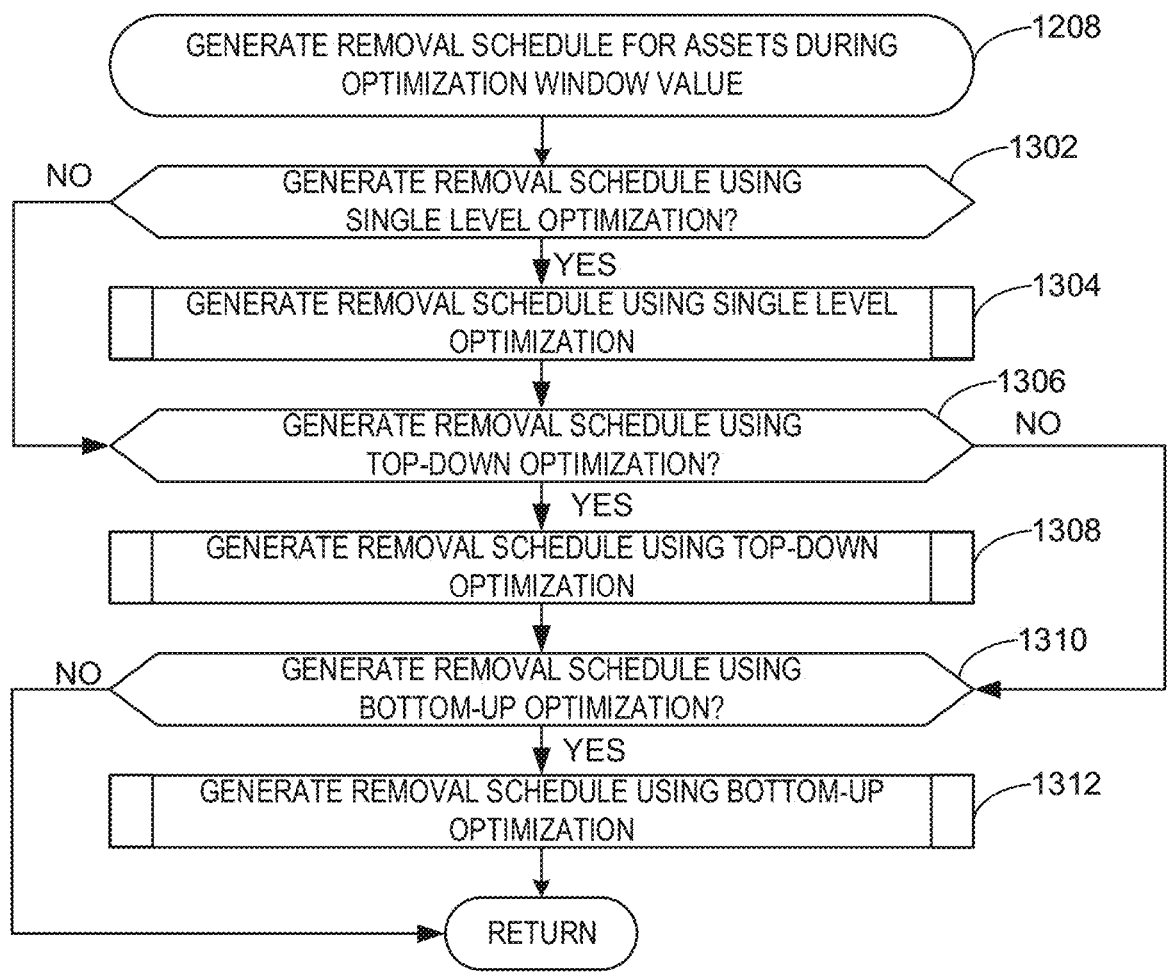

FIG. 13 is a flowchart representative of an example method that can be performed by the example asset health calculator 300 of FIGS. 3-4 to generate a removal schedule for assets during an optimization window value. The example process of FIG. 13 can be used to implement the operation of block 1208 of FIG. 12. The example method begins at block 1302 at which the example asset health calculator 300 determines whether to generate a removal schedule using single level optimization. For example, the removal scheduler 420 can determine that a substantial quantity of computing processing resources is available, and a single optimization run can be executed using the computing processing resources.

If, at block 1302, the example asset health calculator 300 determines not to generate the removal schedule using single level optimization, control proceeds to block 1306 to determine whether to generate the removal schedule using top-down optimization. If, at block 1302, the example asset health calculator 300 determines to generate the removal schedule using single level optimization, then, at block 1304, the asset health calculator 300 generates the removal schedule using single level optimization. For example, the removal scheduler 420 can generate a removal schedule using single level optimization. For example, the removal scheduler 420 can generate a removal schedule of one or more assets corresponding to one or more contracts by pooling the one or more contracts together and optimizes the removal schedule in response to pooling the one or more contracts together. An example process that can be used to implement block 1304 is described below in connection with FIG. 14.

At block 1306, the example asset health calculator 300 determines whether to generate the removal schedule using top-down optimization. For example, the removal scheduler 420 can determine that maintenance facility constraints are a priority compared to contract-level constraints or operator-level constraints. If, at block 1306, the example asset health calculator 300 determines not to generate the removal schedule using top-down optimization, control proceeds to block 1310 to determine whether to generate the removal schedule using bottom-up optimization.

If, at block 1306, the example asset health calculator 300 determines to generate the removal schedule using top-down optimization, then, at block 1308, the asset health calculator 300 generates the removal schedule using top-down optimization. For example, the removal scheduler 420 can generate a removal schedule using top-down optimization. For example, the removal scheduler 420 can generate a removal schedule by generating a high-level, top-level, etc., target removal schedule for each contract based on optimizing around and/or prioritizing maintenance facility constraints, generating a candidate removal schedule for each contract, and generating an optimized and/or otherwise improved removal schedule for the contracts based on the comparison of the target removal schedules to the candidate removal schedules. An example process that can be used to implement block 1308 is described below in connection with FIG. 15.

At block 1310, the example asset health calculator 300 determines whether to generate the removal schedule using bottom-up optimization. For example, the removal scheduler 420 can determine that contract-level constraints or operator-level constraints are a priority compared to maintenance facility constraints. If, at block 1310, the example asset health calculator 300 determines not to generate the removal schedule using bottom-up optimization, the example method returns to block 1210 of the example of FIG. 12 to generate a revised optimization window value.

If, at block 1310, the example asset health calculator 300 determines to generate the removal schedule using bottom-up optimization, then, at block 1312, the asset health calculator 300 generates the removal schedule using bottom-up optimization. For example, the removal scheduler 420 can generate candidate removal schedules for each contract based on optimizing around and/or prioritizing contract-level or operator-level constraints, combining the candidate removal schedules, and re-adjusting the candidate removal schedules to help ensure global feasibility with respect to one or more factors such as operator constraints, maintenance facility constraints, spare part availability constraints, etc., and/or a combination thereof. An example process that can be used to implement block 1312 is described below in connection with FIG. 16. In response to generating the removal schedule using bottom-up optimization, the example method returns to block 1210 of the example of FIG. 12 to generate a revised optimization window value.

Although the example method of the example of FIG. 13 depicts generating a removal schedule using one optimization methods such as the single level optimization method, the top-down optimization method, or the bottom-up optimization method, alternatively, the example removal scheduler 420, and/or, more generally, the example asset health calculator 300 can use two or more of the single level optimization method, the top-down optimization method, or the bottom-up optimization method. For example, the removal scheduler 420 can generate a first removal schedule using the top-down optimization method as described in the example of FIG. 15 and can generate a second removal schedule using the bottom-up optimization method as described in the example of FIG. 16. The example removal scheduler 420 can compare the first removal schedule to the second removal schedule and select one of the removal schedules based on the selected removal schedule satisfying one or more maintenance facility constraints, operator constraints, function cost thresholds, etc., and/or a combination thereof.

Figure 14:
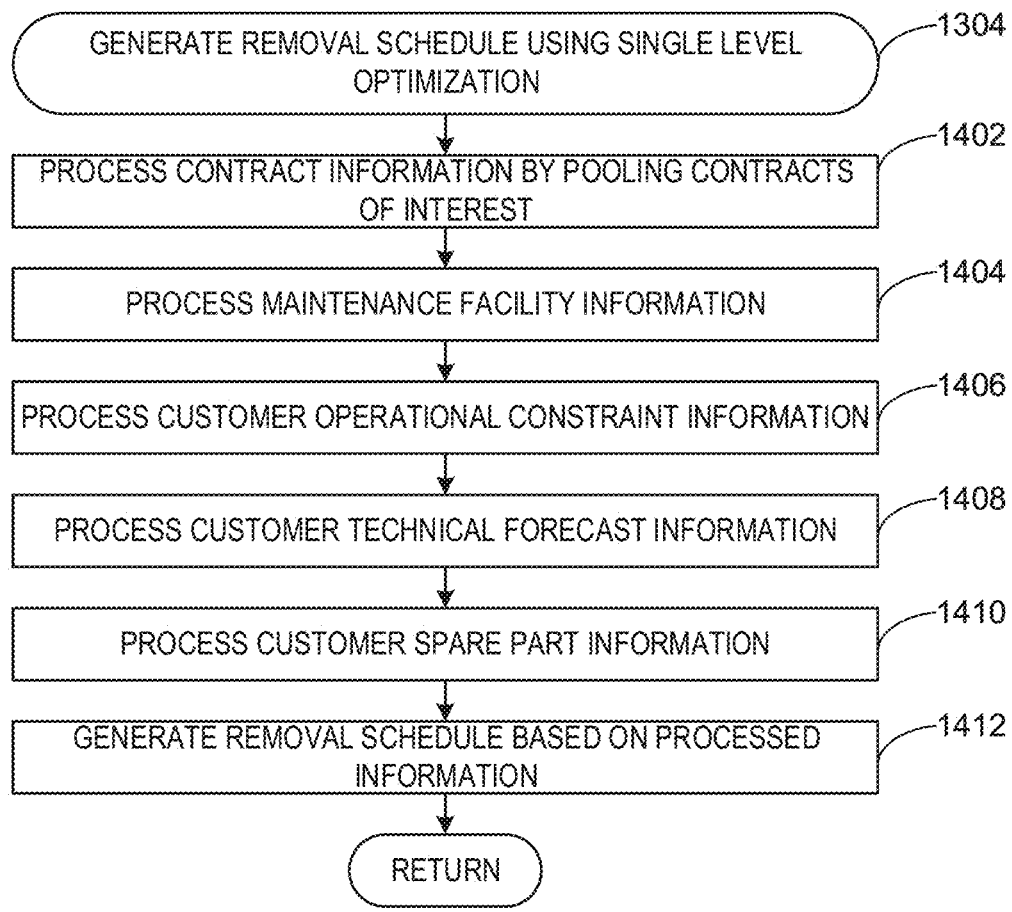

FIG. 14 is a flowchart representative of an example method that can be performed by the example asset health calculator 300 of FIGS. 3-4 to generate a removal schedule using single level optimization. The example process of FIG. 14 can be used to implement the operation of block 1304 of FIG. 13. The example method begins at block 1402 at which the example asset health calculator 300 processes contract information by pooling contracts of interest. For example, the removal scheduler 420 can obtain the contract information from the database 345 of FIGS. 3-4 corresponding to the assets targeted for removal (e.g., the assets including the engine 102 of FIG. 1).

At block 1404, the example asset health calculator 300 processes maintenance facility information. For example, the removal scheduler 420 can obtain the maintenance facility information (e.g., a number of maintenance facilities, a number of personnel at the maintenance facilities, a current availability of the maintenance facilities, etc.) from the database 345.

At block 1406, the example asset health calculator 300 processes customer operational constraint information. For example, the removal scheduler 420 can obtain the customer operational constraint information (e.g., a number of assets the customer can remove from service during a specified time period, etc.) from the database 345.

At block 1408, the example asset health calculator 300 processes customer technical forecast information. For example, the removal scheduler 420 can obtain the customer technical forecast information (e.g., a time-on-wing metric, a number of flight cycles to be executed by the engine 102, etc.) from the database 345.

At block 1410, the example asset health calculator 300 processes customer spare part information. For example, the removal scheduler 420 can obtain the customer spare part information (e.g., a number of spares for the engine 102, the booster compressor 114, etc.) from the database 345.

At block 1412, the example asset health calculator 300 generates a removal schedule based on the processed information. For example, the removal scheduler 420 can generate a removal schedule based on pooling contracts corresponding to assets targeted for removal, processing the information corresponding to the pooled contracts (e.g., the contract information, the maintenance facility information, etc.), and generating the removal schedule for the assets based on the processed information. In response to generating the removal schedule based on the processed information, the example method returns to block 1306 of the example of FIG. 13 to determine whether to generate the removal schedule using top-down optimization.

Figure 15:
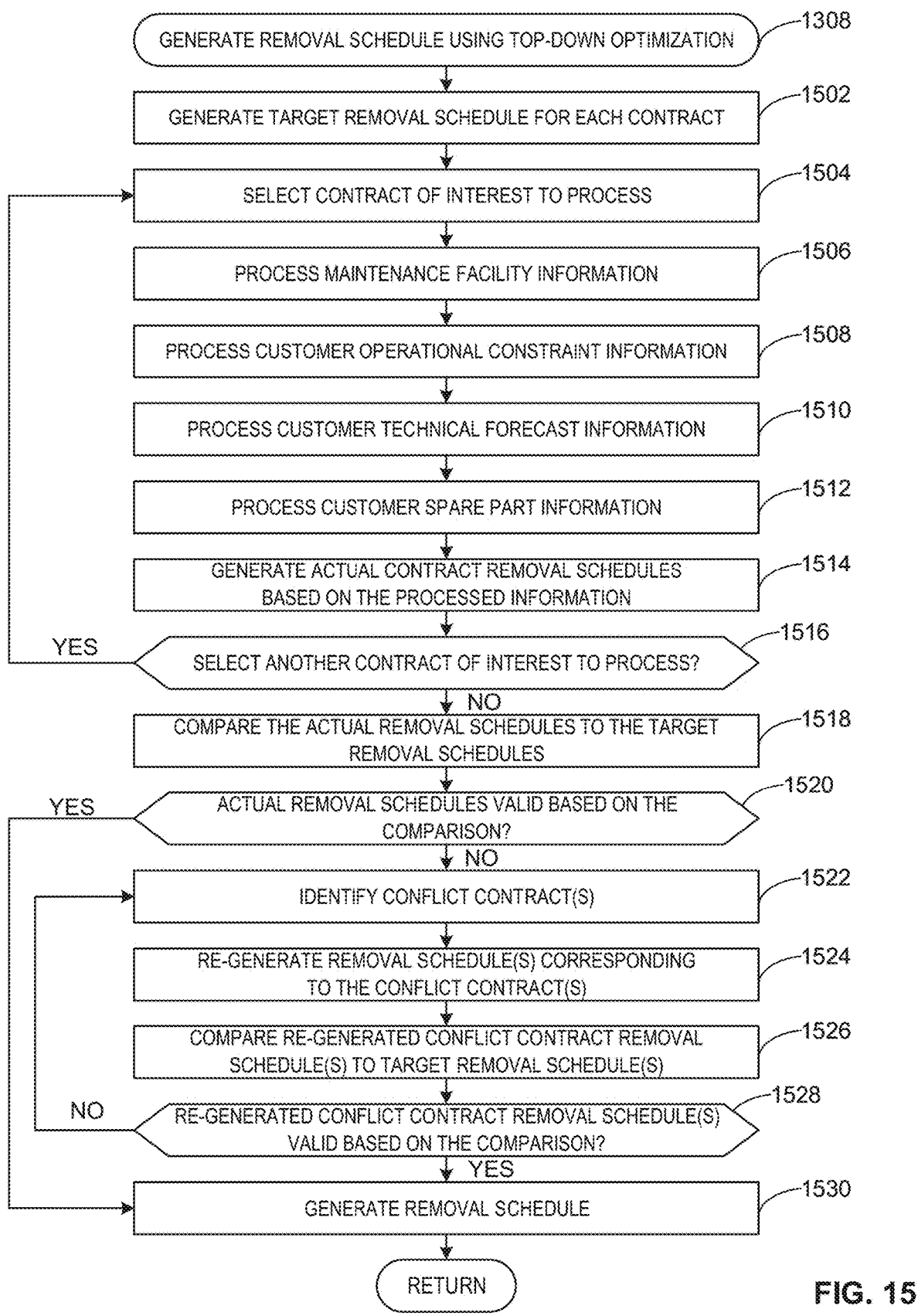

FIG. 15 is a flowchart representative of an example method that can be performed by the example asset health calculator 300 of FIGS. 3-4 to generate a removal schedule using top-down optimization. The example process of FIG.

15 can be used to implement the operation of block 1308 of FIG. 13. The example method begins at block 1502 at which the example asset health calculator 300 generates a target removal schedule for each contract. For example, the removal scheduler 420 can generate a target removal schedule for assets corresponding to contract 1 2200, contract 2 2210, contract 3 2220, and contract 4 2230 of FIG. 22.

At block 1504, the example asset health calculator 300 selects a contract of interest to process. For example, the removal scheduler 420 can select the contract 1 2200 of FIG. 22 to process.

At block 1506, the example asset health calculator 300 processes maintenance facility information. For example, the removal scheduler 420 can obtain the maintenance facility information (e.g., a number of maintenance facilities, a number of personnel at the maintenance facilities, a current availability of the maintenance facilities, etc.) from the database 345.

At block 1508, the example asset health calculator 300 processes customer operational constraint information. For example, the removal scheduler 420 can obtain the customer operational constraint information (e.g., a number of assets the customer can remove from service during a specified time period, etc.) from the database 345.

At block 1510, the example asset health calculator 300 processes customer technical forecast information. For example, the removal scheduler 420 can obtain the customer technical forecast information (e.g., a time-on-wing metric, a number of flight cycles to be executed by the engine 102, etc.) from the database 345.

At block 1512, the example asset health calculator 300 processes customer spare part information. For example, the removal scheduler 420 can obtain the customer spare part information (e.g., a number of spares for the engine 102, the booster compressor 114, etc.) from the database 345.

At block 1514, the example asset health calculator 300 generates an actual removal schedule based on the processed information. For example, the removal scheduler 420 can generate an actual removal schedule for the assets corresponding to the contract 1 2200 of FIG. 22 based on the processed information (e.g., the maintenance facility information, the customer operational constraint information, etc.).

At block 1516, the example asset health calculator 300 determines whether to select another contract of interest to process. For example, the removal scheduler 420 can select the contract 2 2210 of FIG. 22 to process. If, at block 1516, the example asset health calculator 300 determines to select another contract of interest to process, control returns to block 1504 to select another contract of interest to process. If, at block 1516, the example asset health calculator 300 determines not to select another contract of interest to process, then, at block 1518, the asset health calculator 300 compares the actual removal schedules to the target removal schedules. For example, the removal scheduler 420 can compare the actual removal schedule for the assets corresponding to the contract 1 2200 to the target removal schedule for the assets corresponding to the contract 1 2200.

At block 1520, the example asset health calculator 300 determines whether the actual removal schedules are valid based on the comparison. For example, the removal scheduler 420 can determine whether a slot assignment of the assets corresponding to the contracts 2200, 2210, 2220, 2230 of FIG. 22 based on the actual removal schedules are not feasible, not valid, etc., (e.g., too many assets are assigned to the same maintenance facility at the same time, too many assets are removed during a specific time period, etc.).

If, at block 1520, the example asset health calculator 300 determines that the actual removal schedules are valid based on the comparison, control proceeds to block 1530 to generate the removal schedule based on the actual removal schedules. If, at block 1520, the example asset health calculator 300 determines that the actual removal schedules are not valid based on the comparison, then, at block 1522, the asset health calculator 300 identifies conflict contract(s). For example, the removal scheduler 420 can determine that the contract 2 2210 of FIG. 22 conflicts with the contract 1 2200 of FIG. 2 because one or more assets in the contract 2 2210 are in the same maintenance facility during a similar time period (e.g., a substantially similar time period, etc.) as one or more assets in the contract 1 2200 of FIG. 22.

At block 1524, the example asset health calculator 300 re-generates the removal schedule(s) corresponding to the conflict contract(s). For example, the removal scheduler 420 can re-generate the removal schedule for assets corresponding to contract 2 2210 of FIG. 22. For example, the removal scheduler 420 can determine that contract 2 2210 cannot be assigned or slotted according to the target removal schedule due to additional constraints (e.g., maintenance facility constraints, constraints due to contract 1 2200, etc.). The example removal scheduler 420 can re-generate the removal schedule for assets corresponding to contract 2 2210 to satisfy constraints corresponding to contract 2 2210 and the constraints set by the top (e.g., the maintenance facility, etc.).

At block 1526, the example asset health calculator 300 compares the re-generated conflict contract removal schedule(s) to the target removal schedules. For example, the removal scheduler 420 can compare the re-generated removal schedule for the contract 2 2210 of FIG. 22 to the target removal schedule for the contract 2 2210.

Figure 22:
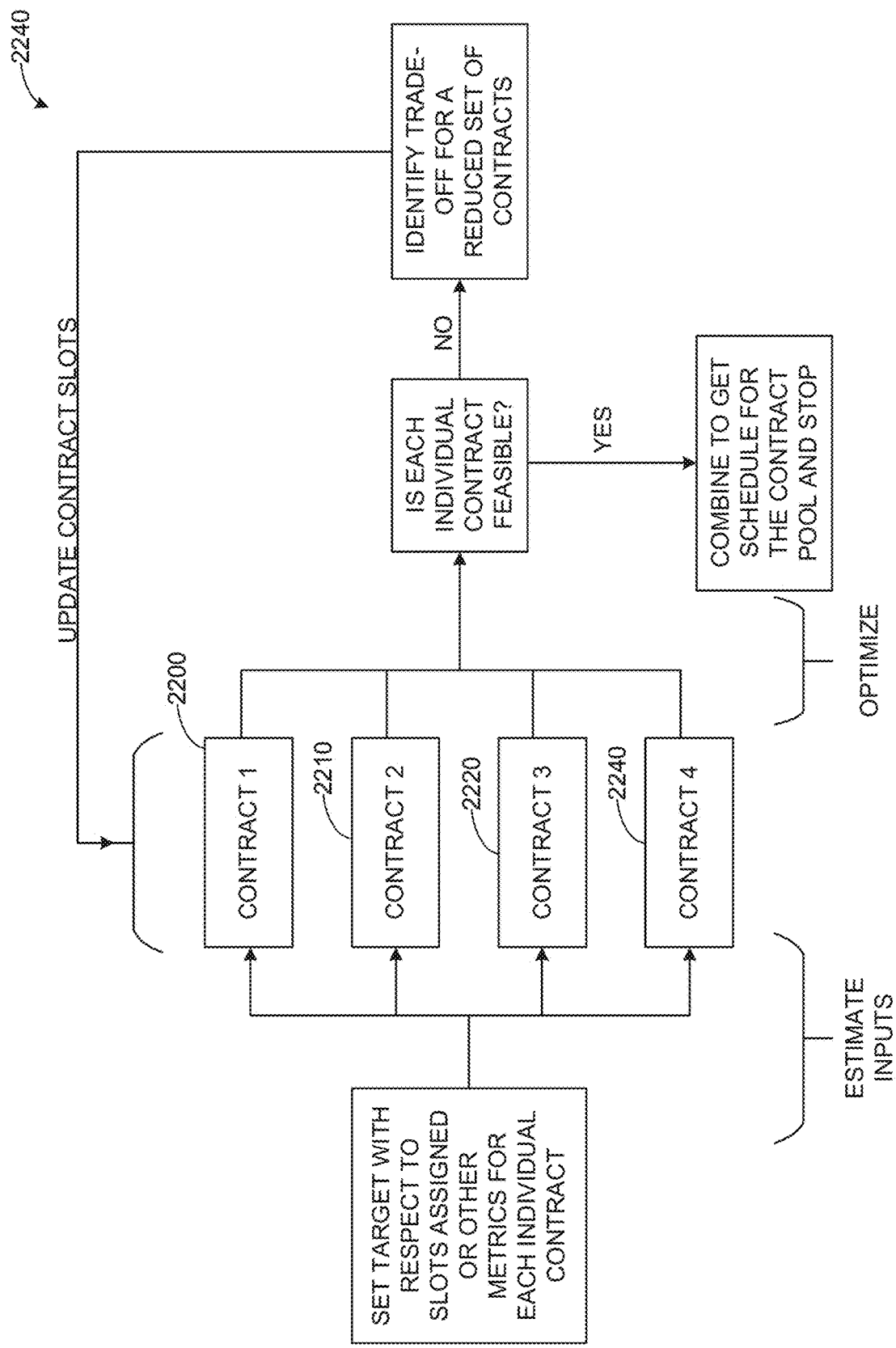
FIG. 22 is a schematic illustration of an example method of generating a removal schedule using top-down optimization.

At block 1528, the example asset health calculator 300 determines whether the re-generated conflict contract removal schedule(s) are valid based on the comparison. For example, the removal scheduler 420 can determine that the contract 2 2210 of FIG. 22 is valid (e.g., the contract 2 2210 no longer conflicts with the contract 1 2200 of FIG. 22, etc.) based on the comparison.

If, at block 1528, the example asset health calculator 300 determines that the re-generated conflict contract removal schedule(s) are not valid based on the comparison, control returns to block 1522 to identify the conflict contracts. If, at block 1528, the example asset health calculator 300 determines that the re-generated conflict contract removal schedule(s) are valid based on the comparison, then, at block 1530, the asset health calculator 300 generates a removal schedule. For example, the removal scheduler 420 can generate the removal schedule based on determining that each of the removal schedules for the contracts 2200, 2210, 2220, 2230 of FIG. 22 are feasible, valid, etc. In response to generating the removal schedule, the example method returns to block 1310 of the example method of FIG. 13 to determine whether to generate the removal schedule using bottom-up optimization.

Figure 16:
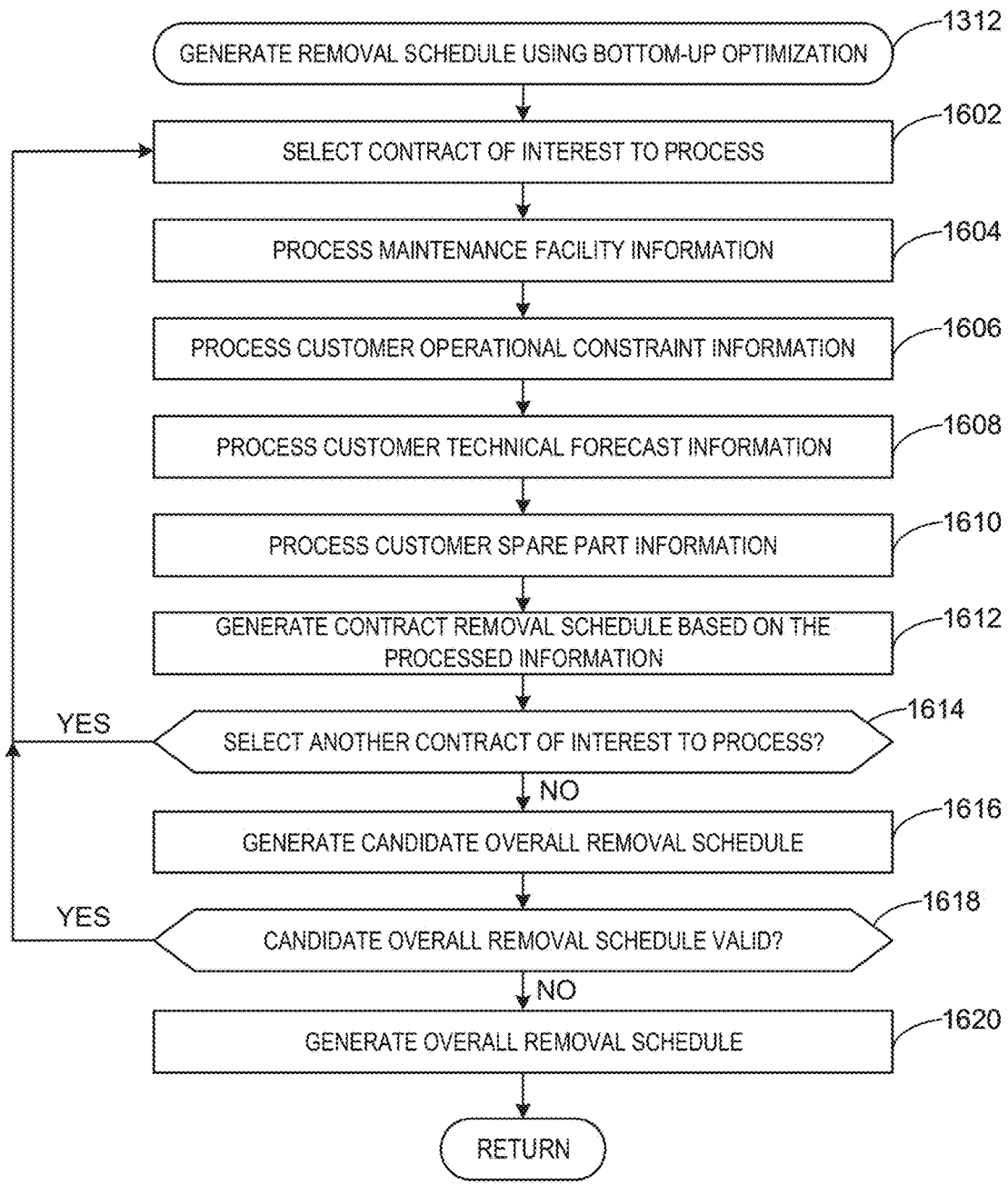

FIG. 16 is a flowchart representative of an example method that can be performed by the example asset health calculator 300 of FIGS. 3-4 to generate a removal schedule using bottom-up optimization. The example process of FIG. 16 can be used to implement the operation of block 1312 of FIG. 13. The example method begins at block 1602 at which the example asset health calculator 300 selects a contract of interest to process. For example, the removal scheduler 420 can select contract 1 2300 of FIG. 23 to process.

At blocks 1604-1610, the example asset health calculator 300 (e.g., the removal scheduler 420, etc.) processes information of interest similar (e.g., substantially similar) to the processes of blocks 1404-1410 of the example of FIG. 14. At block 1612, the example asset health calculator 300 generates a contract removal schedule based on the processed information. For example, the removal scheduler 420 can generate a removal schedule for the contract 1 2300 based on the processed information (e.g., the maintenance facility information, the customer spare part information, etc.).

At block 1614, the example asset health calculator 300 determines whether to select another contract of interest to process. For example, the removal scheduler 420 can select the contract 2 2310 of FIG. 23 to process. If, at block 1614, the example asset health calculator 300 determines to select another contract of interest to process, control returns to block 1602 to select another contract of interest to process. If, at block 1614, the example asset health calculator 300 determines not to select another contract of interest to process, then, at block 1616, the asset health calculator 300 generates a candidate overall removal schedule. For example, the removal scheduler 420 can generate an overall removal schedule including a removal schedule for the contract 1 2300, the contract 2 2310, the contract N-1 2320, the contract N 2330, etc., in which N corresponds to a total number of contracts to process.

At block 1618, the example asset health calculator 300 determines whether the candidate overall removal schedule is valid. For example, the removal scheduler 420 can determine that the candidate overall removal schedule is valid based on the candidate overall removal schedule satisfying customer requirements, maintenance facility constraints, etc.

If, at block 1618, the example asset health calculator 300 determines that the overall removal schedule is not valid, control returns to block 1602 to select another contract of interest to process (e.g., to re-adjust the removal schedule to help ensure global feasibility with respect to maintenance facility level constraints, etc.). If, at block 1618, the example asset health calculator 300 determines that the overall removal schedule is not valid, then, at block 1620, the asset health calculator 300 generates an overall removal schedule. For example, the removal scheduler 420 can generate an overall removal schedule including a removal schedule of assets corresponding to the contracts 2300, 2310, 2320, 2330 of FIG. 23. In response to generating the overall removal schedule, the example method returns to the example of FIG. 13 to return to block 1210 of the example of FIG. 12 to generate a revised optimization window value.

FIG. 17 is a schematic illustration of performing an iterated local search to generate a removal schedule for assets corresponding to a single contract. The example process of FIG. 11 can be used to implement the iterated local search as depicted in FIG. 17. For example, a removal schedule of the engines 1710, 1720, 1730 can be re-ordered to generate different solutions with corresponding different function costs. In the illustrated example of FIG. 17, the dark shaded boxes represent removal schedules corresponding to the engines that are being re-arranged when generating a different solution. For example, as depicted in FIG. 17, the removal scheduler 420 generates the neighbor 1 solution 1740 by swapping an order of the removal schedules for the engine 1 1710 (dark shaded) and the engine 2 1720 (dark shaded) while the engine 3 1730 is left unchanged (not dark shaded). In the illustrated example of FIG. 17, the removal scheduler 420 generates additional solutions such as a neighbor 2 solution 1750 and a neighbor 3 solution 1760 based on re-arranging the removal schedules for the engines 1710, 1720, 1730.

FIG. 18 depicts example source code 1800 representative of example computer readable instructions that can be executed to implement the example asset health calculator 300 of FIGS. 3-4 that can be used to implement the examples disclosed herein. For example, the source code 1800 can be used to implement the method of FIG. 11. In the illustrated example of FIG. 11, the asset health calculator 300 generates an initial sequence (e.g., an initial solution, etc.) of work orders to be performed and sets the initial sequence as the current best sequence. For example, the removal scheduler 420 can generate the initial sequence of work orders by sorting engines (e.g., assets, etc.) by increasing TPP dates. In the illustrated examples of FIG. 18, the asset health calculator 300 performs an iterated local search while time elapsed is less than or equal to a time limit threshold. For example, the removal scheduler 420 can optimize and/or otherwise improve a current best sequence (e.g., a removal schedule, etc.) to complete the work orders (e.g., to remove the engine 102 of FIG. 1 and perform a maintenance task on the engine 102, etc.) while an amount of time taken to process the source code 1800 is less than or equal to the time limit threshold (e.g., 100 milliseconds, 5 seconds, 2 minutes, etc.).

FIG. 19 is a schematic illustration of an example method of generating a removal schedule for assets corresponding to more than one contract by performing integer programming using a myopic optimization method, a rolling optimization method, etc. The schematic illustration of FIG. 19 can correspond to the example process of FIG. 12.

FIG. 20 depicts example source code 2000 representative of example computer readable instructions that can be executed to implement the example asset health calculator 300 of FIGS. 3-4 that can be used to implement the examples disclosed herein. For example, the source code 2000 can be used to implement the method of FIG. 12. In the illustrated example of FIG. 12, the asset health calculator 300 (e.g., the removal scheduler 420, etc.) generates an assignment of engines (e.g., a removal schedule, etc.) for a planning horizon P, an optimization window period R, and a freeze period F. The example source code 2000 is executed while the end of the planning window k given by (t_k+R) is less than or equal to P.

Figure 21:
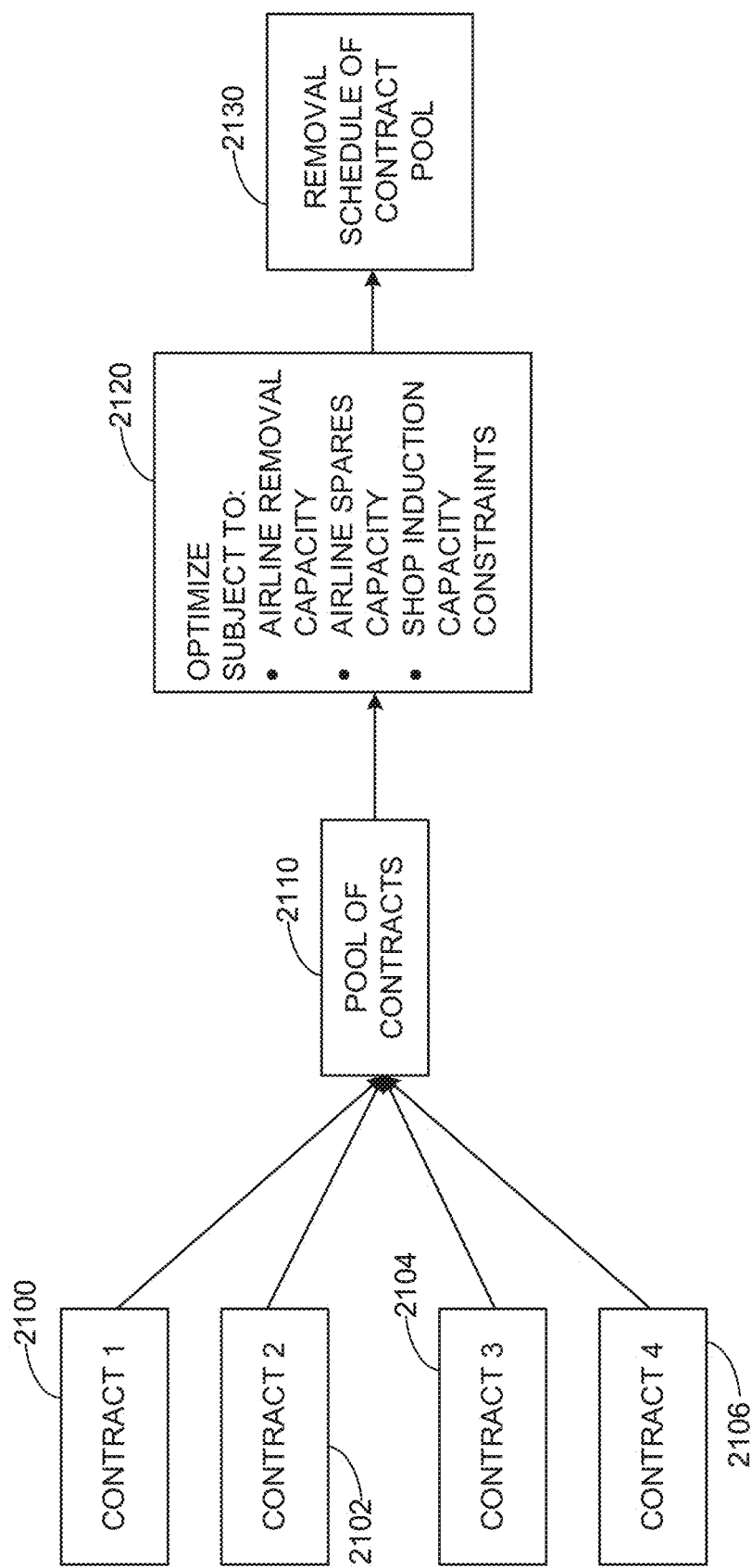
FIG. 21 is a schematic illustration of an example method of generating a removal schedule using single-level optimization.

FIG. 21 is a schematic illustration of an example method of generating a removal schedule using single-level optimization. The example process of FIG. 14 can be used to implement the single level optimization process depicted in FIG. 21. In the illustrated example of FIG. 21, the asset health calculator 300 (e.g., the removal scheduler 420, etc.) pools the contracts 1-4 2100, 2102, 2104, 2106 into the pool of contracts 2110. In the illustrated example of FIG. 21, the asset health calculator 300 optimizes and/or otherwise improves a removal schedule corresponding to the pool of contracts 2110 based on airline removal capacity (e.g., customer operational constraint information, etc.), airlines spares capacity (e.g., customer spare part information, etc.), and shop induction capacity constraints (e.g., maintenance facility information, etc.). Additionally or alternatively, any other customer information, operator information, maintenance facility information, etc., can be used.

FIG. 22 is a schematic illustration of an example method of generating a removal schedule using top-down optimization. The example process of FIG. 15 can be used to implement the example top-down optimization process 2240 depicted in FIG. 22. In the illustrated example of FIG. 22, the asset health calculator 300 sets a target removal schedule for each of the contracts 1-4 2200, 2210, 2220, 2230 with respect to each of the other contracts 1-4 2200, 2210, 2220, 2230. For example, the removal scheduler 420 generates a slot order of the contracts 1-4 2200, 2210, 2220, 2230 using target information such as operating margin of the turbine engine maintenance provider, time-on-wing, and spare engine availability and constraint information such as spare engine availability, maintenance facility capacity, and contract information (e.g., terms and conditions, timelines, metrics, etc.). In the illustrated example of FIG. 22, the asset health calculator 300 assigns each of the contracts 2200, 2210, 2220, 2230 a target removal schedule based on the target information and the constraint information and then individually optimize and/or otherwise improve the target removal schedules.

For example, the removal scheduler 420 can generate a target removal schedule where the contracts 1-4 2200, 2210, 2220, 2230 do not conflict with each other based on estimating inputs such as maintenance facility information, customer operational constraint information, etc. In the illustrated example, the asset health calculator 300 optimizes and/or otherwise improves the target removal schedules by generating actual removal schedules based on information such as the maintenance facility information, the customer operational constraint information, etc.

In the illustrated example, the asset health calculator 300 determines whether an actual removal schedule corresponding to each individual contract is feasible, valid, etc., based on the target removal schedules. For example, the removal scheduler 420 can determine to combine the actual removal schedules to get an overall removal schedule for the contract pool (e.g., the contracts 1-4 2200, 2210, 2220, 2230, etc.) and stop the top-down optimization process 2240 of FIG. 22. In another example, the removal scheduler 420 can determine to identify a trade-off for a reduced set of contracts (e.g., contracts that are not feasible or valid, conflict with other contracts, etc.) and to update the removal schedules pertaining to the invalid contracts.

Figure 23:
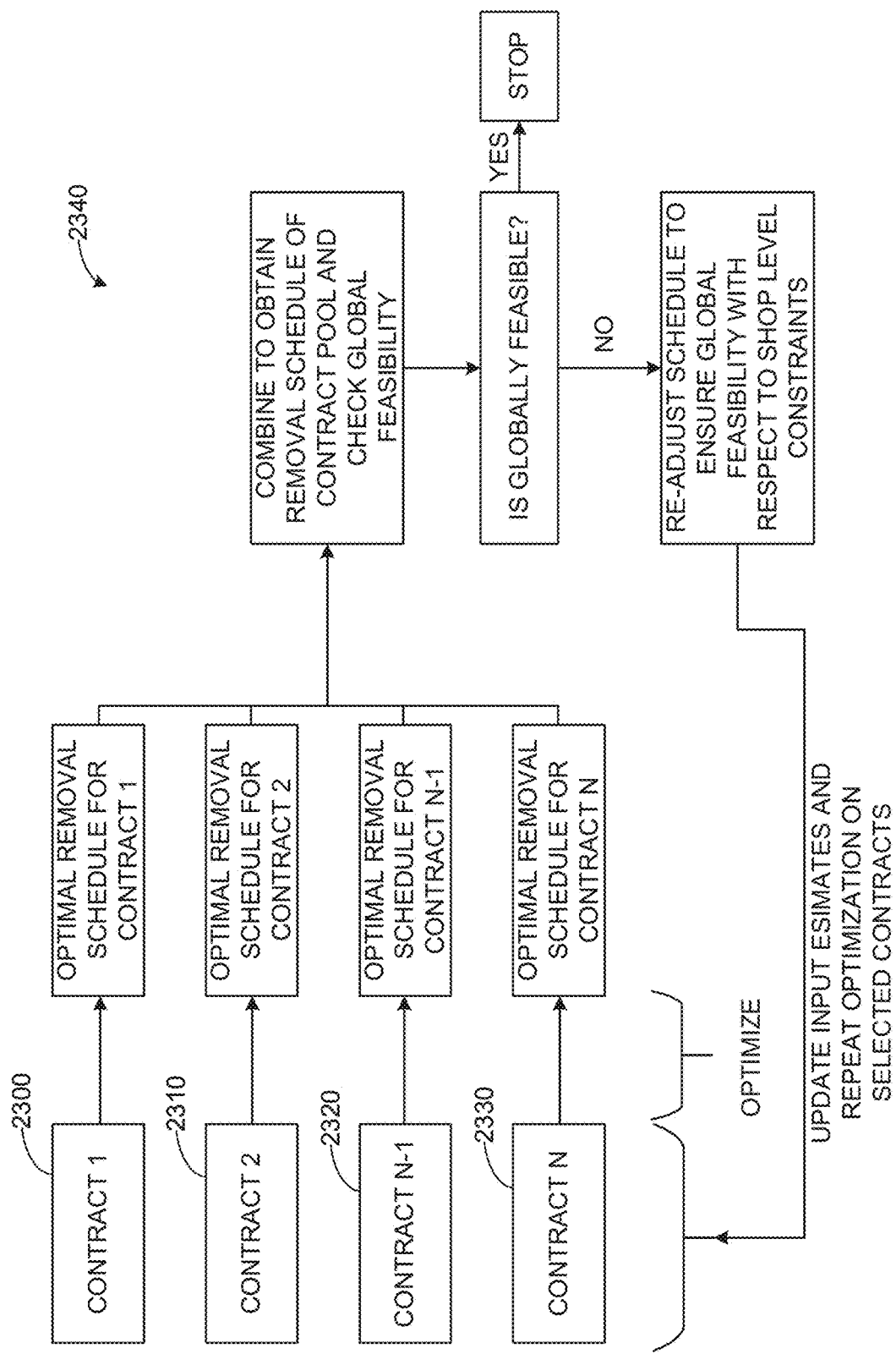
FIG. 23 is a schematic illustration of an example method of generating a removal schedule using bottom-up optimization.

FIG. 23 is a schematic illustration of an example method of generating a removal schedule using bottom-up optimization. The example process of FIG. 16 can be used to implement the bottom-up optimization process 2340 depicted in FIG. 23. In the illustrated example of FIG. 23, the asset health calculator 300 generates a removal schedule (e.g., an optimal removal schedule, etc.) for each of the contracts 2300, 2310, 2320, 2330 depicted in FIG. 23. In the illustrated example, the asset health calculator 300 combines the removal schedules for each of the contracts 2300, 2310, 2320, 2330 to obtain a removal schedule of the contract pool and check for global feasibility. In the illustrated example, the asset health calculator 300 determines whether the removal schedule of the contract pool is globally feasible (e.g., the removal schedule is compatible with contract information, customer requirements, maintenance facility constraints, etc.). In the illustrated example, the asset health calculator 300 re-adjusts the contract pool removal schedule to ensure global feasibility with constraints such as customer constraints, maintenance facility constraints, etc. In the illustrated example, the asset health calculator 300 stops the bottom-up optimization process 2340 if the asset health calculator 300 determines that the contract pool removal schedule is globally feasible.

Figure 24:
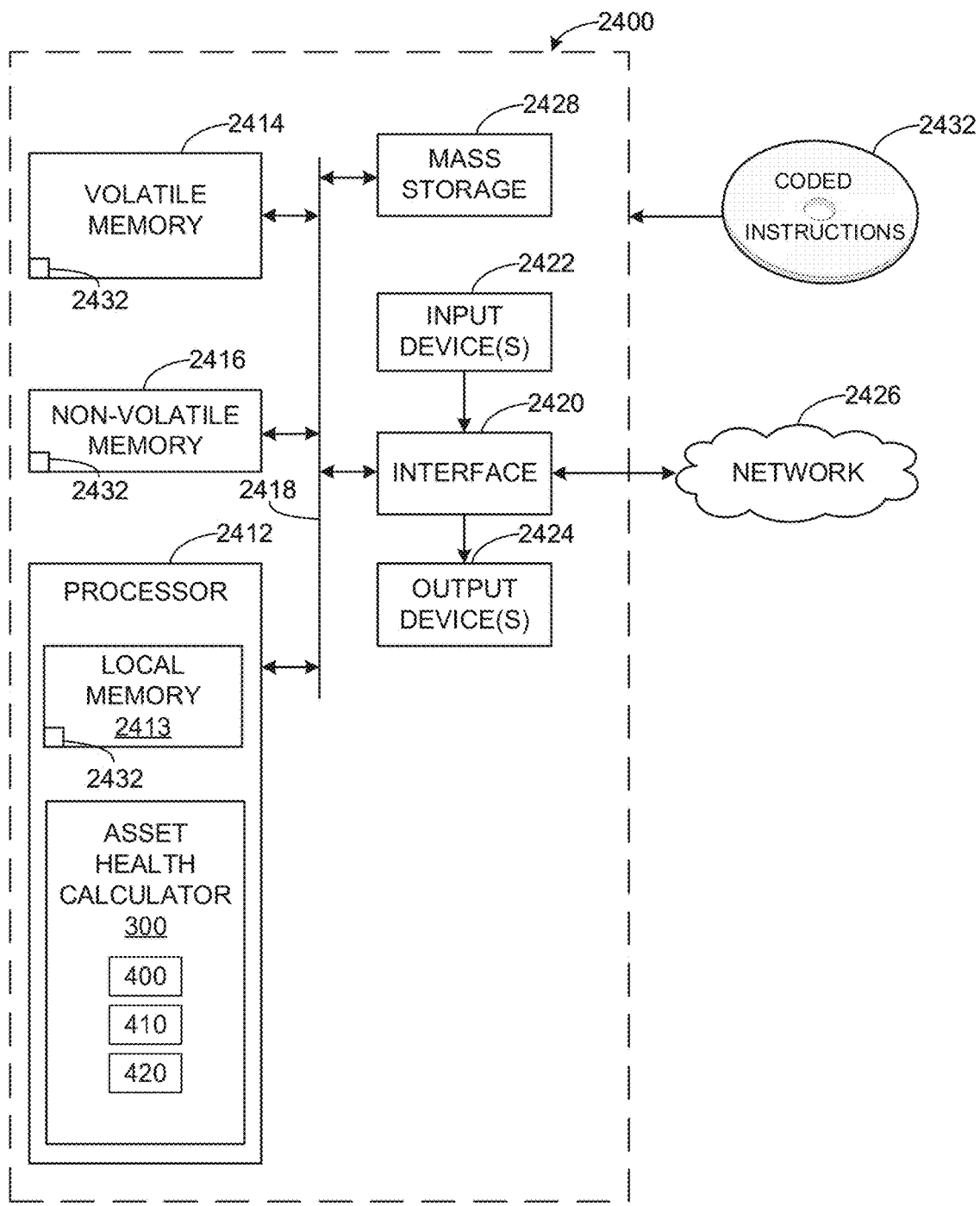
FIG. 24 is a block diagram of an example processing platform structured to execute machine-readable instructions to implement the methods of FIGS. 5-16, 18, and 20 and/or the example asset health calculator apparatus of FIGS. 3-4.

FIG. 24 is a block diagram of an example processor platform 2400 capable of executing the instructions of FIGS. 5-16, 18, and 20 to implement the asset health calculator 300 of FIGS. 3-4. The processor platform 2400 can be, for example, a server, a personal computer, a mobile device (e.g., a cell phone, a smart phone, a tablet such as an iPad™), a personal digital assistant (PDA), or any other type of computing device.

The processor platform 2400 of the illustrated example includes a processor 2412. The processor 2412 of the illustrated example is hardware. For example, the processor 2412 can be implemented by one or more integrated circuits, logic circuits, microprocessors or controllers from any desired family or manufacturer. The hardware processor may be a semiconductor based (e.g., silicon based) device. In this example, the processor 2412 implements the example collection engine 400, the example health quantifier generator 410, and the example removal scheduler 420.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a peripheral component interconnect (PCI) express interface.

In the illustrated example, one or more input devices 2422 are connected to the interface circuit 2420. The input device(s) 2422 permit(s) a user to enter data and/or commands into the processor 2412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2420 of the illustrated example, thus, typically includes a graphics driver card, a graphics driver chip and/or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, redundant array of independent disks (RAID) systems, and DVD drives.

The coded instructions 2432 of FIGS. 5-16, 18, and 20 may be stored in the mass storage device 2428, in the volatile memory 2414, in the non-volatile memory 2416, and/or on a removable non-transitory computer readable storage medium such as a CD or DVD.

From the foregoing, it will be appreciated that example methods, apparatus, systems, and articles of manufacture have been disclosed that generate an asset health quantifier of a turbine engine. The above-disclosed asset health calculator apparatus estimates actual or current health states (e.g., actual AHQ, etc.) and forecasts projected health states (e.g., projected AHQ, etc.) of an asset such as a turbine engine by component and sub-component of the asset while in service with limited instrumentation using one or more models such as a digital twin model of the turbine engine. The example asset health calculator apparatus can optimize and/or otherwise improve a scheduling of removal of the asset from service to perform maintenance, refurbishment, service, etc., on the asset to meet customer requirements, maintenance capacity constraints, etc. The example asset health calculator apparatus can generate a removal schedule using one or more removal schedule determination or optimization processes and select one of the removal schedules based on satisfying customer requirements, maintenance facility constraints, etc. The example asset health calculator apparatus can optimize and/or otherwise improve a time-on-wing of the asset while minimizing cost and removal time and while yet achieving a post-repair mission based on forecast utilization information for the asset.

The example asset health calculator apparatus can obtain asset monitoring information corresponding to a turbine engine on-wing of an aircraft while in service. The example asset health calculator apparatus can generate (e.g., iteratively generate) an actual health state of the turbine engine based on generating actual health states of individual components of the turbine engine using one or more computer-generated models corresponding to the turbine engine. The example asset health calculator apparatus can identify that the turbine engine is a candidate for removal from service to perform maintenance on one or more components of the turbine engine based on a comparison of one or more of the actual health states to an actual health state threshold. The example asset health calculator apparatus can generate a removal schedule for the turbine engine by using different optimization processes and selecting a removal schedule based on satisfying operator requirements, operator constraints, turbine engine maintenance provider constraints, etc. A turbine engine maintenance provider can remove the turbine engine off-wing based on the removal schedule, perform the maintenance operation on the removed turbine engine, and re-deploy the turbine engine back to service where the example asset health calculator apparatus can resume monitoring the turbine engine while in service.

The example asset health calculator apparatus can improve a function, an operation, an efficiency, etc., of the turbine engine over the course of useful life of the turbine engine by more accurately determining an actual health state of the turbine engine. For example, by more accurately determining the actual health state, the asset health calculator apparatus can reduce a probability of premature removal of the turbine engine from service. By reducing the probability of premature removal, additional time can pass between maintenance facility visits which can allow new and improved asset components to be researched, designed, and tested that can improve an AHQ of the turbine engine. If the turbine engine is not prematurely removed from service, then, when the turbine engine is ready to be removed from service, newer components that can increase the AHQ of the turbine engine can be used to upgrade and/or otherwise improve an operation of the turbine engine over the course of useful life of the turbine engine.

II. Task Generator

Figure 25:
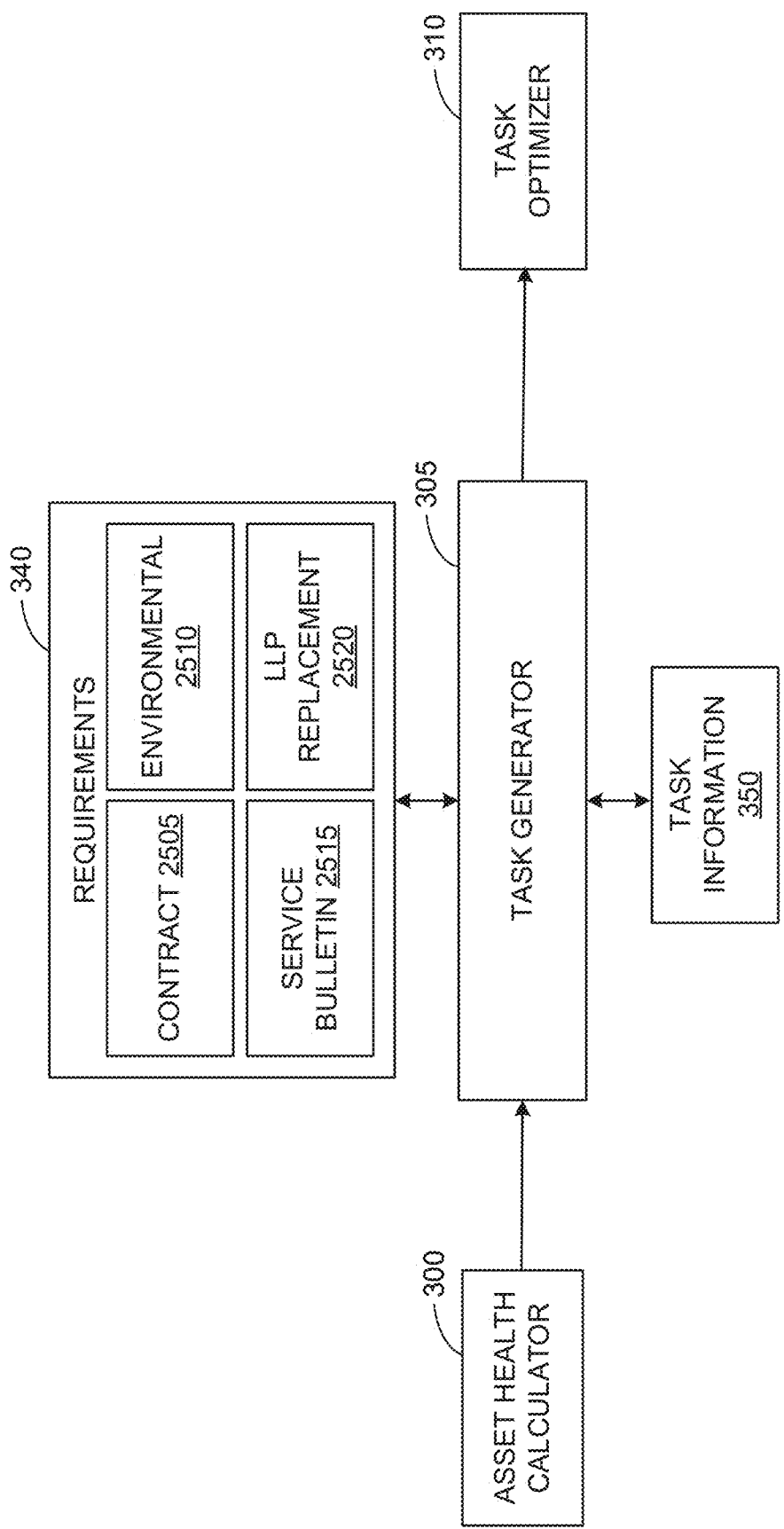
FIG. 25 is a block diagram of an example implementation of a portion of the example asset workscope generation system of FIGS. 2-3.

FIG. 25 is a block diagram of an example implementation of a portion of the AWGS 220 including the asset health calculator 300, task generator 305, task optimizer 310, requirements 340, and task information 350. The asset health calculator 300 provides input, such as overall asset health rank, component (e.g., asset module or part, etc.) health rank, etc., and the task generator 305 provides maintenance operations or tasks to the task optimizer 310 to generate and evaluate workscope options.

As shown in the example of FIG. 25, the requirements 340 include contract requirements 2505, environment requirements 2510, a service bulletin 2515, life-limited part (LLP) replacement requirements 2520, etc. Requirements 340 can be modeled via one or more of a deterministic model, probabilistic model, physics-based model, durability model, etc. For example, a digital twin, neural network, and/or other machine learning network, etc., can be used to form a model of a contract, environment, service bulletin, life limited part trajectory, etc., and associated requirements.

In the illustrated example of FIG. 25, the task information 350 includes information regarding tasks involved in maintenance operations. For example, each maintenance operation includes one or more tasks, where each task has corresponding information such as type and quantity of personnel to complete the task, components and/or tools needed to complete task, time and cost to complete task, etc.

The task information 350 and requirements 340 provide input to the task generator 305 to generate a series of tasks to prepare and/or otherwise maintain an asset for a next mission, for example. The task generator 305 generates list or other set of potential maintenance operations that can be completed within a next shop visit or subsequent shop visit(s) for a target asset. In certain examples, each maintenance operation can be assigned a criticality index or quantifier to drive minimum workscope, for example For example, time on wing and shop cost for a target asset are related by workscope. Balancing Customized Service Agreement (CSA) durability, operability and performance requirements with financial metrics is a multidimensional optimization problem with millions of solutions. The task generator 305 analyzes possibilities and presents top candidates based on input criteria including requirements 340 and task information 350 to generate potential tasks or operations with respect to the target asset. Evaluating all the possibilities manually is impossible.

Figure 26A:
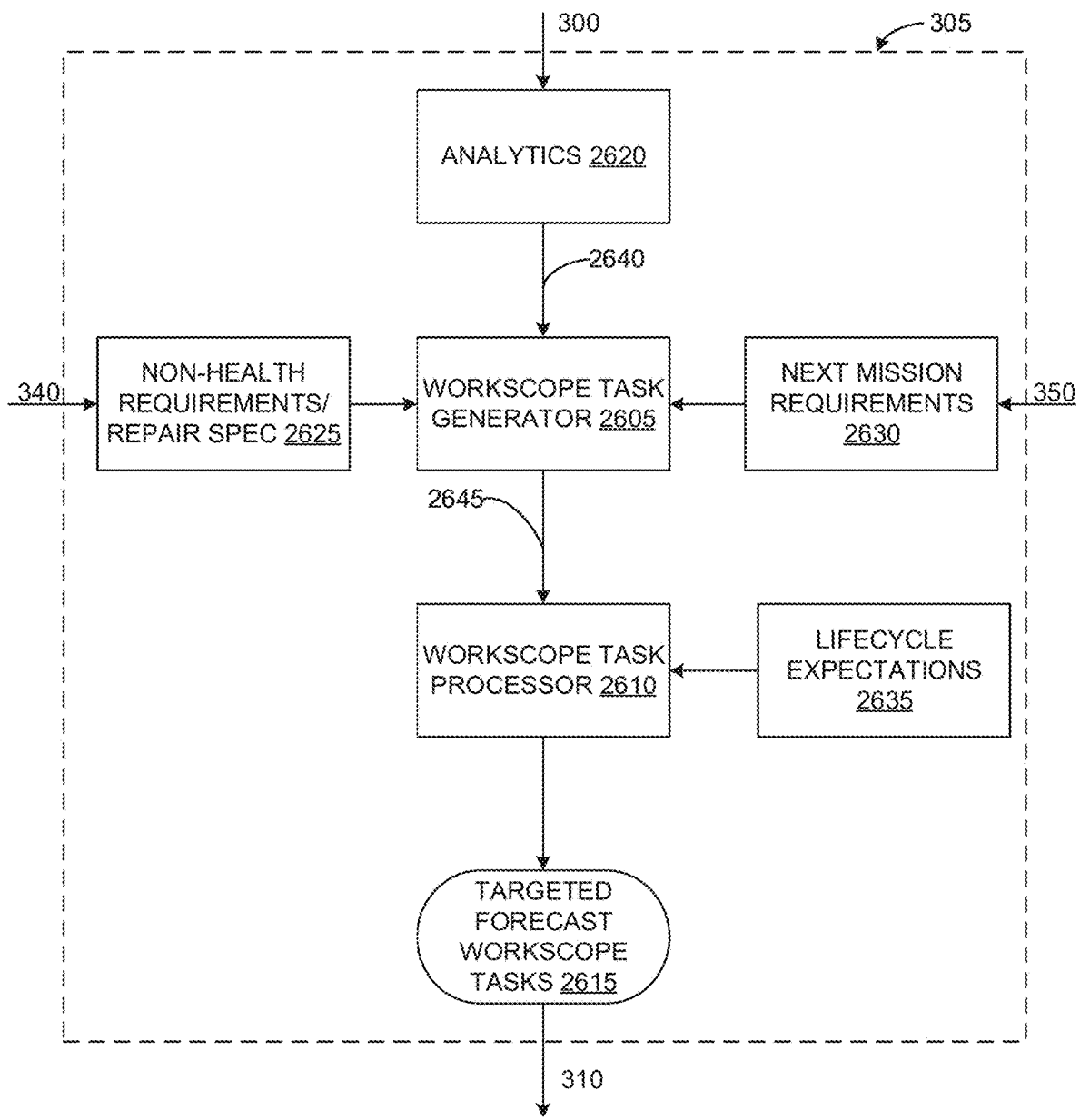
FIGS. 26A-26B are block diagram of example implementations of the example task generator of FIGS. 3 and/or 25.

FIG. 26A is a block diagram of an example implementation of the example task generator 305 of FIGS. 3 and/or 25. In the illustrated example of FIG. 26A, the task generator 305 includes a workscope task generator 2605 and a workscope task processor 2610 which work together to generate targeted forecast workscope tasks 2615 for a particular goal, mission, etc. As shown in the example of FIG. 26A, analytics 2620, non-health requirements 2625 such as a repair specification, etc., and next mission requirements 2630 provide input to the workscope task generator 2605. Lifecycle expectations 2635 provide input to the workscope task processor 2610.

For example, the workscope task generator 2605 processes analytics 2620 generated as a result of the asset health calculation, including asset health rank, etc., from the asset health calculator 300. Asset health can be modeled using a physics-based model (e.g., a digital twin, neural network, etc.) of the asset (e.g., a turbine engine, diesel engine, other electromechanical device, etc.), for example. Asset health can be modeled while the asset is still fielded (e.g., the engine is still on-wing, etc.), for example. In addition to modeling current asset health, a future health or life expectancy for the asset can be determined by the model and/or other analytics 2620. The health analytics 2620 generate an asset health state 2640 (e.g., a health level and/or life expectancy, etc.) for the asset, which is provided to the workscope task generator 2605.

The workscope task generator 2605 combines the asset health state analytics 2640 including health level and life expectancy for the target asset with non-health requirements 2625 (e.g., a repair specification, service bulletin, life-limited part information, etc.) and next mission requirements 2630 (e.g., build-to-achieve functionality for a certain goal, objective, mission, etc.) to generate mission-specific workscope tasks 2645 based on mission requirements 2630 as constrained by non-health requirements 2625 applicable to the target asset.

The workscope task processor 2610 receives the mission-specific workscope tasks 2645 generated from asset health state information 2640, next mission requirements 2630, and non-health requirements 2625 and generates targeted forecast workscope tasks 2615. The workscope task processor 2610 processes the tasks 2645 based on lifecycle expectations 2635 for the asset to evaluate whether the tasks 2645 fit the lifecycle expectations 2635 for the asset (e.g., will the task(s) 2645 help the asset to last to meet the lifecycle expectation 2635 enumerated in the contract, will the task(s) 2645 be insufficient to maintain a desired and/or required asset health state for the life of the contract, will the task(s) 2645 be unnecessary to maintaining the required/desired asset health state for the next mission and remaining life of the contract, etc.).

Figure 26B:
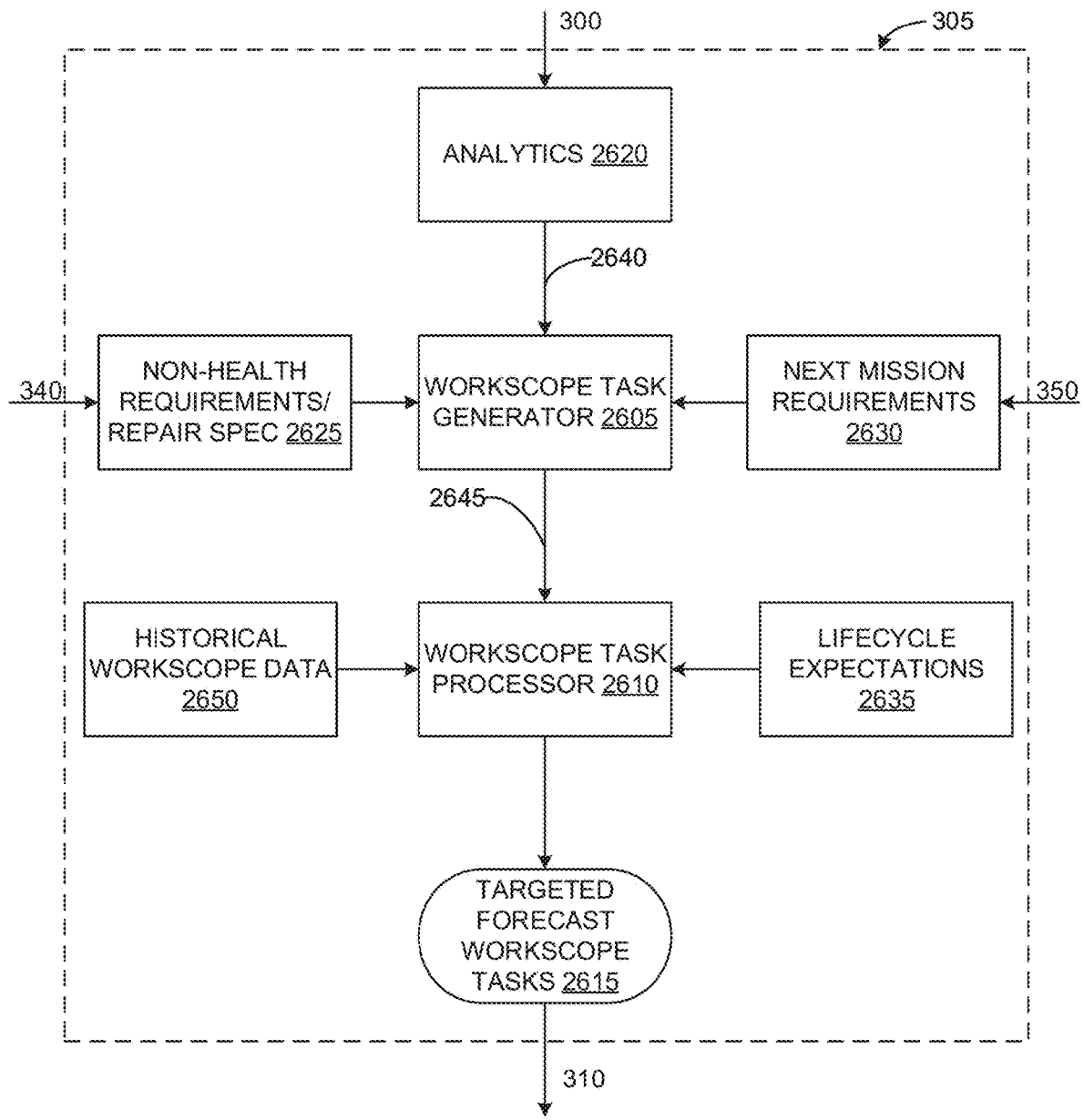

As shown in the example of FIG. 26B, historical workscope data 2650 can also be provided to the workscope task processor 2610 to further refine the forecast of targeted workscope tasks 2615 for a next mission based on feedback from prior missions the same as or similar to the next mission provided 2630. The historical data 2650 provides example(s) of prior settings, tasks, resources, etc., for a related workscope as well as a measurement, evaluation, and/or other feedback regarding workscope effect on the asset and/or asset environment from the prior workscope, for example. Such historical data and/or other feedback can help improve the generation of forecasted workscope tasks 2615 by the task generator 305.

Thus, the workscope task processor 2610 refines the mission-specific workscope tasks based on lifecycle expectations and historical workscope data to provide targeted forecast workscope tasks 2615. In certain examples, the task optimizer 310 processes the workscope tasks 2615 among a plurality of available workscope options to generate an "optimal" workscope. In certain examples, the task generator 305 estimates mission specific targeted workscopes by asset module and part using: 1) assessed individual asset health state/life expectancy; 2) business, contractual and technical requirements; 3) subsequent asset mission/lifecycle requirements; and 4) historical and analytic-based workscope versus asset health recovery assessments. The targeted forecast workscope tasks 2615 provide input to target asset repair/maintenance and supporting material/tooling to specific asset health issues to minimize or otherwise reduce costs/equipment down time while achieving the asset post-repair/maintenance mission. For example, the tasks 2615 specify an asset (or asset part, module, etc.) to be maintained (e.g., repaired, replaced, etc.), a timing for the maintenance, an expected duration for the maintenance, a location for the maintenance, materials involved in the maintenance, tooling used in the maintenance, personnel involved in the maintenance, etc.

In certain examples, the generated tasks 2615 are generated by the task generator 305 taking into account an impact on the fielded asset's environment (e.g., an airplane on which the engine is mounted, etc.). In certain examples, the generated tasks 2615 are generated by the task generator 305 taking in account a fleet- and/or other organization-wide impact (e.g., an entire fleet of aircraft scheduled with the aircraft whose engine is undergoing maintenance including engines on other aircraft in the fleet that may need maintenance as well, etc.). Tasks 2615 can be generated for the next mission and/or to maximize work done while the asset is in the shop, for example. The tasks 2615 can be generated and appropriate resources notified before the asset is removed from the field, for example. For example, a replacement (e.g., loaner, etc.) engine can be located and allocated to an aircraft whose engine will then be scheduled to come off-wing at a time when the aircraft is idle for engine maintenance to be completed by the aircraft's next idle period to be placed back on-wing in a state satisfying safety concerns, contract obligations, etc.

Figure 27:
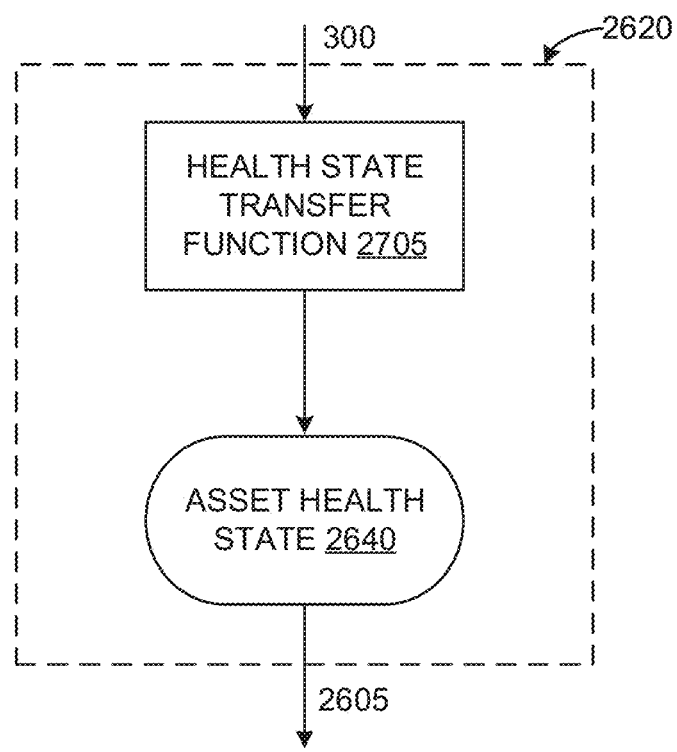
FIGS. 27-28 illustrate example implementations of the health state analytics of FIGS. 26A-26B.

FIG. 27 illustrates an example implementation of the health state analytics 2620 of FIGS. 26A-26B. As shown in the example of FIG. 27, the analytics 2620 can be implemented using a health state transfer function 2705 to process asset health quantifier output from the asset health quantifier 300 to generate an asset health state 2640 to provide to the workscope task generator 2605. The example health state transfer function 2705 leverages the overall and component asset health quantifiers provided by the asset health quantifier 300 as well as forecast utilization and environmental information for the target asset, etc. Based on asset health information, such as useful life remaining (ULR) of the asset (e.g., at a device and/or component/part/module level, etc.), feedback between a predicted ULR and measured ULR for a prior workscope, modeled digital twin and/or other asset health modeling output/prediction, the health state transfer function 2705 provides an indication of current operating health and/or predicted future health of the asset to the workscope task generator 2605, which combines the indication of asset health with non-health requirements (e.g., contract requirement 2505, environment factor 2510, service bulletin 2515 and/or LLP replacement 2520, etc.,) and next mission requirements 2630 to generate mission-specific workscope tasks 2645, for example.

For example, the health state transfer function 2705 utilizes available input data to model and/or otherwise quantify a current asset health state and an estimated or projected ULR for the target asset from a current point in time to a target point in time for asset removal (e.g., a contract end of life, etc.). The health state transfer function 2705 takes into account one or more factors or aspects such as performance, operability, durability, etc., for the target asset, a module of the target asset, a component or part of the target asset, etc., to provide health state information to be used for comparison to requirements and development of associated workscope tasks, for example.

Figure 28:
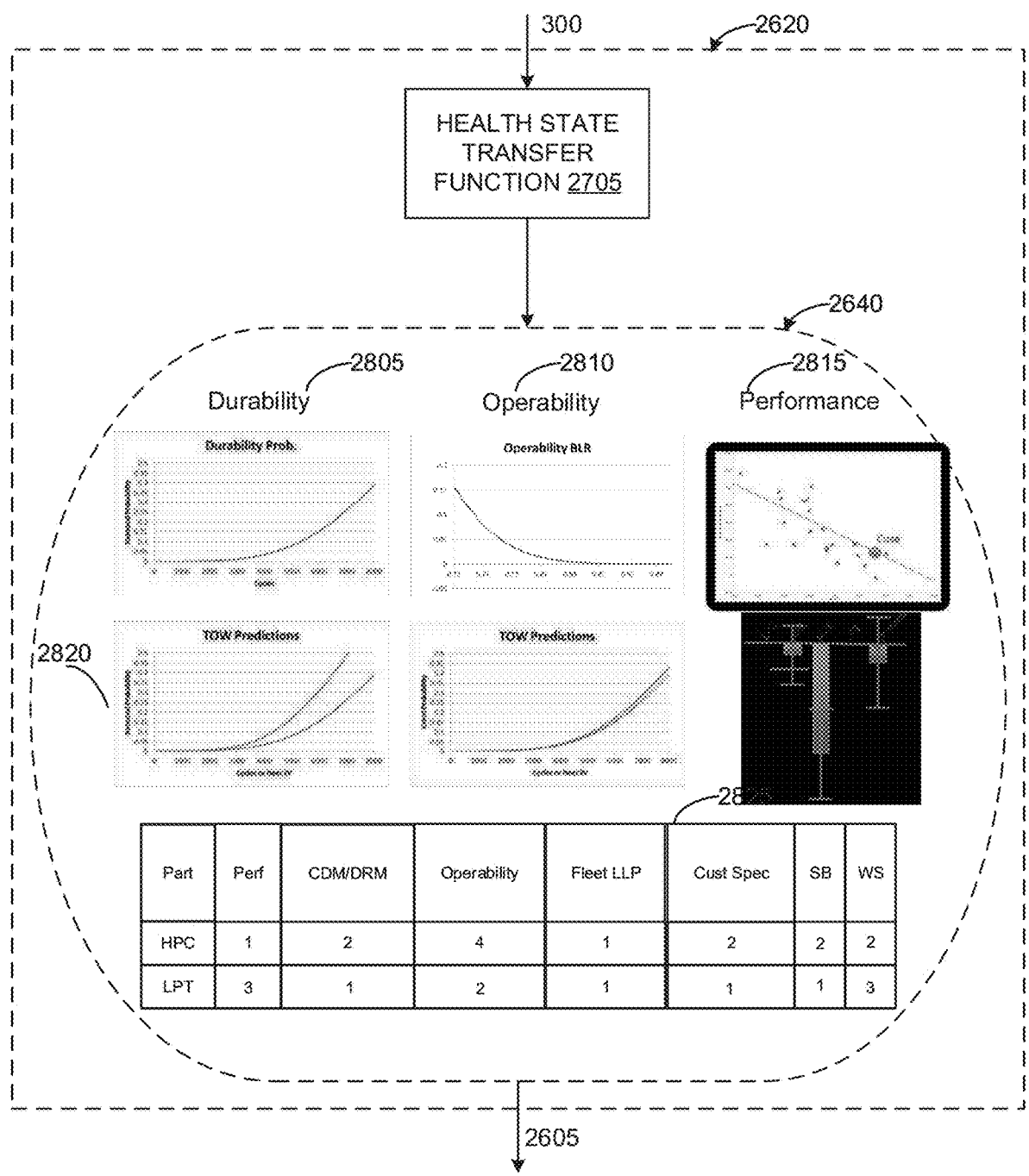

FIG. 28 illustrates another implementation of the example analytics 2620 including the health state transfer function 2705 providing asset health information 2640 modeled in a plurality of ways. For example, the health state transfer function 2705 can generate a probability of asset durability 2805, asset operability 2810, asset performance 2815, timeon-wing prediction 2820, etc. In certain examples, the asset health information 2640 can include a data structure 2825 relating to asset part and associated parameters (e.g., performance, cumulative damage model, distress rank model, operability, fleet LLP, customer specification, service bulletin, cumulative workscope, etc.).

Thus, as shown in the example of FIG. 28, a part, such as a high pressure compressor (HPC), low pressure turbine (LPT), low pressure compressor (LPC), high pressure turbine (HPT), etc., can be analyzed to generate the data structure 2825 of parameters for fusion with removal analytic, lifecycle, service bulletin, and/or other information by the workscope task generator 2605 and the workscope task processor 2610, for example. As shown in the example of FIG. 28, the asset health state 2640 can be modular, including performance, durability, etc., for flowpath and/or non-flowpath asset data.

For example, the health state transfer function 2705 utilizes available input data to model and/or otherwise quantify a current asset health state and an estimated or projected ULR for the target asset from a current point in time to a target point in time for asset removal (e.g., a contract end of life, etc.). The health state transfer function 2705 takes into account one or more factors or aspects such as durability 2805, operability 2810, performance 2815, time-on-wing 2820, etc., for the target asset, a module of the target asset, a component or part of the target asset, etc., to provide health state information to be used for comparison to requirements and development of associated workscope tasks, for example.

Thus, the example health state transfer function 2705 can generate a model of asset health based on the asset health quantifier including durability 2805, operability 2810, performance 2815. For example, the performance assessment 2815 for an engine can quantify an impact of engine health state (e.g., current and forecasted, etc.) on gas temperature margin (e.g., exhaust gas temperature margin (EGTM), etc.).

For example, a health state can be quantified using a health state transfer function, $H_S$, as a combination of performance, operability, and durability representing a useful remaining life of the target asset, the asset including n parts, modules, and/or components:

$$H_S = \Sigma_{i=1}^{n}(f(P_i)+f(O_i)+f(D_i)) \qquad (Eq. 1),$$

where $P_i$ represents a performance of part/module/component i, $O_i$ represents a operability of part/module/component i, and $D_i$ represents a durability of part/module/component i, for example.

Figure 29:
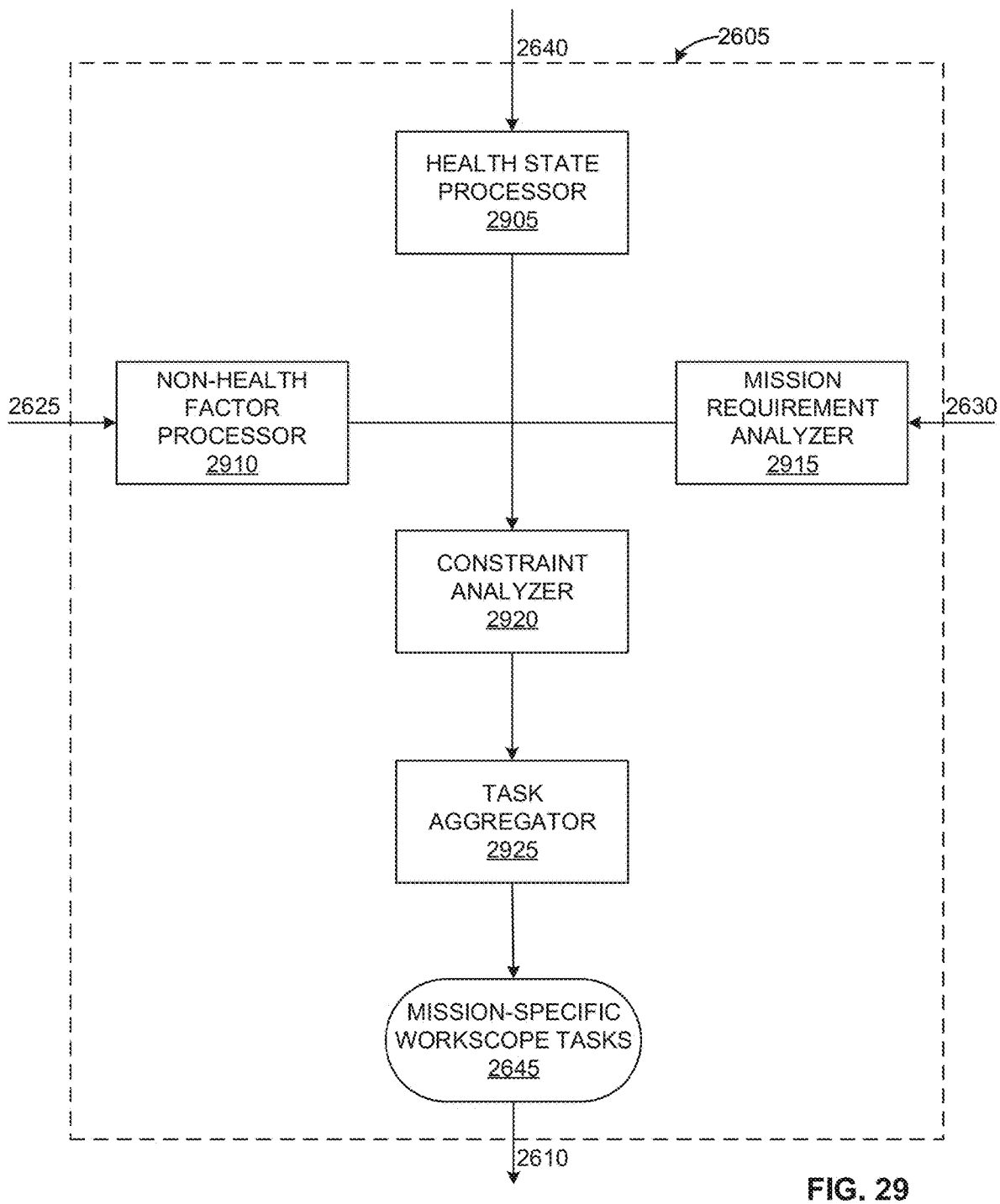
FIG. 29 illustrates an example implementation of the workscope task generator of FIGS. 26A-26B.

FIG. 29 illustrates an example implementation of the workscope task generator 2605 of FIGS. 26A-26B. As shown in the example of FIG. 29, the example workscope task generator 2605 includes a health state processor 2905, a non-health factor processor 2910, and a mission requirement analyzer 2915 feeding into a constraint analyzer 2920. The constraint analyzer 2920 provides constraint information to a task aggregator 2925 to aggregate tasks for a workscope based on asset health state, non-health factors, mission requirements, etc. The task aggregator 2925 generates mission-specific workscope tasks 2645 to provide to the workscope task processor 2610.

As shown in the example of FIG. 29, the health state processor 2905 receives asset health information 2640 from the health analytics 2620 and processes the asset health information 2640 to determine asset health level, asset life expectancy, asset durability and performance (e.g., along an asset flowpath and/or non-flowpath, etc.), etc., and provides the determined health information to the constraint analyzer 2920, which factors asset health into determining bounds or constraints by which tasks are generated to form a workscope for the target asset. For example, health state information can be provided for an asset, an asset module/part, a group of asset modules/parts, etc., to factor into task generation for the asset and/or module(s)/part(s) of the asset.

Additionally, the non-health factor processor 2910 processes a repair specification and/or other non-health requirements 2625 to provide further input to the constraint analyzer 2920, which factors non-health requirements into determining constraints by which tasks are determined to form a workscope for the target asset, for example. The non-health factor processor 2910 can generate a non-health state for the constraint analyzer 2920 including life-limited part (LLP) expiration information, service bulletins indicating repair or replacement of part(s), contractual requirements providing certain action, etc.

The example mission requirement analyzer 2915 processes next mission requirements 2630 to determine what asset(s), asset capability(-ies), configuration(s), etc., are to be involved in a next mission for the target asset, for example. The mission requirement analyzer 2915 provides requirements for a current, next, and/or subsequent mission to the constraint analyzer 2920, which factors mission requirements into determining constraints by which tasks are determined to form a workscope for the target asset, for example. Thus, understanding what is expected of the asset (e.g., modeling usage of the asset, quantifying asset parameters, etc.) can help to determine tasks associated with maintenance of the asset.

The example constraint analyzer 2920 processes input from the health state processor 2905, the non-health factor processor 2910, and the mission requirement analyzer 2915 to develop a set of constraints on potential workscope tasks for the asset (e.g., by applying a workscope transfer function to the input, etc.). The constraints are provided to the task aggregator 2925 which processes and aggregates tasks for the target asset in view of the health, non-health, and mission constraints. Thus, the workscope task generator 2605 processes a plurality of different factors as inputs, motivation, requirements, and other constraints to generates tasks to be done with respect to an asset to maintain that asset for a particular mission.

For example, a workscope transfer function, $W_S$, can be used to quantify a set of constraints to be provided by the constraint analyzer 2920 to guide the task aggregator 2925 in forming a set of tasks to be executed to maintain the target asset at a desired health level for mission execution. The example workscope transfer function processes useful remaining life algorithms/models with Build to Achieve requirements to set the workscope to meet the Build to Achieve requirements for performance/operability/durability, etc. The workscope can be aggregated with the non-health state requirements and/or a lifecycle optimization, etc., to determine recommended workscope tasks:

$$W_S = f(H_S) - \Sigma_{j=1}^{m}(f(T_j)+f(R_j)) \qquad (Eq. 2),$$

where $T_j$ represents a set of next mission tasks to be performed a target asset part/module/component j, and $R_j$ represents a set of non-health restrictions on a target asset part/module/component j, for example.

Figure 30:
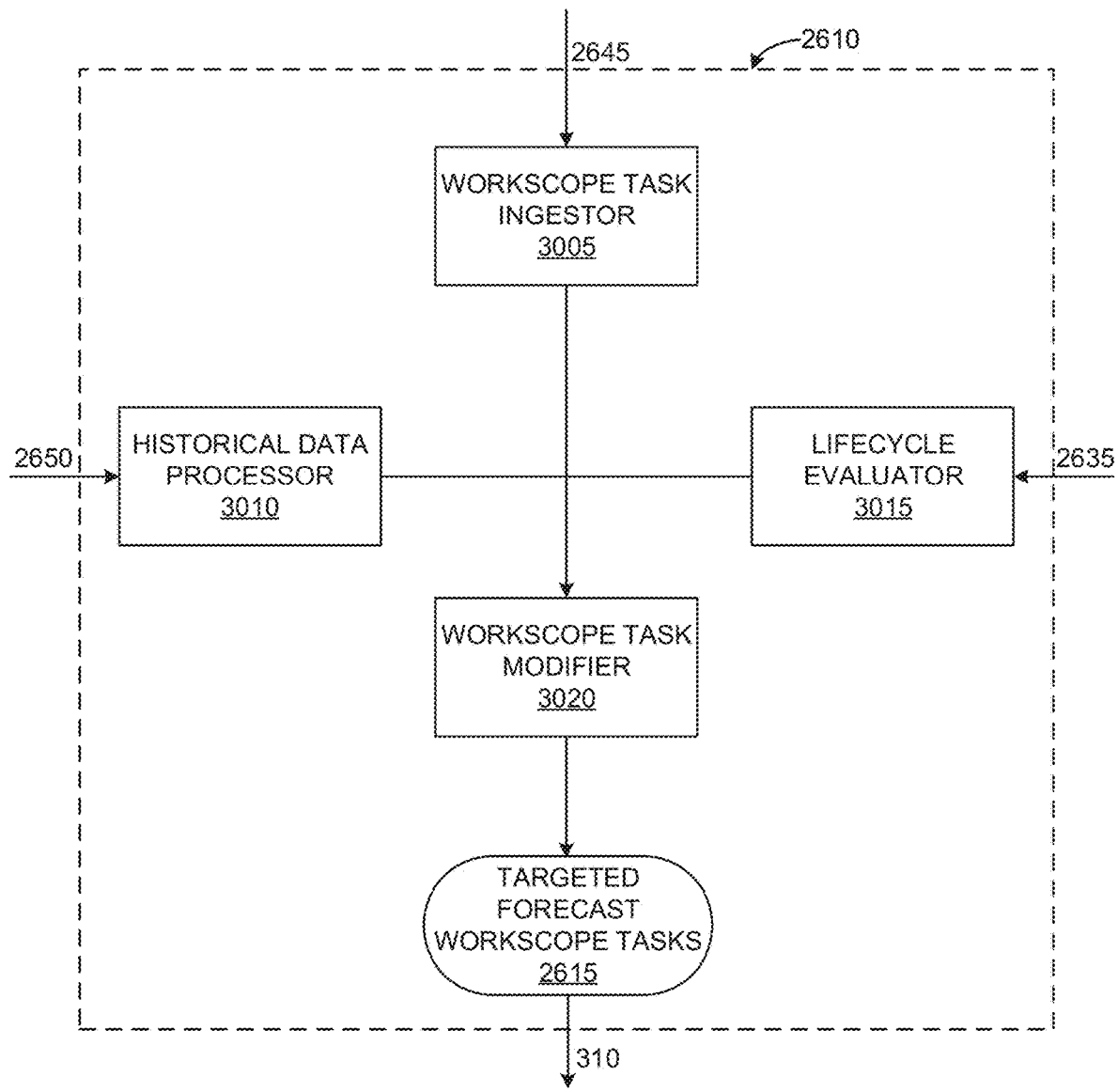
FIG. 30 illustrates an example implementation of the workscope task processor of FIGS. 26A-26B.

FIG. 30 illustrates an example implementation of the workscope task processor 2610 of FIGS. 26A-26B. The example workscope task processor 2610 receives mission-specific workscope tasks 2645 from the workscope task generator 2605 and applies lifecycle expectations 2635 and/or historical workscope data 2650 to the tasks 2645 to generate targeted forecast workscope tasks 2615 to be sent to the task optimizer 310.

The example workscope task processor 2610 includes a workscope task ingestor 3005, a historical data processor 3010, a lifecycle evaluator 3015, and a workscope task modifier 3020 to produce targeted forecast workscope tasks 2615. The example workscope task ingestor 3005 receives and analyzes the tasks 2645 from the workscope task generator 2605. The workscope task ingestor 3005 can determine parameters associated with the tasks 2645, quantify the tasks 2645 and/or resources involved in the tasks 2645, model the tasks 2645, etc. The workscope task ingestor 3005 provides task information to the workscope task modifier 3020.

The workscope task modifier 3020 receives processed task information as well as lifecycle evaluation and historical data. The workscope task modifier 3020 assesses lifecycle expectation, remaining useful life, probability of asset recovery probability of asset retention, next mission requirements, contractual obligations, etc., to forecast a targeted set of workscope tasks 310. Driven by technical constraints based on current asset (e.g., engine, etc.) health and time-on-wing requirements, as well as contractual constraints (e.g., obligations under a service contract, etc.), the workscope task modifier 3020 generates tasks forming a workscope for maintenance of the target asset.

For example, expectations for asset lifecycle 2635 (e.g., as defined by a contract, based on model, age and/or other status of the asset, etc.) are evaluated by the lifecycle evaluator 3015 to modify the task information provided to the workscope task modifier 3020 and adjust how the workscope task modifier 3020 forecasts a set of targeted workscope tasks 2615. Similarly, historical trends, prior workscope results, asset history, etc. 2650, can be processed by the historical data processor 3010 to modify the task information provided to the workscope task modifier 3020 and adjust how the workscope task modifier 3020 forecasts a set of targeted workscope tasks 2615.

Thus, the workscope task processor 2610 can generate targeted forecast workscope tasks 2615 to meet asset requirements, fleet management needs, etc. In certain examples, a cost and/or criticality index or quantifier can be applied to one or more factors to weight the workscope task calculations for or against the respective factor. For example, if prolonging the lifespan of a turbine engine is of primary importance, then that lifecycle factor is weighted more heavily by the workscope task processor 2610. If minimizing time off-wing is of most importance, then that timing factor and historical data regarding shop visit timing for the asset is weighted more heavily by the workscope task processor 2610, for example Increased accuracy, reduced shop turn-around time, and cost savings can be produced through the workscope tasks generated by the task generator 305 for task optimization 310.

While an example implementation of the task generator 305 of FIG. 3 is illustrated in FIGS. 25-30, one or more of the elements, processes and/or devices illustrated in FIGS. 25-30 can be combined, divided, re-arranged, omitted, eliminated and/or implemented in any other way. Further, the example workscope task generator 2605, the example workscope task processor 2610, the example asset health analytics 2620, and/or, more generally, the example task generator 305 of FIG. 3 can be implemented by hardware, software, firmware and/or any combination of hardware, software and/or firmware. Thus, for example, any of the example workscope task generator 2605, the example workscope task processor 2610, the example asset health analytics 2620, and/or, more generally, the example task generator 305 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workscope task generator 2605, the example workscope task processor 2610, the example asset health analytics 2620, and/or, more generally, the example task generator 305 is/are hereby expressly defined to include a non-transitory computer readable storage device or storage disk such as a memory, a digital versatile disk (DVD), a compact disk (CD), a Blu-ray disk, etc. including the software and/or firmware. Further still, the example task generator 305 of FIG. 3 may include one or more elements, processes and/or devices in addition to, or instead of, those illustrated in FIGS. 25-30, and/or may include more than one of any or all of the illustrated elements, processes and devices.

Flowcharts representative of example machine readable instructions for implementing the AWGS 220 and/or its task generator 305 of FIGS. 2-3 and/or 25-30 are shown in FIGS. 31-34. In these examples, the machine readable instructions comprise a program for execution by a processor such as a processor 3512 shown in the example processor platform 3500 discussed below in connection with FIG. 35. The program may be embodied in software stored on a non-transitory computer readable storage medium such as a CD-ROM, a floppy disk, a hard drive, a DVD, a Blu-ray disk, or a memory associated with the processor 3512, but the entire program and/or parts thereof could alternatively be executed by a device other than the processor 3512 and/or embodied in firmware or dedicated hardware. Further, although the example program is described with reference to the flowcharts illustrated in FIGS. 31-34, many other methods of implementing the example AWGS 220 and/or its task generator 305 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 31-34 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 31:
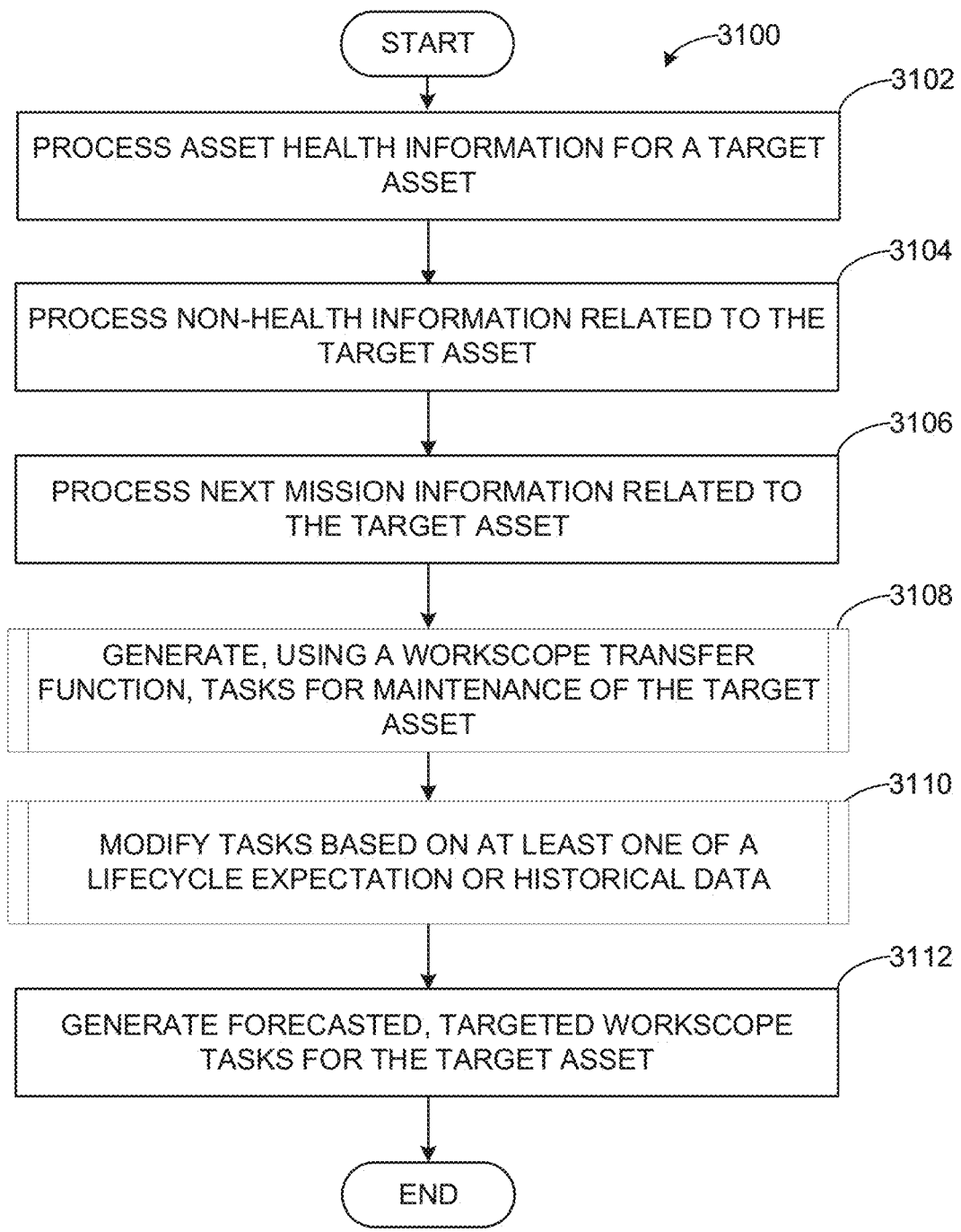
FIGS. 31-34 are flowcharts representative of an example method that can be executed by the example task generation system of FIGS. 3-9 to implement the examples disclosed herein.

FIG. 31 is a flowchart representative of an example method 3100 that can be performed by the example task generator 305 of FIGS. 2-3 and/or 25-30 to generate targeted workscope tasks. At block 3102, health information is processed with respect to a target asset. For example, the analytics 2620 (e.g., including the health state transfer function 2705 such as defined by Equation 1, etc.) can process the asset health calculation, including asset health rank, etc., provided by the asset health calculator 300. Asset health can be modeled using a physics-based model (e.g., a digital twin, neural network, etc.) of the asset (e.g., a turbine engine, diesel engine, other electromechanical device, etc.), for example. Asset health can be modeled while the asset is still fielded (e.g., the engine is still on-wing, etc.), for example. In addition to modeling current asset health, a future health or life expectancy for the asset can be determined by the model and/or other analytics 2620. The health analytics 2620 generate an asset health state 2640 (e.g., a health level and/or life expectancy, etc.) for the target asset, which is provided to the workscope task generator 2605. For example, the current health level of the target asset affects whether or not the asset can continue to function and impacts a scope of repairs and/or other maintenance to place the target asset in proper working order. The asset health state 2640 can be used to model and/or otherwise impact tasks to be done in the workscope for the target asset.

In certain examples, the asset health state 2640 can be reflected in a physics-based model, such as a digital twin, etc., of the target asset (e.g., a turbine engine, diesel engine, wind turbine, etc.). The model can be associated with the asset health state 2640 which can then be compared with and/or otherwise exposed to various health and non-health related factors, expectations, requirements, etc., to evaluate a behavior of the model and its asset health state 2640, for example. Using the model, interactions, simulations, and/or other evaluation can occur with multiple external factors in multiple scenarios done via a computing device. Such modeling and evaluation is not achievable manually or in the human mind.

At block 3104, non-health information related to the target asset is processed. For example, input not directly related to current target asset health such as LLP information, SB information, repair specifications, etc., can be factored into an analysis of tasks for the target asset. For example, a part of the asset can be a life limited part (LLP) with replacement on the horizon. A service bulletin (SB) may mandate an upgrade or repair to a target asset module, for example. Repair specifications may control one or more tasks for the target asset's next shop visit, for example In the physics-based model example described above, one or more non-health items can be constructed as characteristics, factors, inputs, and/or other constraints to the digital twin of the target asset (and/or sub-system of the target asset, etc.). An effect of the non-health item(s) (e.g., LLP restrictions, SB requirements, repair specifications, etc.) can be modeled on the virtual construct of the target asset (e.g., the digital twin of the engine, etc.). An effect of the non-health information on the asset health state 2640 of the target asset can be modeled and evaluated, for example. Thus, an impact of non-health factors on a target health level of the asset can be evaluated by the system, where such an impact could not be effectively evaluated manually by humans or in the human mind. Accordingly, asset care, maintenance, durability, operability, and performance are improved through the improvement in multi-factor asset health and maintenance monitoring, evaluation, and task generation, for example.

At block 3106, next mission information is processed with respect to the target asset. For example, requirements specified for a next mission involving the asset (e.g., a next flight involving the engine, etc.) are processed to be used to evaluate the tasks generated for the target asset. By modeling and/or otherwise quantifying the mission requirements, a workscope for the target asset can be evaluated to help ensure the maintenance of the asset will allow the asset to meet the next mission requirements. If not, the tasks generated for the workscope can be adjusted to fit the mission requirements, for example To continue the physics-based model example, next mission requirements can be an additional constraint placed on the digital twin model for comparison of requirements and/or other expectations. Thus, a level of performance involved in the next mission for the target asset can be modeled (e.g., simulated using the digital twin, etc.) with the virtual construct of the target asset, as modified by associated health and non-health factors, to determine whether the target asset can complete the next mission. If not, maintenance tasks can be generated to bring the target asset to a health level sufficient to satisfy the next mission requirements.

At block 3108, tasks for maintenance of the target asset are generated by the workscope task generator 2605 using a workscope transfer function (e.g., defined by Equation 2, etc.) applied to the health, non-health, and mission information. For example, given the target asset health level, non-health constraints, and next mission requirements, the workscope task generator 2605 applies a workscope transfer function and evaluates whether the health level of the target asset will enable the target asset to function at a certain level for the next mission. If not, then the workscope task generator 2605 determines a workscope of tasks to repair, replace, and/or otherwise maintain the asset for the next mission (e.g., to raise a health level of the target asset to a level of capability, durability, operability, performance, etc., sufficient for the next mission and/or another subsequent mission, etc.). Such a determination can also be impacted by non-health requirements such as repair specification requirements (e.g., as dictated by a service bulletin, life-limited part, etc.), environmental factors, contractual obligations, etc.

At block 3110, the next mission specific targeted tasks are processed by the workscope task processor 2610 to generate a targeted workscope forecast of tasks for the target asset. For example, the set of tasks can be evaluated with respect to a lifecycle expectation (e.g., a number of cycles such as 3000 cycles, 10,000 cycles, 50,000 cycles, etc.). The lifecycle expectation can be evaluated against the planned, targeted maintenance tasks to help ensure that the targeted maintenance tasks will help the target asset to reach its lifecycle expectation.

In certain examples, if the next mission specific targeted tasks predict that the target asset will meet the lifecycle expectation, then the set of tasks can remain unchanged, for example. However, if the next mission specific targeted tasks predict that the target asset will not meet the lifecycle expectation, then the set of tasks can be adjusted to satisfy that the target asset will meet the lifecycle expectation. In some examples, if the next mission specific targeted tasks predict that the target asset will exceed the lifecycle expectation, then the set of tasks can be re-evaluated to perhaps adjust the set of tasks to satisfy that the target asset will meet, but not unduly exceed, the lifecycle expectation.

Alternatively or in addition, historical data (e.g., results of prior workscope task execution, target asset history, similar asset history, prior mission execution history, etc.) can be analyzed with respect to the next mission expectation, the target asset health, etc., to evaluate whether the next mission specific targeted tasks will allow the target asset to be in a certain health state to complete the next mission. In certain examples, if the historical data predicts that the next mission specific targeted tasks will allow the target asset to complete the next mission, then the set of tasks can remain unchanged, for example. However, if the historical data predicts that the next mission specific targeted tasks will not allow the target asset to complete the next mission, then the set of tasks can be adjusted to satisfy that the target asset will meet the lifecycle expectation. In some examples, if the historical data predicts that the next mission specific targeted tasks will be more than sufficient to allow the target asset to complete the next mission, then the set of tasks can be re-evaluated to perhaps adjust the set of tasks to satisfy that the target asset will meet, but not unduly exceed, the next mission requirements.

Figure 32:
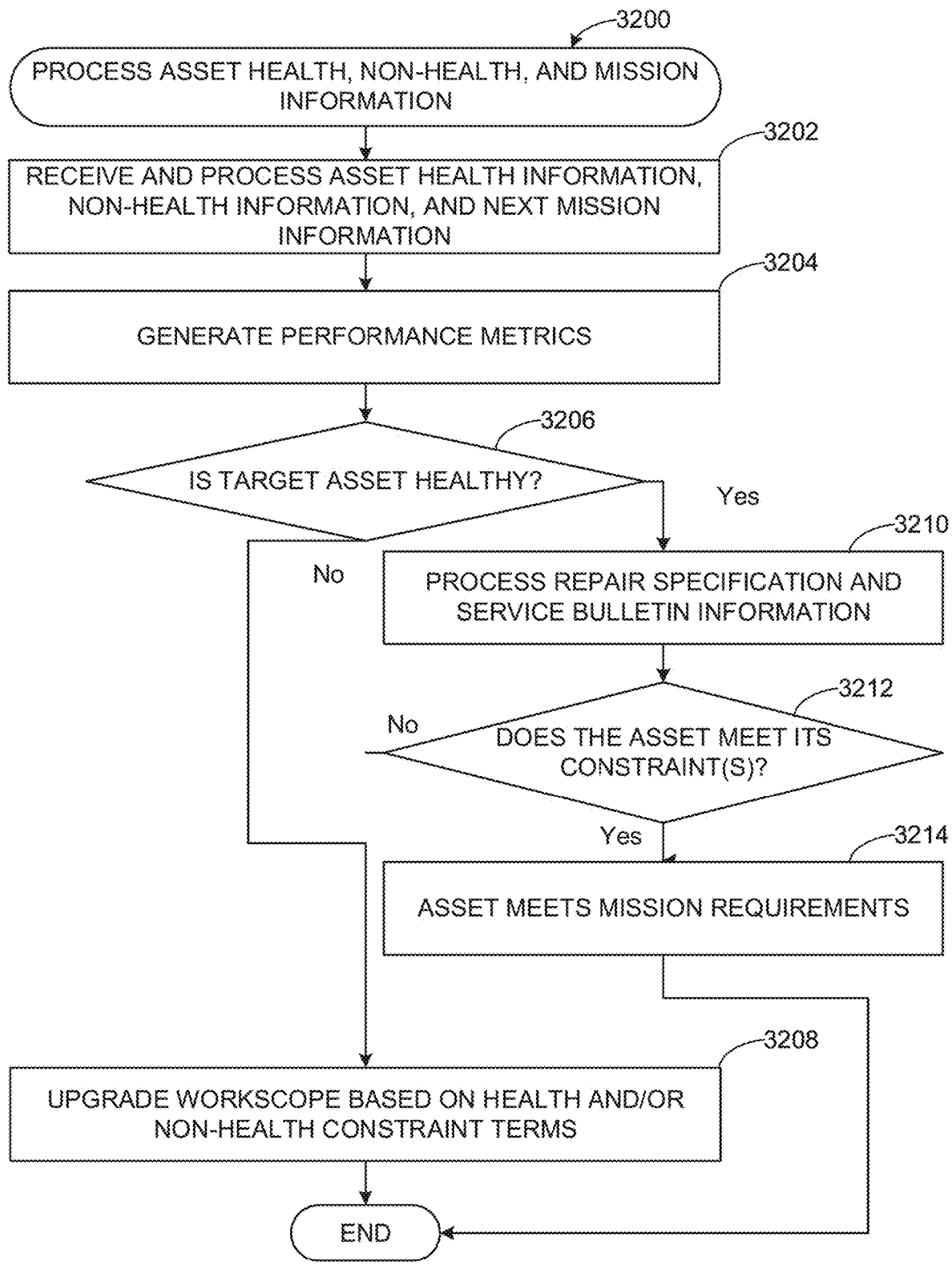

At block 3112, forecasted, targeted workscope tasks are generated for the target asset. For example, based on the health state, target asset characteristics, non-health constraints, next mission requirements, lifecycle expectation, and/or historical data, workscope tasks targeted to bring the target asset to a forecast health level to complete the next mission in satisfaction of the non-health requirements is generated for the target asset. The set of workscope tasks can trigger maintenance of the target asset (e.g., engine, turbine, etc.) at a shop visit, for example. The set of workscope tasks can be implemented in a schedule for removal, transport, maintenance, and reinstallation of the target asset, for example. The set of forecast, targeted workscope tasks can be provided for optimization by the task optimizer 310, for example FIG. 32 is a flowchart representative of an example method 3200 to process asset health, non-health, and mission information (e.g., executing blocks 3102-3108 of the example of FIG. 31, etc.). At block 3202, asset health information, non-health information, and next mission information are received and processed (e.g., by the workscope task generator 2605). For example, a representation (e.g., model, equation, etc.) of current asset health state and non-health constraint(s) related to the asset (e.g., contract requirement, life limited part restriction, SB information, environmental constraint, etc.) are processed to model asset health, non-health constraints, mission requirements, and/or the target asset. For example, the target asset (e.g., an engine, turbine, scanner, etc.) can be modeled in a virtual environment as a physics-based digital twin model of the physical target asset in a real environment.

At block 3204, one or more performance metrics can be generated based on the asset health, non-health, and next mission information. For example, an asset durability (e.g., cumulative damage model (CDM), distress rank model (DRM), etc.), operability, LLP information, configuration/utilization information, removal cause, mission data, and/or other performance analytic can be generated.

At block 3206, the target asset health state is evaluated with respect to the performance metrics, next mission requirement, etc., to determine whether or not the target asset is healthy. If the target asset is not healthy, then, at block 3208, workscope tasks are updated based on health and/or non-health constraint terms.

However, if the target asset is deemed healthy, then, at block 3210, then information such as a repair specification, SB information, etc., is processed and evaluated to determine, at block 3212, whether the target asset is meeting its constraint(s), such as repair requirements, SB restrictions, LLP limits, and/or other contract constraints required and/or agreed upon with respect to the target asset, for example. If the target asset is meeting its constraints, then, at block 3214, the target asset is determined to meet its mission requirements (e.g., sufficient health including performance, operability, durability, etc., for a next flight, a next energy generation, a next image acquisition, etc.). However, if the target asset is not meeting its constraints, then, at block 3208, workscope tasks are updated based on health and/or non-health constraint terms.

Figure 33:
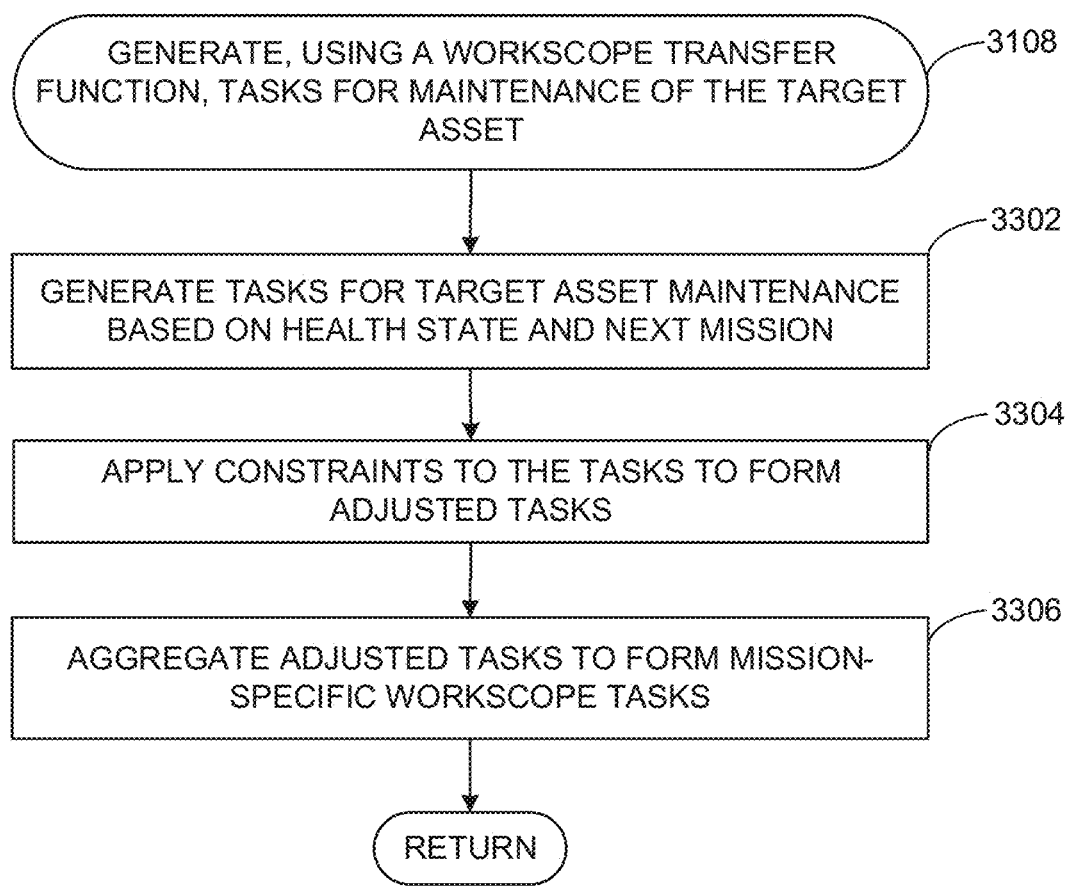

FIG. 33 is a flowchart representative of an example method to generate, using a workscope transfer function (e.g., defined by Equation 2, etc.), tasks for maintenance of the target asset (e.g., block 3108 of FIG. 31). At block 3302, available information including target asset health status, next mission requirements, etc., is combined to generate tasks for maintenance of the target asset at a desired health state for the next mission. For example, given the target asset health level, non-health constraints, and next mission requirements, the workscope task generator 2605 applies a workscope transfer function (e.g., as defined by Equation 2, etc.) and evaluates whether the health level of the target asset will enable the target asset to function at a certain level for the next mission. If not, then the workscope task generator 2605 determines a workscope of tasks to repair, replace, and/or otherwise maintain the asset for the next mission (e.g., to raise a health level of the target asset to a level of capability, durability, operability, performance, etc., sufficient for the next mission and/or another subsequent mission, etc.).

At block 3304, constraints are applied to the tasks to form adjusted tasks. For example, the constraint analyzer 2920 of the workscope task generator 2605 applies non-health requirements such as repair specification requirements (e.g., as dictated by a service bulletin, life-limited part, etc.), environmental factors, contractual obligations, LLP restrictions, and/or other constraints, etc., modify tasks expected be performed with respect to maintenance of the target asset such that the target asset is ready and able to perform its next mission in satisfaction of the next mission requirements. For example, a service bulletin and/or life-limited part restriction may mandate that a component of the target asset be replaced, regardless of whether or not that component is to be used and/or is of insufficient health for use in the next mission. A contractual agreement may mandate part replacement at a certain part, regardless of its impact on the next mission requirements, for example At block 3306, adjusted tasks are aggregated to form mission-specific workscope tasks. For example, the task aggregator 2925 of the workscope task generator 2605 gathers tasks impacted and/or otherwise processed, expanded, added, reduced, altered, etc., according to the one or more constraints from the constraint analyzer 2920 and forms a set of mission-specific workscope tasks 2645. Thus, the various constraint(s) and associated tasks can be aggregated into a cohesive set of mission-specific workscope tasks 2645 to prepare the target asset to execute the next mission, for example Control then reverts to block 3110 to modify the tasks if a lifecycle expectation and/or historical data is present and applicable.

Figure 34:
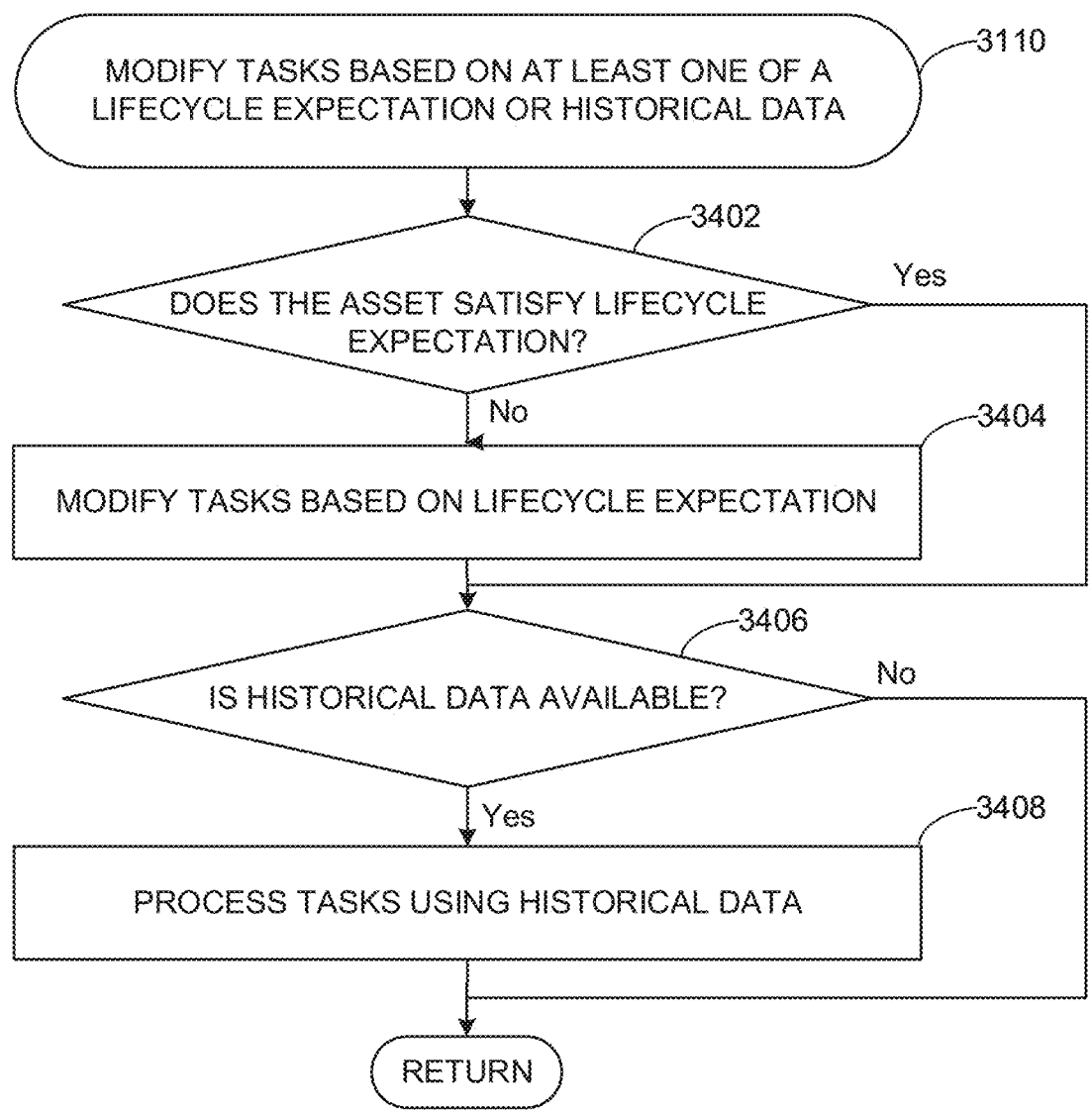

FIG. 34 is a flowchart representative of an example method to modify tasks based on at least one of a lifecycle expectation or historical data (e.g., block 3110 of FIG. 31). At block 3402, when a lifecycle expectation is available, the tasks and associated target asset health state are evaluated to determine whether the target asset satisfies a lifecycle expectation (e.g., a certain number of operating cycles for the target asset and/or an asset module/part/component/etc. before an end of contract, end of asset life, etc.). If the target asset, as maintained by the set of tasks, does not satisfy the lifecycle expectation, then, at block 3404, the set of workscope tasks is modified to help ensure that the target asset will satisfy the lifecycle expectation. Thus, for example, additional maintenance can be performed on the target asset, beyond requirements for the next mission, to help ensure that the lifecycle expectation will be met by the target asset. In some examples, maintenance can be reduced (e.g., repair instead of replace, used instead of new, repair postponed, etc.) if the tasks are likely to exceed the lifecycle expectation for the target asset, as long as the reduction does not result in a predicted failure of the target asset for the next mission.

At block 3406, availability of historical data (e.g., prior mission feedback, target asset feedback, other similar asset information, etc.) is determined. If relevant historical data is available, then, at block 3408, the set of maintenance workscope tasks is processed based on the historical data. For example, tasks can be modified based on past target asset experience, feedback from other execution of the next mission, insight into similar asset health state, performance, etc.). Control then reverts to block 3112 to generate forecasted, targeted workscope tasks for the target asset.

Figure 35:
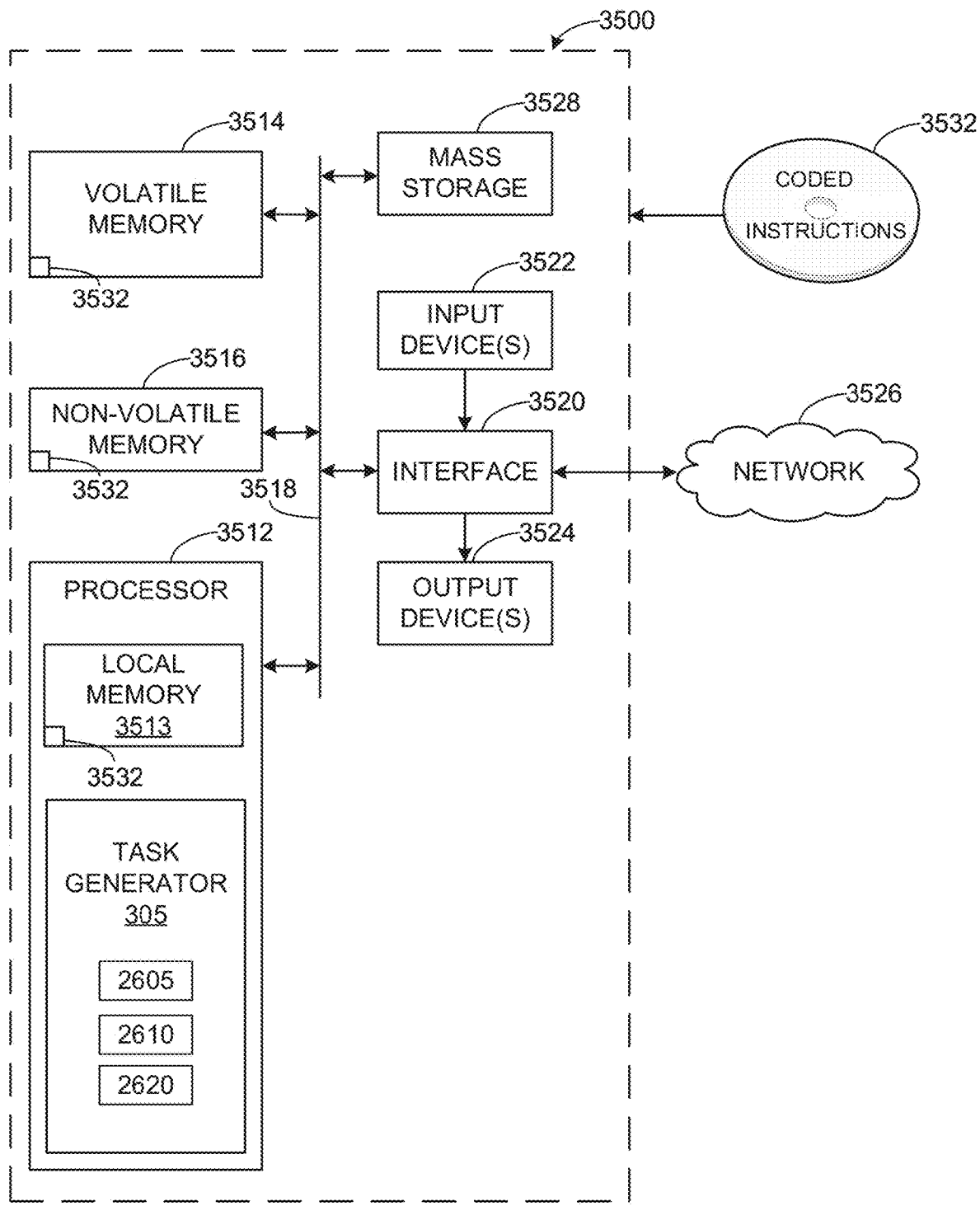
FIG. 35 is a block diagram of an example processing platform structured to execute machine-readable instructions to implement the methods of FIGS. 31-34 and/or the example asset workscope generation system of FIGS. 2-3 and/or 25-30.

FIG. 35 is a block diagram of an example processor platform 3500 capable of executing the instructions of FIGS. 31-34 to implement the task optimizer 310 and/or the AWGS 220 of FIGS. 2-3 and/or 25-30. The processor platform 3500 can be, for example, a server, a personal computer, a mobile device (e.g., a cell phone, a smart phone, a tablet such as an iPad™), a personal digital assistant (PDA), or any other type of computing device.

The processor platform 3500 of the illustrated example includes a processor 3512. The processor 3512 of the illustrated example is hardware. For example, the processor 3512 can be implemented by one or more integrated circuits, logic circuits, microprocessors or controllers from any desired family or manufacturer. The hardware processor may be a semiconductor based (e.g., silicon based) device. In this example, the processor 3512 implements the example workscope task generator 2605, the example workscope task processor 2610, and the example health analytics 2620.

The processor 3512 of the illustrated example includes a local memory 3513 (e.g., a cache). The processor 3512 of the illustrated example is in communication with a main memory including a volatile memory 3514 and a non-volatile memory 3516 via a bus 3518. The volatile memory 3514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3516 may be implemented by flash memory and/or any other desired type of memory device. Access to the main memory 3514, 3516 is controlled by a memory controller.

The processor platform 3500 of the illustrated example also includes an interface circuit 3520. The interface circuit 3520 may be implemented by any type of interface standard, such as an Ethernet interface, a universal serial bus (USB), and/or a peripheral component interconnect (PCI) express interface.

In the illustrated example, one or more input devices 3522 are connected to the interface circuit 3520. The input device(s) 3522 permit(s) a user to enter data and/or commands into the processor 3512. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 3524 are also connected to the interface circuit 3520 of the illustrated example. The output devices 3524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 3520 of the illustrated example, thus, typically includes a graphics driver card, a graphics driver chip and/or a graphics driver processor.

The interface circuit 3520 of the illustrated example also includes a communication device such as a transmitter, a receiver, a transceiver, a modem and/or network interface card to facilitate exchange of data with external machines (e.g., computing devices of any kind) via a network 3526 (e.g., an Ethernet connection, a digital subscriber line (DSL), a telephone line, coaxial cable, a cellular telephone system, etc.).

The processor platform 3500 of the illustrated example also includes one or more mass storage devices 3528 for storing software and/or data. Examples of such mass storage devices 3528 include floppy disk drives, hard drive disks, compact disk drives, Blu-ray disk drives, redundant array of independent disks (RAID) systems, and DVD drives.

The coded instructions 3532 of FIGS. 31-34 can be stored in the mass storage device 3528, in the volatile memory 3514, in the non-volatile memory 3516, and/or on a removable non-transitory computer readable storage medium such as a CD or DVD.

From the foregoing, it will be appreciated that example methods, apparatus and articles of manufacture have been disclosed that evaluate asset health state and next mission requirements to generate tasks for maintenance of a target asset to help ensure the target asset (e.g., a turbine engine, diesel engine, other engine, wind turbine, imaging system, etc.) will satisfy the next mission requirements as further constrained by non-health information such as contractual obligations, service bulletins, life limited part restrictions, environmental constraints, etc. The above-disclosed task generator apparatus can optimize and/or otherwise improve generation and selection of appropriate workscope tasks based on a plurality of factors including expected cost, operating margin over the life of an associated contract, time in shop, time before next failure, lifecycle expectation, historical data/feedback, etc. The task generator apparatus performs a tradeoff analysis based on these factors, and facilitates maintenance of the target asset (e.g., removal of the asset, shop visit for repair/replacement, temporary asset substitution while in shop, etc.). Certain examples leverage constraint information, feedback, and end of life expectations to balance tasks to maintain the target asset at a certain durability, operational, and/or performance level. Workscope determination is automated and customized to the target asset, next mission, and applicable constraint(s), for example. Both deterministic and probabilistic events are evaluated to provide a more complete picture or model of the asset and its operating environment.

When faced with millions of possibilities, the task generator determines a subset of available tasks more likely to allow the target asset to achieve the next mission within its constraints. The health analytics, workscope task generator, and task processor model the target asset, associated health state, next mission requirements, constraints, expectations, feedback, etc., to predict which tasks provide the desired benefit of task asset operability, durability, performance, etc. Determined tasks can then trigger, initiate, and/or otherwise facilitate maintenance of the target asset.

III. Task Optimizer

Figure 36:
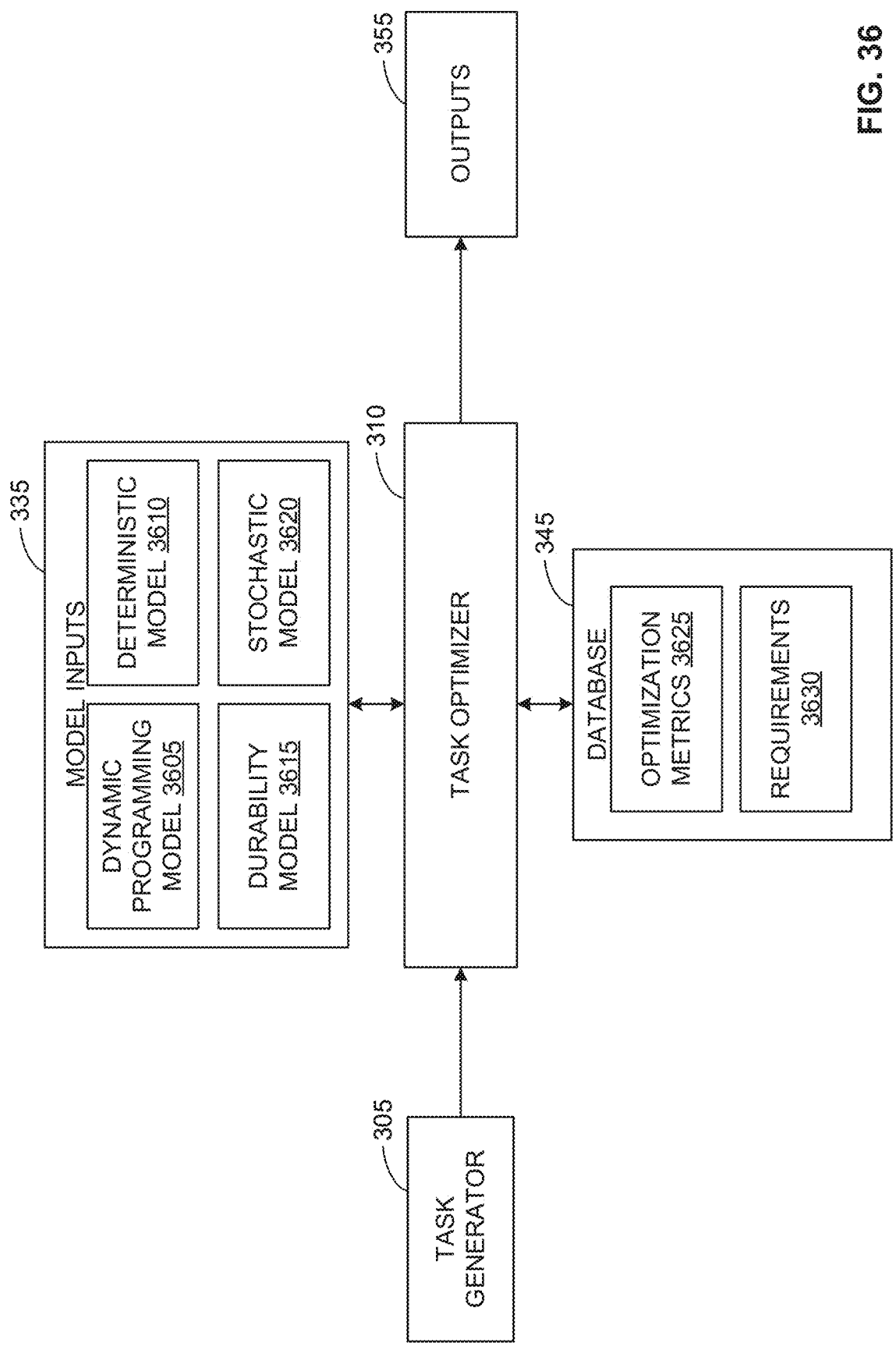
FIG. 36 is a block diagram of an example implementation of a portion of the example asset workscope generation system of FIGS. 2-3.

FIG. 36 is a block diagram of an example implementation of a portion of the AWGS 220 including the task generator 305, task optimizer 310, model inputs 335, database 345, and outputs 355. As shown in the example of FIG. 36, the model inputs 335 include a plurality of models including a dynamic programming model 3605, a deterministic model 3610, a durability model 3615, and a stochastic model 3620. In the illustrated example of FIG. 36, the database 345 includes optimization metrics 3625 and requirements and/or other constraints 3630 such as contract requirements (e.g., contract model), engine data, workscope drivers, etc., gathered from a service contract input, engine asset monitoring data, asset digital twin feedback, service bulletins, degradation/damage information, etc., and stored in/streamed to the database 345. The model inputs 335 and database 345 provide input to the task optimizer 310 to generate an optimized and/or otherwise improved workscope as output 355.

For example, time on wing and shop cost for a target asset are related by workscope. Balancing Customized Service Agreement (CSA) durability, operability and performance requirements with financial metrics is a multidimensional optimization problem with millions of solutions. The task optimizer 310 analyzes possibilities and presents top candidates based on input criteria including the dynamic programming model 3605, deterministic model 3610, durability model 3615, and/or stochastic model 3620, etc. Evaluating all the possibilities manually is impossible.

The task optimizer 310 provides rapid, consistent and unbiased evaluation of workscope scenarios with respect to restrictions and constraints such as contract profitability and terms and conditions (e.g., time horizon, rates, limits on time between asset component maintenance, and/or other soft and hard constraints). Through evaluation of workscope scenarios/options, the task optimizer 310 avoids putting unnecessary workscope(s) into an engine (e.g., depending on optimization objective function(s) chosen, etc.), for example. Further, the task optimizer 310 identifies additional workscoping opportunities where additional workscope may be beneficial. The example task optimizer 310 facilitates analytics-based removal (e.g., on wing) and analytics-based workscoping (e.g., off wing).

In certain examples, the task optimizer 310 leverages task generator 305 input along with model information 335 and database information 345 to determines a minimum workscope for a current shop visit based on the requirements 3630 and health of components. For example, the task generator 305 provides a list or set of potential maintenance operations that can be completed within a next shop visit and/or subsequent shop visit(s) for a target asset. Each maintenance operation includes one or more tasks, where each task has corresponding information (e.g., a workscope level, etc.) such as type and quantity of personnel to complete task, components and/or tools needed to complete task, time and cost to complete task, etc. Each maintenance operation can be assigned a criticality index, modifier, or quantifier to drive a minimum and/or otherwise reduced workscope by weighing a maintenance operation with respect to other maintenance operation(s), for example The task optimizer 310 identifies possible additional tasks for the minimum workscope and associated costs of the additional tasks. The task optimizer 310 calculates when future shop visits will occur during a contract using the dynamic programing models 3605. The task optimizer 310 identifies future workscopes for the future shop visits and associated costs. The task optimizer 310 analyzes all possible workscopes and costs using a dynamic programming solution. The task optimizer 310 selects optimal workscope(s) for the current shop visit that satisfies contract requirements 3630 and reduces or minimizes expected costs and/or increases time on wing through the end of the contract, for example Put another way, the task optimizer 310 selects a workscope having the best/most value (e.g., based on cost of repairs versus income from contract payments over a contractual horizon time, etc.) with respect to restrictions and/or constraints on the target asset.

Using the task optimizer 310, a workscope is determined based on multiple inputs including cumulative damage models of parts, modules, and systems, statistical models (e.g., parametric (e.g., Weibull probability distribution, etc.) and/or non-parametric), financial models, contract term, conditions, and/or customer expectations, etc. The task optimizer 310 processes the model inputs 335 to evaluate a financial impact of a series of possible workscopes over the life of a service contract to facilitate creation of an optimized or otherwise improved workscope selection with associated predicted outcomes.

The task optimizer 310 obtains specific contract information, maps failure mode distributions to one or more workscoping models, and constructs a workscoping model with associated price, cost and billing structure. For a given shop visit, the task optimizer 310 computes failure mode probabilities with workscope options using a dynamic optimization approach which is propagated to end of the contract.

Figure 37:
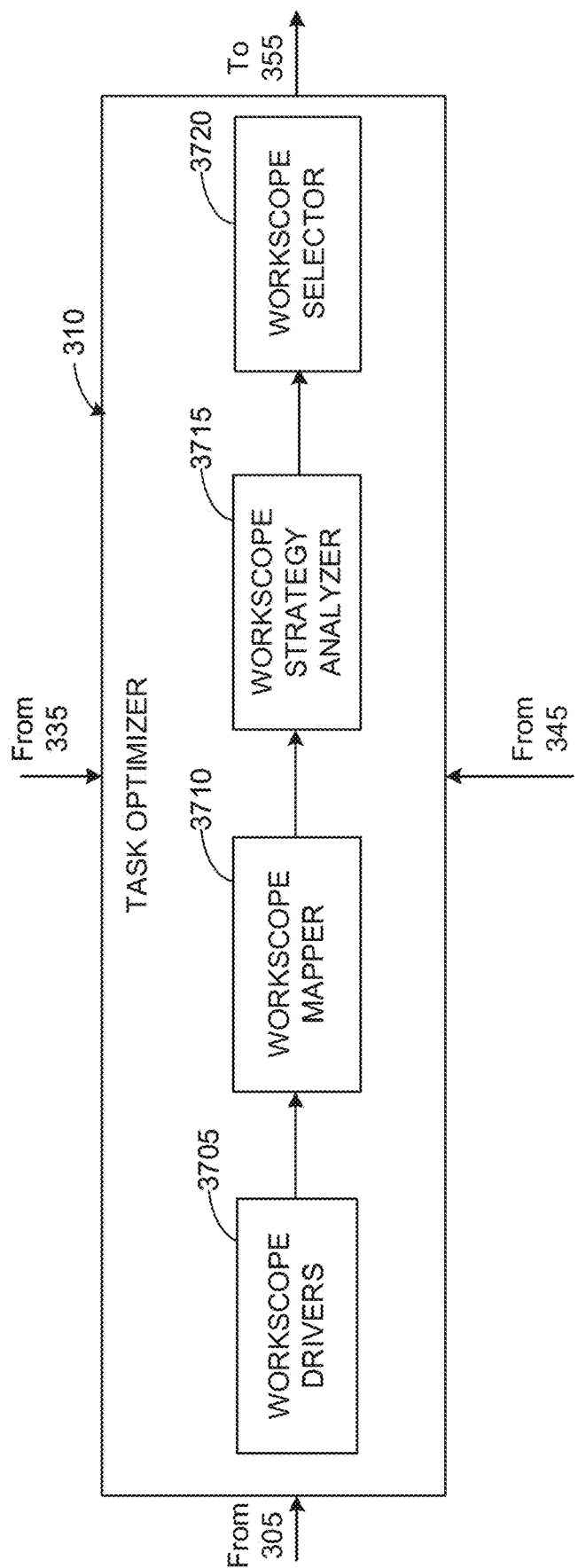
FIG. 37 is a block diagram of an example implementation of the example task optimizer of FIGS. 3 and/or 36.

FIG. 37 is a block diagram of an example implementation of the example task optimizer 310 of FIG. 3. In the illustrated example of FIG. 37, the task optimizer 310 includes workscope drivers 3705, a workscope mapper 3710, a workscope strategy analyzer (WSA) 3715, and a workscope selector 3720. The task optimizer 310 receives a combination of one or more tasks in the workscope from the task generator 305 and processes the task(s) to determine one or more workscopes to accomplish the task(s) for a target asset. The task optimizer 310 determines an optimized and/or otherwise improved workscope from the one or more workscopes for execution with respect to the task(s) for the target asset.

Figure 38:
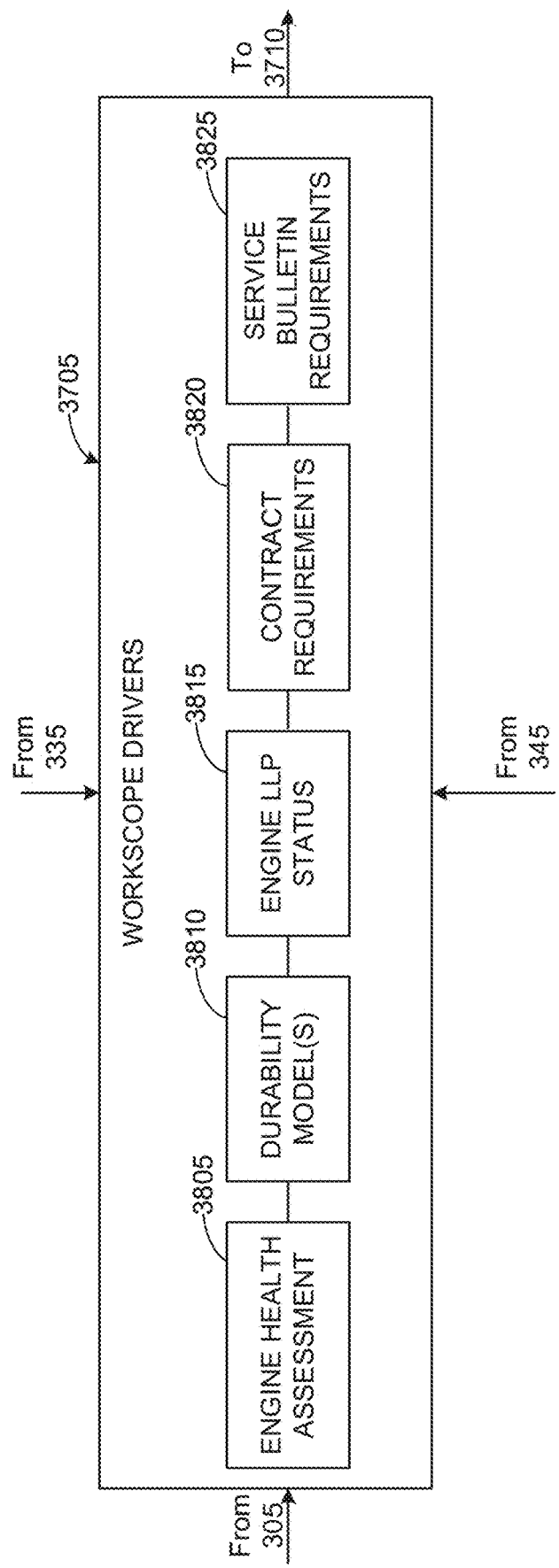
FIG. 38 is a block diagram of an example implementation of the example workscope drivers of FIG. 37.

As shown in the example of FIG. 37, one or more workscope drivers 3705 are generated based on input from the model inputs 335 (e.g., dynamic programming model 3605, deterministic model 3610, durability model 3615, stochastic model 3620, etc.) and database 345 (e.g., optimization metrics 3625, requirements 3630, etc.), as well as the task generator 305. As illustrated in the example of FIG. 38, workscope drivers 3705 can include an engine health assessment 3805, durability model(s) 3810, engine life-limited part (LLP) status 3815, contract requirements 3820, service bulletin (SB) requirements 3825, etc.

That is, workscope selection drivers 3705 can be used to drive a minimum workscope build that is greater than a minimum total expectation for constraints related to the target asset. LLP time limits and/or other restrictions, SBs, contract terms and conditions greater than popular, restored, and/or hybrid asset workscope tasks can be used to expand or contract a workscope of tasks for maintenance of the target asset, for example. Asset characteristics such as operability (e.g., in accordance with an SB, etc.), durability, performance, etc., can be applied to drive and/or otherwise model workscope tasks. For example, performance of a turbine engine asset can be measured against an exhaust gas temperature (EGT) margin to quantify a minimum performance expectation driving workscope. For example, an EGT margin, which serves as an indicator of engine time on-wing and engine health, is at its highest level when the engine is new or has just been refurbished. An operating margin (e.g., profit with respect to a service contract, etc.) can also be a workscope driver.

For example, the workscope drivers 3705 can include a physics-based model such as a digital twin of the engine 102. For example, the digital twin model can simulate physics behavior, a thermodynamic health, a performance health, etc., of the engine 102. For example, the digital twin can simulate inputs and outputs of the sensors 144, 146 of the engine 102. In some examples, the digital twin and/or other physics-based model can simulate an operability of the engine 102 (e.g., an efficiency of the engine 102, etc.), a durability 3615 of the engine 102 (e.g., a mechanical stress on the fan section 108, the booster compressor 114, etc.), etc., based on simulating the engine 102 executing one or more flight cycles, flight legs, flight operations, etc.

In certain examples, the stochastic model 3620 can represent probability distributions of potential outcomes allowing for random variation in one or more inputs over time. In some examples, the stochastic model 3620 generates the random variation based on fluctuations observed in historical data (e.g., the model inputs 335 based on a historical data model, etc.) for a selected time period using time-series techniques. For example, the stochastic model 3620 can calibrate the random variation to be within limits set forth by the outputs from the historical data model. In some examples, the stochastic model 3620 includes generating continuous probability distributions (e.g., Weibull distributions, reliability curves, etc.) to determine a distribution of failure rates over time due to one or more asset components. For example, the stochastic model 3620 can generate a failure rate of the engine 102 based on determining failure rates for the fan section 108, the booster compressor 114, etc., of the engine 102.

In some examples, a hybrid model is formed from one or more of the historical data model, the physics-based model, and the stochastic model 3620. For example, the hybrid model can be the stochastic model 3620 in which the outputs from the stochastic model 3620 are compared to the physics-based model (e.g., the engine digital twin, etc.) and the outputs are adjusted based on the comparison. In another example, the hybrid model can be the stochastic model 3620 in which the outputs from the stochastic model 3620 can compared to the historical data model and the outputs are adjusted or calibrated based on the comparison.

The workscope drivers 3705 provide input to the workscope mapper 3710, which maps a shop visit driver 3705, such as failure mode, service bulletin campaign, cumulative damage model, other analytics, etc., to a potential workscope per part, module, subsystem, etc. For example, a system-level workscope can be formed as an aggregate of a minimum or otherwise reduced workscope for each workscope requirement 3630. The mapping to a system-level workscope helps ensure that the aggregated workscope is a minimum to restore a required level of capability and/or performance, for example. Workscope drivers 3705, such as engine health assessment 3805, durability model(s) 3810, engine LLP replacement status 3815, contract repair limits 3820, service bulletin requirements 3825, etc., can be applied for each task from the task generator 305 to generate a minimum workscope for each requirement mapped to a total/aggregate workscope at the system, subsystem, module, and/or part level for the target asset.

The workscope mapper 3710 can integrate a plurality of shop visit drivers 3705, each driver 3705 represented by an analytic or logic to be used to drive workscope decisions. For example, each workscope driver 3705 is represented by a deterministic time limit for repair/replace and/or a probabilistic distribution of timing for repair/replacement of a part/module/device, etc. A workscope at the deterministic time limit is to restore partially or fully the time cost for a set of parts/modules. For each workscope, a probabilistic distribution of when the next shop visit will happen can be calculated for trade-off analysis. The deterministic time limit and probability of repair/replace can be combined for a more accurate determination of time limit until next repair/replacement, for example, based on drivers 3705 such as engine health assessment 3805, durability model(s) 3810, engine LLP replacement status 3815, contract repair limits 3820, service bulletin requirements 3825, etc.

In certain examples, the workscope mapper 3710 maps contract information 3820, failure mode distributions (e.g., based on engine health assessment 3805, durability model 3810, engine LLP status 3815, etc.), etc., to a workscoping model. The workscoping model can be represented using a digital twin of the asset (e.g., engine, engine subsystem, engine aspect, engine characteristic, etc.) and/or other artificial neural network, machine learning construct, etc. In certain examples, the workscope mapper 3710 is dynamic and adjusts for both predicted and actual feedback regarding target asset health and operations status.

In certain examples, a financial impact can be computed and evaluated over the life of a contract for a target asset assuming a specific workscope combining probability failure modes, discrete events, contract specifications, etc. For example, the WSA 3715 can apply one or more mathematical models/equations to compute an expected cost, price, and operating margin over the life of the contract (LOC) for each potential workscope. The WSA 3715 facilitates a tradeoff analysis for asset (e.g., engine, etc.) removal and "optimal" or otherwise improved workscope selection, for example. The WSA 3715 processes input including contract details such as payment structure, removal scheduling requirements, life limited parts (e.g., actual LLP and/or soft timer and pseudo LLP, etc.), financial considerations (e.g., resale value of used parts, etc.), workscope cost, interdependency of workscope for modules, probability of engine removals due to different workscope drivers and deterministic drivers, etc. For example, the WSA 3715 can compute an LOC financial impact for a new asset based on a current maintenance/workscope decision followed by a probability associated with a next decision point and a final outcome over a plurality of cycles. Based on the LOC financial impact, an expected time-on-wing (TOW) for the asset can be determined for a period following a shop visit (SV).

The WSA 3715 of the task optimizer 310 provides a maintenance planning optimization tool to optimize and/or otherwise improve maintenance strategies based on customer critical-to-quality (CTQ) characteristic(s) and/or contract profitability, for example. The WSA 3715 evaluates current and future consequences of each maintenance decision and considers possible paths with associated probability and value (e.g., cost versus benefit in performance, durability, operability, income, etc.). While there are too many possibilities for human analysis or simulation, the WSA 3715 can evaluate possible paths and associated consequences via an analytical solution to optimize and/or otherwise improve maintenance of a fleet of engines and/or other assets, for example User input, such as current engine status, optimization metric(s) 3625, etc., can be combined with fixed tool inputs such as contract margin review (CMR) (e.g., an annual and/or other periodic contract profitability evaluation based on prior projection, etc.), integrated cost analysis model (ICAM) (e.g., a Weibull-based simulation of shop visit removals and associated cost over the life of the contract, etc.), workscope dependency rules, etc., for use by the WSA 3715 to provide an analytical programming solution for workscope optimization. An output of the WSA 3715 to the workscope selector 3720 can include optimal/improved workscopes, expected revenue, expected cost, expected operating margin, expected LLP financials, probability of future shop visits, likely drivers of future shop visits, expected TOW until future shop visits, etc.

Thus, the WSA 3715 quickly calculates and ranks workscope alternatives formed by the workscope mapper 3710 based on information from the task generator 305 and workscope drivers 3705. Update Weibull and cost information can be provided based on the automated input and can be customized to each contract, for example.

In certain examples, the WSA 3715 executes a two-step process to maintenance optimization. First, the WSA 3715 automatically collects CMR information. For example, Weibull distributions, costs/prices, sub-fleeting, special contract rules, dependency rules, etc., can be gathered by the WSA 3715 from the drivers 3705, engine status data, database 345 information, etc., for one or more failure-related tasks, etc.

Then, the WSA 3715 processes engine status information. For example, the WSA 3715 (e.g., automatically, etc.) processes cycle information (e.g., engine cycles since new (ECSN), engine cycles since shop visit (ECSV), etc.), engine utilization, flight leg, removal cause, LLP information, minimum build, requirements 3630 (e.g., maintenance goals, etc.), optimization metrics 3625, etc. The WSA 3715 can generate a maintenance optimization schedule for one or more workscope alternatives ranked accordingly including revenue, cost, operating margin, etc., based on a current/upcoming shop visit, TOW, etc. A TOW distribution until next shop visit can be graphed and presented for evaluation by the WSA 3715 for each workscope alternative over a plurality of cycles (e.g., 2500, 5000, 7500, 10,000, 12,500, 15,000, 17,500, 20,000, etc.). The WSA 3715 can also generate one or more probabilistic predictions for a future shop visit according to a shop visit driver such as an engine component (e.g., fan, baffle, other), engine operating characteristic (e.g., exhaust gas temperature (EGT), etc.), etc. For example, failure data (e.g., a Weibull distribution, cumulative damage model, etc.) can be processed to impact a probabilistic prediction for a future shop visit.

Figure 39:
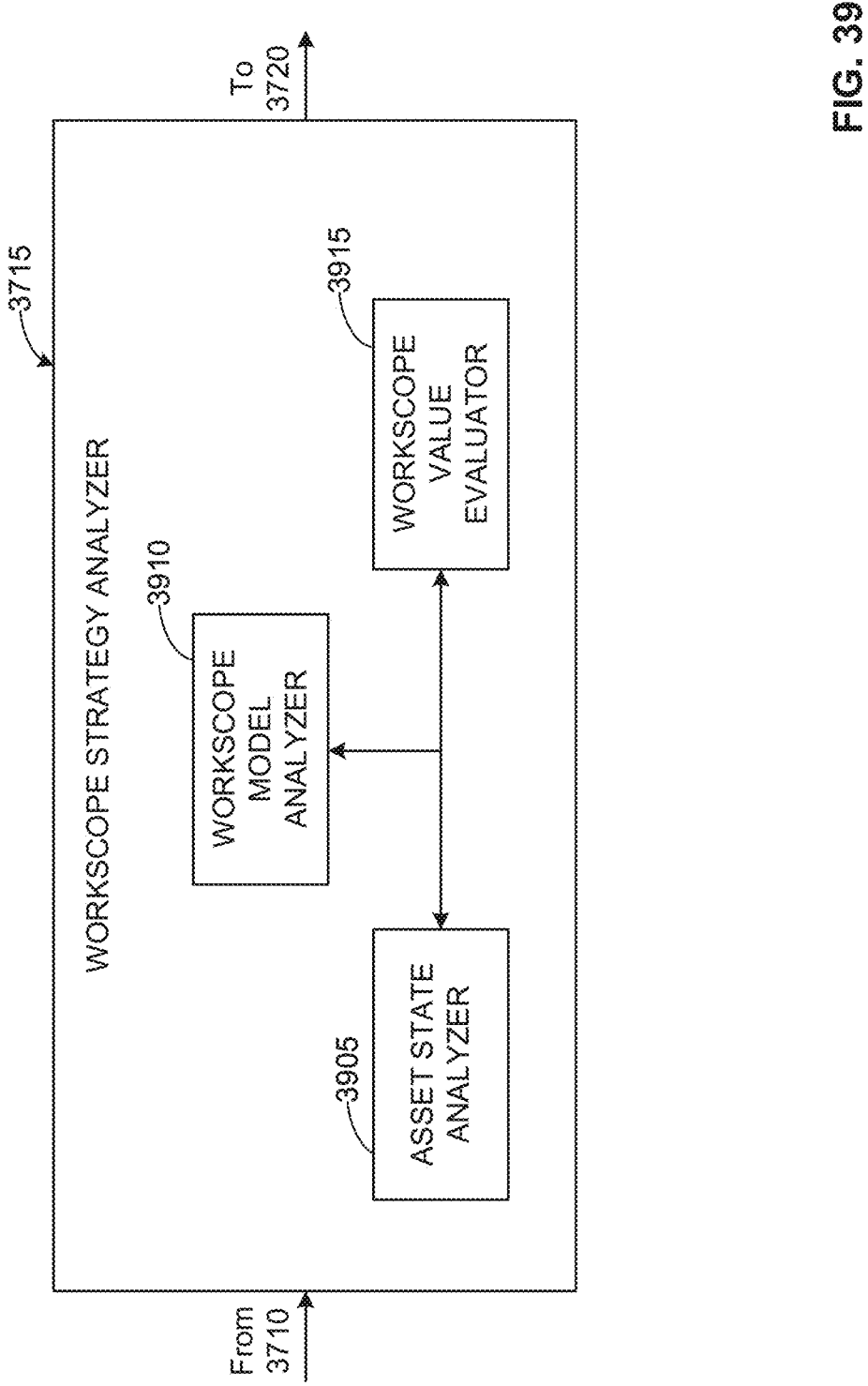
FIG. 39 illustrates an example implementation of the example workscope analyzer of FIG. 37

FIG. 39 illustrates an example implementation of the WSA 3715. As shown in the example of FIG. 39, the WSA 3715 includes an asset state analyzer 3905, a workscope model analyzer 3910, and a workscope value evaluator 3915. In the example of FIG. 39, the asset state analyzer 3905 receives information regarding the target asset (e.g., data regarding an engine, engine subsystem, etc., such as engine status, shop visit driver, LLP status, service bulletin status, etc.), contract model information (e.g., contract type, contract terms and conditions, contract end date, end engine state, etc.). The asset state analyzer 3905 processes the received information to provide a state-based solution or model to select among workscope alternatives (e.g., to facilitate selecting an optimal or recommended workscope from the list of available workscopes).

In certain examples, a time interval associated with a service contract for an asset, such as an engine, includes a plurality of stages. A stage indicates a time at which a decision is made (e.g., for a shop visit). A stage begins when a component (e.g., the engine and/or other asset) enters the shop for repair/maintenance/replacement. A state of the asset at a stage indicates a condition of the system at that stage. The state can be quantified based on asset time on engine, time on modules, shop visit driver(s), etc. The state can be used to define a time remaining until the end of the time interval associated with the service contract, as well as the time on each system (e.g., asset) component and identification of a failing component, for example. The state can be defined by a vector quantifying these elements, for example. The asset state analyzer 3905 quantifies and provides asset state information to the workscope model analyzer 3910 to analyze and compare possible workscopes from the workscope mapper 3710 based on asset stage, state, etc.

The example workscope model analyzer 3910 analyzes available workscope options provided by the workscope mapper 3710 based on models, probabilities, and asset state information from the asset state analyzer 3905. For example, the workscope mapper 3710 can provide one or more workscopes that are available to be performed on the engine and/or other system asset. Each workscope can define a different set of maintenance activities to be performed on asset component(s) when compared to other workscope(s). In certain examples, a "base" workscope, a "full" workscope, and/or one or more alternative workscopes can be identified and/or otherwise generated as available to be performed on the target asset, such as an engine and/or a subset of its components, related components, etc. In certain examples, a workscope can be referred to as none, heavy, medium, or light based on an associated workscope planning guide and platform. Even a workscope of "none" can include an inspection of the target asset, for example In certain examples, the base workscope is a minimal set of maintenance activities to be performed on the engine and/or engine components. Alternatively, the base workscope may be a predetermined or "default" set of repair and/or maintenance activities to be performed on the engine and/or engine components. For example, the base workscope may include only repairing components that have failed and/or that are identified as "life-limited" components or LLP (e.g., parts that are to be replaced and/or repaired within a predetermined time period). Alternative workscopes include additional and/or alternative repair and/or maintenance activities that may be performed on the engine and/or engine components as compared to the activities identified in the base workscope. The full workscope is a full set of maintenance activities to be performed on each component of the system. For example, the full workscope may include performing a maintenance activity on each component of the system when the system and/or components are taken to the maintenance facility, even if the components are not identified as requiring maintenance or repair. The available workscopes (e.g., the base workscope, the full workscope, and/or the alternative workscopes) are transmitted from the workscope mapper 3710 to the workscope strategy analyzer 3715, for example The workscope model analyzer 3910 analyzes the available workscopes generated by the workscope mapper 3710 based on status information from asset state analyzer 3905 including engine data, contract model, status information, etc., to select an "optimal" or improved workscope for execution. In certain examples, an artificial neural network and/or other mesh/graph of decisions and outcomes for a target asset can be used to evaluate a probability of one or more final outcomes.

Figure 40:
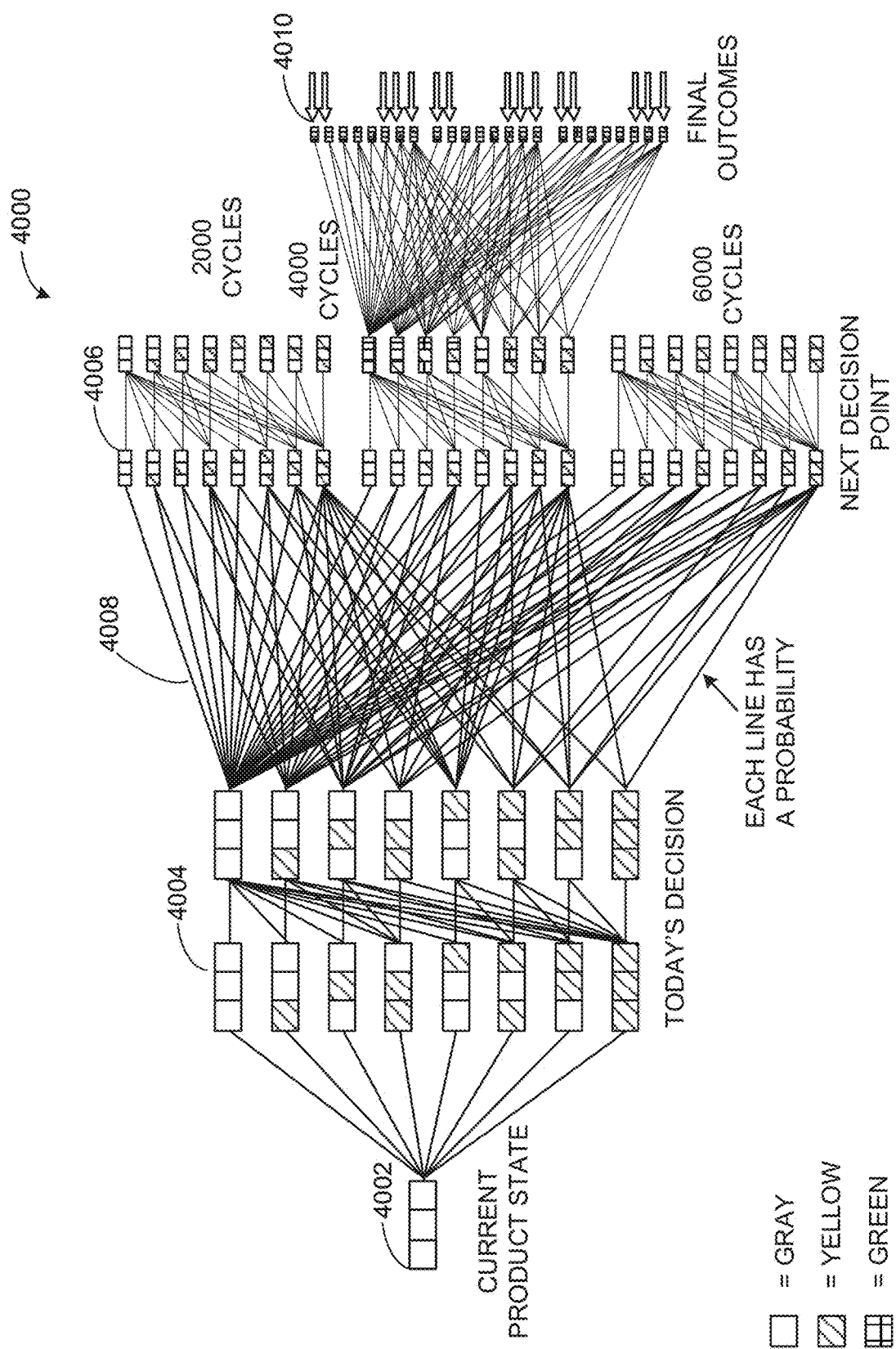
FIG. 40 illustrates an example network of decisions and associated probabilities for a target asset.

For example, as shown in FIG. 40, an asset having a current product state 4002 is connected to a plurality of potential decisions 4004, 4006, and each decision 4004, 4006 has an associated probability 4008. As shown in the example network 4000 of FIG. 40, each possible branch or path from a first decision point 4004 to a next decision point 4006 is associated with a probability 4008.

Figure 41A:
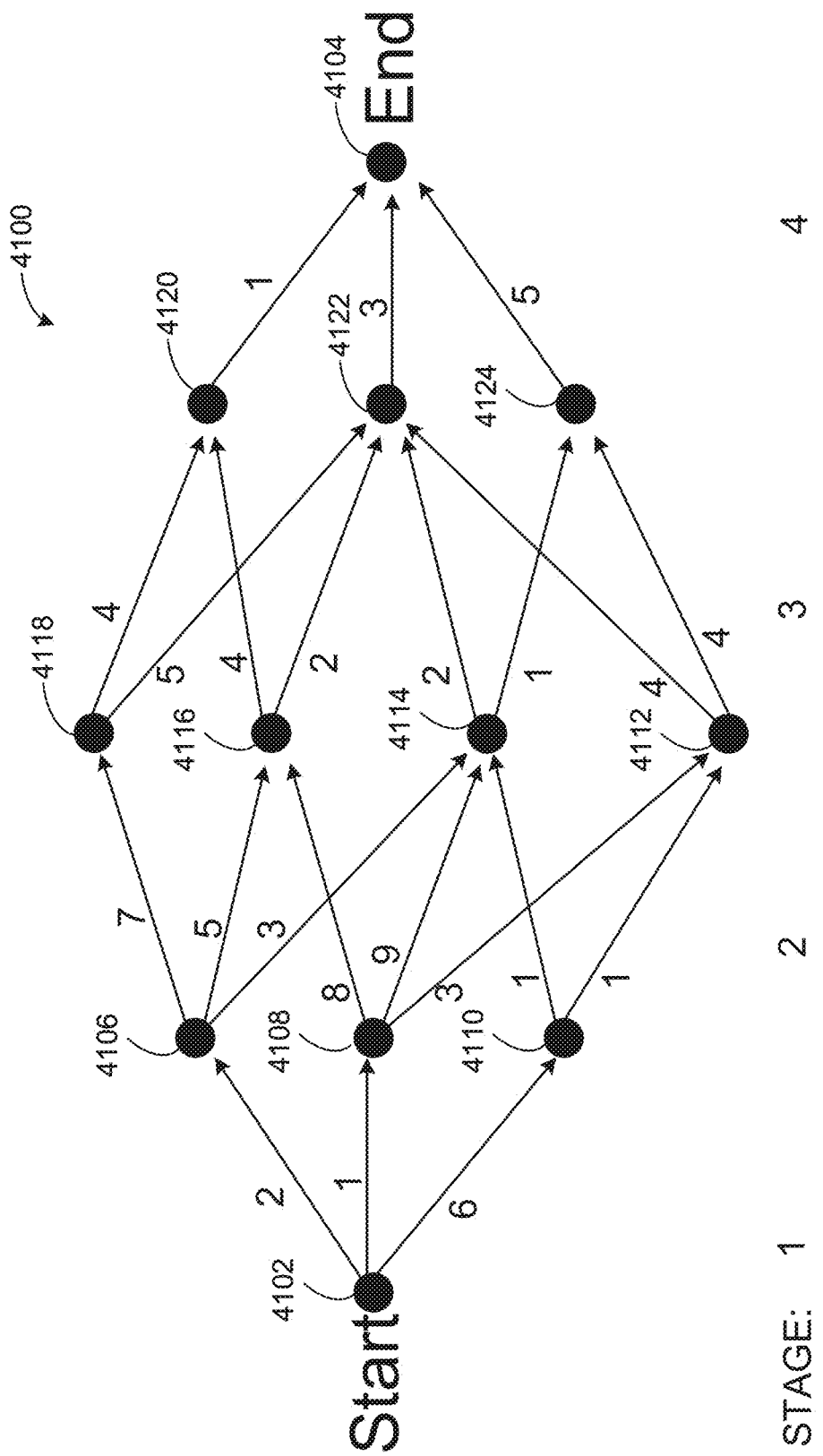
FIGS. 41A-41B illustrate example networks with weighted paths between a starting point and an end point.
Figure 41B:
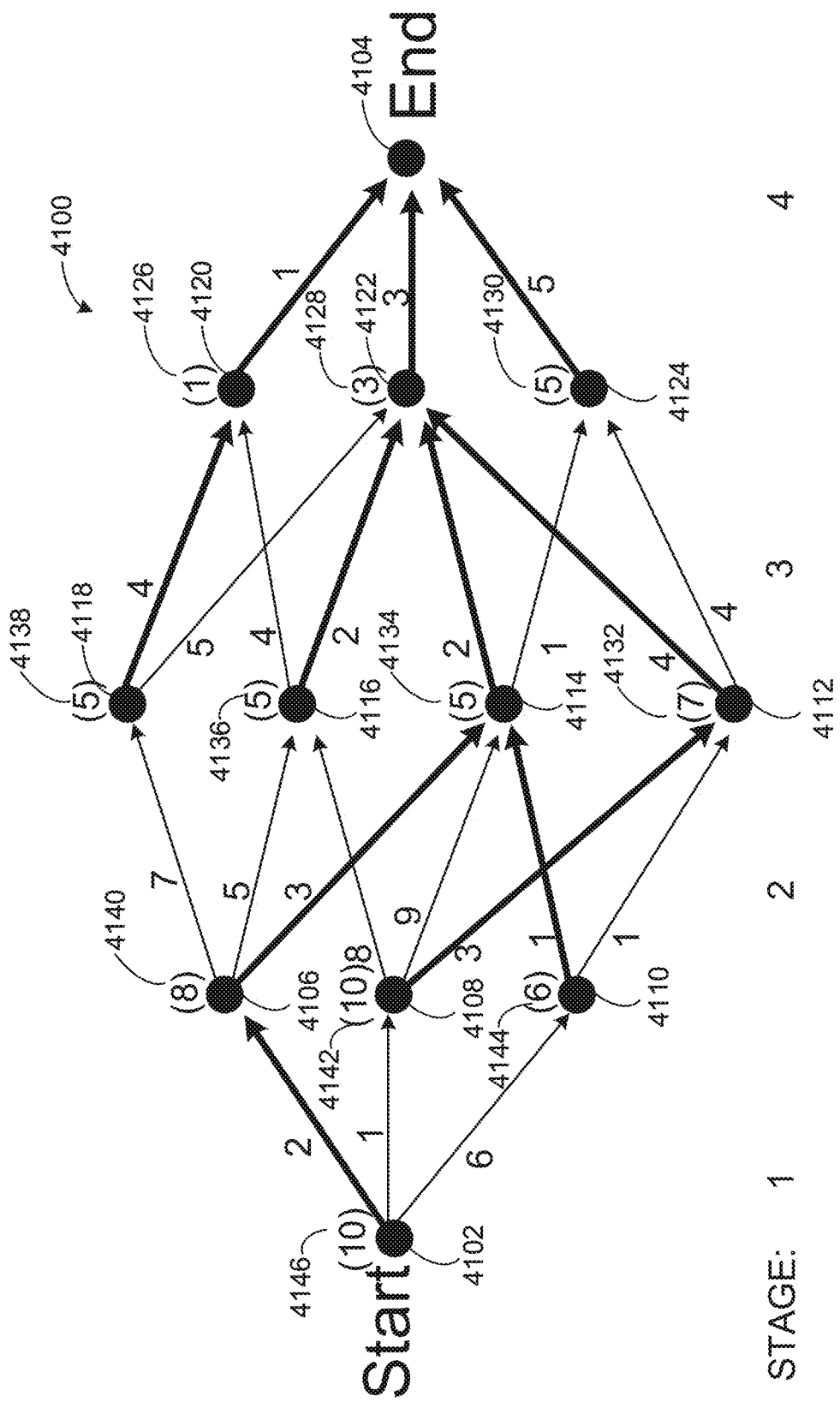

In certain examples, the network is traversed to get from a starting point to an endpoint (e.g., a starting point of an engine service contract to an end point of an engine service contract, etc.) while minimizing a cost to get from the starting point to the end point. For example, as shown in FIG. 41A, a plurality of nodes or decision points representing a time directed discrete probability graph of possible future events (e.g., shop visits, asset failure/damage, etc.) are found in a network 4100 between a starting point 4102 and an endpoint 4104. As shown in the example of FIG. 41B, the workscope model analyzer 3910 implements a dynamic programming solution to start at a last stage 4 and move back through the network 4100 (e.g., stage 4 to stage 3, stage 3 to stage 2, stage 2 to stage 1). Each node or decision point 4102-4124 has an associated cost and/or value (e.g., cost versus benefit, and/or other objective function such as maximizing time on-wing, etc.) 4126-4146. For each state in the stage 4, a minimal path forward is determined as well as a total remaining cost associated with the path. This analysis is repeated for stages 3, 2, and 1 to arrive at a total cost for each state from the starting point 4102 to the endpoint 4104. A model can implement the example network 4100 and be used by the workscope model analyzer 3910 to evaluate potential paths and associated costs from start 4102 (e.g., engine in service, etc.) to finish 4104 (e.g., end-of-life for the engine, etc.). Intermediate nodes 4106-4124 can represent workscope tasks (e.g., shop visits, etc.) for the asset during the life of the asset, for example. The workscope model analyzer 3910 can process the network 4100 in a deterministic and/or stochastic analysis, for example In a deterministic analysis, a decision results in a fixed outcome. For example, possible actions include {a, b, c}, such that action a results in a top path in the example network 4100, action b results in a middle path in the example network 4100, and action c results in a bottom path in the example network 4100.

In a stochastic analysis, a decision results in a distribution of possible outcomes. For example, possible actions include {a, b}, such that action a results in a top path with a probability of 0.1, a middle path with a probability of 0.5, and a bottom path with a probability of 0.4. Action b results in the top path with a probability of 0.33, the middle path with a probability of 0.33, and the bottom path with a probability of 0.33, for example In certain examples, a discrete stochastic model can be implemented by the workscope model analyzer 3910 using stochastic dynamic programming. The example model can be defined as:

$$V_N(i) = \min_{a \in W}\left[C(i, a) + \sum_j P_{ij}(a)V_{N-1}(j)\right], \quad \text{(Eq. 1)}$$
for $0 < N < M$, $$V_0(i) = \min_{a \in W} C(i, a). \quad \text{(Eq. 2)}$$

In Equations 1-2 above, $V_N(i)$ is a minimum expected cost when N stages remain of a total of M stages and the asset is in state I; $C(i,a)$ is a current cost for making decision a when the asset is in state i; $P_{ij}(a)$ is a probability of moving from state i to state j when decision a is made; and W is a set of possible decisions at the given stage and state. Here, according to Equation 2, $V_0(i)=C(i, \text{base Workscope})$.

While Equations 1 and 2 represent the discrete stochastic model, a continuous stochastic model can be generated by replacing the sum with an integral and replacing $P_{ij}$ with a probability density function (PDF):

$$V_N(i) = \min_{a \in W}\left[C(i, a) + \int f(a)V_{N-1}(j)\right], \quad \text{(Eq. 3)}$$
for $0 < N < M$, wherein f(a) represents the PDF.

Thus, the workscope model analyzer 3910 evaluates a given stage (e.g., a given shop visit (SV), etc.) and associated state (e.g., state 1=age of engine, 2=time on each module, 3=driver of the SV, etc.) to drive a decision identifying which workscope alternative is to be exercised. The workscope value evaluator 3915 works with the workscope model analyzer 3910 to evaluate associated cost/benefit such as with respect to a cost/profit goal (e.g., to minimize an overall expected cost to end (e.g., 20,000 cycles, 25,000 cycles, 30,000 cycles, 50,000 cycles, etc.). To solve the workscope strategy analysis problem the asset state analyzer 3905, workscope model analyzer 3910, and workscope value evaluator 3915 work together to analyze the models and the data using a stochastic dynamic programming model with continuous states, for example.

For example, a workscope strategy analysis can be divided into M stages (e.g., stages 1-4 corresponding with shop visits 1-4 up to a contract limit (e.g., an end of life of the contract and/or other limit, etc.) of a number of 25,000 cycles for the target asset (e.g., engine, engine module, etc.), etc.). If the system is in stage k and is currently in the shop for repair, a probability of reaching the contract limit in M-k or fewer additional shop visits is greater than P, where P is a level of certainty (e.g., P=0.99, etc.).

Thus, using dynamic programming, the WSA 3715 can analyze models of available workscope and determine a preferred or "optimal" workscope to be selected from the available workscopes which minimizes or otherwise reduces an expected or average cost and/or provides a best overall value (e.g., cost versus benefit such as income per contract, repair value over contract horizon time, etc.). The workscope value evaluator 3915 examines a cost associated with the stages and states of each available workscope as processed by the workscope model analyzer 3910 and calculates an average cost for each of the available workscopes that can be selected. Thus, the WSA 3715 can compare each available workscope and associated cost/benefit (e.g., workscope value) to select an "optimal" workscope to be executed with respect to the target asset.

Figure 42A:
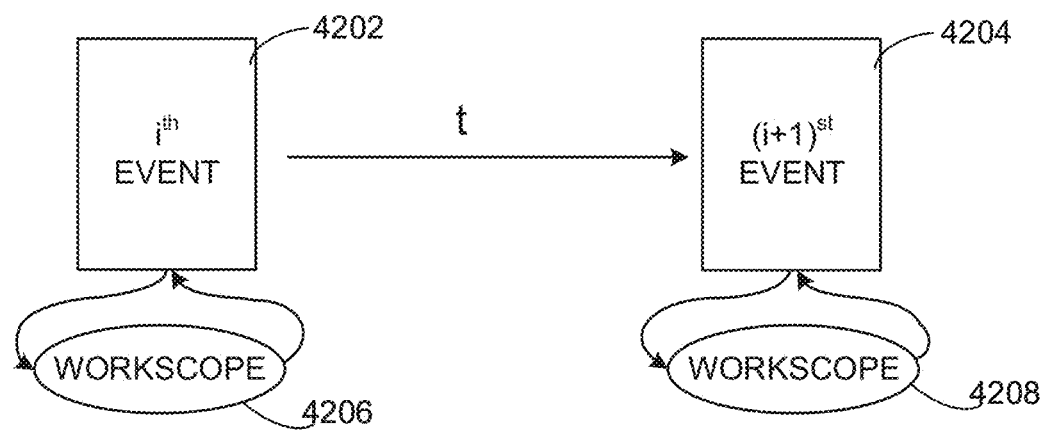
FIGS. 42A-42B illustrate example state-based systems for workscope analysis.

In certain examples, the WSA 3715 can be implemented as a state-based system for dynamic workscope analysis. As shown in the example of FIG. 42A, a plurality of events such as an $i^{th}$ event 4202 and a $(i+1)^{st}$ event 4204 are defined and separated by a time t. Each event 4202, 4204 is associated with a workscope 4206, 4208. The time t between the $i^{th}$ and $(i+1)^{st}$ event is based on a state of the asset (e.g., the engine and/or engine module, etc.) when the asset leaves the shop (e.g., time on each module, etc.) and how the asset is operated (e.g., captured in Weibull parameters, etc.). The time t follows a probability distribution and/or density function.

Figure 42B:
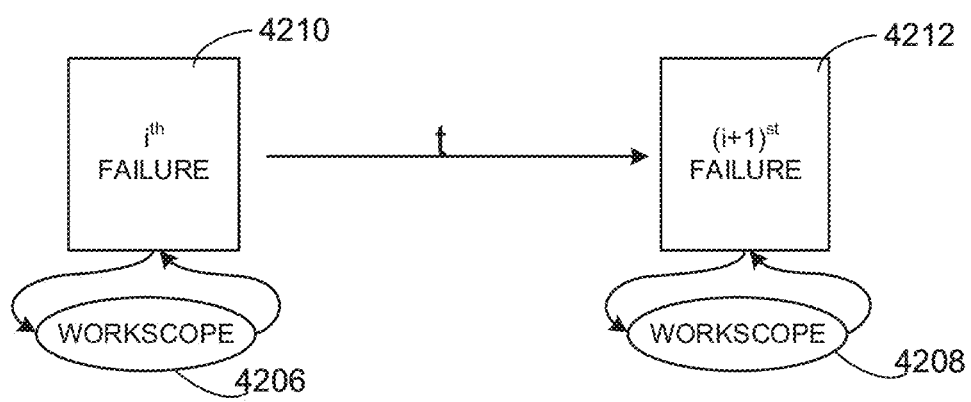

The probability distribution function (and/or probability density function) (PDF) can be associated with a Weibull distribution of failure, as shown in the example of FIG. 42B. An $i^{th}$ failure 4210 is separated from an $(i+1)^{st}$ failure 4212 by the time t. Each failure 4210, 4212 is associated with a workscope 4206, 4208. In the example of FIG. 42B, assuming N modules associated with the target asset and times $S_{i1}$, $S_{i2}$, ..., $Si_N$ are times on the modules after the $i^{th}$ failure and after repairs have been performed. The probability that the time between the $i^{th}$ and $(i+1)^{st}$ event is less than t can be defined as:

$$F(t \mid s_1, s_2, \ldots, s_N) = \qquad \text{(Eq. 4)}$$
$$1 - \exp\left[\sum_{j=1}^{N}\left(\frac{s_j}{\eta_j}\right)^{\beta_j} - \sum_{j=1}^{N}\left(\frac{s_j + t}{\eta_j}\right)^{\beta_j}\right].$$

In the example of FIG. 42B, given that there is a failure at time t, the probability that module k failed is:

$$\frac{h_k(s_j+t)}{\sum_{j=1}^{N} h_j(s_j+t)}, \text{ where } h_j(s_j+t) = \left(\frac{s_j+t}{\eta_j}\right)^{\beta_j-1} \frac{\beta_j}{\eta_j}.$$

In certain examples, a conditional PDF in which module k is the $(i+1)^{st}$ failure and the time between the $i^{th}$ and $(i|1)^{st}$ failures is t given that the time on the modules after the $i^{th}$ failure is $s_{i1}, s_{i2}, \ldots, s_{iN}$ can be defined as:

$$F(t \mid s_1, s_2, \ldots, s_N) = \qquad \text{(Eq. 5)}$$
$$1 - \exp\left[\sum_{j=1}^{N}\left(\frac{s_{ij}}{\eta_j}\right)^{\beta_j} - \sum_{j=1}^{N}\left(\frac{s_{ij}+t}{\eta_k}\right)^{\beta_j}\right]\left(\frac{s_{ik}+t}{\eta_k}\right)^{\beta_k-1}\frac{\beta_k}{\eta_k}.$$

A corresponding probability distribution function/probability density function (PDF) can be defined as:

$$F_k=(t|s_{i1},s_{i2},\ldots,s_{iN})=\int_{S=0}^{t}f_k(s|s_{i1},s_{i2},\ldots,s_{iN})ds \qquad \text{(Eq. 6)}$$

wherein $F_k$ is the PDF and $f_k$ represents individual probabilities of failure.

Figure 43:
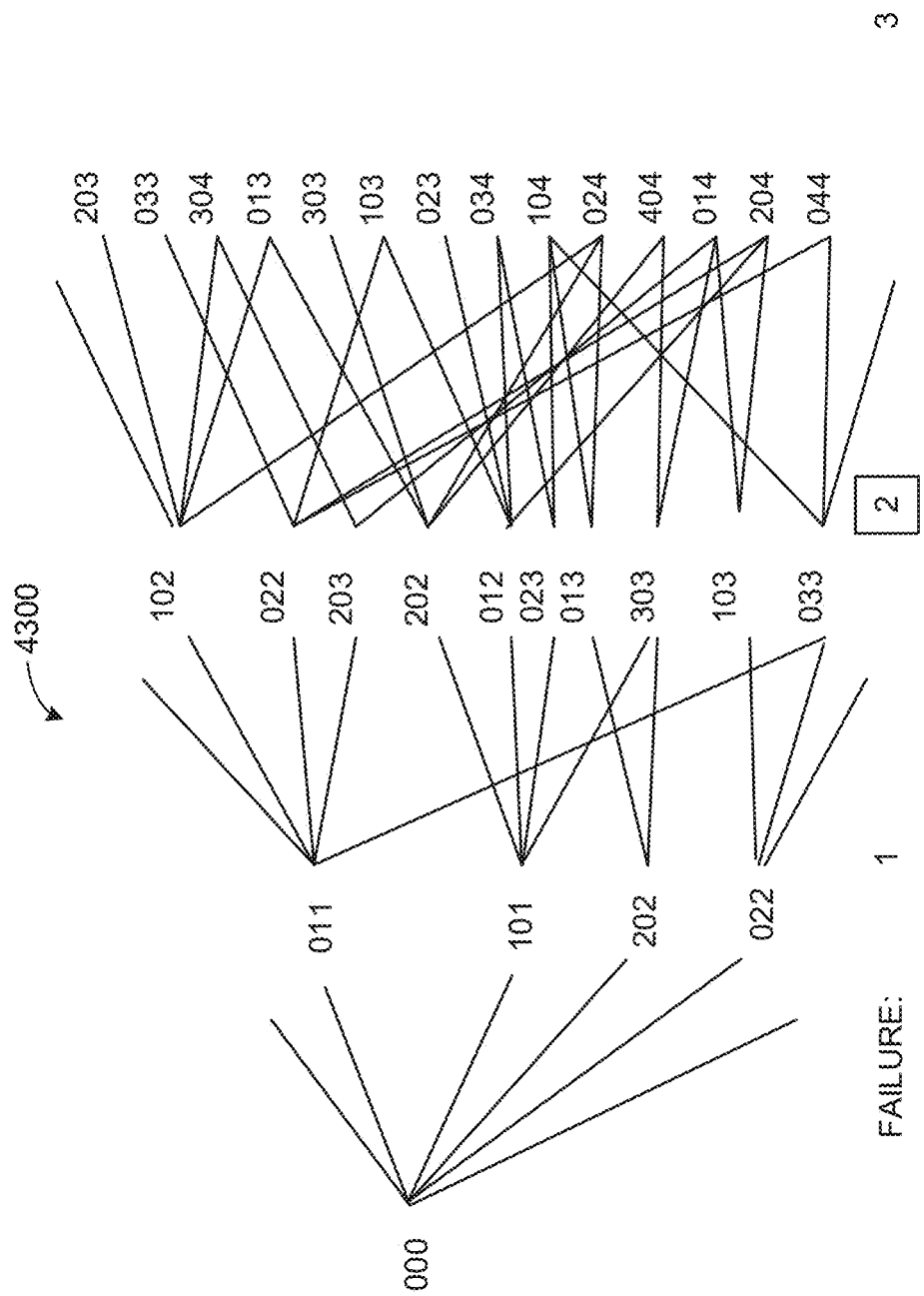
FIG. 43 illustrates an example mesh or time directed graph of state transitions and modules in a target asset.

Referring back to a mesh network or time directed graph (e.g., a time directed discrete probability graph of possible future events, etc.) such as the example of FIGS. 40-41B, a probability distribution of possible future events (e.g., errors, failures, insufficient performance, shop visit, etc.) can be represented as paths built on a finite mesh. The time directed graph has a size m (e.g., 1000 cycles, 25,000 cycles, etc.). Network state is given by time on each module. FIG. 43 illustrates an example network graph 4300 in which it is assumed that only a failing module is repaired. As shown in the example of FIG. 43, a "0" indicates which module failed. For example, 023 indicates 0 cycles on module 1, 2 m cycles on module 2, and 3 m cycles on module 3. A probability of going from 1,0,1 to 0,2,3 can be represented as:

$$\int_m^{2m} f_1(t|m,0,m)dt=F(wm|m,0,m)-F_1(M|m,0,m).$$

Thus, with a mesh or network size m, a probability of going from state $a_{i1}, a_{i2}, \ldots, a_{iN}$ to state $a_{i1}+b, a_{i2}+b, \ldots a_{i,k-1}+b, 0, a_{i,k+1}+b, \ldots, a_{iN}-b$ is given by:

$$\int_{m(b-1)}^{mb}(t|ma_{i1},\ldots,ma_{iN})dt=F_k(mb|ma_{i1},\ldots,ma_{iN})-F_k(m(b-1)|ma_{i1},\ldots,ma_{iN}) \qquad \text{(Eq. 7)}.$$

The righthand side of Equation 7 can be simplified as $F_k(mb)-F_k(m(b-1))$.

To determine a total probability, P, that module k will be the next failing module given a time horizon T with S hours already passed, the WSA 3715 can calculate:

$$P=\Sigma_{j=S/m+1}^{T/m}[F_k(jm)-F_k((j-1)m)] \qquad \text{(Eq. 8)}.$$

A probability that the first L failures between time 0 and time T will be due to modules $k_1, k_2, \ldots, k_L$ can be calculated by:

$$P=\Sigma_{j_1=1}^{T/m-(L-1)}\Sigma_{j_2=j_1}^{T/m-(L-2)}\ldots\Sigma_{j_L=j_1+j_2+\ldots+j_{L-1}}^{T/m}[F_{k_1}(j_1m)-F_{k_1}((j_1-1)m)]\times[F_{k_2}(j_2m)-F_{k_2}((j_2-1)m)]\ldots[F_{k_L}(j_Lm)-F_{k_L}((j_L-1)m)] \qquad \text{(Eq. 9)}.$$

Taking the limit as m approaches zero generates:

$$P=\int_{t_1=0}^{T}\int_{t_2=0}^{T-t_1}\ldots\int_{t_L=0}^{T-t_1-t_2-\ldots-t_{L-1}}F_{k_1}(t_1|0,0,\ldots,0)f_{k_2}(t_2|s_{11},\ldots,s_{1N})\ldots f_{k_L}(t_L|s_{L-1,1},\ldots,s_{L-1,N})dt_1dt_2\ldots dt_L \qquad \text{(Eq. 10)},$$

where $t_1$ is time from $SV_{i-1}$ to $SV_i$.

Thus, the WSA 3715 generates an "optimal" and/or otherwise desirable workscope for execution with respect to a target asset such as an engine, engine module/subsystem (e.g., high pressure compressor, fan/low pressure compressor, combustor, high pressure turbine, low pressure turbine, accessory drive, etc.), etc., using the workscope model analyzer 3910 in conjunction with the asset state analyzer 3905 and workscope value evaluator 3915. The WSA 3715 provides expected revenue, expected cost, expected operating margin, expected LLP financials, etc., via the workscope value evaluator 3915. Model analysis and simulation allow the WSA 3715 to narrow a set of available workscopes for a target asset to a selected optimal workscope for execution via the workscope selector 3720. Using model analysis, simulation, and dynamic programming via a state-based mesh model, the WSA 3715 generates and evaluates a probability of future shop visits for the asset, likely drivers of future shop visits, and expected time-on-wing until future shop visits, for example.

A decision made by the workscope value evaluator 3910 triggers an action made at a current stage to effect asset operation as well as overall cost/profit and/or other benefit, value, etc. Decisions are associated with a value (e.g., cost/benefit, etc.), as well as a chosen workscope, for example. The WSA 3715 provides cost/benefit value information along with workscope data to the workscope selector 3720 to produce the selected optimal workscope as output 355. Such value can be bounded and/or otherwise affected by restrictions and/or constraints such as time horizon, rates, limits on time between asset component maintenance, and other soft and/or hard constraints specified by a contract, for example. The selected workscope triggers an assignment of maintenance personnel, a service facility, spare parts, tools, etc., to repair and/or replace the asset according to the workscope based on a removal schedule, for example.

In some examples, the outputs 355 include a removal schedule of one or more assets including corresponding removal schedule information (e.g., maintenance logistic information, service logistic information, etc.). For example, the outputs 355 can include a removal schedule of the engine 102 including a maintenance facility in which the engine 102 can be serviced and a timeline in which the engine 102 can be removed, serviced, and re-deployed. In certain examples, availability of spare assets (e.g., spare engines, etc.) such as 5% of fleet size, 10% of fleet size, 15% of fleet size, etc., factors into the output 355 such that the WSA 3715 helps to predict and control a number of spare assets and/or other parts to be available for a duration of maintenance of the target asset in the shop (e.g., a spare engine to replace an engine being taken off wing and brought into the shop for repair, etc.).

While an example implementation of the task optimizer 310 of FIG. 3 is illustrated in FIGS. 36-39, one or more of the elements, processes and/or devices illustrated in FIGS. 36-39 can be combined, divided, re-arranged, omitted, eliminated and/or implemented in any other way. Further, the example workscope drivers 3705, the example workscope mapper 3710, the example workscope strategy analyzer 3715, the example workscope selector 3720, and/or, more generally, the example task optimizer 310 of FIG. 3 can be implemented by hardware, software, firmware and/or any combination of hardware, software and/or firmware. Thus, for example, any of the example workscope drivers 3705, the example workscope mapper 3710, the example workscope strategy analyzer 3715, the example workscope selector 3720, and/or, more generally, the example task optimizer 310 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workscope drivers 3705, the example workscope mapper 3710, the example workscope strategy analyzer 3715, the example workscope selector 3720, and/or, more generally, the example task optimizer 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example task optimizer 310 of FIG. 3 may include one or more elements, processes and/or devices in addition to, or instead of, those illustrated in FIGS. 36-39, and/or may include more than one of any or all of the illustrated elements, processes and devices.

Figure 44:
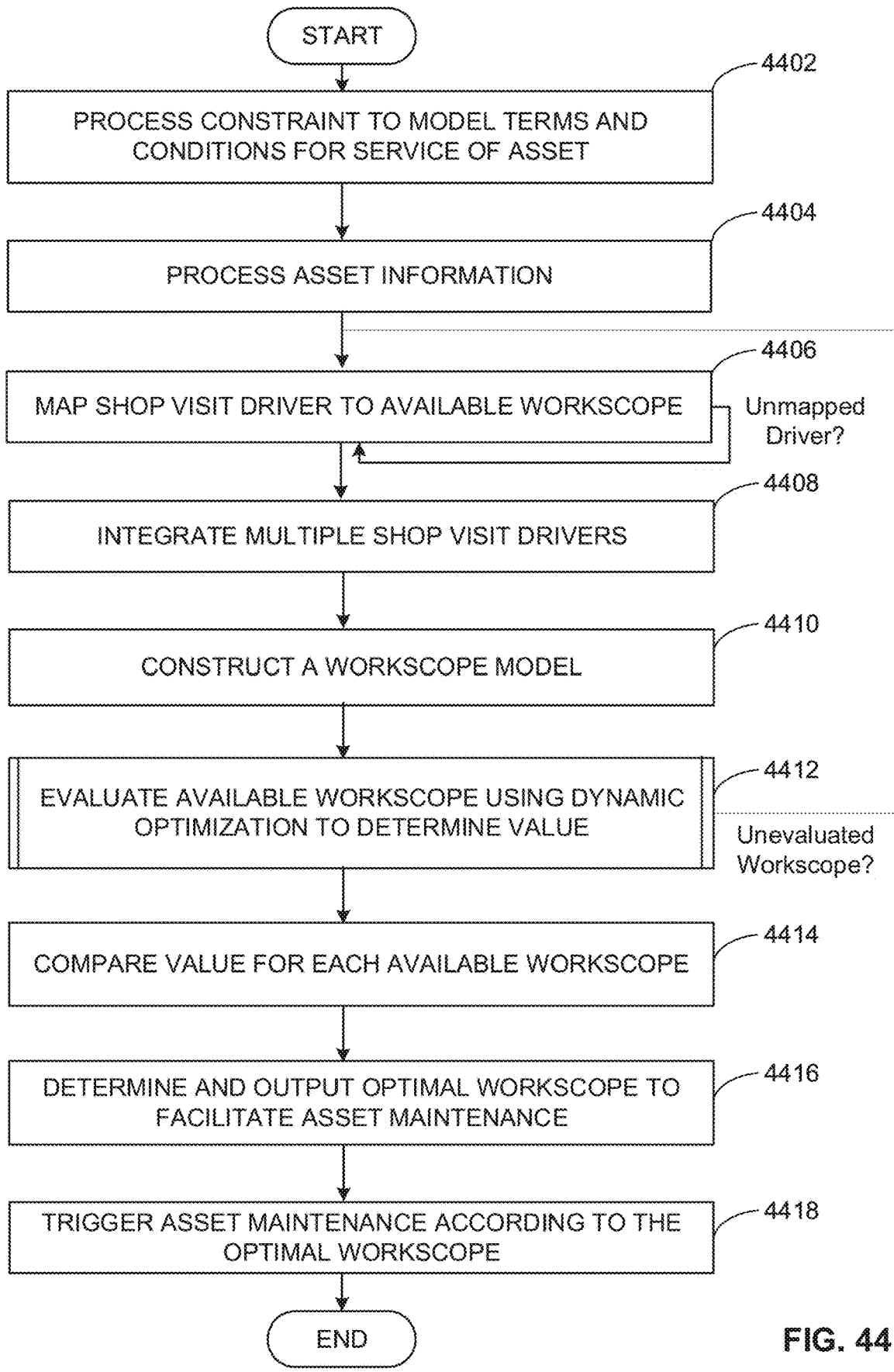
FIGS. 44 and 46 are flowcharts representative of an example method that can be executed by the example asset workscope generation system of FIGS. 3 and/or 36-39 to implement the examples disclosed herein.
Figure 46:
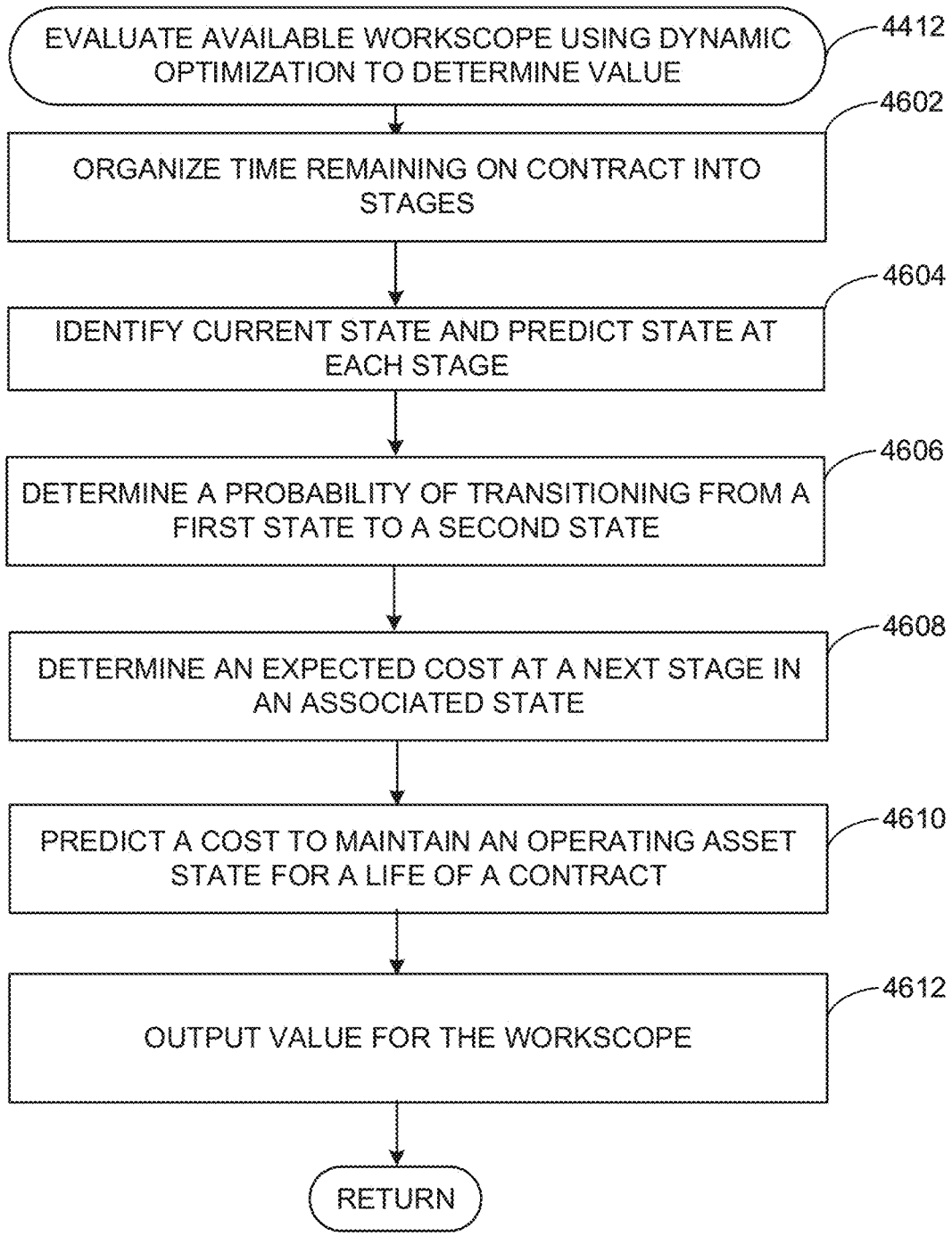

Flowcharts representative of example machine readable instructions for implementing the AWGS 220 and/or its task optimizer 310 of FIGS. 2-3 and/or 36-39 are shown in FIGS. 44 and 46. In these examples, the machine readable instructions comprise a program for execution by a processor such as a processor 4812 shown in the example processor platform 4800 discussed below in connection with FIG. 48. The program may be embodied in software stored on a non-transitory computer readable storage medium such as a CD-ROM, a floppy disk, a hard drive, a DVD, a Blu-ray disk, or a memory associated with the processor 4812, but the entire program and/or parts thereof could alternatively be executed by a device other than the processor 4812 and/or embodied in firmware or dedicated hardware. Further, although the example program is described with reference to the flowcharts illustrated in FIGS. 44 and 46, many other methods of implementing the example AWGS 220 and/or its task optimizer 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 44 and 46 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 44 is a flowchart representative of an example method that can be performed by the example task optimizer 310 of FIGS. 3 and/or 36-39 to evaluate available workscopes and determine an optimal or otherwise improved workscope for maintenance of a target asset. The example method begins at block 4402 at which a contract for servicing of a target asset (and/or other set of restrictions and/or constraints) is processed by the task optimizer 310 to identify terms and conditions such as maintenance requirements, contract end date, and end asset state, etc. For example, a service contract, such as a customized service agreement (CSA), etc., can be parsed by the workscope mapper 3710 and workscope drivers 3705 to organize (e.g., model, etc.) the contract and/or other set of requirements and constraints in a data structure according to terms and conditions including asset and/or asset module(s) covered, duration, milestones, deliverables, etc. The data structure enables elements of the requirements and/or constraints to be modeled and compared (e.g., to each other, to components in other contracts, to status and/or feedback data regarding the target asset/asset module, etc.). The parsing, organization, and storage of contract elements in the data structure allows a workscope for an asset to be automatically tailored to the contract and/or other requirement(s)/constraint(s) for that asset, for example. The data structure can be stored as a model 335, in the database 345, as a workscope driver 3705 (e.g., contract requirements 3820), etc.

At block 4404, asset information is processed by the task optimizer 310. For example, target asset status, shop visit driver(s), LLP status, service bulletin state, etc., are processed. For example, current asset health from the asset health calculator 300, model input 335, database 345 information, workscope driver(s) 3705, can be processed to evaluate current asset health, asset durability, life-limited part status, outstanding SB, etc., as workscope drivers 3705. Asset failure rate, model/type/part number, status/health, etc., can be processed for use in evaluating workscope (e.g., according to Equations 1-10), building a digital model or twin of the asset/asset module, etc. By processing the target asset and/or a subsystem or module of the target asset, the task optimizer 310 can understand the characteristics, behavior, condition/status, and likely failure of the asset/asset module, for example At block 4406, each shop visit driver (e.g., failure mode distributions, etc.) is mapped to a potential workscope for an associated part of the target asset. For example, a target asset module (e.g., an engine module such as a fan, booster, compressor, etc.) is analyzed by the workscope mapper 3710 with respect to shop visit driver(s) 3705 such as failure mode/engine health assessment 3805, durability model 3810, engine LLP status 3815, contract requirements and/or other restriction(s)/constraint(s) 3820, SB requirements 3825, etc., that are and/or can be driving a shop visit for the asset module. The driver(s) 3705 are used by the workscope mapper 3710 to craft an appropriate (e.g., minimum, ideal, improved, beneficial, cost-effective, etc.) workscope to address the health of the target asset module to restore a level of capability and/or performance for the asset module as indicated by the contract requirements 3820, SB requirements 3825, etc. Each shop visit/workscope driver 3705 is modeled and an associated probability of success, time to next failure, performance, etc., is evaluated over time at one or more decision points during the life of the asset/period of the contract for a lowest cost and/or best value (e.g., cost versus benefit) maintenance solution. In certain examples, block 4406 repeats until drivers have been mapped to the available workscope.

At block 4408, multiple shop visit drivers are integrated, each shop visit driver represented by a logic or analytic to drive workscoping decisions. Thus, block 4406 can be repeated by the workscope mapper 3710 for a plurality of drivers 3705 to generate a plurality of workscope models or other logical representations. For example, for each mapped workscope driver 3705, at least one of a deterministic time limit or a probability of repair/replacement is associated with the driver 3705. A workscope associated with the combination of mapped drivers 3705 is to restore, partially or fully, a time count for a set of parts/modules involved in the target asset for which a workscope is sought. For each workscope, a probability distribution of when the next shop visit will/is likely to occur can be calculated for cost/benefit (e.g., value) trade-off analysis. An overall deterministic time limit can be calculated by the workscope mapper 3710 from the plurality of individual workscope driver time limit and probability distributions, for example At block 4410, a workscoping model is constructed with associated price, cost and billing structure. For example, a model, such as a digital twin of the asset and associated workscope, a logical representation of tasks, materials, timing, cost, benefit, contract terms, etc., forming the workscope, etc., is generated by the workscope mapper to represent and facilitate processing of the workscope with respect to the asset/asset module. Asset (and/or asset module), task(s), failure mode distribution, price, cost, and billing structure (e.g., per contract terms, etc.), etc., can be represented for use, processing, reporting, etc., via the workscope model.

At block 4412, the available workscope is evaluated using dynamic optimization to determine a cost and benefit associated with the workscope. For example, an impact (e.g., a financial impact, TOW impact, contract impact, performance impact, etc.) is computed over a life of the contract for the target asset assuming a specific workscope combining probability failure modes, discrete events, and contract specifications. For example, mathematical processing (e.g., computing a probability distribution of expected maintenance activities within a selected workscope such as in Equations 4-10, etc.) by the WSA 3715 computes a life of contract (LOC) financial impact for a workscope. Contract details including payment structure, removal scheduling requirements, life limited parts (LLP), financial considerations (e.g., resale value of used parts, spare part availability, etc.), workscope cost, interdependency of workscope for asset modules, probability of engine removal due to different workscope drivers and deterministic drivers, other restrictions(s) and/or constraint(s), etc., are provided as input to analyze a probability of a next state at each decision point in the LOC until a final outcome (see, e.g., the example network 4000 and associated probabilities 4008 from a current decision point 4004 to final outcome(s) 4010 at the end of the LOC as shown in the example of FIG. 40). For each potential workscope, an expected cost, price, and operating margin are computed over the LOC by the WSA 3715. Thus, the expected cost to maintain the target asset over the LOC can be determined for an available workscope and used to evaluate the associated workscope in comparison to other available workscopes.

Figure 45:
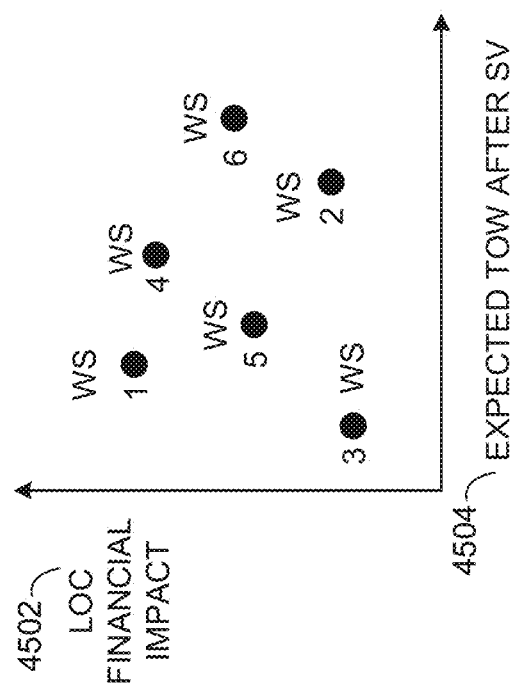
FIG. 45 is an example graph of expected time-on-wing after shop visit versus financial impact for the life of a contract for a plurality of workscopes.

FIG. 45 illustrates an example diagram comparing LOC financial impact 4502 and/or other desired objective function to expected TOW after shop visit 4504 for workscope 1-workscope 6 (WS1-WS6). Thus, different workscopes have a different financial impact over the life of the contract (e.g., greater or less cost than other workscope alternatives) as well as more or less TOW following the shop visit when compared to other workscope alternatives. Such financial impact enables a tradeoff analysis for engine removal and optimal and/or otherwise improved workscope selection, for example.

Thus, at block 4412, failure mode probabilities and financial impact are combined with workscoping options using dynamic optimization propagated to an end of the contract. A likelihood or probability of failure, a financial impact of the failure, and a cost for shop visit are combined with available workscope options by the WSA 3715 using dynamic programming optimization to extrapolate the cost/benefit through the end of the contract for service of the asset.

For example, by evaluating a system/asset state for each of a plurality of decision points representing workscope options at a given stage in the life of an asset/contract, a cost/benefit analysis can be automatically generated by the WSA 3715 to select an available workscope that maximizes and/or otherwise increases benefit/profit (e.g., ease of repair, cost-effectiveness, timeliness, efficient, capability, etc.) with respect to cost at a given point in the LOC for the asset/asset module. In certain examples, the cost/benefit (e.g., value) analysis is extrapolated from the current decision point to subsequent decision points in the future leading to the end of the contract and/or other constraint/restriction. As shown in the example network 4000 of FIG. 40, from a current decision point 4004, a plurality of next decision points 4006 have a certain probability 4008 of occurring. As shown in FIGS. 41A-41B, a lowest cost path between desirable outcomes along the way from start 4102 to end 4104 of contract/usable life of the asset can represent a desirable workscope for selection and implementation with respect to the asset/asset module, for example. As described above, a stochastic and/or deterministic dynamic programming optimization can be executed by the WSA 3715 with respect to available workscopes for the target asset and its contract and/or other restriction/constraint/requirement to determine an "optimal" workscope give asset (e.g., engine, etc.) age, time on module, shop visit driver(s), etc.

For example, assuming an LOC for the asset can be divided into M stages, the asset is in stage k if the asset is currently in the shop and the probability of reaching the limit in M-k or fewer additional shop visits is greater than a level of certainty P (e.g., P=0.80, 0.90, 0.99, etc.). The asset has a state at each of the M stages up to end-of-life/end-of-contract for the asset. As shown in the example of FIGS. 42A-42B, asset state can be represented as events 4202, 4204 and/or associated workscopes 4206, 4208 with associated failures 4210, 4212 based on state of the asset when it leaves the shop (e.g., time on each module, etc.) and how the asset is operated (e.g., captured in Weibull parameters, etc.), where time follows a specific probability distribution/ density function as specified by Equations 1-10. Probability can then be used to determine whether an asset and/or asset module will be the next module to failure and, therefore, should be included the workscope. The probability of stage and state for an available workscope can be compared to probability associated with another available workscope to evaluate and select an "optimal" workscope for the target asset to maximize and/or otherwise improve cost/benefit for the contract associated with servicing of the target asset.

At block 4414, the cost versus benefit and/or other value generated through dynamic optimization processing of the available workscopes performed at block 4412 is compared for each available workscope. For example, a cost (e.g., determined according to Equations 1-3, etc.) calculated at block 4412 for each available workscope can be compared to evaluate which available workscope has the lowest associated cost. In certain examples, a quantification of the benefit (e.g., parts repaired, parts replaced, time-on-wing, incentives gained, etc.) can be applied to balance the cost of the respective workscope such that the comparison at block 4414 is an evaluation by the WSA 3715 of the cost/benefit for each available workscope to determine which available workscope provides the best benefit at the lowest cost.

At block 4416, an optimal and/or otherwise improved workscope is determined based on the dynamic optimization processing of the available workscopes, and the optimal workscope is output to facilitate asset maintenance (e.g., repair, replacement, etc.). For example, based on the stochastic and/or deterministic dynamic programming optimization applied at block 4412 and the comparison evaluated by the WSA 3715 at block 4414, the available workscope that satisfies likely probabilities of asset module/asset failure while reducing/minimizing cost can be selected as the "optimal" workscope, for example. The optimal and/or otherwise improved workscope is determined by the WSA 3715 and output via the workscope selector 3720 as output 355. Thus, based on the analysis of the WSA 3715, the workscope selector 3720 selects optimal workscope(s) for a current shop visit that satisfies contract requirements and minimizes expected costs and/or increases time on wing through the end of the contract for the asset in question.

At block 4418, asset maintenance is triggered according to the optimal workscope. For example, the determined workscope (e.g., including tasks to be executed, materials to be used, asset(s)/asset module(s) to be taken offline/off-wing, spare/leased asset(s) to replace part(s) in shop, etc.) can be provided to an asset maintenance system, scheduling system, etc., to take affected asset(s) off-wing and/or otherwise off-line, arrange for temporary replacement, and trigger repair/replacement of the affected asset/asset module(s).

FIG. 46 is a flowchart representative of an example implementation of block 4412 of the example of FIG. 44 to evaluate an available workscope using dynamic optimization to determine value. For example, failure mode probabilities and financial impact can be combined with an available workscope option using dynamic optimization propagated to an end of a contract for the target asset. At block 4602, time remaining on the contract for service of the target asset is organized into stages. For example, starting with a current point in time, the remaining LOC is divided into stages, each stage associated with one or more probable/possible states. Each stage represents a decision point with respect to the target asset (e.g., engine, engine module, etc.). The decision point indicates an action made at the respective stage to affect the asset and overall cost/profit with respect to the contract (e.g., associated workscope, etc.).

At block 4604, a current state is identified, and a state to be associated with each stage is predicted. An associated state indicates a condition of the asset at the respective stage (e.g., time-on-engine, time-on-modules, shop visit driver, etc.). A prediction of a next state at a next stage can be calculated as described above with respect to Equations 4-10. For example, asset states can be characterized as events 4202, 4204, such as failures 4210, 4212, associated with workscopes 4206, 4208.

At block 4606, a probability of transitioning from a first state to a second state is determined. For example, a probability distribution can be generated based on a transition from a current state to a next state for an asset module at a predicted time (see, e.g., Equations 4-10 and FIGS. 40-43, etc.). For example, a probability distribution from on-wing to off-wing (or vice-versa) for the engine can be determined.

At block 4608, an expected cost at a next stage in an associated state is determined. For example, a cost associated with the state of the asset at the next stage and tasks involved to maintain the asset based on the asset state is calculated based on contract terms, cost of parts and labor, spare engine/leased engine cost, time off wing, etc.

At block 13610, a cost to maintain the operating state for the life of the contract is predicted. For example, using the continuous stochastic model of Equation 3, a distribution of possible outcomes is dynamically evaluated to compute a minimum expected cost when N stages remain in the LOC and the LOC for the asset is at stage i. By integrating the probability density function and associating with workscope cost, the minimum expected cost for an available workscope over the remaining LOC can be determined (see, e.g., Equations 1-3). Thus, each workscope driver is a time limit and/or probability distribution, and Equations 1-3 can be used to compute the financial impact over the life of the contract of a given asset assuming a specific workscope combining probability failure modes, discrete events and contract specifications. At block 4612, a value is output for the particular workscope.

As recited in the example method 4400, for each available workscope, a corresponding workscope model is evaluated based on a mathematical method involving contract details including payment structure, removal scheduling requirements, life limited parts, financial considerations as resale value of used parts, workscope cost, interdependency of workscope for modules, probability of engine removals due to different workscope drivers and deterministic drivers to compute the expected cost, price and operating margin over the life of the contract and/or other set of restrictions and/or constraints and enable tradeoff analysis for engine removal and optimal workscope selection. Thus, a likelihood or probability of failure, a financial impact of the failure, and a cost for shop visit are combined with available workscope options by the WSA 3715 using dynamic programming optimization to extrapolate the cost/benefit (e.g., value) through the end of the contract for service of the asset.

FIG. 47 depicts example source code 4700 representative of example computer readable instructions that can be executed to implement the example task optimizer 310 including the example WSA 3715 that can be used to implement the examples disclosed herein. For example, the source code 4700 can be used to implement the method of FIGS. 44 and 46. As shown in the example of FIG. 47, the source code 4700 represents instructions to evaluate each remaining stage for each available workscope to evaluate a cost associated with the respective workscope to maintain the asset through the LOC. For each stage from the end stage to the current stage, a workscope decision cost plus a cost associated with a probability of changing states is determined such that associated costs can be compared for each stage to identify a stage associated with a best value (e.g., a minimum cost, most benefit, etc.).

Figure 48:
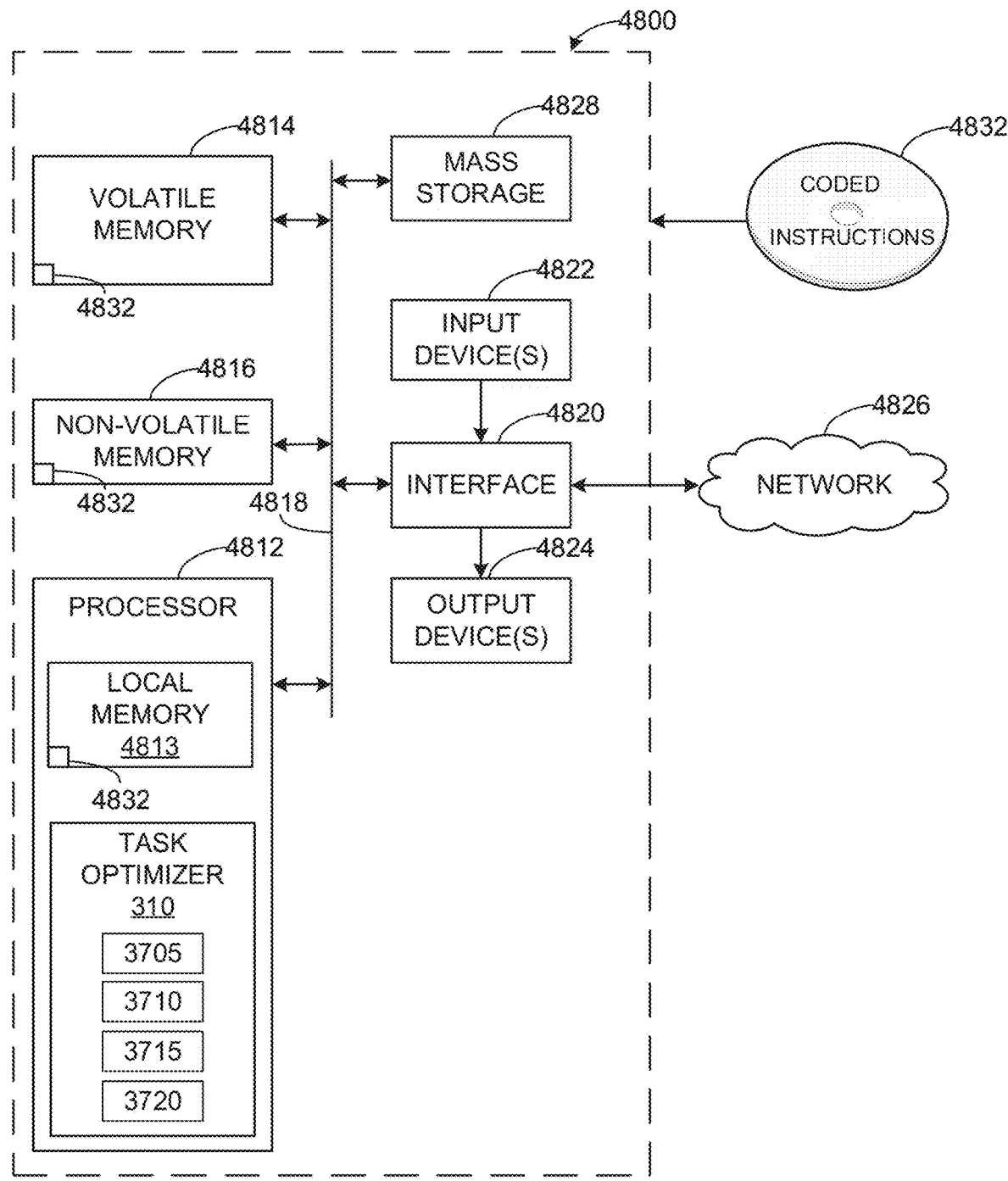
FIG. 48 is a block diagram of an example processing platform structured to execute machine-readable instructions to implement the methods of FIGS. 44 and 46 and/or the example asset workscope generation system of FIGS. 3 and/or 36-39.

FIG. 48 is a block diagram of an example processor platform 4800 capable of executing the instructions of FIGS. 44, 46 and 47 to implement the task optimizer 310 and/or the AWGS 220 of FIGS. 2-3 and/or 36-39. The processor platform 4800 can be, for example, a server, a personal computer, a mobile device (e.g., a cell phone, a smart phone, a tablet such as an iPad™), a personal digital assistant (PDA), or any other type of computing device.

The processor platform 4800 of the illustrated example includes a processor 4812. The processor 4812 of the illustrated example is hardware. For example, the processor 4812 can be implemented by one or more integrated circuits, logic circuits, microprocessors or controllers from any desired family or manufacturer. The hardware processor may be a semiconductor based (e.g., silicon based) device. In this example, the processor 4812 implements the example workscope drivers 3705, the example workscope mapper 3710, the example workscope strategy analyzer 3715, and the example workscope selector 3720.

The processor 4812 of the illustrated example includes a local memory 4813 (e.g., a cache). The processor 4812 of the illustrated example is in communication with a main memory including a volatile memory 4814 and a non-volatile memory 4816 via a bus 4818. The volatile memory 4814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 4816 may be implemented by flash memory and/or any other desired type of memory device. Access to the main memory 4814, 4816 is controlled by a memory controller.

The processor platform 4800 of the illustrated example also includes an interface circuit 4820. The interface circuit 4820 may be implemented by any type of interface standard, such as an Ethernet interface, a universal serial bus (USB), and/or a peripheral component interconnect (PCI) express interface.

In the illustrated example, one or more input devices 4822 are connected to the interface circuit 4820. The input device(s) 4822 permit(s) a user to enter data and/or commands into the processor 4812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 4824 are also connected to the interface circuit 4820 of the illustrated example. The output devices 4824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 4820 of the illustrated example, thus, typically includes a graphics driver card, a graphics driver chip and/or a graphics driver processor.

The interface circuit 4820 of the illustrated example also includes a communication device such as a transmitter, a receiver, a transceiver, a modem and/or network interface card to facilitate exchange of data with external machines (e.g., computing devices of any kind) via a network 4826 (e.g., an Ethernet connection, a digital subscriber line (DSL), a telephone line, coaxial cable, a cellular telephone system, etc.).

The processor platform 4800 of the illustrated example also includes one or more mass storage devices 4828 for storing software and/or data. Examples of such mass storage devices 4828 include floppy disk drives, hard drive disks, compact disk drives, Blu-ray disk drives, redundant array of independent disks (RAID) systems, and DVD drives.

The coded instructions 4832 of FIGS. 44, 46, and 47 can be stored in the mass storage device 4828, in the volatile memory 4814, in the non-volatile memory 4816, and/or on a removable non-transitory computer readable storage medium such as a CD or DVD.

From the foregoing, it will be appreciated that example methods, apparatus and articles of manufacture have been disclosed that generate, evaluate, and select among a plurality of available workscopes for maintenance of a target asset, such as a turbine engine, engine module, diesel engine, wind turbine, other asset requiring maintenance, etc. The above-disclosed task optimizer apparatus can optimize and/or otherwise improve generation and selection of a desired workscope based on a plurality of factors including expected cost, operating margin over the life of an associated contract, time in shop, time before next failure, etc. The task optimizer apparatus performs a tradeoff analysis based on these factors, and facilitates maintenance of the target asset (e.g., removal of the asset, shop visit for repair/replacement, temporary asset substitution while in shop, etc.). Certain examples leverage contract information such as payment structure, asset removal scheduling requirements, life limited parts, financial considerations such as resale value of used parts and operating margin, workscope cost, asset module workscope interdependency, probability of asset removal due to different workscope drivers and deterministic drivers, etc., to determine an expected cost and benefit for each available workscope to select a best or "optimal" workscope among the available workscope alternatives. Workscope determination is automated and customized to the contract and target asset, for example. Both deterministic and probabilistic events are evaluated to provide a more complete picture or model of the asset and its operating environment.

When faced with millions of possibilities, the task optimizer and its workscope strategy analyzer determine a subset of available workscopes and, for each available workscope in the subset, the analyzer predicts, for the future, when a next shop visit is likely to be warranted. The workscope strategy analyzer models based on available workscopes and probabilities to predict what types of workscopes are likely to be available at future points in time during the life of the associated contract based on stage and state, and the analyzer evaluates a plurality of decision points or stages from a starting point until an end of the life of the contract is reached. The example workscope strategy analyzer determines an optimal path among the predicted path options to reach the end of the life of the contract and computes the total cost for the selected workscope path. Total cost and expected payment by customer can be evaluated with optimal workscope path to select a workscope from the available workscope alternatives. The task optimizer then triggers and facilitates maintenance of the target asset based on the determined "optimal" or otherwise improved workscope and its associated tasks, resources, timing, etc. For example, rather than a Monte Carlo simulation (e.g., involving 1000 iterations using random numbers starting with a seeded starting point, etc.) and/or other estimate, certain examples provide an exact solution for workscope determination.

IV. Workscope Effect Calculator

Figure 49:
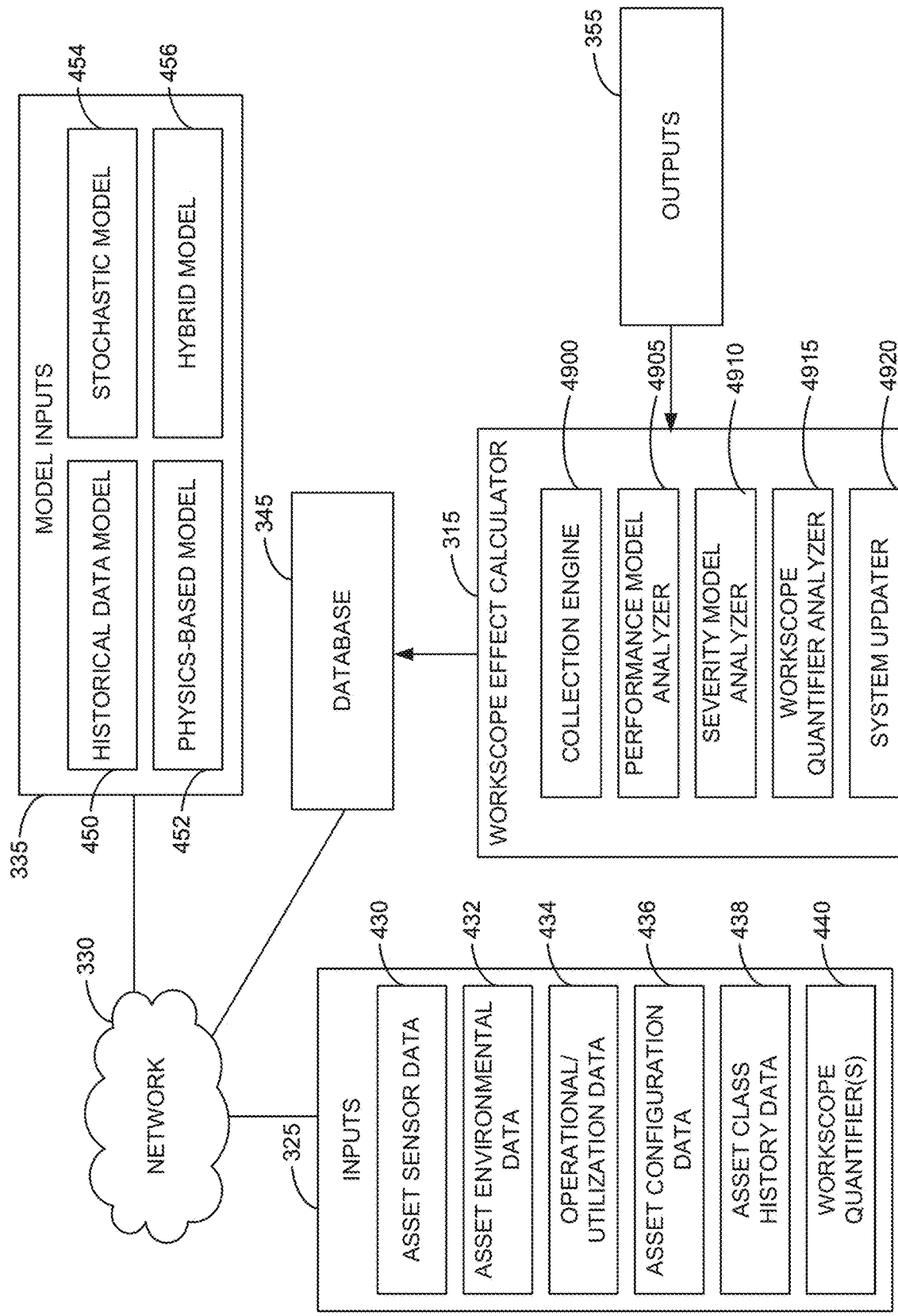
FIG. 49 is a block diagram of an example implementation of an example workscope effect calculator apparatus.

FIG. 49 is a block diagram of an example implementation of the example workscope effect calculator (WEC) 315 of FIG. 3. The WEC 315 of the illustrated example obtains operator behavior corresponding to assets and generates and analyzes performance and/or severity models based on the operator behavior. In some examples, the WEC 315 determines an impact of the operator behavior on health of an asset (e.g., actual AHQ, projected AHQ, etc.) and recommended workscopes for the asset based on the asset health. In some examples, the WEC 315 determines a workscope effect of the asset corresponding to a comparison of pre-workscope asset information (e.g., pre-workscope actual AHQ, pre-workscope projected AHQ, etc.) to post-workscope asset information (e.g., post-workscope actual AHQ, post-workscope projected AHQ, etc.). In some examples, the WEC 315 updates one or more components of the AWGS 220 based on the operator behavior, the workscope effect, etc. In the illustrated example of FIG. 49, the WEC 315 includes a collection engine 4900, a performance model analyzer 4905, a severity model analyzer 4910, a workscope quantifier analyzer 4915, and a system updater 4920.

In the illustrated example of FIG. 49, the example WEC 315 includes the collection engine 4900 to obtain information of interest to process. In the illustrated example, the collection engine 4900 obtains the inputs 325 to process via the network 330 and the database 345 of FIG. 3. For example, the inputs 325 can be stored in the database 345 via the network 330. The example collection engine 4900 can obtain the inputs 325 from the database 345. The inputs 325 of the illustrated example include example asset sensor data 430, example asset environmental data 432, example operational/utilization data 434, example asset configuration data 436, example asset class history data 438, and example workscope quantifier(s) 440.

In the illustrated example, the collection engine 4900 obtains the asset sensor data 430 to determine operating conditions experienced by the engine 102 of FIG. 1. In some examples, the asset sensor data 430 corresponds to inputs to the engine 102. For example, the asset sensor data 430 can include an engine command (e.g., a thrust control input, a de-rate control input, etc.), an engine input, etc. For example, the asset sensor data 430 can correspond to information obtained from a closed loop control module included in the turbine engine controller 100 of FIGS. 1-2. For example, the asset sensor data 430 can include parameters generated by an algorithm executed by the turbine engine controller 100 in response to an engine control input, an environmental factor, etc.

In some examples, the collection engine 4900 obtains the asset sensor data 430 from the database 345 of FIG. 3. In some examples, the asset sensor data 430 corresponds to sensor data obtained from the sensors 144, 146 of FIG. 2. For example, the asset sensor data 430 can include sensor measurements such as a speed of a rotor, a pressure, a temperature, a vibration, etc., experienced by the engine 102 of FIG. 1. In some examples, the asset sensor data 430 includes a range of sensor measurements for an environmental parameter (e.g., a pressure, a temperature, etc.) measured by an environmental parameter sensor (e.g., a pressure sensor, a temperature sensor, etc.).

In some examples, the asset sensor data 430 includes a duration of sensor measurements such as an amount of time the sensors 144, 146 measured a specific sensor measurement (e.g., an amount of time the sensors 144, 146 measured a pressure value of 100 PSI, an amount of time the sensors 144, 146 measured a temperature value of 2400 Rankine, etc.). In some examples, the asset sensor data 430 includes information corresponding to a current or an instant flight segment of the asset. For example, the asset sensor data 430 can include information from an aircraft control system, the turbine engine controller 100 of FIG. 2, etc., indicating that the engine 102 of FIG. 1 is on-wing of an aircraft currently taking off, climbing, cruising, etc.

In the illustrated example, the collection engine 4900 obtains the asset environmental data 432 to determine environmental conditions experienced by the engine 102. In some examples, the collection engine 4900 obtains the asset environmental data 432 from the database 345 of FIG. 3. In some examples, the asset environmental data 432 includes a range of environmental condition parameters experienced by the engine 102. For example, the asset environmental data 432 can include a range of ambient temperatures (e.g., a range of 10-40 degrees Celsius, etc.), precipitation amounts, salt atmosphere percentages (e.g., a range of 5-55% salt atmosphere, etc.), a range of airborne particulate matter sizes (e.g., a size of a man-made airborne particulate matter, a size of a naturally occurring airborne particulate matter, etc.), humidity percentages (e.g., a range of 40-95% humidity, etc.), etc., experienced by the engine 102. In some examples, the asset environmental data 432 includes a duration of environmental condition parameters experienced by the engine 102. For example, the asset environmental data 432 can include an amount of time the engine 102 experienced a salt atmosphere of 30%, 40%, 50%, etc.

In the illustrated example of FIG. 49, the collection engine 4900 obtains the operational/utilization data 434 to determine a usage of the engine 102. In some examples, the collection engine 4900 obtains the operational/utilization data 434 from the database 345 of FIG. 3. In some examples, the operational/utilization data 434 includes a utilization plan of the engine 102. For example, the operational/utilization data 434 can include a number of cycles (e.g., flight cycles, operation cycles, etc.), a number of hours in operation, types of flight routes (e.g., flights from a first destination to a second destination, etc.), a number of flight legs (e.g., a number of hours from a first destination to a second destination, etc.), etc., completed by the engine 102. In some examples, the operational/utilization data 434 includes operating behavior of one or more assets by one or more airline operators. For example, the operational/utilization data 434 can include operating rating information corresponding to an operation of the engine 102 compared to a rated maximum capacity of the turbine engine. For example, the operational/utilization data 434 can include average takeoff de-rate information, average climb de-rate information, etc. In another example, the operational/utilization data 434 can include an average thrust parameter of the engine 102, a percentage indicating how often the engine 102 is at full power during one or more flight cycles, etc.

In the illustrated example of FIG. 49, the collection engine 4900 obtains the asset configuration data 436 to determine a current or an instant configuration of the engine 102. In some examples, the collection engine 4900 obtains the asset configuration data 436 from the database 345 of FIG. 3. In some examples, a physical and/or software configuration of the engine 102 can be updated, upgraded, etc., over time as maintenance is performed on the engine 102. For example, the engine 102 can be refurbished with new components, upgraded components, etc. In another example, software of the turbine engine controller 100 of the engine 102 can be upgraded to adjust or control a variable geometry of the engine 102 when in operation. In such examples, the asset configuration data 436 can include a current list of components in the engine 102, a current software version of the turbine engine controller 100, etc.

In the illustrated example of FIG. 49, the collection engine 4900 obtains the asset class history data 438 to determine a baseline operation parameter, performance parameter, reliability parameter, etc., of an asset in response to upgrading a hardware and/or a software component of the asset. For example, an asset class can correspond to a fleet of substantially similar assets used to generate a baseline durability parameter or a baseline reliability parameter by analyzing durability parameters, reliability parameters, etc., for the fleet. For example, the engine 102 can belong to a first asset class corresponding to a first baseline durability parameter, a first baseline reliability parameter, etc.

In such an example, an upgrade in a hardware and/or a software component of the engine 102 can cause the engine 102 to correspond to a second asset class corresponding to a second baseline durability parameter, a second baseline reliability parameter, etc., where the second parameters can be an improvement compared to the first parameters. In some examples, the collection engine 4900 obtains the asset class history data 438 to ensure that the performance model analyzer 4905, the severity model analyzer 4910, etc., uses the model inputs 335 based on the current asset class of the engine 102 compared to a previous asset class of the engine 102 (e.g., an asset class of the engine 102 prior to an upgrade, etc.).

In the illustrated example of FIG. 49, the collection engine 4900 obtains the one or more workscope quantifiers 440 to determine an accuracy of AHQ generated by the asset health calculator 300, the task optimizer 310, and/or, more generally, the AWGS 220 of FIGS. 2-3. In some examples, the collection engine 4900 obtains the workscope quantifiers 440 from the database 345 of FIG. 3. For example, the collection engine 4900 can obtain a workscope quantifier of 10%, 20%, 30%, etc., calculated by the asset health calculator 300, the task optimizer 310, etc. For example, the WEC 315 can determine to update one or more parameters of the AWGS 220 based on the workscope quantifier. For example, the WEC 315 can update the model inputs 335 of FIG. 3 by updating (e.g., directing an updating, etc.) a historical data model 450, a physics-based model 452, a stochastic model 454, a hybrid model 456, etc., and/or a combination thereof to incorporate a latest version of information, parameter values, etc.

In the illustrated example of FIG. 49, the WEC 315 includes the performance model analyzer 4905 to generate a performance model of an asset based on operator behavior corresponding to the asset. In some examples, the performance model analyzer 4905 calculates asset parameters (e.g., operator-level assets, fleet-level assets, etc.) based on engine de-rate information (e.g., takeoff de-rate parameters, climb de-rate parameters, etc.) corresponding to one or more assets operated by an operator (e.g., an airline operator, a turbine engine operator, etc.). In some examples, the performance model analyzer 4905 generates a reference model, compares asset information and/or operator behavior to the reference model, and calculate deviations from the reference model based on the comparison. In some examples, the performance model analyzer 4905 generates recommendations to improve operator behavior corresponding to one or more assets based on determining the deviations from the reference model.

In some examples, the performance model analyzer 4905 generates the reference model based on determining operator-level and fleet-level asset parameters. For example, an operator-level takeoff de-rate parameter can be a takeoff de-rate parameter (e.g., an average takeoff de-rate parameter, a median takeoff de-rate parameter, etc.) corresponding to a plurality or an entirety of assets operated by an operator. In another example, a fleet-level takeoff de-rate parameter can be a takeoff de-rate parameter (e.g., an average takeoff de-rate parameter, a median takeoff de-rate parameter, etc.) corresponding to a plurality or an entirety of assets operated by a plurality or an entirety of operators in a fleet maintained or serviced by a turbine engine maintenance provider.

In some examples, the performance model analyzer 4905 generates the operator-level asset parameters and/or the fleet-level asset parameters by executing one or more models. For example, the performance model analyzer 4905 can direct an execution of the historical data model 450, the physics-based model 452, etc., of FIG. 49 to generate the asset parameters (e.g., operator-level takeoff de-rate parameters, fleet-level climb de-rate parameters, etc.) based on the inputs 325 of FIGS. 3 and/or 49.

In some examples, the performance model analyzer 4905 directs the historical data model 450 to generate operator-level and/or fleet-level takeoff de-rate parameters, climb de-rate parameters, etc., using historical information included in the database 345 of FIGS. 3 and/or 49 based on the inputs 325 of FIGS. 3 and/or 49. In some examples, the performance model analyzer 4905 generates a regression reference model (e.g., a multi-variable regression reference model, etc.) using regression analysis (e.g., generating a linear regression model, an exponential regression model, etc.) based on the asset parameters generated by the historical data model 450.

In some examples, the performance model analyzer 4905 generates the multi-variable regression reference model by selecting a first parameter of interest. For example, the performance model analyzer 4905 can select a takeoff de-rate parameter to process where the takeoff de-rate parameter values are based on the information generated by the historical data model 450. The example performance model analyzer 4905 can map the first parameter of interest to a plurality of parameters of interest using regression analysis to determine a correlation between the first parameter and one or more of the plurality of parameters. For example, the performance model analyzer 4905 can generate regression parameters for the reference regression model such as an rsquare value and/or a mean of response value to determine a correlation between the first parameter and one or more of the plurality of parameters. For example, the performance model analyzer 4905 can generate a multi-variable regression reference model based on determining a correlation between the takeoff de-rate parameter and an airport elevation, an ambient temperature, etc., to determine an effect of an airline operator behavior as a function of environmental or operational constraints, factors, parameters, etc.

In some examples, the performance model analyzer 4905 directs the physics-based model 452 to generate operator-level and/or fleet-level engine de-rate parameters (e.g., takeoff de-rate parameters, climb de-rate parameters, etc.) based on executing a digital twin model of an asset using the inputs 325. In some examples, the performance model analyzer 4905 generates the reference model by mapping the asset parameters to an engine performance characteristic such as an aircraft weight of an aircraft to which an asset is on-wing, an asset class, an asset configuration, etc. In some examples, the performance model analyzer 4905 generates a physics-based reference model by mapping the asset parameters as a function of the engine performance characteristic based on the model inputs 335 from the physics-based model 452.

In some examples, the performance model analyzer 4905 compares operator behavior to a reference model to calculate a difference and generate a recommendation for operator behavior improvement based on the difference. For example, the performance model analyzer 4905 can calculate a difference between an operator-level takeoff de-rate parameter and a fleet-level takeoff de-rate parameter generated by the historical data model 450, the physics-based model 452, etc. In some examples, the performance model analyzer 4905 generates a residual performance model to analyze differences between operator behavior of an individual operator compared to a fleet of operators to generate a recommendation for improvement. For example, the performance model analyzer 4905 can determine that a first operator is better than an asset fleet average, worse than an asset fleet average, etc. In another example, the performance model analyzer 4905 can identify a second operator as a candidate improvement target because the second operator is worse than the asset fleet average.

In some examples, the performance model analyzer 4905 determines a recommendation to optimize and/or otherwise improve the operator behavior based on analyzing the performance model. In some examples, the performance model analyzer 4905 generates a report including the recommendation. In some examples, the performance model analyzer 4905 can identify one or more operators as candidate improvement targets for operator behavior improvement based on the performance model. For example, the performance model analyzer 4905 can generate a recommendation for an operator to optimize and/or otherwise improve the behavior of the operator by recommending a change in a de-rate parameter, a taper schedule, a water-washing technique, etc., and/or a combination thereof based on analyzing a comparison of the operator behavior to the asset fleet. In some examples, the performance model analyzer 4905 generates an alert dashboard (e.g., an alert dashboard in a report, an alert dashboard in a web-based software application, etc.) indicating areas of improvement for an operator to improve TOW and to reduce maintenance cost of an asset based on analyzing the performance model.

In the illustrated example of FIG. 49, the WEC 315 includes the severity model analyzer 4910 to generate a severity model to estimate and/or otherwise predict asset health as a function of a severity factor (e.g., an environmental factor, an operator behavior factor, etc.). For example, a severity model can be a model based on mapping an effect of an environmental factor, an operator behavior, etc., on an AHQ of an asset to determine how severe, significant, etc., the effect of the environmental factor, the operator behavior, etc., has on the AHQ. In some examples, the severity model analyzer 4910 generates an asset component level severity model. For example, the severity model analyzer 4910 can generate a severity model that maps an effect of a severity factor on an AHQ such as TOW for an asset component such as a fan blade, a booster compressor, etc. In some examples, the severity model analyzer 4910 generates a fleet-level severity model. For example, the severity model analyzer 4910 can generate a severity model that maps a mean time to failure parameter to one or more asset components based on fleet-level asset parameters.

In some examples, the severity model analyzer 4910 generates the severity model based on one or more environmental factors such as temperature (e.g., engine temperature, average ambient temperature, etc.), a time duration during which the asset operates at the temperature, an exposure to an airborne particulate matter, etc. For example, the severity model analyzer 4910 can generate a severity model corresponding to the engine 102 that maps a quantity of TOW hours of the high-pressure turbine 120 of the engine 102 to a frequency of dusty departures experienced by the engine 102.

In some examples, the severity model analyzer 4910 generates a severity model corresponding to an asset including one or more severity models corresponding to the asset. For example, the severity model analyzer 4910 can map a severity factor such as takeoff thrust to an AHQ such as TOW of one or more asset components such as the fan section 108, the booster compressor 114, the high-pressure turbine 120, etc., of the engine 102. For example, the severity model analyzer 4910 can map the takeoff thrust operator behavior for the one or more asset components to determine a sensitivity of the TOW of the asset components as a function of the takeoff thrust.

In some examples, the severity model analyzer 4910 determines whether an AHQ of one or more asset components of an asset satisfies a threshold based on the mapping. In some examples, the severity model analyzer 4910 determines whether an AHQ of an asset component satisfies an anticipated AHQ threshold. In some examples, the anticipated AHQ threshold corresponds to an anticipated AHQ as a function of a severity factor. For example, the severity model analyzer 4910 can calculate an anticipated AHQ threshold value of 0.63 scaled TOW hours based on the asset component level severity model 5400 of FIG. 54. For example, the severity model analyzer 4910 can map a severity factor value of 0.5 corresponding to Asset Component C to approximately 0.63 scaled TOW hours (e.g., a number of TOW hours scaled to a range of 0-1, etc.) using the asset component level severity model 5400 of FIG. 54.

In some examples, the severity model analyzer 4910 determines that an actual AHQ of an asset satisfies the anticipated AHQ threshold based on the actual AHQ being greater than the anticipated AHQ threshold. For example, the severity model analyzer 4910 can map a severity factor value of 0.375 currently or previously experienced by the Asset Component C of the engine 102 to the severity factor value of the asset component level severity model 5400 of FIG. 54 to determine an anticipated TOW of the Asset Component C of approximately 0.63 scaled TOW hours. In such an example, the severity model analyzer 4910 can compare the anticipated TOW of 0.63 scaled TOW hours to an example actual TOW of the Asset Component C of 0.6 scaled TOW hours. In such an example, the severity model analyzer 4910 can determine that the actual TOW of the Asset Component C does not satisfy the anticipated AHQ threshold based on the actual TOW being less than the anticipated AHQ threshold.

In some examples, the severity model analyzer 4910 determines that an AHQ difference satisfies an AHQ difference threshold. For example, the severity model analyzer 4910 can determine an AHQ difference by calculating a difference between an actual AHQ and an anticipated AHQ. For example, the severity model analyzer 4910 can calculate an AHQ difference of 0.1 scaled TOW hours by calculating a difference between an actual AHQ of 0.6 scaled TOW hours and an anticipated AHQ of 0.7 scaled TOW hours (e.g., 0.1 scaled TOW hours=0.7 scaled TOW hours−0.6 scaled TOW hours, etc.). For example, the severity model analyzer 4910 can determine that an AHQ difference of 0.1 scaled TOW hours satisfies an AHQ difference threshold of 0.15 scaled TOW hours based on the AHQ difference being less than the AHQ difference threshold.

In response to determining that an AHQ satisfies an anticipated AHQ threshold, an AHQ difference satisfies an AHQ difference threshold, etc., the severity model analyzer 4910 can identify the asset component as a candidate for maintenance. For example, the severity model analyzer 4910 can estimate and/or otherwise predict that an asset component is a candidate for a maintenance operation based on the actual AHQ of the asset component being within a tolerance threshold of an anticipated AHQ of the asset component based on an environmental factor, an operator asset behavior, etc., and/or a combination thereof.

In some examples, the severity model analyzer 4910 determines a recommendation to optimize and/or otherwise improve operator behavior corresponding to the asset based on analyzing the severity model. In some examples, the severity model analyzer 4910 determines a workscope recommendation based on determining a sensitivity for each of the asset components and/or the asset. For example, the severity model analyzer 4910 can generate a first recommendation to perform maintenance on the high-pressure turbine 120 at 25,000 TOW hours, a second recommendation to perform maintenance on the fan section 108 at 27,500 TOW hours, etc., based on the sensitivity of the high-pressure turbine 120, the fan section 108, etc., to an example severity factor value of 0.1. In some examples, the severity model analyzer 4910 generates a report including the severity factor values, the actual AHQ, the anticipated AHQ threshold, the workscope recommendation to improve operator behavior, etc.

In the illustrated example of FIG. 49, the WEC 315 includes the workscope quantifier analyzer 4915 to calculate an actual AHQ, a projected AHQ, etc., based on workscope results from an inspection (e.g., a visual inspection, a regularly scheduled inspection, etc.), a validation test (e.g., an operator acceptance test, a service validation test, etc.). In some examples, the WEC 315 deploys an automated imaging system to inspect the engine 102. For example, the WEC 315 can use an imaging system including one or more cameras (e.g., digital cameras, video cameras, etc.) to capture one or more images of an asset component of the engine 102. For example, the WEC 315 can use an object-recognition system (e.g., a machine-learning system, a deep-learning system, etc.) to compare an image of the booster compressor 114 to an image in an object-recognition database. The example WEC 315 can calculate an AHQ of the booster compressor 114 based on the comparison of the image of the booster compressor 114 to the image in the object-recognition database. In some examples, the WEC 315 performs an automated transfer of inspection or workscope results from a shop system to the database 345.

In some examples, the WEC 315 performs an automated validation test of the engine 102 in response to the workscope being completed on the engine 102. For example, the WEC 315 can (1) perform an exhaust gas-path temperature hot day margin (EGTHDM) test on the engine 102 after the workscope has been completed on the engine 102, (2) compare the EGTHDM test results to EGTHDM data corresponding to the engine 102 prior to the workscope being completed, and (3) calculate an AHQ based on the comparison. In such an example, the WEC 315 can transmit (e.g., automatically transmit, etc.) the results of the EGTHDM test to the database 345 to be used to improve one or more components of the AWGS 220.

In some examples, the workscope results are based on the outputs 355. For example, the workscope quantifier analyzer 4915 can perform an inspection, a validation test, etc., based on the outputs 355 including a selected workscope to be performed including a set of tasks to be performed on the engine 102 and corresponding workscope information. In response to calculating a post-workscope AHQ (e.g., an actual AHQ, a projected AHQ, etc., of an asset after a workscope has been completed on the asset, etc.), the example workscope quantifier analyzer 4915 can calculate a workscope quantifier by calculating a difference between the post-workscope AHQ and a pre-workscope AHQ, and compare the workscope quantifier to a workscope quantifier threshold.

In some examples, the workscope quantifier analyzer 4915 generates an AHQ based on the workscope results by directing one or more models to calculate the AHQ based on the workscope results. For example, the workscope quantifier analyzer 4915 can record the workscope results and transmit the workscope results to the database 345 of FIG. 3. The example workscope quantifier analyzer 4915 can direct one or more of a historical data model 450, a physics-based model 452, a stochastic model 454, or a hybrid model 456 to use the workscope results from the database 345 to calculate an AHQ of the engine 102 of FIG. 1. In response to the one or more models 450, 452, 454, 456 being directed to use the results from the database 345, the one or more models 450, 452, 454, 456 can generate the model inputs 335. For example, the workscope quantifier analyzer 4915 can obtain the model inputs 335 based on executing one or more of the historical data model 450, the physics-based model 452, the stochastic model 454, the hybrid model 456, etc., using the workscope results. In such an example, the workscope quantifier analyzer 4915 can use the model inputs 335 that are the most restrictive or the workscope quantifier analyzer 4915 can use an average of one or more of the model inputs 335 to generate an AHQ of an asset.

In some examples, the workscope quantifier analyzer 4915 directs or uses the historical data model 450 to generate the model inputs 335. For example, the workscope quantifier analyzer 4915 can use the historical data model 450 to generate the model inputs 335 prior to the engine 102 being returned to service. For example, the historical data model 450 can be a regression model or any other type of statistical model using asset monitoring information (e.g., historical asset monitoring information, etc.) based on the inputs 325, information stored in the database 345, the workscope results from the workscope quantifier analyzer 4915, etc. For example, the historical data model 450 can generate the model inputs 335 by performing a statistical analysis on previous workscope operations.

In some examples, the historical data model 450 obtains information corresponding to assets similar in asset configuration, asset class, environment, utilization, etc., to the engine 102. For example, the historical data model 450 can generate metrics and quantifiers that can be applied to the engine 102. For example, the historical data model 450 can calculate a percentage of useful life remaining, a quantity of flight cycles remaining, a quantity of TOW hours remaining, etc., for the engine 102 based on how similar assets (e.g., assets with a substantially similar asset configuration, asset class history, etc.) have previously performed (e.g., previously performed after completing a similar workscope, etc.). For example, the historical data model 450 can be a regression model (e.g., a linear regression model, an exponential regression model, etc.) corresponding to a correlation or a relationship between an AHQ of the engine 102 such as a quantity of TOW hours and a severity factor, where the regression model is determined based on previously collected data on substantially similar turbine engines.

In some examples, the workscope quantifier analyzer 4915 uses the physics-based model 452 to generate the model inputs 335 using the workscope results. For example, the physics-based model 452 of the engine 102 can include one or more vibration models, stress models, thermo-mechanical models, aero-thermal models, aero-mechanical models, etc., of one or more sensors, asset components, etc., of the engine 102. For example, the workscope quantifier analyzer 4915 can use the physics-based model 452 to generate the model inputs 335 prior to the engine 102 being returned to service.

In some examples, the physics-based model 452 is a digital twin model of the engine 102. For example, the digital twin model can simulate physics behavior, a thermodynamic health, a performance health, etc., of the engine 102 using asset monitoring information based on the inputs 325, information stored in the database 345, the workscope results from the workscope quantifier analyzer 4915, etc. For example, the physics-based model 452 can simulate inputs and outputs of the sensors 144, 146 of FIGS. 1-2 of the engine 102 to generate an AHQ based on the workscope results. For example, the physics-based model 452 can be a digital twin model of the engine 102 of FIG. 1 that can calculate an AHQ of the booster compressor 114 of FIG. 1 such as a quantity of TOW hours based on (1) a completed workscope on the booster compressor 114 (e.g., one or more components of the booster compressor 114 have been replaced, serviced, etc.) and (2) a severity factor. For example, the digital twin model can generate the AHQ with improved accuracy based on more accurately characterizing a health of the booster compressor 114 as a result of the completed workscope on the booster compressor 114.

In some examples, the physics-based model 452 can simulate an operability of the engine 102 (e.g., an efficiency of the engine 102, etc.), a durability of the engine 102 (e.g., a mechanical stress on the fan section 108, the booster compressor 114, etc.), etc., based on simulating the engine 102 executing one or more flight cycles, flight legs, flight operations, etc. Thus, by evaluating and extrapolating from the physics-based model 452, engine performance characteristics can be identified and evaluated, and behavior and other outcomes associated with the asset (e.g., the engine 102, etc.) can be modeled and predicted, for example. For example, the workscope quantifier analyzer 4915 can extrapolate the model inputs 335 of FIG. 3 obtained from the physics-based model 452 to forecast and/or otherwise predict future issues likely to arise corresponding to the engine 102 because of the characteristics of the engine 102, a utilization of the engine 102, an operating environment of the engine 102, etc., after a completion of the workscope.

For example, the physics-based model 452 can be a digital twin model of the engine 102 of FIG. 1 that can calculate a forecast or a predictive AHQ of the booster compressor 114 of FIG. 1 such as a quantity of TOW hours based on (1) a completed workscope on the booster compressor 114 (e.g., one or more components of the booster compressor 114 have been replaced, serviced, etc.) and (2) an environmental factor such as an airborne particulate matter size. For example, the physics-based model 452 can generate a predictive quantity of TOW hours for the recently serviced booster compressor 114 based on an upcoming schedule of flight cycles in an environment with an airborne particulate matter size of 0.1 micrometers, an average ambient temperature of 30 degrees Celsius, etc., and/or a combination thereof. By determining the predictive quantity of TOW hours based on an effect of a forecast utilization or environmental plan on the degradation of the booster compressor 114, the workscope quantifier analyzer 4915 can generate a recommended workscope including the next maintenance operation of the booster compressor 114 as the number of actual TOW hours approaches the predictive quantity of TOW hours.

In some examples, the workscope quantifier analyzer 4915 uses the stochastic model 454 to generate metrics based on estimating probability distributions of potential outcomes by allowing for random variation in one or more inputs over time. For example, the workscope quantifier analyzer 4915 can use the stochastic model 454 to generate the model inputs 335 prior to the engine 102 being returned to service. In some examples, the stochastic model 454 generates the random variation based on fluctuations observed in historical data (e.g., the model inputs 335 based on the historical data model 450, etc.), the asset monitoring information based on the inputs 325, the workscope results from the workscope quantifier analyzer 4915, etc., for a selected time period using time-series techniques. For example, the stochastic model 454 can calibrate the random variation to be within limits set forth by the outputs from the historical data model 450. In some examples, the stochastic model 454 includes generating continuous probability distributions (e.g., Weibull distributions, reliability curves, etc.) to determine a distribution of failure rates over time due to one or more asset components. For example, the stochastic model 454 can generate a failure rate of the engine 102 based on determining failure rates for the fan section 108, the booster compressor 114, etc., of the engine 102.

For example, the stochastic model 454 can be a Weibull distribution corresponding to the engine 102 of FIG. 1 that can calculate an unreliability value or a failure rate as a function of time for the fan section 108, the booster compressor 114, the combustor 118, etc. For example, the stochastic model 454 can map an instant TOW of the combustor 118 to the Weibull distribution to generate a predictive failure rate at the instant TOW. By determining the predictive failure rate at the instant TOW of the combustor 118, the workscope quantifier analyzer 4915 can generate a recommended workscope including the next maintenance operation of the combustor 118 as the failure rate increases as the instant TOW increases.

In some examples, the workscope quantifier analyzer 4915 uses the hybrid model 456 to generate the model inputs 335 using one or more of the historical data model 450, the physics-based model 452, and the stochastic model 454 of FIG. 49 based on the workscope results. For example, the workscope quantifier analyzer 4915 can use the hybrid model 456 to generate the model inputs 335 prior to the engine 102 being returned to service. For example, the hybrid model 456 can be the stochastic model 454 in which the outputs from the stochastic model 454 are compared to the physics-based model 452 and the outputs are adjusted based on the comparison. In another example, the hybrid model 456 can be the stochastic model 454 in which the outputs from the stochastic model 454 can be compared to the historical data model 450 and the outputs are adjusted or calibrated based on the comparison.

In some examples, the workscope quantifier analyzer 4915 calculates an actual AHQ of an asset component based on actual AHQ of sub-components of the asset component prior to the engine 102 being returned to service. For example, the workscope quantifier analyzer 4915 can calculate an actual AHQ for the fan section 108 of FIG. 1 based on calculating an actual AHQ for sub-components of the fan section 108 based on the model inputs 335. For example, the workscope quantifier analyzer 4915 can calculate an actual AHQ of sub-components such as a fan blade, a bearing, a speed sensor, etc., of the fan section 108 by executing the physics-based model 452 of the engine 102. In such an example, the workscope quantifier analyzer 4915 can generate an actual AHQ of the fan section 108 based on calculating an average (e.g., a weighted average, etc.) of the actual AHQ of the fan blade, the bearing, the speed sensor, etc., of the fan section 108. In some examples, the workscope quantifier analyzer 4915 can rank the actual AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the workscope quantifier analyzer 4915 calculates projected AHQ based on the model inputs 335. In some examples, the projected AHQ represents what an actual AHQ of an asset component can be based on forecast operating conditions. For example, the workscope quantifier analyzer 4915 can calculate a projected AHQ for the booster compressor 114 of FIG. 1 based on an actual AHQ for the booster compressor 114 and generating the model inputs 335 based on a forecast utilization and environment plan obtained from the database 345. In some examples, the forecast utilization and environment plan corresponds to future utilization (e.g., a number of flight cycles, flight legs, operation hours, etc.) and environmental parameters (e.g., an ambient temperature range of 25-40 degrees Celsius, a salt atmosphere percentage range of 15-35%, etc.) to be endured by the engine 102 in future operations.

For example, the workscope quantifier analyzer 4915 can calculate the projected AHQ of the booster compressor 114 by calculating a change in the actual AHQ over time based on the forecast utilization and environment plan. For example, the workscope quantifier analyzer 4915 can calculate a projected AHQ of 30% useful life remaining for the booster compressor 114 based on (1) an actual AHQ of 70% useful life remaining of the booster compressor 114 and (2) executing one or more of the models 450, 452, 454, 456 for an additional 500 flight cycles in a geographic region in which ambient temperatures range from 25-40 degrees Celsius and salt atmosphere percentages range of 15-35%. For example, the workscope quantifier analyzer 4915 can input the above-described parameters into the TOW severity model generation system 5300 of FIG. 53A to calculate an estimated AHQ of useful life remaining as a result of the engine 102 executing the additional 500 flight cycles.

In some examples, the workscope quantifier analyzer 4915 calculates a projected AHQ of an asset component based on a projected AHQ of sub-components of the asset component. For example, the workscope quantifier analyzer 4915 can calculate a projected AHQ for the fan section 108 of FIG. 1 based on calculating a projected AHQ for sub-components of the fan section 108 based on the model inputs 335. For example, the workscope quantifier analyzer 4915 can calculate a projected AHQ of sub-components such as a fan blade, a bearing, a speed sensor, etc., of the fan section 108 by executing the physics-based model 452 of the engine 102. In such an example, the workscope quantifier analyzer 4915 can generate a projected AHQ of the fan section 108 based on calculating an average (e.g., a weighted average, etc.) of the projected AHQ of the fan blade, the bearing, the speed sensor, etc., of the fan section 108. In some examples, the workscope quantifier analyzer 4915 can rank the projected AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the workscope quantifier analyzer 4915 calculates the workscope quantifier by calculating a difference between the post-workscope AHQ and the pre-workscope AHQ, and compares the workscope quantifier to the workscope quantifier threshold. In some examples, the pre-workscope AHQ is an estimate AHQ of an asset based on estimating what the AHQ for the asset can be in response to performing a specified workscope on the asset. By comparing a post-workscope AHQ of the engine 102 to the pre-workscope AHQ of the engine 102, the example workscope quantifier analyzer 4915 can evaluate an accuracy or an efficiency of the AWGS 220 in improving an operating condition of the engine 102. For example, the workscope quantifier analyzer 4915 can compare (1) an estimate AHQ of 95% useful life remaining of the engine 102 based on a prediction of the asset health after completing a workscope to (2) an actual AHQ of 80% useful life remaining after the workscope has been completed on the engine 102. For example, the workscope quantifier analyzer 4915 can determine that a significantly large difference (e.g., 10%, 25%, 40%, etc.) between the estimate AHQ and the actual AHQ represents that one or more components of the AWGS 220 of FIGS. 2-3 can be improved to generate more accurate estimate AHQ.

In some examples, the workscope quantifier analyzer 4915 calculates the workscope quantifier based on comparing the post-workscope AHQ to the pre-workscope AHQ. In some examples, the workscope quantifier corresponds to a measure of how accurate an estimation, a prediction, etc., capability of the AWGS 220 is in determining how completing a workscope affects a health, an operating condition, etc., of an asset. For example, the workscope quantifier analyzer 4915 can calculate a workscope quantifier of 15% by calculating a difference between the estimate AHQ of 95% useful life remaining and the actual AHQ of 80% useful life remaining (e.g., 15%=95%−80%, etc.).

In some examples, the workscope quantifier analyzer 4915 compares a workscope quantifier to a workscope quantifier threshold and determines whether the workscope quantifier threshold has been satisfied based on the comparison. In some examples, the workscope quantifier threshold corresponds to whether the AWGS 220 is generating one or more AHQ of the asset that track an actual health, a projected health, etc., of the asset within a tolerance (e.g., within 1%, 5%, 10%, etc., of the actual health, the projected health, etc.). For example, the workscope quantifier analyzer 4915 can compare the workscope quantifier of 15% to a workscope quantifier threshold of 10% and determine that the workscope quantifier threshold has been satisfied based on the workscope quantifier being greater than the workscope quantifier threshold. For example, the workscope quantifier analyzer 4915 can determine that the AWGS 220 is not calculating one or more AHQ that tracks the actual health, the projected health, etc., of an asset within a tolerance.

In the illustrated example of FIG. 49, the WEC 315 includes the system updater 4920 to determine whether to optimize, update, and/or otherwise improve the AWGS 220 based on the operator behavior, a workscope quantifier, etc. In some examples, the system updater 4920 can direct the AWGS 220 of FIGS. 2-3 to modify one or more components of the AWGS 220 to optimize and/or otherwise improve workscope recommendations based on the operator behavior.

In some examples, the system updater 4920 directs the AWGS 220 to update based on the operator behavior. For example, the system updater 4920 can direct the AWGS 220 to update or modify the one or more models 450, 452, 454, 456, update one or more parameters corresponding to a maintenance task included in the task information 350 of FIG. 3 to be used by the task generator 305 of FIG. 3, improve an optimization parameter to be used by the task optimizer 310 for evaluating generated workscopes, etc., and/or a combination thereof to meet a current operator behavior (e.g., an instant operator behavior, an observed operator behavior, etc.), a forecasted operator behavior, etc. For example, the system updater 4920 can direct the AWGS 220 to update the physics-based model 452 to be based on a takeoff de-rate parameter used by the operator. In such an example, the AWGS 220 can generate AHQ of assets owned by the operator based on the takeoff de-rate parameter used by the operator to generate improved workscope recommendations for the assets.

In some examples, the system updater 4920 directs the AWGS 220 to updated based on comparing a workscope quantifier to a workscope quantifier threshold. For example, the system updater 4920 can be used to optimize and/or otherwise improve a predictability of turbine engine maintenance management recommendations of the AWGS 220 based on determining whether the workscope quantifier threshold has been satisfied. For example, in response to determining that the workscope quantifier has been satisfied, the system updater 4920 can direct the AWGS 220 to update or modify the one or more models 450, 452, 454, 456, update one or more parameters corresponding to a maintenance task included in the task information 350 of FIG. 3 to be used by the task generator 305 of FIG. 3, improve an optimization parameter to be used by the task optimizer 310 for evaluating generated workscopes, etc., and/or a combination thereof.

While an example implementation of the WEC 315 of FIG. 3 is illustrated in FIG. 49, one or more of the elements, processes and/or devices illustrated in FIG. 49 may be combined, divided, re-arranged, omitted, eliminated and/or implemented in any other way. Further, the example collection engine 4900, the example performance model analyzer 4905, the example severity model analyzer 4910, the example workscope quantifier analyzer 4915, the example system updater 4920, and/or, more generally, the example WEC 315 of FIG. 3 may be implemented by hardware, software, firmware and/or any combination of hardware, software and/or firmware. Thus, for example, any of the example collection engine 4900, the example performance model analyzer 4905, the example severity model analyzer 4910, the example workscope quantifier analyzer 4915, the example system updater 4920, and/or, more generally, the example WEC 315 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 4900, the example performance model analyzer 4905, the example severity model analyzer 4910, the example workscope quantifier analyzer 4915, and/or the example system updater 4920 is/are hereby expressly defined to include a non-transitory computer readable storage device or storage disk such as a memory, a digital versatile disk (DVD), a compact disk (CD), a Blu-ray disk, etc. including the software and/or firmware. Further still, the example WEC 315 of FIG. 3 may include one or more elements, processes and/or devices in addition to, or instead of, those illustrated in FIG. 49, and/or may include more than one of any or all of the illustrated elements, processes and devices.

Figure 50:
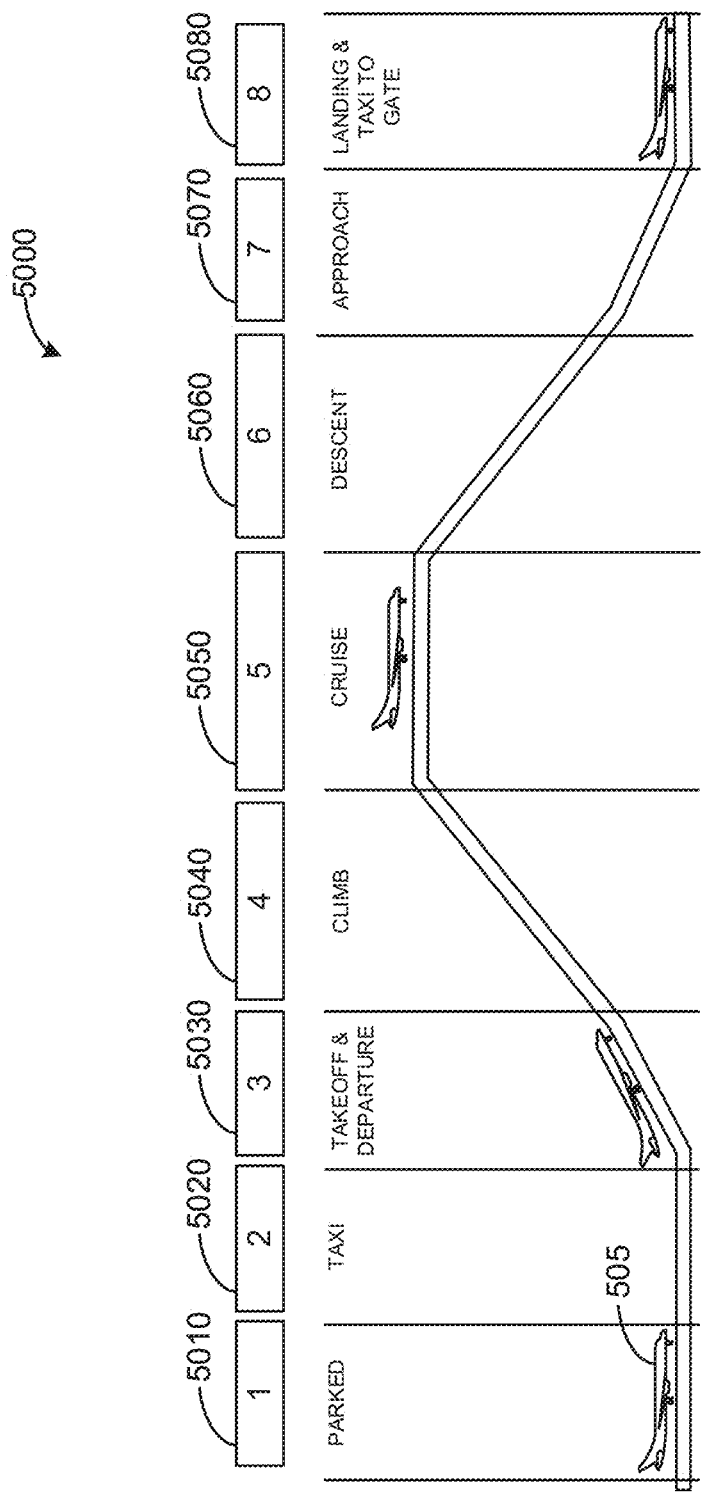
FIG. 50 is a schematic illustration of example flight segments in which the turbine engine of FIG. 1 can be used.

FIG. 50 is a schematic illustration of example flight segments of a flight route 5000 in which the turbine engine 102 of FIG. 1 can be used. In the illustrated example, the engine 102 can be coupled to an aircraft 5005. The flight route 5000 of the illustrated example includes a parked flight segment 5010, a taxi flight segment 5020, a takeoff and departure flight segment 5030, a climb flight segment 5040, a cruise flight segment 5050, a descent flight segment 5060, an approach flight segment 5070, and a landing and taxi to gate flight segment 5080. Alternatively, there may be fewer or more flight segments in the flight route 5000.

In the example flight route 5000, the engine 102 can be de-rated during one or more of the flight segments. For example, the engine 102 can be de-rated from a rated maximum capacity when the aircraft 5005 is in the takeoff and departure flight segment 5030 to conserve fuel, to improve TOW, and to reduce maintenance costs. For example, the engine 102 can be operated using a takeoff de-rate of 25% during the takeoff and departure flight segment 5030. In another example, the engine 102 can be operated at the rated maximum capacity when the aircraft 5005 is in the takeoff and departure flight segment 5030. For example, the engine 102 can be operated using a takeoff de-rate of 0% to reduce the time to get to the cruise flight segment 5050.

In some examples, the engine 102 is operated using a takeoff de-rate of 0% during long-haul flights because de-rating the engine 102 during the cruise flight segment 5050 can generate greater benefits (e.g., improved fuel consumption, reduced maintenance costs, prolonged engine health, etc.) than drawbacks of not de-rating the engine 102 during the takeoff and departure flight segment 5030. For example, efficiently operating the engine 102 (e.g., using a de-rate parameter of 25%, 40%, etc.) during the cruise flight segment 5050 for a relatively long period of time (e.g., a long-haul international flight, etc.) can outweigh the drawbacks of inefficiently operating the engine 102 (e.g., using a de-rate parameter of 0%, etc.) during the takeoff and departure flight segment 5030 for a relatively short period of time.

FIG. 51A is a schematic illustration of an example performance reference model 5100. The performance reference model 5100 of the illustrated example includes statistical information corresponding to a fleet of operators including operators A, B, C, D, and E operating turbine engines such as the engine 102 of FIG. 1. For example, the performance model analyzer 4905 can direct the historical data model 450 of FIG. 49 to generate the performance reference model 5100 by determining an operator behavior parameter such as engine de-rate as a function of an engine performance characteristic (e.g., a characteristic that impacts a performance, an operation, etc., of a turbine engine) such as aircraft weight. In the illustrated example, an x-axis 5102 of the performance reference model 5100 corresponds to aircraft weight values scaled from zero to one. In the illustrated example, a y-axis 5104 of the performance reference model 5100 corresponds to engine de-rate values scaled from zero to one. Alternatively, the x-axis 5102 and/or the y-axis 5104 may be scaled using any other range of values. The example performance model analyzer 4905 can direct the historical data model 450 to generate the performance reference model 5100 by mapping the historical data engine de-rate parameters to aircraft weight for operators A, B, C, D, and E.

In the illustrated example of FIG. 51A, the performance model analyzer 4905 can generate fleet behavior parameters 5106 corresponding to an average of historical data de-rate parameters for the operators A, B, C, D, and E as a function of aircraft weight. Alternatively, the example performance model analyzer 4905 can generate fleet behavior parameters 5106 corresponding to a median, a weighted average, etc., of historical data de-rate parameters for the operators A, B, C, D, and E as a function of aircraft weight.

In the illustrated example of FIG. 51A, the performance model analyzer 4905 generates a physics-based performance reference model 5108 (long dashed-lines). For example, the performance model analyzer 4905 can generate the physics-based performance reference model 5108 by directing the physics-based model 452 of FIG. 49 to simulate a de-rate parameter as a function of aircraft weight by executing a digital twin model of the asset. In such an example, the performance model analyzer 4905 can direct the physics-based model 452 to hold one or more severity factors constant (e.g., a fixed aircraft weight, a fixed airport elevation, a fixed airborne particulate matter exposure, a fixed airport contamination, one or more fixed weather conditions, etc.). In some examples, the physics-based performance reference model 5108 corresponds to a baseline, an optimal, a turbine engine manufacturer specified, etc., engine de-rate operator behavior as a function of aircraft weight. In some examples, the performance model analyzer 4905 calculates a difference between the performance reference model 5100 based on historical information and the physics-based performance reference model 5108 to determine whether an operator is performing better or worse than the physics-based performance reference model 5108.

Figure 51B:
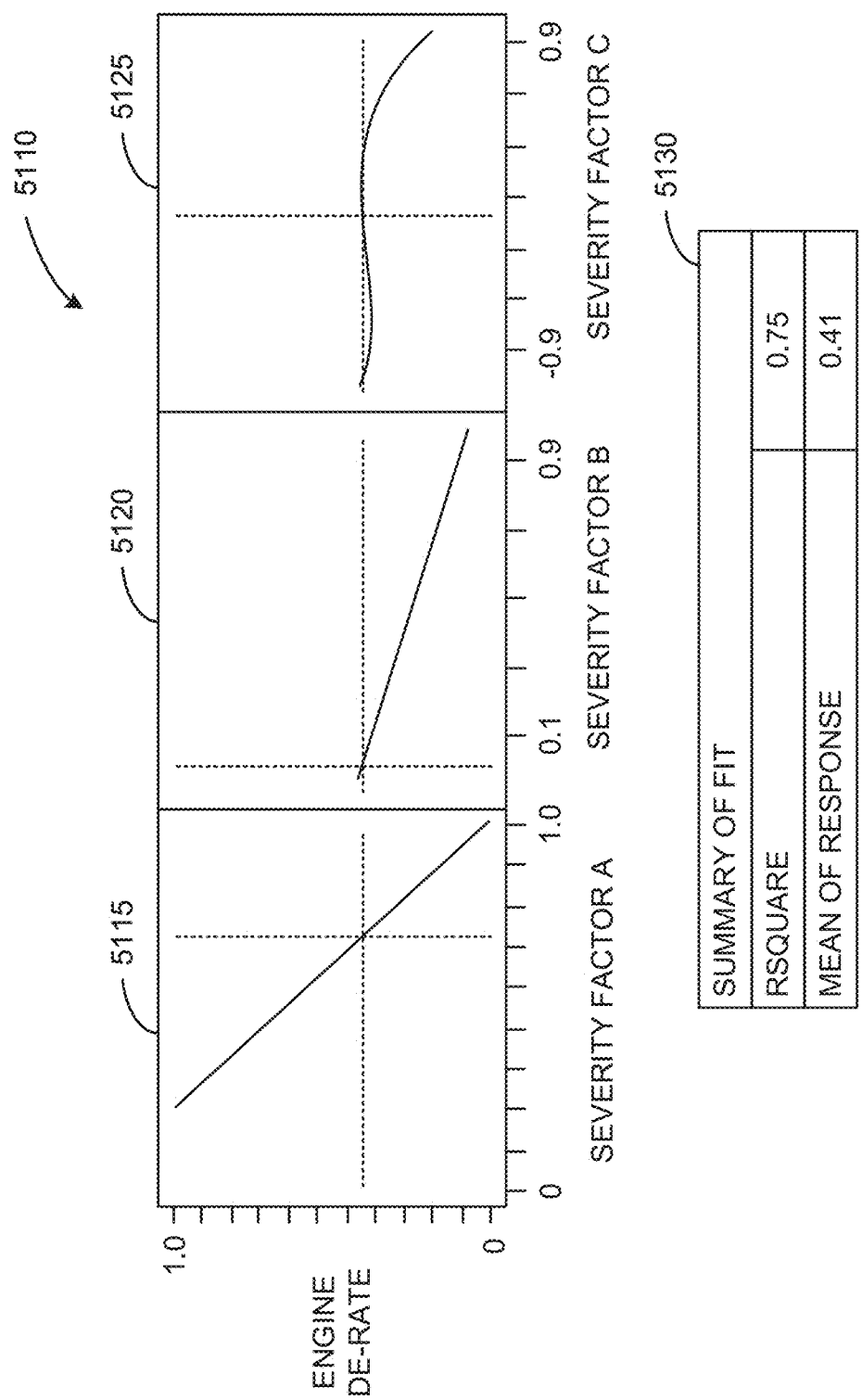
FIG. 51B is a schematic illustration of an example regression reference model corresponding to an operator behavior as a function of a first example severity factor, a second example severity factor, and a third example severity factor.

FIG. 51B is a schematic illustration of an example regression reference model 5110 corresponding to an operator behavior such as engine de-rate (e.g., takeoff de-rate, land-based turbine engine de-rate, etc.) as a function of a first example severity factor A, a second example severity factor B, and a third example severity factor C. In the illustrated example of FIG. 51B, the regression reference model 5110 is a multi-variable regression model that includes statistical information corresponding to a fleet of operators operating turbine engines such as the engine 102 of FIG. 1. In the illustrated example of FIG. 51B, the performance model analyzer 4905 generates the regression reference model 5110 using historical data. For example, the performance model analyzer 4905 can direct the historical data model 450 to generate the regression reference model 5110 based on or in response to the collection engine 4900 obtaining engine de-rate behavior from the fleet of operators operating turbine engines. In response to generating the example regression reference models 5110, the example performance model analyzer 4905 can use the regression reference model 5110 to analyze engine de-rate behavior of an operator when the operator experiences or is subject to one or more severity factors.

In the illustrated example of FIG. 51B, the regression reference model 5110 includes a first mapping 5115 of engine de-rate behavior to severity factor A. For example, the first mapping 5115 can include a mapping of engine de-rate behavior of the engine 102 to a severity factor such as an aircraft weight of an aircraft to which the engine 102 is installed, an airport elevation, an ambient temperature, etc., based on historical information. In the illustrated example of FIG. 51B, the regression reference model 5110 includes a second mapping 5120 of engine de-rate behavior to severity factor B. For example, the second mapping 5120 can include a mapping of engine de-rate behavior of the engine 102 to a severity factor such as an aircraft weight, an airport elevation, an ambient temperature, etc. In the illustrated example of FIG. 51B, the regression reference model 5110 includes a third mapping 5125 of engine de-rate behavior to severity factor C. For example, the third mapping 5125 can include a mapping of engine de-rate behavior of the engine 102 to a severity factor such as an aircraft weight, an airport elevation, an ambient temperature, etc.

In the illustrated example of FIG. 51B, the regression reference model 5110 can be characterized or represented by an example summary of fit table 5130. For example, the performance model analyzer 4905 can determine to use the regression reference model 5110 based on the fit of the data in first through the third mappings 5115, 5120, 5125 to the regression reference model 5110. For example, the performance model analyzer 4905 can determine to use the regression reference model 5110 when the rsquare value is greater than an rsquare value threshold. For example, the summary of fit table 5130 can correspond to the first mapping 5115. For example, the rsquare value of 0.75 can represent that 75% of the variation in the engine de-rate values included in the first mapping 5115 can be represented by the regression reference model 5110. In another example, the mean of response value of 0.41 can represent the mean engine de-rate parameter value of the first mapping 5115.

Figure 51C:
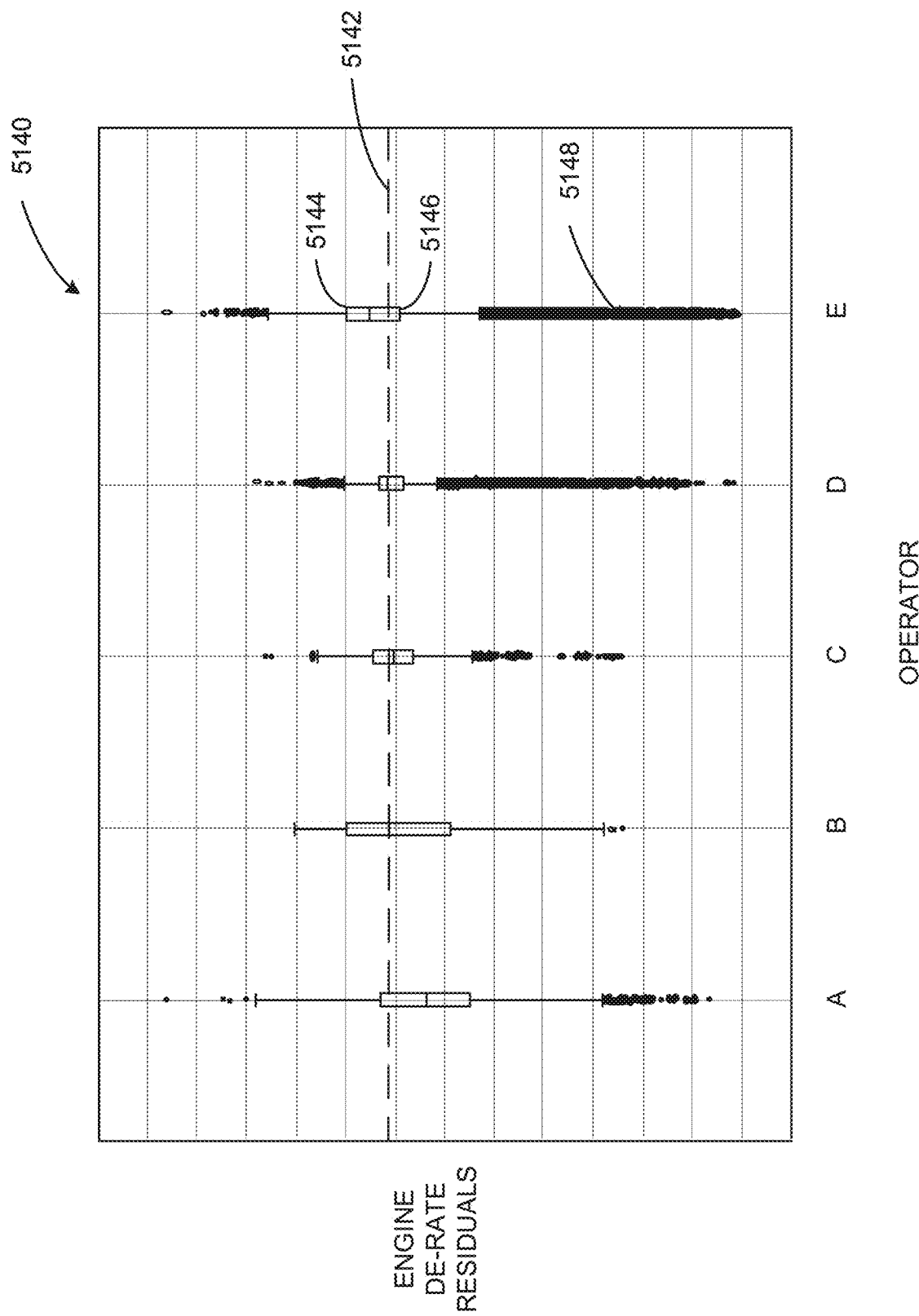
FIG. 51C is a schematic illustration of an example residual model that is used to identify opportunities to improve operator behavior.

FIG. 51C is a schematic illustration of an example residual performance model 5140. In some examples, the performance model analyzer 4905 generates the residual performance model 5140 by comparing the actual, the instant, etc., operator behavior parameters of the operators A, B, C, D, and E to a fleet behavior parameter in a reference model. In the illustrated example of FIG. 51C, the performance model analyzer 4905 generates the residual performance model 5140 by calculating a difference between the actual engine de-rate operator behavior parameter of the operators A, B, C, D, and E and de-rate operator behavior corresponding to the physics-based performance reference model 5108 in the performance reference model 5100 of FIG. 51A. Alternatively, the example performance model analyzer 4905 can generate the residual performance model 5140 by calculating a difference between the actual engine de-rate operator behavior parameter of the operators A, B, C, D, and E and the fleet engine de-rate operator behavior parameter in the regression reference model 5110 of FIG. 51B for the fleet of operators that includes the operators A, B, C, D, and E.

In the illustrated example of FIG. 51C, the performance model analyzer 4905 calculates a baseline value 5142 (solid-dashed line) based on determining a mean difference, a median difference, etc., between an actual operator behavior parameter value and a reference operator behavior parameter value. For example, the baseline value 5142 can correspond to a median difference between an actual fleet engine de-rate behavior and the fleet engine de-rate behavior included in the regression reference model 5110 of FIG. 51B. In the illustrated example of FIG. 51C, the performance model analyzer 4905 determines a 75% median value 5144 and a 25% median value 5146. For example, the 75% median value 5144 can correspond to a top 25% of assets operated by an operator where the corresponding operator behavior is above the baseline value 5142. In another example, the 25% median value 5146 can correspond to a bottom 25% of assets operated by an operator where the corresponding operator behavior is below the baseline value 5142.

In the illustrated example of FIG. 51C, the performance model analyzer 4905 generates recommendations to improve an engine de-rate behavior of an operator by analyzing the comparison between the actual engine de-rate operator behavior parameter and the reference engine de-rate operator behavior parameter. For example, the performance model analyzer 4905 can determine an adjusted operator behavior parameter for an operator when the operator is identified as a candidate improvement target. For example, operator E includes underperforming assets 5148 below the baseline value 5142 (e.g., below the fleet average, etc.). For example, the performance model analyzer 4905 can generate a recommendation to operator E to adjust an operator behavior parameter (e.g., to use an adjusted operator behavior parameter, etc.) such as a engine de-rate operator behavior parameter, a climb de-rate operator behavior parameter, a turbine engine taper schedule, etc., used by the operator E to improve the performance of the underperforming assets 5148 and decrease a difference between the operator E behavior and the operator fleet including the operators A, B, C, D, and E.

Figure 51D:
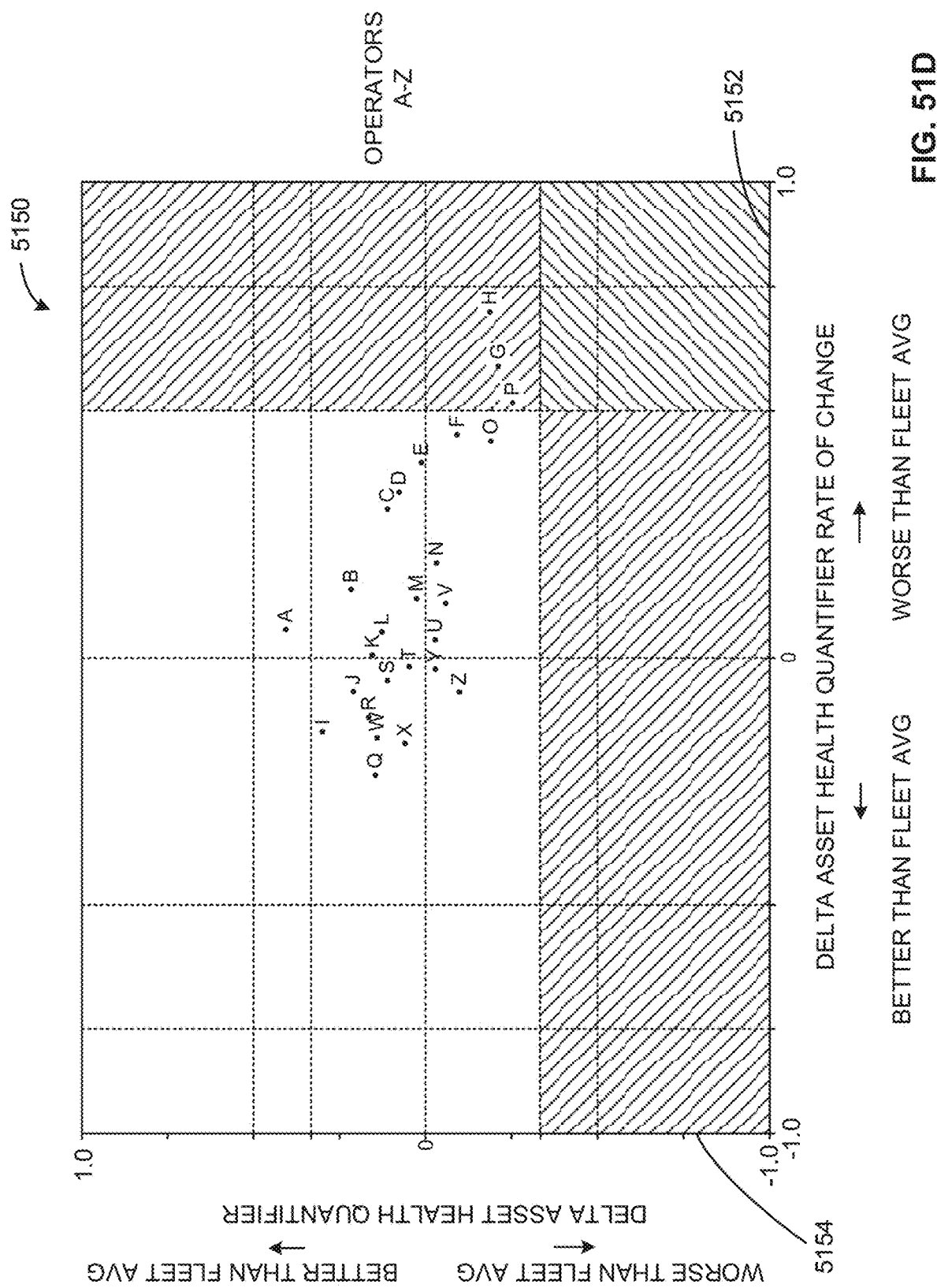
FIG. 51D is a schematic illustration of an example asset health quantifier (AHQ) performance model.

FIG. 51D is a schematic illustration of an example asset health quantifier (AHQ) performance model 5150 including statistical information corresponding to a fleet of operators including operators A-Z operating turbine engines such as the engine 102 of FIG. 1. In the illustrated example of FIG. 51D, the AHQ performance model 5150 maps a delta asset health quantifier value to a delta asset health quantifier rate of change value. In the illustrated example of FIG. 51D, an x-axis 5152 of the AHQ performance model 5150 corresponds to delta AHQ rate of change values scaled from zero to one. For example, the delta AHQ rate of change value can correspond to a change of an AHQ over time. In the illustrated example, a y-axis 5154 of the AHQ performance model 5150 corresponds to delta AHQ values scaled from zero to one. Alternatively, the x-axis 5152 and/or the y-axis 5154 may be scaled using any other range of values.

For example, the delta asset health quantifier rate of change value represented by the x-axis 5152 can correspond to a difference between (1) an exhaust gas-path temperature hot day margin (EGTHDM) rate of change value (e.g., a mean EGTHDM rate of change value, a median EGTHDM rate of change value, etc.) for an operator and (2) a fleet-level EGTHDM rate of change value (e.g., a mean fleet-level EGTHDM rate of change value, a median fleet-level EGTHDM rate of change value, etc.) based on the performance reference model 5100 of FIG. 51A, the regression reference model 5110 of FIG. 51B, etc. In another example, the delta asset health quantifier value can correspond to a difference between (1) an EGTHDM value (e.g., a mean EGTHDM value, a median EGTHDM value, etc.) for an operator and (2) a fleet-level EGTHDM value (e.g., a mean fleet-level EGTHDM value, a median fleet-level EGTHDM value, etc.) based on the performance reference model 5100 of FIG. 51A, the regression reference model 5110 of FIG. 51B, etc.

In the illustrated example of FIG. 51D, the performance model analyzer 4905 can use the AHQ performance model 5150 to generate a recommendation to optimize and/or otherwise improve an operator behavior corresponding to operating an asset of the operator. In the illustrated example of FIG. 51D, the performance model analyzer 4905 can determine that operators G, H, and P are using asset behaviors that are detrimental to an AHQ (e.g., an EGTHDM AHQ, etc.) of assets owned by the operators G, H, and P. For example, the performance model analyzer 4905 can identify the operators G, H, and P as candidate improvement targets based on the AHQ performance model 5150. For example, the performance model analyzer 4905 can determine that the operator P has a worse than fleet average AHQ rate of change value based on the AHQ rate of change values of assets owned by operator P being approximately more than 0.5 delta away from the fleet average. In another example, the performance model analyzer 4905 can determine that the operator P has a worse than fleet average AHQ based on the AHQ of the assets owned by operator P being approximately more than 0.25 delta away from the fleet average. Alternatively, the example performance model analyzer 4905 can determine that the operator A has a better than fleet average AHQ, operator Q has a better than fleet average AHQ rate of change value, etc.

FIG. 52 is an example alert dashboard 5200 including recommendations to optimize and/or otherwise improve operator asset behavior. The example alert dashboard 5200 represents a snapshot of potential actions for one or more operators in a fleet of operators. The example alert dashboard 5200 represents a fleet management tool based on determined information from one or more performance models. For example, the performance model analyzer 4905 can generate the alert dashboard 5200. In the illustrated example of FIG. 52, the performance model analyzer 4905 can use the alert dashboard 5200 to generate recommendations for a fleet of operators including operators A-E based on changes corresponding to operator behavior A 5202, operator behavior A (change) 5204, operator behavior B 5206, operator behavior B (change) 5208, severity factor A (change) 5210, and asset health quantifier 5212. Alternatively, there may be fewer or more operators, operator behaviors, severity factors, and/or asset health quantifiers than depicted in FIG. 52.

In the illustrated example of FIG. 52, the performance model analyzer 4905 can use an up-arrow symbol 5214 or a down-arrow symbol 5216 to represent an identification of a change in a condition corresponding to an operator relative to the operator over time. In the illustrated example of FIG. 52, the performance model analyzer 4905 assigns the up-arrow symbol 5214 to operator B in the operator behavior A (change) 5204 column to identify that operator B has improved corresponding to operator behavior A at a first time period compared to a second time period, where the first time period is after the second time period. For example, the up-arrow 5214 can correspond to operator B improving over time corresponding to operator behavior A.

In the illustrated example of FIG. 52, the performance model analyzer 4905 can use a circle symbol 5218 to represent an identification of a sub-optimal condition corresponding to an operator compared with the fleet of operators. In the illustrated example of FIG. 52, the performance model analyzer 4905 assigns the circle symbol 5218 to operator C to identify that operator C has a worse than fleet average value corresponding to operator behavior A 5202. In some examples, the performance model analyzer 4905 assigns the circle symbol 5218 to an operator to identify the operator as a candidate improvement target in response to comparing an operator behavior parameter (e.g., the operator behavior A 5202, the operator behavior B 5206, etc.) of the operator to the fleet of operators. In some examples, the performance model analyzer 4905 uses the circle symbol 5218 to represent actions that can be triggered corresponding to an operator such as generating a recommendation, a report, adjusting or generating a workscope, etc., based on identifying the operator as a candidate improvement target.

In the illustrated example of FIG. 52, operator behavior A 5202 can correspond to an operator behavior such as a percentage of climb overrides. For example, the performance model analyzer 4905 can analyze the percentage of climb overrides to identify which operators can benefit from reducing climb de-rate overrides based on obtained asset monitoring information. For example, the performance model analyzer 4905 can assign the circle symbol 5218 to operator C to identify operator C as an operator that overrides the standard climb de-rate parameter more than a specified percentage of duty cycles (e.g., more than 20%, 30%, 40%, etc., of the time, etc.). For example, the performance model analyzer 4905 can identify operator C as a candidate improvement target based on comparing the operator behavior A 5202 of operator C compared to the fleet of operators. In such an example, in response to identifying operator C as a candidate improvement target, the performance model analyzer 4905 can generate an alert, a recommendation, a report including the alert and/or the recommendation, etc., to improve operator behavior A 5202 corresponding to operator C. In some examples, the performance model analyzer 4905 generates (e.g., automatically generates, etc.) a workscope or a workscope recommendation for one or more assets attributed to operator C in response to identifying operator C as a candidate improvement target based on the operator behavior.

In the illustrated example of FIG. 52, the operator behavior A (change) column 5204 corresponds to a change in operator behavior A 5202 for an operator relative to the operator over time. For example, the performance model analyzer 4905 can determine whether an operator improved or declined corresponding to operator behavior A 5202 over time. For example, the performance model analyzer 4905 can identify an improvement (e.g., by assigning the up arrow 5214, etc.) or a decline (e.g., by assigning the down arrow 5216) corresponding to operator behavior A 5202. In the illustrated example of FIG. 52, the performance model analyzer 4905 assigns an up arrow 5214 to operator B corresponding to operator behavior A (change) 5204. For example, the performance model analyzer 4905 can determine that operator B improved corresponding to climb de-rate override behavior over time (e.g., reduced a percentage of climb de-rate overrides over a 6-month period, a 1-year period, a 3-year period, etc.).

In the illustrated example of FIG. 52, the operator behavior B 5206 corresponds to a quantifiable operator behavior. For example, operator behavior B 5206 can correspond to an engine de-rate behavior, an engine takeoff de-rate behavior, etc. In the illustrated example of FIG. 52, operator behavior B (change) 5208 corresponds to a change in operator behavior B 5208 for an operator relative to the operator over time.

In the illustrated example of FIG. 52, the severity factor A (change) 5210 corresponds to a change in a severity factor experienced by an operator relative to the operator over time. For example, the severity factor A (change) 5210 can correspond to a change in engine temperature, airborne particulate matter exposure, etc., experienced by assets of an operator over time. In the illustrated example of FIG. 52, the performance model analyzer 4905 assigns an up arrow 5216 to operators D and E. For example, the severity factor A can correspond to engine temperature of assets corresponding to operators A-E. For example, the performance model analyzer 4905 can determine that operator D has improved corresponding to engine temperature of assets operated by operator D. For example, the performance model analyzer 4905 can determine that an engine temperature (e.g., a mean engine temperature, a median engine temperature, etc.) corresponding to assets operated by operator D have decreased over time.

In the illustrated example of FIG. 52, the asset health quantifier 5212 corresponds to an identification of a suboptimal condition corresponding to an operator compared with the fleet of operators for the asset health quantifier 5212. For example, the asset health quantifier can be a TOW, an EGTHDM, an EGTHDM rate of change value, etc. For example, the asset health quantifier 5212 can be an EGTHDM corresponding to a margin between an EGT of the engine 102 of FIG. 1 during an operation and an EGT "redline" which is a maximum temperature the engine 102 cannot exceed without running the risk of substantially damaging the engine 102. The EGTHDM rate of change value can correspond to a rate in which the EGTHDM of the engine 102 decreases over time. In the illustrated example of FIG. 52, the performance model analyzer 4905 assigns the circle symbol 5218 to operator A for the asset health quantifier 5212 to identify operator A as a candidate improvement target. For example, the performance model analyzer 4905 can identify operator A has a candidate improvement target based on comparing the EGTHDM rate of change values of the assets operated by operator A to the fleet of operators. In response to identifying that operator A is a candidate improvement target based on comparing the operator to the fleet of operators for an asset health quantifier, the example performance model analyzer 4905 can generate an alert, a recommendation, a report including the alert and/or the recommendation, etc., to improve the asset health quantifier corresponding to operator A. In some examples, the performance model analyzer 4905 generates (e.g., automatically generates, etc.) a workscope or a workscope recommendation for one or more assets attributed to operator A in response to identifying operator A as a candidate improvement target based on the asset health quantifier.

Figure 53A:
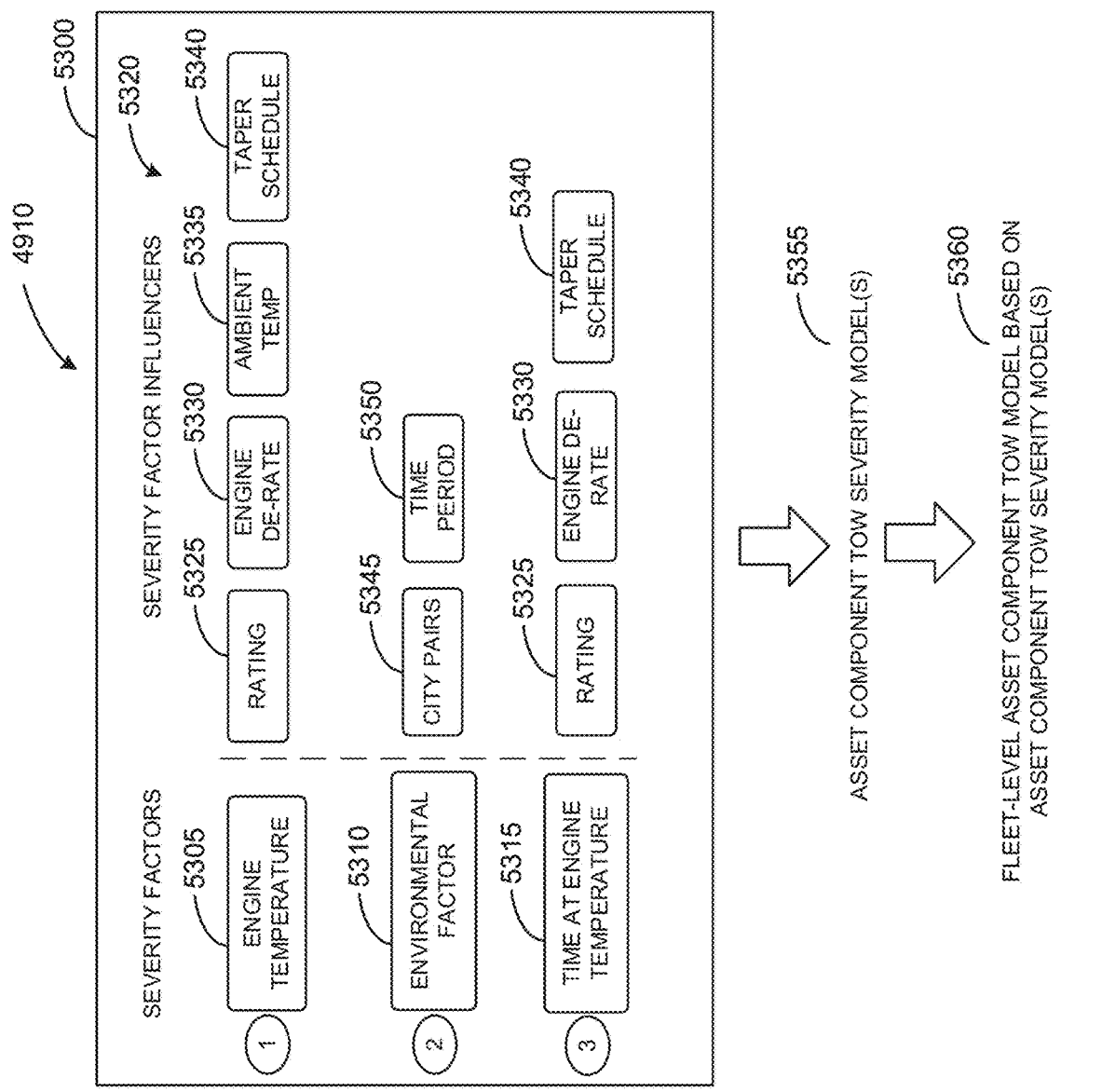
FIG. 53A is an example time on-wing severity model generation system.

FIG. 53A is an example TOW severity model generation system 5300 executed by the severity model analyzer 4910 of FIG. 49. In the illustrated example of FIG. 53A, the severity model analyzer 4910 generates an asset or an asset component TOW severity model by mapping a severity factor such as an engine temperature severity factor 5305, an environmental factor severity factor 5310, a time at engine temperature severity factor 5315, etc., to an asset health quantifier such as TOW. For example, the severity model analyzer 4910 can generate a high-pressure turbine blade severity model of the engine 102 that maps a TOW of the high-pressure turbine blade as a function of the environmental factor 5310. In some examples, the severity model analyzer 4910 generates recommendations to optimize and/or otherwise improve operator behavior based on the asset and/or asset component TOW severity model. Alternatively, there may be fewer or more than the severity factors depicted in FIG. 53A.

In the illustrated example of FIG. 53A, the engine temperature severity factor 5305 can be affected, influenced, impacted, etc., by one or more severity factor influencers 5320 such as an engine rating 5325, an engine de-rate 5330, an ambient temperature 5335, and a taper schedule 5340. Alternatively, there may be fewer or more than the severity factor influencers 5320 corresponding to the engine temperature severity factor 5305 than depicted in FIG. 53A. For example, the engine temperature severity factor 5305 can correspond to an operating temperature of the engine 102. In some examples, the rating 5325 corresponds to a rating (e.g., an engine rating, a maximum rated capacity, etc.) of the engine 102. For example, the engine temperature severity factor 5305 can be impacted by the rating of the engine 102. For example, a higher rating of the engine 102 can correspond to a higher engine temperature. In another example, the engine temperature severity factor 5305 can be influenced by the engine de-rate behavior 5330 of an operator. For example, an operator using a lower de-rate when operating the engine 102 can correspond to a higher engine temperature. In yet another example, the engine temperature severity factor 5305 can be impacted by the ambient temperature 5335. For example, a lower ambient temperature experienced by the engine 102 can correspond to a lower engine temperature. In yet another example, the engine temperature severity factor 5305 can be affected by the taper schedule 5340 used by an operator. For example, an operator using a taper schedule including lower engine de-rate values can correspond to a higher engine temperature.

In the illustrated example of FIG. 53A, the environmental factor severity factor 5310 can be affected, influenced, impacted, etc., by one or more severity factor influencers 5320 such as city pairs 5345 and a time period 5350. Alternatively, there may be fewer or more than the severity factor influencers 5320 corresponding to the environmental factor severity factor 5310 than depicted in FIG. 53A. For example, the environmental factor severity factor 5310 can correspond to an environmental factor experienced by the engine 102. For example, the environmental factor can be an airborne particulate matter (e.g., an exposure to man-made pollution, an exposure to dust, etc.), an ambient temperature, an elevation, etc.

In some examples, the city pairs 5345 correspond to pairs of cities included in a flight operation. For example, a flight from London to Paris can generate a city pair of London and Paris. In some examples, the city pairs correspond to environmental factors associated with pairs of cities. For example, the severity model analyzer 4910 can map a value (e.g., a mean value, a median value, etc.) of an airborne particulate matter, an ambient temperature, an elevation parameter, etc., to London and Paris to determine an effect of an AHQ on the asset operating in the cities of London and Paris. For example, the environmental factor severity factor 5310 can be affected based on a selection of the city pair 5345. In another example, the environmental factor severity factor 5310 can be affected based on the time period 5350 such as a time of day of operation, a time of year of operation, etc.

In the illustrated example of FIG. 53A, the time at engine temperature severity factor 5315 can be affected, influenced, impacted, etc., by one or more severity factor influencers 5320 such as the engine rating 5325, the engine de-rate 5330, and the taper schedule 5340. Alternatively, there may be fewer or more than the severity factor influencers 5320 corresponding to the time at engine temperature severity factor 5315 than depicted in FIG. 53A. In some examples, the time at the engine temperature severity factor 5315 can correspond to an amount of time the engine 102 of FIG. 1 operates at the engine temperature.

In the illustrated example of FIG. 53A, the severity model analyzer 4910 generates one or more asset component TOW severity models 5355 by executing the TOW severity model generation system 5300 based on the severity factors 5305, 5310, 5315 and the severity factor influencers 5320. For example, the severity model analyzer 4910 can generate a regression model (e.g., the regression reference models 5110 of FIG. 51B, etc.) based on a mapping of an AHQ such as TOW of an asset component to an environmental or an operational factor. For example, the severity model analyzer 4910 can generate a high-pressure turbine blade severity model by mapping a TOW of the high-pressure turbine blade to the environmental factor severity factor 5310 by executing the TOW severity model generation system 5300 based on information obtained by executing the historical data model 450, the physics-based model 452, etc. The example severity model analyzer 4910 can generate (e.g., iteratively generate, etc.) a plurality of asset component severity models based on the severity factors 5305, 5310, 5315 and one or more asset components.

In some examples, the TOW severity model 5320 generates one or more asset component TOW severity models 5355 and generates a fleet-level asset component TOW model 5360 based on the one or more asset component TOW severity models 5355. For example, the severity model analyzer 4910 can generate an asset component severity model 5400 as depicted in FIG. 54. The example severity model analyzer 4910 can generate a fleet-level model 5370 as depicted in FIG. 53B based on one or more asset component severity models such as the asset component severity model 5400 of FIG. 54.

Figure 53B:
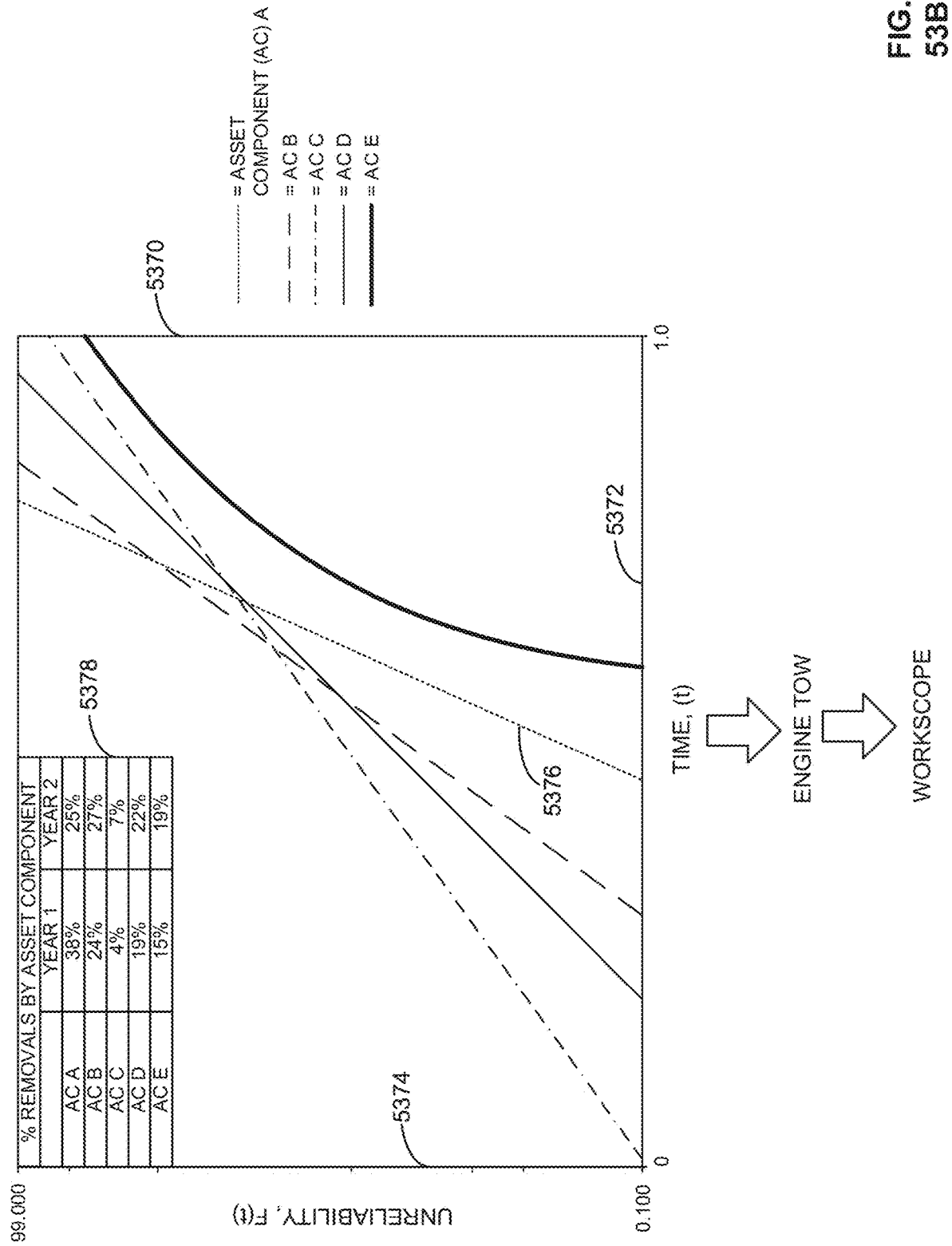
FIG. 53B is a schematic illustration of an example fleet-level model.
Figure 54:
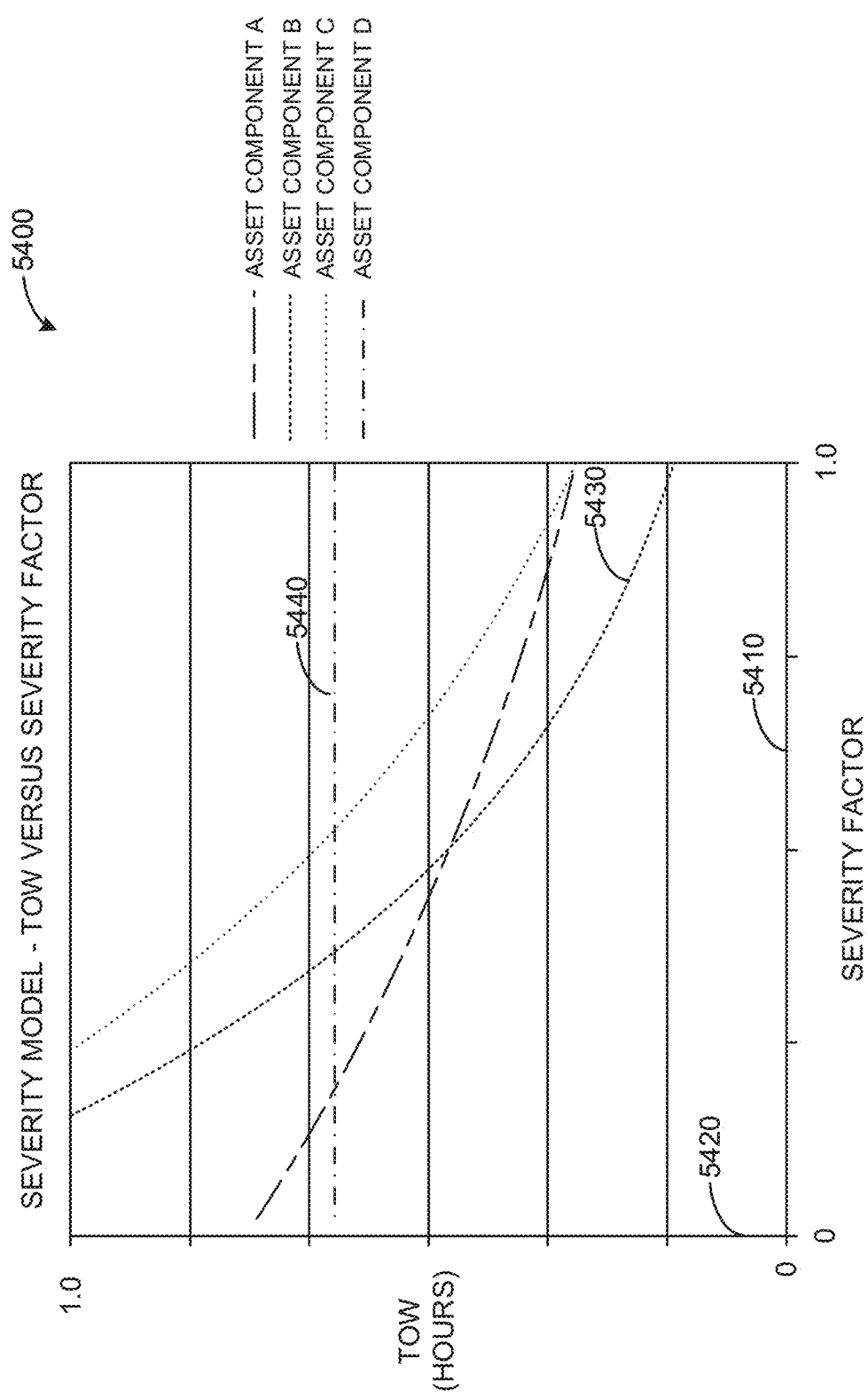
FIG. 54 is a schematic illustration of an example asset component level severity model mapping an AHQ of time on-wing to an AHQ severity factor input.

FIG. 53B is a schematic illustration of the fleet-level model 5370. The fleet-level model 5370 of FIG. 53B represents a stochastic model of fleet-level asset data. For example, the fleet-level model 5370 can correspond to the stochastic model 454 of FIG. 49. For example, the severity model analyzer 4910 can direct the stochastic model 454 to generate the fleet-level model 5370 based on executing the TOW severity model generation system 5300 of FIG. 53A for one or more assets for one or more operators.

In the illustrated example of FIG. 53B, the fleet-level model 5370 maps an unreliability factor as a function of time. In the illustrated example of FIG. 53B, an x-axis 5372 labeled "TIME, (t)" represents a TOW of an asset component scaled from zero to one. Alternatively, the x-axis 5372 can be scaled using any other range of values. In the illustrated example of FIG. 53B, a y-axis 5374 labeled "UNRELIABILITY, F(t)" represents a probability value scaled from zero to one that an asset component can become non-responsive at a specified TOW of the asset component. Alternatively, the y-axis 5374 can be scaled using any other range of values.

For example, the severity model analyzer 4910 can use the fleet-level model 5370 to determine an unreliability factor of an asset component based on a number of cycles the asset component has operated or any other time duration. For example, the unreliability factor can correspond to an amount of time an asset component can operate without experiencing a failure mode. For example, at approximately 0.8 scaled TOW hours, the asset component (AC) A (e.g., the fan section 108 of FIG. 1, the booster compressor 114, etc.) has an approximate unreliability value of 99.000 (e.g., 99%, etc.) based on the asset component A unreliability line 5376 (dotted line). In such an example, the severity model analyzer 4910 can generate a recommendation to remove the asset component A from service as the TOW hours of the asset component A approaches 0.8 scaled TOW hours.

In the illustrated example of FIG. 53B, the fleet-level model 5370 depicts an unreliability function for a plurality of asset components such as asset component B, asset component C, asset component D, asset component E, etc. In some examples, the severity model analyzer 4910 uses the fleet-level model 5370 to calculate a TOW or an anticipated TOW prior to performing maintenance on one or more components of the engine 102 of FIG. 1. By determining the anticipated TOW prior to performing the maintenance, the example severity model analyzer 4910 can generate a recommendation to optimize and/or otherwise improve a recommended workscope for an asset of an operator. For example, the severity model analyzer 4910 can generate a recommendation for the operator to prepare a workscope including removing the engine 102 from service, ordering spare parts, querying maintenance facility availability to perform the maintenance operation, etc.

In the illustrated example of FIG. 53B, the fleet-level model 5370 includes a percentage of removals by asset component table 5378. The table 5378 of the illustrated example of FIG. 53B includes data representing a percentage of asset removals by asset component. For example, the table 5378 represents that 38% of asset removals in Year 1 were in response to identifying asset component A for maintenance. For example, the severity model analyzer 4910 can determine an influence of a rate of change value, a health status, etc., of one or more asset components on a probability that an asset is to be removed from service. For example, the severity model analyzer 4910 can generate a workscope, adjust a forecasted workscope, etc., for an operator in response to determining that asset component A is a significant influence of a removal rate of operator assets from service. For example, the table 5378 represents that 25% of asset removals in Year 2 were in response to identifying asset component A for maintenance. For example, in response to generating forecasted workscopes for assets managed by the operator, the percentage of asset removals due to the asset component A decreased year over year. The example severity model analyzer 4910 can improve asset health management for assets included in a fleet of operators by determining an impact of a rate of change value, a health status, etc., of one or more asset components and improve forecasted workscopes for the assets based on the determination.

FIG. 54 is a schematic illustration of an example asset component level severity model 5400 mapping an AHQ such as TOW to a severity factor (e.g., the engine temperature severity factor 5305 of FIG. 53A, the environmental severity factor 5310 of FIG. 53A, etc.). For example, the severity model analyzer 4910 can generate the asset component level severity model 5400 of FIG. 54 using the TOW severity model generation system 5300 of FIG. 53A. In the illustrated example of FIG. 54, the asset component level severity model 5400 maps TOW in hours of an asset component to the severity factor for an asset component (e.g., the high-pressure compressor 116 of FIG. 1, the combustor 118 of FIG. 1, etc.) such as asset component A, asset component B, asset component C, and asset component D. Alternatively, there may be fewer or more asset components than depicted in FIG. 54.

In the illustrated example of FIG. 54, a sensitivity of each of the asset components is determined based on the mapping of the TOW to the severity factor in the asset component level severity model 5400. In the illustrated example of FIG. 54, the x-axis 5410 represents the severity factor scaled from zero to one. Alternatively, the x-axis 5410 can be scaled using any other range of values. In the illustrated example of FIG. 54, the y-axis 5420 represents a TOW of an asset component scaled from zero to one. Alternatively, the y-axis 5420 can be scaled using any other range of values.

In the illustrated example of FIG. 54, the asset component B has one of the highest sensitivities of the depicted asset components as represented by the asset component B sensitivity line 5430 (darker-shaded dotted line). For example, the asset component B can have a reduced TOW as the severity factor value increases. In the illustrated example of FIG. 54, alternatively, the asset component D has one of the lowest sensitivities of the depicted asset components based on the asset component D sensitivity line 5440. For example, the asset component D has a substantially similar TOW as the severity factor value increases or decreases.

In some examples, the severity model analyzer 4910 can generate the asset component level severity model 5400 of FIG. 54 to determine an effect of the severity factor on the TOW to determine how severe, significant, etc., of an effect the severity factor has on the TOW AHQ. For example, the severity model analyzer 4910 can direct one or more components of the AWGS 220 to update based on the asset component level severity model 5400. For example, the severity model analyzer 4910 can direct the physics-based model 452 to update a rate of change parameter of a component of the engine 102 based on the severity factor value. For example, in response to updating the physics-based model 452, the workscope quantifier analyzer 4915 of FIG. 49 can generate a more accurate AHQ (e.g., a TOW, an asset health, etc.) of an asset of interest based on a severity factor value experienced by or to be experienced by the asset of interest.

Figure 55:
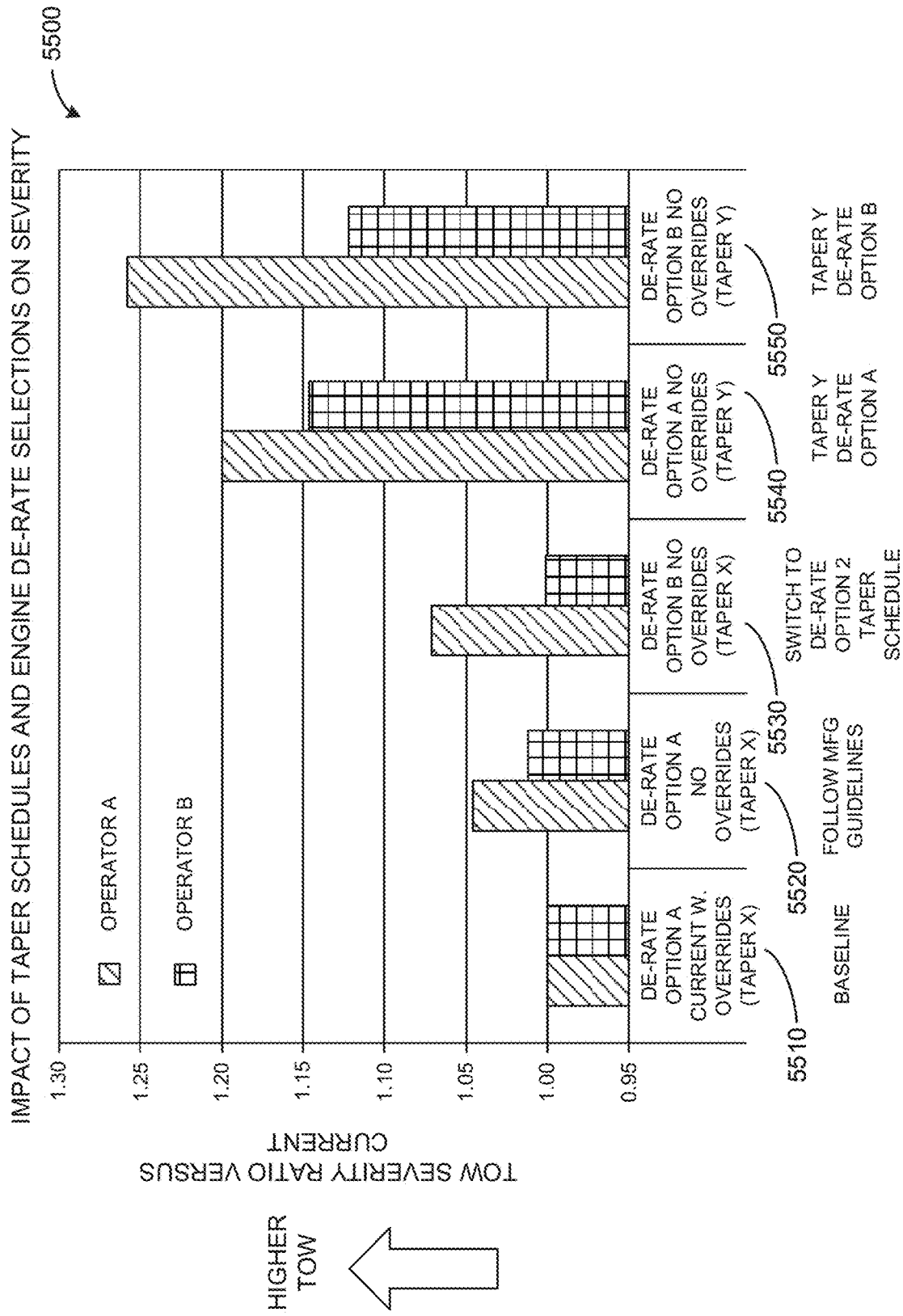
FIG. 55 is a schematic illustration of example effects of implementing example recommendations by the workscope effect calculator of FIGS. 3 and/or 49 to optimize and/or otherwise improve operator asset behavior by adjusting an operator behavior.

FIG. 55 is a schematic illustration of effects of implementing a recommendation by the WEC 315 of FIGS. 3 and/or 49 to optimize and/or otherwise improve operator asset behavior by adjusting an operator behavior parameter of an asset such as an engine de-rate behavior, a turbine engine taper schedule, etc. In the illustrated example of FIG. 55, a Taper Schedule impact plot 5500 includes a depiction of a TOW severity ratio for operator A and operator B. The TOW severity ratio represents an increase or a decrease in TOW. For example, a TOW severity ratio of 1.05 represents a 5% increase in TOW compared to a baseline TOW severity ratio.

In the illustrated example of FIG. 55, the de-rate option A current with overrides (Taper X) bars 5510 represent the operators A and B currently using a Taper X schedule and allowing pilots to override the engine de-rate option A and normalizing the operators A and B to a baseline TOW severity ratio of 1.00. In the illustrated example of FIG. 55, the de-rate option A with no overrides (Taper X) bars 5520 represent the operators A and B using the Taper X schedule and executing the de-rate option A except without allowing pilots to override the de-ration option A. As depicted in FIG. 55, the operator A previously allowed more overrides compared to operator B and, thus, benefited from a higher TOW severity ratio by not allowing pilots to override the de-rate option A engine behavior.

In the illustrated example of FIG. 55, the de-rate option B with no overrides (Taper X) bars 5530 represent an effect of the operators A and B adjusting de-rate options based on a recommendation by the WEC 315. For example, the severity model analyzer 4910 can generate a recommendation for the operator A to adjust from the de-rate option A without overrides using the Taper X schedule 5520 to the de-rate option B without overrides using the Taper X schedule 5530. As a result, the TOW severity ratio increases from a baseline of 1.00 to approximately 1.07 based on the recommended adjustment by the severity model analyzer 4910. In another example, the severity model analyzer 4910 can generate a recommendation for the operator B to adjust from the de-rate option A without overrides using the Taper X schedule 5520 to the de-rate option B without overrides using the Taper X schedule 5530. As a result, the TOW severity ratio slightly increases from a baseline of 1.00 to negligibly above 1.00 based on the recommended adjustment by the severity model analyzer 4910. In such an example, the adjustment did not significantly adjust a TOW severity ratio for the operator B. In some examples, the severity model analyzer 4910 directs the system updater 4920 to update one or more components of the AWGS 220 of FIGS. 2-3 based on generating an inefficient recommendation.

In some examples, the severity model analyzer 4910 generates another recommendation to the operator B to adjust from the de-rate option A without overrides using the Taper X schedule 5520 to a de-rate option A without overrides using the Taper Y schedule 5540, a de-rate option B without overrides using the Taper Y schedule 5550, etc. As a result, the example severity model analyzer 4910 can generate a recommendation to direct an adjustment of operator behavior corresponding to one or more assets operated by the operator to affect a health, an operation, etc., of the one or more assets.

Figure 56:
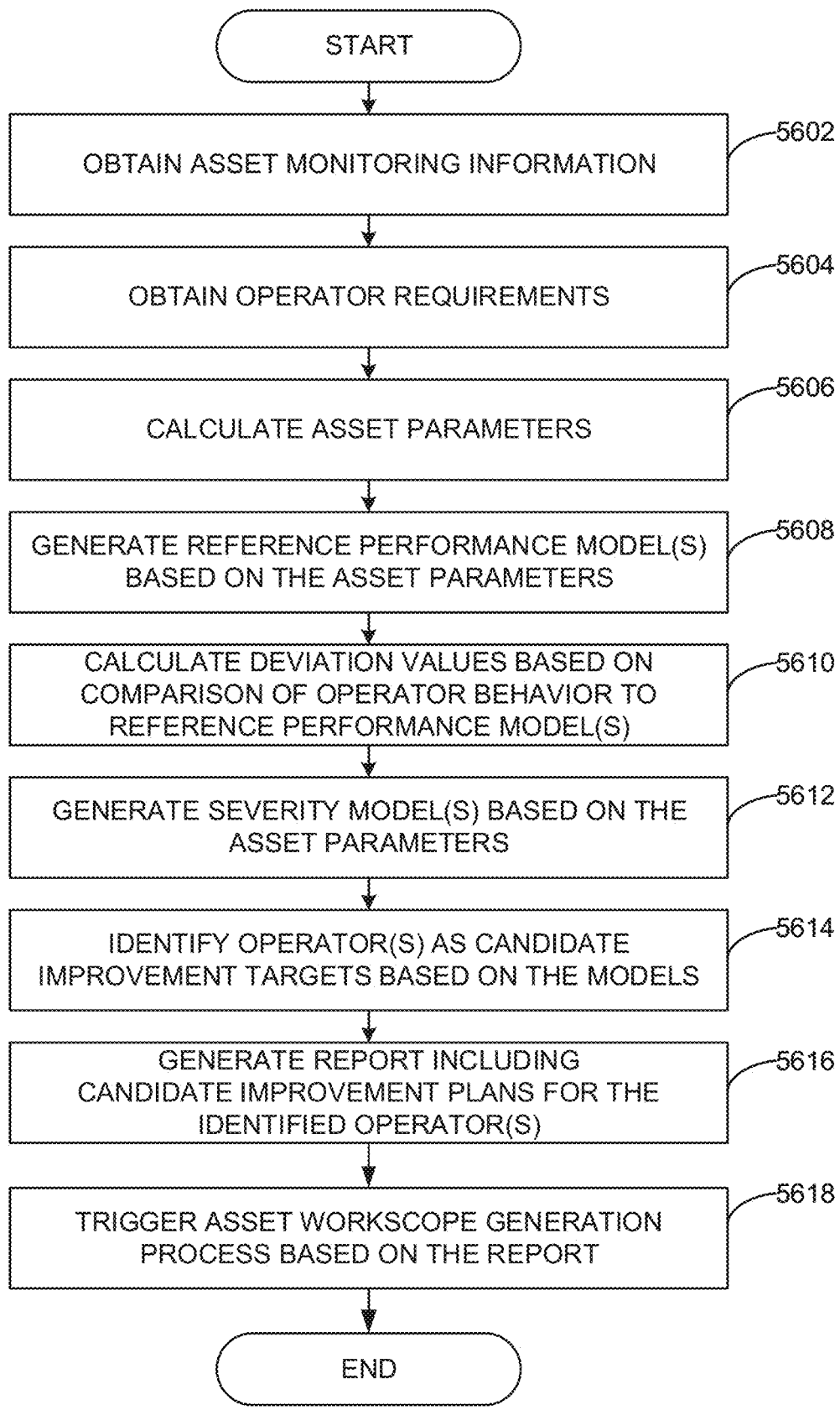
FIGS. 56-58 are flowcharts representative of example methods that can be executed by the example asset workscope generation system of FIGS. 2-3 and/or the example workscope effect calculator apparatus of FIGS. 3 and/or 49 to implement the examples disclosed herein.
Figure 57:
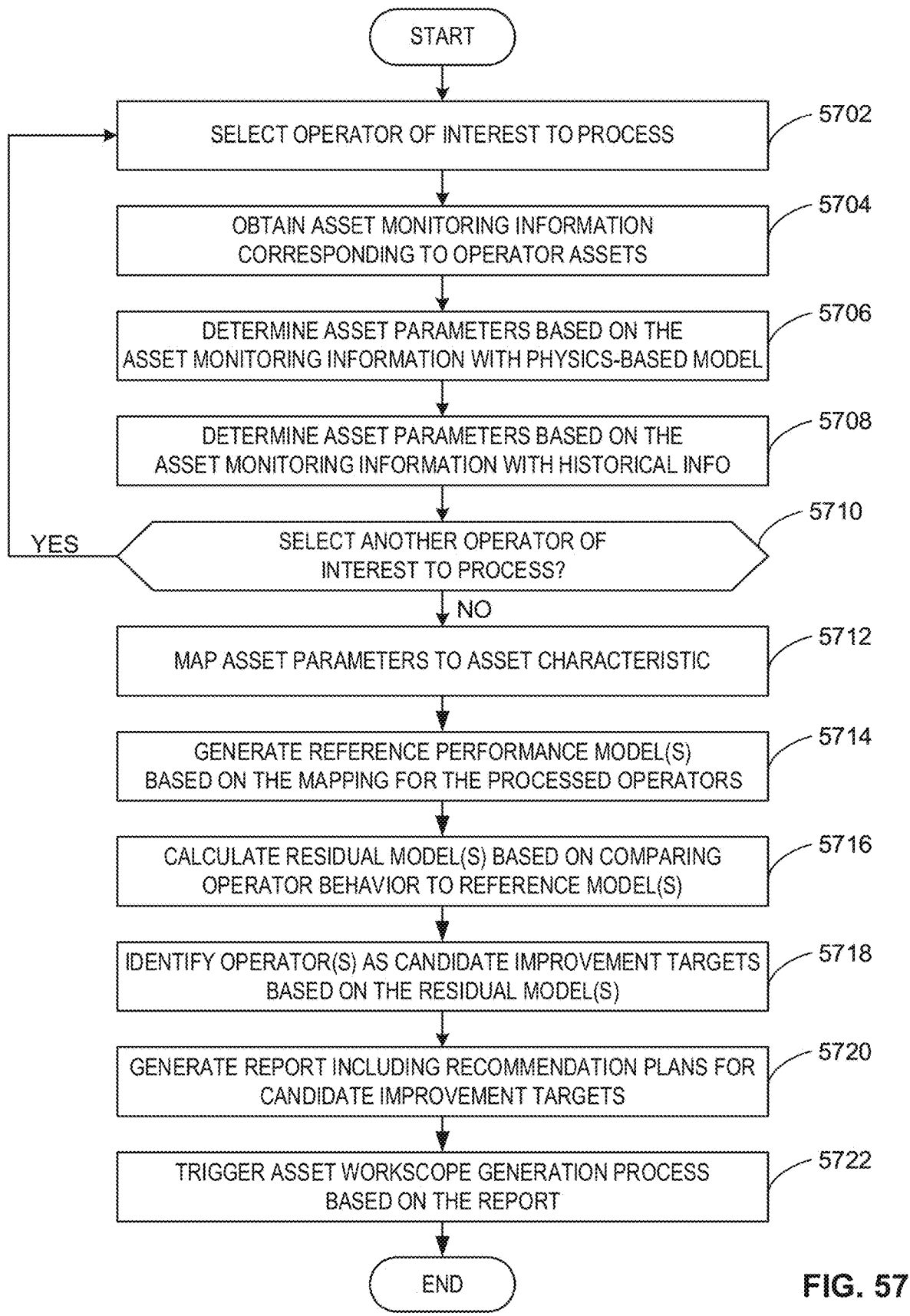
Figure 58:
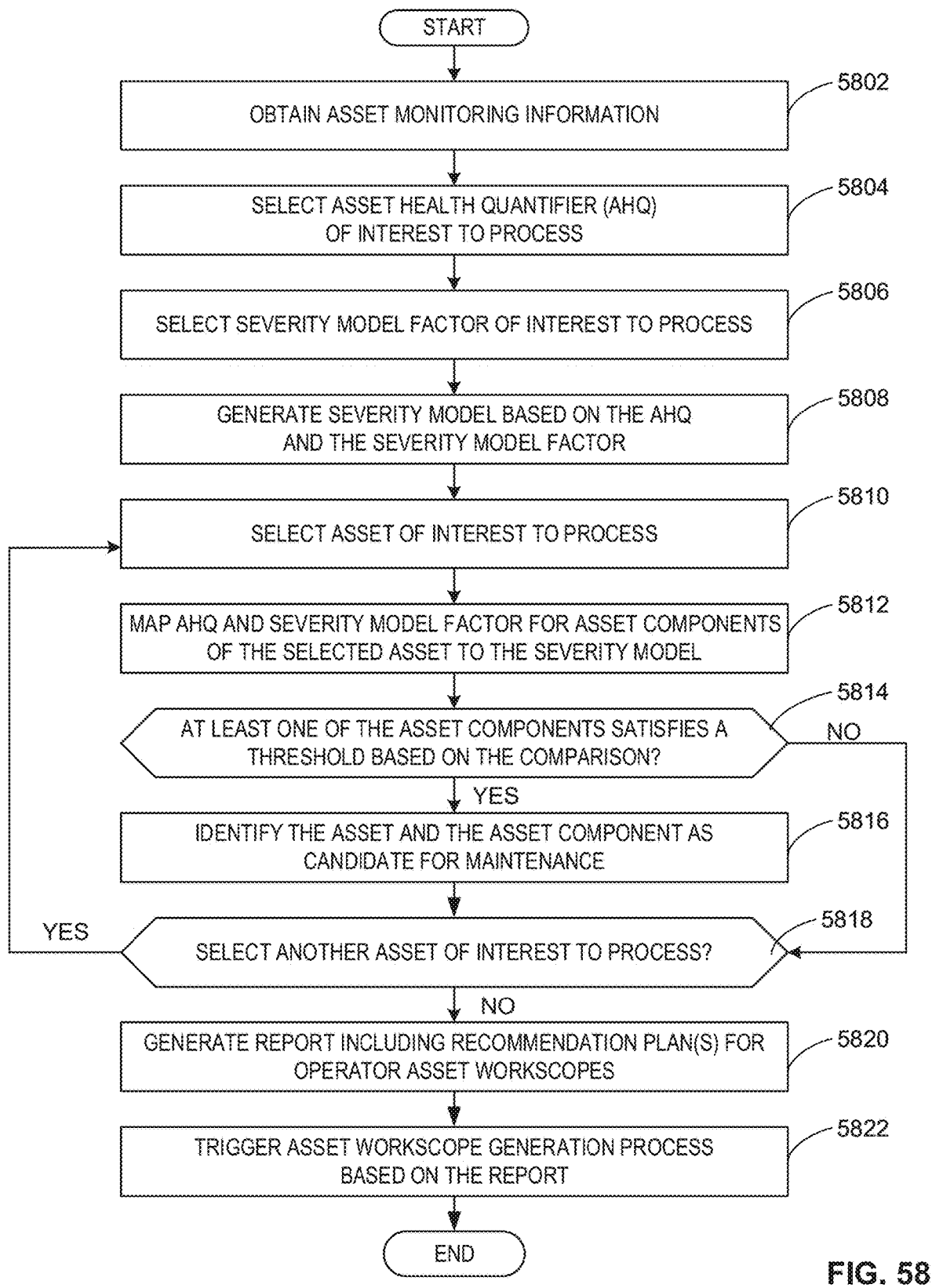

Flowcharts representative of example machine readable instructions for implementing the WEC 315 of FIGS. 3 and/or 49 are shown in FIGS. 56-58. In these examples, the machine readable instructions comprise a program for execution by a processor such as a processor 5912 shown in the example processor platform 5900 discussed below in connection with FIG. 59. The program may be embodied in software stored on a non-transitory computer readable storage medium such as a CD-ROM, a floppy disk, a hard drive, a DVD, a Blu-ray disk, or a memory associated with the processor 5912, but the entire program and/or parts thereof could alternatively be executed by a device other than the processor 5912 and/or embodied in firmware or dedicated hardware. Further, although the example program is described with reference to the flowchart illustrated in FIGS. 56-58, many other methods of implementing the example WEC 315 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 56-58 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 56 is a flowchart representative of an example method that can be performed by the example WEC 315 of FIGS. 3 and/or 49 to generate a report including recommendation plans for candidate improvement plans. The example method begins at block 5602 at which the example WEC 315 obtains asset monitoring information. For example, the collection engine 4900 of FIG. 49 can obtain the inputs 325 of FIGS. 3 and/or 49 such as the asset sensor data 430, the asset environmental data 432, etc., of FIG. 49.

At block 5604, the example WEC 315 obtains operator requirements. For example, the collection engine 4900 can obtain the requirements 340 of FIG. 3 from the database 345 of FIG. 3. For example, the collection engine 4900 can obtain TOW requirements, contractual requirements corresponding to asset maintenance operations, asset de-rate parameters, etc., from the database 345.

At block 5606, the example WEC 315 calculates asset parameters. For example, the performance model analyzer 4905 can direct the historical data model 450, the physics-based model 452, etc., to calculate an engine de-rate parameter (e.g., a takeoff de-rate parameter, a climb de-rate parameter, a land-based turbine engine de-rate parameter, etc.) of the engine 102 based on the inputs 325 of FIGS. 3 and/or 49. In another example, the performance model analyzer 4905 can direct the historical data model 450, the physics-based model 452, etc., to calculate an engine de-rate parameter for a plurality of assets for a plurality of operators.

At block 5608, the example WEC 315 generates reference performance model(s) based on the asset parameters. For example, the performance model analyzer 4905 can generate the physics-based performance reference model 5108 of FIG. 51A, the regression reference model 5110 of FIG. 51B, etc., based on asset parameters calculated by the historical data model 450, the physics-based model 452, etc.

At block 5610, the example WEC 315 calculates deviation values based on a comparison of operator behavior to reference performance model(s). For example, the performance model analyzer 4905 can generate the residual performance model 5140 of FIG. 51C by calculating deviation values by calculating differences between actual asset parameters of operators and asset parameters included in the reference performance models.

At block 5612, the example WEC 315 generates severity model(s) based on the asset parameters. For example, the severity model analyzer 4910 can generate the fleet-level model 5370 of FIG. 53B based on one or more asset component level severity models such as the asset component level severity model 5400 of FIG. 54.

At block 5614, the example WEC 315 identifies operator(s) as candidate improvement targets based on the models. For example, the performance model analyzer 4905 can identify the operator E in the residual performance model 5140 of FIG. 51C as a candidate improvement target. In another example, the performance model analyzer 4905 can identify the operators P, G, and H in the AHQ performance model 5150 of FIG. 51D as candidate improvement targets.

At block 5616, the example WEC 315 generates a report including recommendation plans for candidate improvement plans. For example, the performance model analyzer 4905 can generate a report including a recommendation to optimize and/or otherwise improve asset operator behavior of the operator E based on analyzing the residual performance model 5140 of FIG. 51C. In another example, the severity model analyzer 4910 can generate a report including a recommendation to optimize and/or otherwise improve asset operator behavior of an operator based on analyzing the fleet-level model 5370 of FIG. 53B, the asset component level severity model 5400 of FIG. 54, etc.

At block 5618, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the performance model analyzer 4905 identifying operator E as a candidate improvement target based on the residual performance model 5140 of FIG. 51C, the performance model analyzer 4905 can direct the asset health calculator 300 of FIG. 3 to generate one or more AHQ of the engine 102 and/or other assets operated by the operator E using the recommended operator behavior parameter (e.g., the recommended engine de-rate parameter, takeoff de-rate parameter, climb de-rate parameter, etc.). In response to the example asset health calculator 300 being activated by the example performance model analyzer 4905, the asset health calculator 300 can execute one or more of the models 450, 452, 454, 456 of FIG. 49 using the recommended engine de-rate parameter included in the report.

In response to the asset health calculator 300 generating the one or more AHQ, the asset health calculator 300 can (1) identify one or more assets operated by the operator E as candidate assets for removal from service and (2) generate a removal schedule to remove the one or more assets. In response to generating the removal schedule, the example task generator 305 can generate one or more maintenance tasks to be performed on the removed assets and the example task optimizer 310 can select a workscope based on the maintenance tasks. In response to the example task optimizer 310 selecting the workscope, the selected workscope can be performed on the one or more removed assets to improve a health and/or operation of the one or more removed assets. In response to triggering the asset workscope generation process, the example method concludes.

FIG. 57 is a flowchart representative of an example method that can be performed by the example WEC 315 of FIGS. 3 and/or 49 to generate a report including recommendation plans for candidate improvement plans based on generating a performance model. The example process of FIG. 57 can be used to implement the operation of blocks 5608 and/or 5616 of FIG. 56. The example method begins at block 5702 at which the example WEC 315 selects an operator of interest to process. For example, the collection engine 4900 can select an operator of interest to process.

At block 5704, the example WEC 315 obtains asset monitoring information corresponding to operator assets. For example, the collection engine 4900 can obtain engine de-rate information from the engine 102 associated with an operator and/or from a plurality of engines associated with the operator. For example, the collection engine 4900 of FIG. 49 can obtain the inputs 325 of FIGS. 3 and/or 49 such as the asset sensor data 430, the asset environmental data 432, etc., of FIG. 49 when the engine 102 is operating in the flight route 5000 of FIG. 50, while the engine 102 is in service, etc.

At block 5706, the example WEC 315 determines asset parameters based on the asset monitoring information with a physics-based model. For example, the performance model analyzer 4905 can calculate an engine de-rate parameter for the engine 102 based on the inputs 325 of FIGS. 3 and/or 49 for the engine 102 and/or for the plurality of engines associated with the operator of interest using the physics-based model 452 of FIG. 49.

At block 5708, the example WEC 315 determines asset parameters based on the asset monitoring information with historical information. For example, the performance model analyzer 4905 can calculate an engine de-rate parameter for the engine 102 based on the inputs 325 of FIGS. 3 and/or 49 for the engine 102 and/or for the plurality of engines associated with the operator of interest using the historical data model 450 of FIG. 49.

At block 5710, the example WEC 315 determines whether to select another operator of interest to process. For example, the collection engine 4900 can determine to select another operator of interest to process. If, at block 5710, the example WEC 315 determines to select another operator of interest to process, control returns to block 5702 to select another operator of interest to process.

If, at block 5710, the example WEC 315 determines not to select another operator of interest to process, then, at block 5712, the WEC 315 maps the asset parameters to an engine performance characteristic. For example, the performance model analyzer 4905 can map the engine de-rate parameters generated by the physics-based model 452 to an aircraft weight. In another example, the performance model analyzer 4905 can map the engine de-rate parameters generated by the historical data model 450 to an aircraft weight.

At block 5714, the example WEC 315 generates reference performance model(s) based on the mapping for the processed operators. For example, the performance model analyzer 4905 can generate the performance reference model 5100 of FIG. 51A based on mapping engine de-rate parameters for one or more operators to an aircraft weight. In another example, the performance model analyzer 4905 can generate the regression reference model 5110 of FIG. 51B based on mapping engine de-rate parameters for one or more operators to an aircraft weight, an airport elevation, and an ambient temperature.

At block 5716, the example WEC 315 calculates residual model(s) based on comparing operator behavior to the reference model(s). For example, the performance model analyzer 4905 can generate the residual performance model 5140 of FIG. 51C by calculating a difference between an actual operator behavior (e.g., an actual engine de-rate behavior, an instant takeoff de-rate behavior, a current takeoff de-rate behavior, etc.) and the operator behavior included in the performance reference model 5100 of FIG. 51A. In another example, the performance model analyzer 4905 can generate the residual performance model 5140 of FIG. 51C by calculating a difference between an actual operator behavior (e.g., an actual engine de-rate behavior, a takeoff de-rate behavior, a current takeoff de-rate behavior, etc.) and the operator behavior included in the regression reference model 5110 of FIG. 51B.

At block 5718, the example WEC 315 identifies operator(s) as candidate improvement targets based on the residual model(s). For example, the performance model analyzer 4905 can identify operators D and/or E in FIG. 51C based on the residual performance model 5140 of FIG. 51C as a candidate improvement targets based on operating a plurality of underperforming and/or inefficiently utilized turbine engines compared to the fleet average.

At block 5720, the example WEC 315 generates a report including recommendation plans for candidate improvement targets. For example, the performance model analyzer 4905 can generate a report including a recommendation for the operators C and/or E in FIG. 51C to adjust an engine de-rate parameter when operating the underperforming assets.

At block 5722, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the performance model analyzer 4905 identifying operator E as a candidate improvement target based on the residual performance model 5140 of FIG. 51C, the performance model analyzer 4905 can direct the asset health calculator 300 of FIG. 3 to generate AHQ of the engine 102 and/or other assets operated by the operator E using the recommended operator behavior parameter (e.g., the recommended engine de-rate parameter, etc.). In response to the example asset health calculator 300 being activated by the example performance model analyzer 4905, the asset health calculator 300 can activate the example task generator 305 and trigger the task generator 305 to activate the task optimizer 310 to select and direct a workscope to be performed on an asset to improve a health and/or an operation of the asset. In response to triggering the asset workscope generation process, the example method concludes.

FIG. 58 is a flowchart representative of an example method that can be performed by the example WEC 315 of FIGS. 3 and/or 49 to generate a report including recommendation plans for candidate improvement plans based on generating a severity model. The example process of FIG. 58 can be used to implement the operation of blocks 5612 and/or 5616 of FIG. 56. The example method begins at block 5802 at which the example WEC 315 obtains asset monitoring information. For example, the collection engine 4900 of FIG. 49 can obtain the inputs 325 of FIGS. 3 and/or 49 such as the asset sensor data 430, the asset environmental data 432, etc., of FIG. 49.

At block 5804, the example WEC 315 selects an asset health quantifier (AHQ) of interest to process. For example, the severity model analyzer 4910 can select a TOW AHQ to process. At block 5806, the example WEC 315 selects a severity model factor of interest to process. For example, the severity model analyzer 4910 can select an engine temperature severity factor corresponding to the engine temperature severity factor 5305 of FIG. 53A to process.

At block 5808, the example WEC 315 generates a severity model based on the AHQ and the severity model factor. For example, the severity model analyzer 4910 can generate the asset component level severity model 5400 of FIG. 54 based on mapping TOW of asset components to engine temperature. At block 5810, the example WEC 315 selects an asset of interest to process. For example, the severity model analyzer 4910 can select the engine 102 of FIG. 1 to process.

At block 5812, the example WEC 315 maps an AHQ and a severity model factor for asset components of the selected asset to the severity model. For example, the severity model analyzer 4910 can map a severity factor value of 0.5 currently or previously experienced by the asset component B of the engine 102 to the severity factor value of the asset component level severity model 5400 of FIG. 54 to generate an anticipated TOW of the asset component B of approximately 0.5 scaled TOW hours. In such an example, the severity model analyzer 4910 can compare the anticipated TOW of 0.5 scaled TOW hours to an example actual TOW of the asset component B of 0.6 scaled TOW hours to calculate an AHQ difference of 0.1 scaled TOW hours based on the comparison. The example severity model analyzer 4910 can compare (e.g., iteratively compare, etc.) the actual TOW and the severity factor values for other components of the engine 102.

At block 5814, the example WEC 315 determines whether at least one of the asset components satisfies a threshold based on the comparison. For example, the severity model analyzer 4910 can determine that an anticipated AHQ threshold of 0.5 scaled TOW hours has been satisfied based on the actual AHQ of 0.6 scaled TOW hours being greater than the anticipated AHQ threshold of 0.5 scaled TOW hours. In another example, the severity model analyzer 4910 can compare the AHQ difference of 0.1 scaled TOW hours to an AHQ difference threshold of 0.08 scaled TOW hours and determine that the AHQ difference threshold has been satisfied based on the AHQ difference being greater than the AHQ difference threshold.

If, at block 5814, the example WEC 315 determines that at least one of the asset components does not satisfy a threshold based on the comparison, control proceeds to block 5818 to select another asset of interest to process. If, at block 5814, the example WEC 315 determines that at least one of the asset components satisfies a threshold, then, at block 5816, the WEC 315 identifies the asset and the asset component as a candidate for maintenance. For example, the severity model analyzer 4910 can identify a component of the engine 102 corresponding to asset component B as a candidate for removal from operation to perform a maintenance operation.

At block 5818, the example WEC 315 determines whether to select another asset of interest to process. For example, the collection engine 4900 can determine to select another asset operated by a specific operator, another asset in the fleet, etc., to process. If, at block 5818, the example WEC 315 determines to select another asset of interest to process, control returns to block 5810 to select another asset of interest to process.

If, at block 5818, the example WEC 315 determines not to select another asset of interest to process, then, at block 5820, the WEC 315 generates a report including recommendation plan(s) for operator asset workscopes. For example, the severity model analyzer 4910 can generate a report including a recommendation identifying the engine 102 is a candidate target to be removed from service to perform maintenance on the combustor 118.

At block 5822, the example WEC 315 triggers an asset workscope generation process based on the report. For example, the WEC 315 can trigger the AWGS 220 of FIGS. 2-3 to generate a workscope for an asset and direct the workscope to be performed on the asset by generating a recommendation to adjust an operator behavior parameter to optimize and/or otherwise improve deficient operator behavior. For example, in response to the severity model analyzer 4910 identifying the engine 102 as a candidate for removal from service based on the fleet-level model 5370 of FIG. 53B, the asset component level severity model 5400 of FIG. 54, etc. For example, the severity model analyzer 4910 can direct the asset health calculator 300 of FIG. 3 to generate AHQ of the engine 102 and/or other assets operated by the same operator as the engine 102. In response to the example asset health calculator 300 being activated by the example severity model analyzer 4910, the asset health calculator 300 can activate the example task generator 305 and the task generator 305 can activate the task optimizer 310 to select and direct a workscope to be performed on the engine 102 and/or other operator assets to improve a health and/or an operation of the assets. In response to triggering the asset workscope generation process, the example method concludes.

Figure 59:
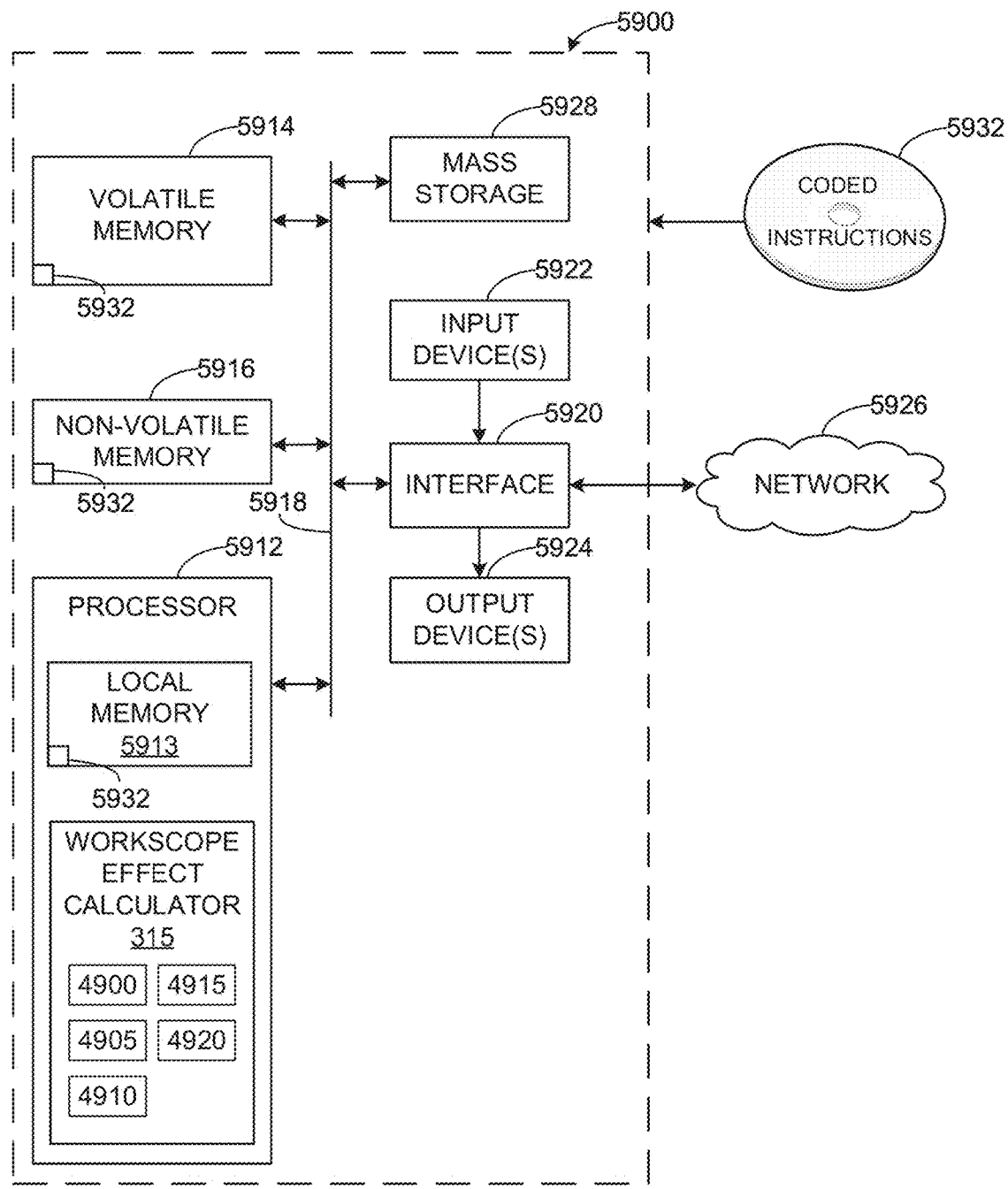
FIG. 59 is a block diagram of an example processing platform structured to execute machine-readable instructions to implement the methods of FIGS. 56-58 and/or the example workscope effect calculator apparatus of FIGS. 3 and/or 49.

FIG. 59 is a block diagram of an example processor platform 5900 capable of executing the instructions of FIGS. 56-58 to implement the WEC 315 of FIGS. 3 and/or 49. The processor platform 5900 can be, for example, a server or any other type of computing device.

The processor platform 5900 of the illustrated example includes a processor 5912. The processor 5912 of the illustrated example is hardware. For example, the processor 5912 can be implemented by one or more integrated circuits, logic circuits, microprocessors or controllers from any desired family or manufacturer. The hardware processor may be a semiconductor based (e.g., silicon based) device.

In this example, the processor 5912 implements the example collection engine 4900, the example performance model analyzer 4905, the example severity model analyzer 4910, the example workscope quantifier analyzer 4915, and the example system updater 4920.

The processor 5912 of the illustrated example includes a local memory 5913 (e.g., a cache). The processor 5912 of the illustrated example is in communication with a main memory including a volatile memory 5914 and a non-volatile memory 5916 via a bus 5918. The volatile memory 5914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 5916 may be implemented by flash memory and/or any other desired type of memory device. Access to the main memory 5914, 5916 is controlled by a memory controller.

The processor platform 5900 of the illustrated example also includes an interface circuit 5920. The interface circuit 5920 may be implemented by any type of interface standard, such as an Ethernet interface, a universal serial bus (USB), and/or a peripheral component interconnect (PCI) express interface.

In the illustrated example, one or more input devices 5922 are connected to the interface circuit 5920. The input device(s) 5922 permit(s) a user to enter data and/or commands into the processor 5912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 5924 are also connected to the interface circuit 5920 of the illustrated example. The output devices 5924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 5920 of the illustrated example, thus, typically includes a graphics driver card, a graphics driver chip and/or a graphics driver processor.

The interface circuit 5920 of the illustrated example also includes a communication device such as a transmitter, a receiver, a transceiver, a modem and/or network interface card to facilitate exchange of data with external machines (e.g., computing devices of any kind) via a network 5926 (e.g., an Ethernet connection, a digital subscriber line (DSL), a telephone line, coaxial cable, a cellular telephone system, etc.).

The processor platform 5900 of the illustrated example also includes one or more mass storage devices 5928 for storing software and/or data. Examples of such mass storage devices 5928 include floppy disk drives, hard drive disks, compact disk drives, Blu-ray disk drives, redundant array of independent disks (RAID) systems, and DVD drives.

The coded instructions 5932 of FIGS. 56-58 may be stored in the mass storage device 5928, in the volatile memory 5914, in the non-volatile memory 5916, and/or on a removable non-transitory computer readable storage medium such as a CD or DVD.

From the foregoing, it will be appreciated that example methods, apparatus, systems, and articles of manufacture have been disclosed that generate a predictive asset health quantifier of a turbine engine. The above-described example workscope effect calculator identifies deficient operator behavior of turbine engines managed by operators. The example workscope effect calculator can identify operators as candidate improvement targets by generating reference performance models using one or more computer-based models such as a physics-based model, a historical data model, etc. The example workscope effect calculator can compare a current operator behavior of an operator to the reference performance models based on determining if the operator is better or worse than a fleet average for the operator behavior.

The example workscope effect calculator can generate a recommendation to adjust the operator behavior by changing an operator behavior parameter such as a takeoff de-rate parameter, a climb de-rate parameter, a taper schedule, etc., corresponding to an operation of assets by the operator. The example workscope effect calculator can trigger an asset workscope generation system process based on the recommendation by activating one or more components of the AWGS such as the asset health calculator. The example workscope effect calculator can activate the asset health calculator to generate an AHQ of one or more assets using the recommended operator behavior parameter and determine whether the one or more assets operated by the operator can be identified as candidate assets for removal from service based on the generated AHQ.

The example workscope effect calculator can identify an asset as a candidate asset for removal from service by generating a severity model. The example workscope effect calculator can execute a historical data model to generate a regression model that maps an operator behavior to an engine performance characteristic. The example workscope effect calculator can generate a fleet-level severity model by incorporating one or more asset component level severity models. The example workscope effect calculator can identify an asset for removal from service by applying an actual TOW of an asset component of the asset to the fleet-level severity model and comparing an anticipated TOW to the actual TOW. The example workscope effect calculator can trigger the asset workscope generation system process based on the identified assets for removal by activating one or more components of the AWGS such as the asset health calculator. The example workscope effect calculator can activate the asset health calculator to generate an AHQ of one or more assets using the fleet-level severity model and determine whether the one or more assets operated by the operator can be identified as candidate assets for removal from service based on the generated AHQ.

V. Fielded Asset Health Advisor

Figure 60:
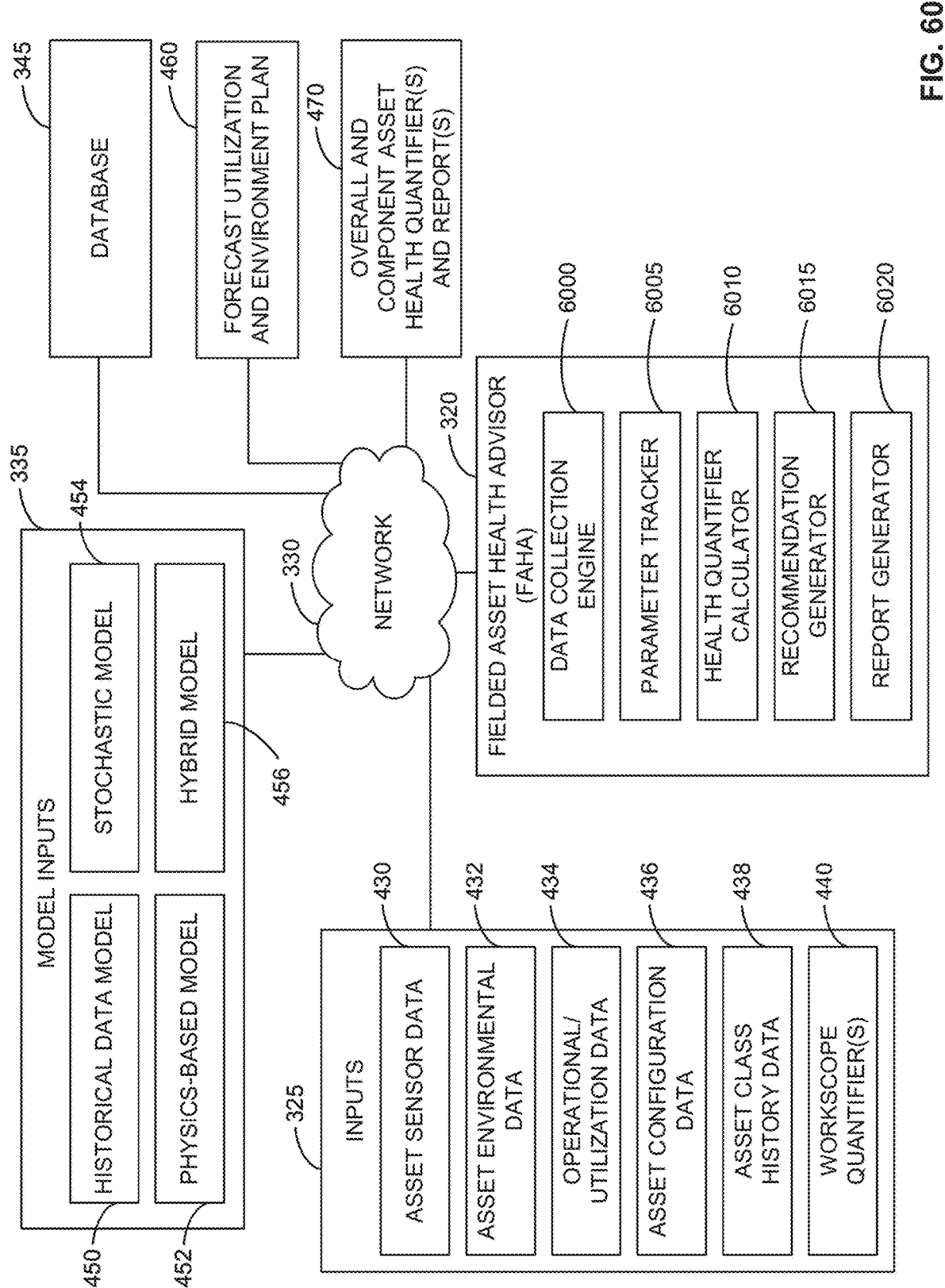
FIG. 60 is a block diagram of an example implementation of an example fielded asset health advisor apparatus.

FIG. 60 is a block diagram of an example implementation of the example FAHA 320 of FIG. 3. The FAHA 320 of the illustrated example calculates, aggregates, and ranks AHQ (e.g., actual AHQ, projected AHQ, etc.) of an asset (e.g., the engine 102 of FIG. 1), an asset component (e.g., the booster compressor 114, the high-pressure turbine 120, etc.), etc. The FAHA 320 includes an example data collection engine 6000, an example parameter tracker 6005, an example health quantifier calculator 6010, an example recommendation generator 6015, and an example report generator 6020.

In the illustrated example of FIG. 60, the FAHA 320 includes the example data collection engine 6000 to obtain information of interest to process. In the illustrated example, the data collection engine 6000 obtains the inputs 325 to process. For example, the data collection engine 6000 can obtain the inputs 325 from the network 330 of FIG. 3. The inputs 325 of the illustrated example include example asset sensor data 430, example asset environmental data 432, example operational/utilization data 434, example asset configuration data 436, example asset class history data 438, and example workscope quantifier(s) 440.

In the illustrated example, the data collection engine 6000 obtains the asset sensor data 430 to determine operating conditions experienced by the engine 102 of FIG. 1. In some examples, the asset sensor data 430 corresponds to inputs to the engine 102. For example, the asset sensor data 430 can include an engine command (e.g., a thrust control input, a de-rate control input, etc.), an engine input, etc. For example, the asset sensor data 430 can correspond to information obtained from a closed loop control module included in the turbine engine controller 100 of FIGS. 1-2. For example, the asset sensor data 430 can include parameters generated by an algorithm executed by the turbine engine controller 100 in response to an engine control input, an environmental factor, etc.

In some examples, the data collection engine 6000 obtains the asset sensor data 430 from the database 345 of FIG. 3. In some examples, the asset sensor data 430 corresponds to sensor data obtained from the sensors 144, 146 of FIG. 2. For example, the asset sensor data 430 can include sensor measurements such as a speed of a rotor, a pressure, a temperature, a vibration, etc., experienced by the engine 102 of FIG. 1. In some examples, the asset sensor data 430 includes a range of sensor measurements for an environmental parameter (e.g., a pressure, a temperature, etc.) measured by an environmental parameter sensor (e.g., a pressure sensor, a temperature sensor, etc.). In some examples, the asset sensor data 430 includes a duration of sensor measurements such as an amount of time the sensors 144, 146 measured a specific sensor measurement (e.g., an amount of time the sensors 144, 146 measured a pressure value of 100 PSI, an amount of time the sensors 144, 146 measured a temperature value of 26000 Rankine, etc.).

In some examples, the asset sensor data 430 includes information corresponding to a current or an instant flight segment of the asset. For example, the asset sensor data 430 can include information from an aircraft control system, the turbine engine controller 100 of FIG. 2, etc., indicating that the engine 102 of FIG. 1 is on-wing of an aircraft currently taking off, climbing, cruising, etc. In some examples, the data collection engine 6000 determines that the asset sensor data 430 is transient asset data. For example, the data collection engine 6000 can determine that the asset sensor data 430 is transient asset data based on the engine 102 operating during a transient flight segment or a transition between flight segments (e.g., transitioning from a climbing flight segment to a cruising flight segment, etc.). In some examples, the data collection engine 6000 determines that the asset sensor data 430 is steady-state asset data. For example, the data collection engine 6000 can determine that the asset sensor data 430 is steady-state asset data based on the engine 102 operating during a cruising flight segment. In such an example, the data collection engine 6000 can determine that the asset sensor data 430 is generated (e.g., iteratively generated, etc.) based on similar (e.g., substantially similar, relatively unchanging, etc.) environmental and operating conditions.

In the illustrated example, the data collection engine 6000 obtains the asset environmental data 432 to determine environmental conditions experienced by the engine 102. In some examples, the data collection engine 6000 obtains the asset environmental data 432 from the database 345 of FIG. 3. In some examples, the asset environmental data 432 includes a range of environmental condition parameters experienced by the engine 102. For example, the asset environmental data 432 can include a range of ambient temperatures (e.g., a range of 10-40 degrees Celsius, etc.), precipitation amounts, salt atmosphere percentages (e.g., a range of 5-55% salt atmosphere, etc.), airborne particulate matter sizes (e.g., a size of a man-made airborne particulate matter, a size of a naturally occurring airborne particulate matter, etc.), humidity percentages (e.g., a range of 40-95% humidity, etc.), etc., experienced by the engine 102. In some examples, the asset environmental data 432 includes a duration of environmental condition parameters experienced by the engine 102. For example, the asset environmental data 432 can include an amount of time the engine 102 experienced a salt atmosphere of 30%, 40%, 50%, etc.

In the illustrated example of FIG. 60, the data collection engine 6000 obtains the operational/utilization data 434 to determine a usage of the engine 102. In some examples, the operational/utilization data 434 includes a utilization plan of the engine 102. For example, the operational/utilization data 434 can include a number of cycles (e.g., flight cycles, operation cycles, etc.), a number of hours in operation, types of flight routes (e.g., flights from a first destination to a second destination, etc.), a number of flight legs (e.g., a number of hours from a first destination to a second destination, etc.), etc., completed by the engine 102. In some examples, the operational/utilization data 434 includes operating behavior of one or more assets by one or more airline operators. For example, the operational/utilization data 434 can include operating rating information corresponding to an operation of the engine 102 compared to a rated maximum capacity of the turbine engine. For example, the operational/utilization data 434 can include average takeoff de-rate information, average climb de-rate information, etc. In another example, the operational/utilization data 434 can include an average thrust parameter of the engine 102, a percentage indicating how often the engine 102 is at full power during one or more cycles, etc.

In the illustrated example of FIG. 60, the data collection engine 6000 obtains the asset configuration data 436 to determine a current or an instant configuration of the engine 102. In some examples, a physical and/or software configuration of the engine 102 can be updated, upgraded, etc., over time as maintenance is performed on the engine 102. For example, the engine 102 can be refurbished with new components, upgraded components, etc. In another example, software of the turbine engine controller 100 of the engine 102 can be upgraded to adjust or control a variable geometry of the engine 102 when in operation. In such examples, the asset configuration data 436 can include a current list of components in the engine 102, a current software version of the turbine engine controller 100, etc.

In the illustrated example of FIG. 60, the data collection engine 6000 obtains the asset class history data 438 to determine a baseline operation parameter, performance parameter, reliability parameter, etc., of an asset in response to upgrading a hardware and/or a software component of the asset. For example, an asset class can correspond to a fleet of substantially similar assets used to generate a baseline durability parameter or a baseline reliability parameter by analyzing durability parameters, reliability parameters, etc., for the fleet. For example, the engine 102 can belong to a first asset class corresponding to a first baseline durability parameter, a first baseline reliability parameter, etc.

In such an example, an upgrade in a hardware and/or a software component of the engine 102 can cause the engine 102 to correspond to a second asset class corresponding to a second baseline durability parameter, a second baseline reliability parameter, etc., where the second parameters can be an improvement compared to the first parameters. In some examples, the data collection engine 6000 obtains the asset class history data 438 to ensure that the parameter tracker 6005, the health quantifier calculator 6010, etc., uses the model inputs 335 based on the current asset class of the engine 102 compared to a previous asset class of the engine 102 (e.g., an asset class of the engine 102 prior to an upgrade, etc.).

In the illustrated example of FIG. 60, the data collection engine 6000 obtains the one or more workscope quantifiers 440 to determine an accuracy of AHQ generated by the asset health calculator 300 and/or the FAHA 320. For example, the data collection engine 6000 can obtain a workscope quantifier of 10%, 20%, 30%, etc., calculated by the workscope effect calculator 315. For example, the FAHA 320 can determine to update one or more parameters of the FAHA 320 based on the workscope quantifier. For example, the FAHA 320 can update the model inputs 335 by updating (e.g., directing an updating, etc.) a historical data model 450, a physics-based model 452, a stochastic model 454, a hybrid model 456, etc., and/or a combination thereof to incorporate a latest version of information, parameter values, etc.

In the illustrated example of FIG. 60, the FAHA 320 includes the parameter tracker 6005 to execute a tracking filter based on tracking filter data to calculate calibrated simulated sensor data. In some examples, the tracking filter data includes simulated asset sensor data (e.g., simulated steady-state asset sensor data, simulated transient asset sensor data, etc.) corresponding to the engine 102 of FIG. 1. In some examples, the parameter tracker 6005 obtains the simulated asset sensor data based on the model inputs 335. In some examples, the parameter tracker 6005 obtains the simulated asset sensor data from the database 345.

In some examples, the tracking filter data includes simulated steady-state asset sensor data. For example, the parameter tracker 6005 can obtain simulated steady-state exhaust gas-path temperature (EGT) sensor data of the engine 102 by simulating the sensors 144, 146 of FIGS. 1-2 in a steady-state. For example, the parameter tracker 6005 can direct the physics-based model 452 to simulate the engine 102 using operating conditions corresponding to an aircraft in a steady-state such as a cruising flight segment to generate simulated steady-state EGT sensor data.

In some examples, the tracking filter data includes transient asset sensor data. For example, the parameter tracker 6005 can obtain simulated transient EGT sensor data of the engine 102 by simulating the sensors 144, 146 of FIGS. 1-2 in a transient state. For example, the parameter tracker 6005 can direct the physics-based model 452 to simulate the engine 102 using operating conditions corresponding to an aircraft in a transient state such as transitioning from a climbing flight segment to a cruising flight segment to generate simulated transient EGT sensor data. For example, the physics-based model 452 can simulate a sensor using a sensor model generated by calibrating (e.g., iteratively calibrating, etc.) the sensor and the sensor model during manufacturing, testing, real-time operation etc., of the sensor. In another example, the parameter tracker 6005 can direct the physics-based model 452 to simulate the engine 102 using operating conditions corresponding to an aircraft in a transient flight segment such as the takeoff and departure flight segment to generate simulated transient EGT sensor data.

In some examples, the tracking filter data includes physical sensor-based asset sensor data based on obtaining steady-state asset sensor data, transient asset sensor data, etc., from the sensors 144, 146 of FIGS. 1-2 (e.g., a physical sensor-based asset parameter, a non-simulated asset parameter, etc.). In some examples, the parameter tracker 6005 obtains the physical sensor-based asset sensor data corresponding to the engine 102 by obtaining the asset sensor data 430.

In some examples, the tracking filter data includes physical sensor-based steady-state asset sensor data. For example, the parameter tracker 6005 can obtain physical sensor-based steady-state EGT sensor data of the engine 102 by obtaining EGT sensor data from the sensors 144, 146 of FIGS. 1-2 in steady-state. For example, the parameter tracker 6005 can obtain physical sensor-based steady-state EGT sensor data by obtaining the asset sensor data 430 from the sensors 144, 146 of FIGS. 1-2 during operating conditions corresponding to an aircraft in a steady-state such as a cruising flight segment.

In some examples, the tracking filter data includes physical sensor-based transient asset sensor data. For example, the parameter tracker 6005 can obtain physical sensor-based transient EGT sensor data of the engine 102 by obtaining EGT sensor data from the sensors 144, 146 of FIGS. 1-2 in a transient state. For example, the parameter tracker 6005 can obtain physical sensor-based transient EGT sensor data by obtaining the asset sensor data 430 from the sensors 144, 146 of FIGS. 1-2 during operating conditions corresponding to an aircraft in a transient state such as a transitioning from a climbing flight segment to a cruising flight segment.

In some examples, the parameter tracker 6005 selects tracking filter data to be used by the tracking filter based on the steady-state asset sensor data and/or the transient asset sensor data. For example, the parameter tracker 6005 can select the tracking filter data to include steady-state asset sensor data, transient asset sensor data, etc., and/or a combination thereof. For example, the parameter tracker 6005 can select the tracking filter data to include steady-state asset sensor data (e.g., simulated steady-state asset sensor data, physical sensor-based steady-state asset sensor data, etc.) and/or transient asset sensor data (e.g., simulated transient asset sensor data, physical sensor-based transient asset sensor data, etc.).

In some examples, the parameter tracker 6005 determines that the tracking filter data includes only steady-state asset sensor data. In some examples, the parameter tracker 6005 determines that the tracking filter data includes only the transient asset sensor data. In some examples, the parameter tracker 6005 determines that the tracking filter data includes a combination of the steady-state asset sensor data and the transient asset sensor data. For example, the parameter tracker 6005 can merge steady-state operation points with snapshots, snippets, etc., of transient operation periods compared to using a long window of transient operation data. For example, the parameter tracker 6005 can calculate average tracking filter data at a first time instance or during a first time interval based on an average of (1) steady-state asset sensor data at the first time instance or during the first time interval and (2) transient asset sensor data at the first time instance or during the first time interval. In another example, the parameter tracker 6005 can select the tracking filter data to include (1) steady-state asset sensor data for a second time instance or for a second time interval and select (2) transient asset sensor data for a third time instance or for a third time interval.

In some examples, the parameter tracker 6005 uses a tracking filter (e.g., a Kalman filter, etc.) to calculate a difference between the simulated asset sensor data and the physical sensor-based asset sensor data. In some examples, the parameter tracker 6005 uses the tracking filter to calculate calibrated asset sensor data based on the difference between simulated and acquired asset sensor data. For example, the parameter tracker 6005 can calculate a difference between (1) simulated EGT sensor data of the engine 102 based on the model inputs 335 and (2) actual EGT sensor data of the engine 102 based on the asset sensor data 430. In such an example, the parameter tracker 6005 can calculate calibrated asset sensor data based on the difference between the simulated EGT sensor data and the actual EGT sensor data.

In some examples, the parameter tracker 6005 transmits the calibrated asset sensor data to one or more of the models 450, 452, 454, 456 of FIG. 60, the database 345, etc., to re-calculate the model inputs 335. For example, the parameter tracker 6005 can determine that the model inputs 335 are diverging from the asset sensor data 430 obtained from the engine 102. For example, the parameter tracker 6005 can transmit the calibrated asset sensor data to the physics-based model 452 to optimize and/or otherwise improve functionality of the physics-based model 452 to generate AHQ, simulated sensor data, etc., to minimize the divergence from the asset sensor data 430. For example, the physics-based model 452 can use the calibrated asset sensor data to generate simulated sensor data that tracks more accurately with the asset sensor data 430 obtained from the engine 102.

In the illustrated example of FIG. 60, the FAHA 320 includes the health quantifier calculator 6010 to calculate actual AHQ, projected AHQ, etc., based on the model inputs 335. For example, the FAHA 320 can use the health quantifier calculator 6010 to calculate AHQ of the engine 102 of FIG. 1 based on the model inputs 335 while the engine 102 is on-wing of an aircraft or while the engine 102 is fielded, prior to a maintenance inspection, etc. For example, the health quantifier calculator 6010 can obtain the model inputs 335 based on executing one or more of the historical data model 450, the physics-based model 452, the stochastic model 454, the hybrid model 456, etc., using the calibrated asset sensor data. In such an example, the health quantifier calculator 6010 can use the model inputs 335 that are the most restrictive or the health quantifier calculator 6010 can use an average of one or more of the model inputs 335.

In some examples, the health quantifier calculator 6010 uses the historical data model 450 to generate the model inputs 335. For example, the health quantifier calculator 6010 can use the historical data model 450 to generate the model inputs 335 while the engine 102 is on-wing of an aircraft, while the engine 102 is fielded, prior to a maintenance inspection, etc. For example, the historical data model 450 can be a regression model or any other type of statistical model using asset monitoring information (e.g., historical asset monitoring information, etc.) based on the inputs 325, information stored in the database 345, the calibrated asset sensor data from the parameter tracker 6005, etc. For example, the historical data model 450 can generate the model inputs 335 by performing a statistical analysis on previous workscope operations. For example, the historical data model 450 can obtain information corresponding to assets similar in asset configuration, asset class, environment, utilization, etc., to the engine 102. In such an example, the historical data model 450 can generate metrics and quantifiers that can be applied to the engine 102. For example, the historical data model 450 can calculate a percentage of useful life remaining, a quantity of flight cycles remaining, a quantity of TOW hours remaining, etc., for the engine 102 based on how similar assets (e.g., assets with a substantially similar asset configuration, asset class history, etc.) have previously performed (e.g., previously performed after completing a similar workscope, etc.).

In some examples, the health quantifier calculator 6010 uses the physics-based model 452 to generate the model inputs 335. For example, the physics-based model 452 of the engine 102 can include one or more vibration models, stress models, thermo-mechanical models, aero-thermal models, aero-mechanical models, etc., of one or more sensors, asset components, etc., of the engine 102. For example, the health quantifier calculator 6010 can use the physics-based model 452 to generate the model inputs 335 while the engine 102 is on-wing of an aircraft, while the engine 102 is fielded, prior to a maintenance inspection, etc. The example physics-based model 452 can be a digital twin model of the engine 102. For example, the digital twin model can simulate physics behavior, a thermodynamic health, a performance health, etc., of the engine 102 using asset monitoring information based on the inputs 325, information stored in the database 345, the calibrated asset sensor data from the parameter tracker 6005, etc. For example, the physics-based model 452 can simulate inputs and outputs of the sensors 144, 146 of FIGS. 1-2 of the engine 102.

In some examples, the physics-based model 452 can simulate an operability of the engine 102 (e.g., an efficiency of the engine 102, etc.), a durability of the engine 102 (e.g., a mechanical stress on the fan section 108, the booster compressor 114, etc.), etc., based on simulating the engine 102 executing one or more flight cycles, flight legs, flight operations, etc. Thus, by evaluating and extrapolating from the physics-based model 452, asset characteristics can be identified and evaluated, and behavior and other outcomes associated with the asset (e.g., the engine 102, etc.) can be modeled and predicted, for example. For example, the health quantifier calculator 6010 can extrapolate the model inputs 335 of FIG. 3 obtained from the physics-based model 452 to forecast and/or otherwise predict future issues likely to arise corresponding to the engine 102 because of the characteristics of the engine 102, a utilization of the engine 102, an operating environment of the engine 102, etc.

In some examples, the health quantifier calculator 6010 uses the stochastic model 454 to generate metrics based on estimating probability distributions of potential outcomes by allowing for random variation in one or more inputs over time. For example, the health quantifier calculator 6010 can use the stochastic model 454 to generate the model inputs 335 while the engine 102 is on-wing of an aircraft, while the engine 102 is fielded, prior to a maintenance inspection, etc. In some examples, the stochastic model 454 generates the random variation based on fluctuations observed in historical data (e.g., the model inputs 335 based on the historical data model 450, etc.), the asset monitoring information based on the inputs 325, the calibrated asset sensor data from the parameter tracker 6005, etc., for a selected time period using time-series techniques. For example, the stochastic model 454 can calibrate the random variation to be within limits set forth by the outputs from the historical data model 450. In some examples, the stochastic model 454 includes generating continuous probability distributions (e.g., Weibull distributions, reliability curves, etc.) to determine a distribution of failure rates over time due to one or more asset components. For example, the stochastic model 454 can generate a failure rate of the engine 102 based on determining failure rates for the fan section 108, the booster compressor 114, etc., of the engine 102.

In some examples, the health quantifier calculator 6010 uses the hybrid model 456 to generate the model inputs 335 using one or more of the historical data model 450, the physics-based model 452, and the stochastic model 454 of FIG. 60. For example, the health quantifier calculator 6010 can use the hybrid model 456 to generate the model inputs 335 while the engine 102 is on-wing of an aircraft, while the engine 102 is fielded, prior to a maintenance inspection, etc. For example, the hybrid model 456 can be the stochastic model 454 in which the outputs from the stochastic model 454 are compared to the physics-based model 452 and the outputs are adjusted based on the comparison. In another example, the hybrid model 456 can be the stochastic model 454 in which the outputs from the stochastic model 454 can be compared to the historical data model 450 and the outputs are adjusted or calibrated based on the comparison.

In some examples, the health quantifier calculator 6010 calculates an actual AHQ of an asset component based on actual AHQ of sub-components of the asset component while on-wing of an aircraft, while the asset component is fielded, prior to a maintenance inspection, etc. For example, the health quantifier calculator 6010 can calculate an actual AHQ for the fan section 108 of FIG. 1 based on calculating an actual AHQ for sub-components of the fan section 108 based on the model inputs 335. For example, the health quantifier calculator 6010 can calculate an actual AHQ of sub-components such as a fan blade, a bearing, a speed sensor, etc., of the fan section 108 by executing the physics-based model 452 of the engine 102. In such an example, the health quantifier calculator 6010 can generate an actual AHQ of the fan section 108 based on calculating an average (e.g., a weighted average, etc.) of the actual AHQ of the fan blade, the bearing, the speed sensor, etc., of the fan section 108. In some examples, the health quantifier calculator 6010 can rank the actual AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier calculator 6010 calculates projected AHQ based on the model inputs 335. In some examples, the projected AHQ represents what an actual AHQ of an asset component can be based on forecast operating conditions. For example, the health quantifier calculator 6010 can calculate a projected AHQ for the booster compressor 114 of FIG. 1 based on an actual AHQ for the booster compressor 114 and generating the model inputs 335 based on a forecast utilization and environment plan 460. In some examples, the forecast utilization and environment plan 460 corresponds to future utilization (e.g., a number of flight cycles, flight legs, operation hours, etc.) and environments (e.g., ambient temperature ranges of 25-40 degrees Celsius, salt atmosphere percentage ranges of 15-35%, etc.) to be endured by the engine 102 in future operations.

For example, the health quantifier calculator 6010 can calculate the projected AHQ for the booster compressor 114 by calculating a change in the actual AHQ over time based on the forecast utilization and environment plan 460. For example, the health quantifier calculator 6010 can calculate a projected AHQ of 30% for the booster compressor 114 based on an actual AHQ of 70% for the booster compressor 114 and executing the models 450, 452, 454, 456 for an additional 500 flight cycles in a geographic region in which ambient temperatures range from 25-40 degrees Celsius and salt atmosphere percentages range of 15-35%.

In some examples, the health quantifier calculator 6010 calculates a projected AHQ of an asset component based on a projected AHQ of sub-components of the asset component. For example, the health quantifier calculator 6010 can calculate a projected AHQ for the fan section 108 of FIG. 1 based on calculating a projected AHQ for sub-components of the fan section 108 based on the model inputs 335. For example, the health quantifier calculator 6010 can calculate a projected AHQ of sub-components such as a fan blade, a bearing, a speed sensor, etc., of the fan section 108 by executing the physics-based model 452 of the engine 102. In such an example, the health quantifier calculator 6010 can generate a projected AHQ of the fan section 108 based on calculating an average (e.g., a weighted average, etc.) of the projected AHQ of the fan blade, the bearing, the speed sensor, etc., of the fan section 108. In some examples, the health quantifier calculator 6010 can rank the projected AHQ of the asset components (e.g., the fan section 108, the booster compressor 114, etc.) in an ascending order, a descending order, by criticality (e.g., a quantitative measure of how critical an asset component is to a function of the engine 102, etc.), etc.

In some examples, the health quantifier calculator 6010 deploys or directs a deployment of an automated (e.g., an unmanned, a computer-operated, etc.) imaging system to inspect the engine 102 to generate an AHQ. For example, the health quantifier calculator 6010 can use an imaging system including one or more cameras (e.g., digital cameras, video cameras, etc.) to capture one or more images of an asset component of the engine 102. For example, the health quantifier calculator 6010 can use an object-recognition system (e.g., a machine-learning system, a deep-learning system, etc.) to compare an image of the booster compressor 114 of FIG. 1 to an image in an object-recognition database. In some examples, the object-recognition system compares the images using an appearance-based method such as divide-and-conquer search, edge matching, greyscale matching, gradient matching, etc. In some examples, the object-recognition system compares the images using a feature-based method.

In some examples, the health quantifier calculator 6010 calculates an AHQ of the booster compressor 114 based on the comparison of an image of the booster compressor 114 captured during an inspection process, a real-time operation, a maintenance period, etc., to an image stored in the object-recognition database. For example, the health quantifier calculator 6010 can determine an AHQ of the booster compressor 114 by matching a captured image (e.g., matching a captured image within a specified object-recognition tolerance, etc.) of the booster compressor 114 with an unknown AHQ to an image stored in the object-recognition database with a known AHQ, and determining the AHQ based on the match.

In the illustrated example of FIG. 60, the FAHA 320 includes the recommendation generator 6015 to generate workscope recommendations for an asset. For example, the recommendation generator 6015 can generate a workscope recommendation for the engine 102 of FIG. 1 including maintenance operations, service operations, etc., for the engine 102. For example, the recommendation generator 6015 can compare an AHQ (e.g., an actual AHQ, a projected AHQ, etc.) to an AHQ threshold (e.g., an actual AHQ threshold, a projected AHQ threshold, etc.) and determine whether the AHQ satisfies the AHQ threshold based on the comparison. The example recommendation generator 6015 can generate a recommendation to perform maintenance on the engine 102, a component of the engine 102 (e.g., the fan section 108, the booster compressor 114, etc.), etc., based on whether the AHQ satisfies the AHQ threshold.

For example, the recommendation generator 6015 can compare an actual AHQ of 50% useful life remaining of the fan section 108 to an actual AHQ threshold of 75% of the fan section 108. The example recommendation generator 6015 can determine that the actual AHQ of 50% satisfies the actual AHQ threshold of 75% based on the actual AHQ being less than the actual AHQ threshold. For example, the recommendation generator 6015 can generate an advisory action, a maintenance alert, a service recommendation, etc., to perform a maintenance operation (e.g., replacement, refurbishment, repair, etc.) on the fan section 108 based on the AHQ satisfying the actual AHQ threshold. In some examples, the recommendation generator 6015 generates asset-level and fleet-level operation diagnostics, maintenance alerts, service recommendations, etc., to assess, summarize, visualize, etc., asset component level AHQ, asset-level AHQ, fleet-level AHQ, etc., to optimize and/or otherwise improve asset maintenance operations.

In the illustrated example of FIG. 60, the FAHA 320 includes the report generator 6020 to generate and/or otherwise prepare a report to record recommended workscope plans. For example, the report generator 6020 can generate a report including fleet-level actual AHQ, asset-level actual AHQ, asset component level actual AHQ, etc., corresponding to one or more assets and/or one or more operators. In another example, the report generator 6020 can generate a report including fleet-level projected AHQ, asset-level projected AHQ, asset component level projected AHQ, etc., corresponding to one or more assets and/or one or more operators. In yet another example, the report generator 6020 can generate a report including recommended workscopes targeting an operator, an asset owned by the operator, an asset component included in the asset, etc.

In some examples, the report generator 6020 generates a report in response to user input. For example, a user of the FAHA 320 can generate a report at any time on-demand. In some examples, the report generator 6020 generates (e.g., automatically generates, etc.) a report in response to an AHQ satisfying an AHQ threshold. For example, the report generator 6020 can generate a report including a workscope recommendation for the booster compressor 114 of the engine 102 when an actual AHQ, a projected AHQ, etc., of the booster compressor 114 satisfies an actual AHQ threshold, a projected AHQ threshold, etc.

In some examples, the report generator 6020 stores the report in the database 345. In some examples, the report generator 6020 transmits the report to an operator, to a central facility, to a maintenance facility, to a supply chain support center, etc., via the network 330 of FIG. 3. In some examples, the report generator 6020 displays the report on a display of a computing device via a web-based application, a smartphone-based application, etc.

In the illustrated example of FIG. 60, the health quantifier calculator 6010, the recommendation generator 6015, the report generator 6020, and/or, more generally, the FAHA 320 generate outputs 470. In some examples, the outputs 470 include AHQ (e.g., actual AHQ, projected AHQ, an overall actual AHQ, an overall projected AHQ, etc.) of an asset (e.g., the engine 102, etc.), an asset component (e.g., the fan section 108, the booster compressor 114, etc.), a fleet of assets, etc. In some examples, the outputs 470 include a workscope recommendations of one or more assets and/or asset components targeted for a maintenance operation, a removal from service, etc. In some examples, the outputs 470 can include reports. For example, the outputs 470 can include a report including an asset (e.g., the engine 102, etc.) targeted for maintenance and corresponding AHQ of the asset and asset components (e.g. the fan section 108, the booster compressor 114, etc.) of the asset. For example, a report identifying the booster compressor 114 of the engine 102 as a target for maintenance can be transmitted to a supply chain operations center via the network 330 to direct supply chain personnel, supply chain computing systems or algorithms, etc., to purchase replacement parts and equipment to replace the booster compressor 114, to schedule removing the engine 102 from service, to identify a maintenance facility to complete the replacement, etc.

While an example implementation of the FAHA 320 of FIG. 3 is illustrated in FIG. 60, one or more of the elements, processes and/or devices illustrated in FIG. 60 may be combined, divided, re-arranged, omitted, eliminated, and/or implemented in any other way. Further, the example data collection engine 6000, the example parameter tracker 6005, the example health quantifier calculator 6010, the example recommendation generator 6015, the example report generator, and/or, more generally, the example FAHA 320 of FIG. 3 may be implemented by hardware, software, firmware and/or any combination of hardware, software and/or firmware. Thus, for example, any of the example data collection engine 6000, the example parameter tracker 6005, the example health quantifier calculator 6010, the example recommendation generator 6015, the example report generator, and/or, more generally, the example FAHA 320 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collection engine 6000, the example parameter tracker 6005, the example health quantifier calculator 6010, the example recommendation generator 6015, and/or the example report generator is/are hereby expressly defined to include a non-transitory computer readable storage device or storage disk such as a memory, a digital versatile disk (DVD), a compact disk (CD), a Blu-ray disk, etc. including the software and/or firmware. Further still, the example FAHA 320 of FIG. 3 may include one or more elements, processes and/or devices in addition to, or instead of, those illustrated in FIG. 60, and/or may include more than one of any or all of the illustrated elements, processes, and devices.

Figure 61:
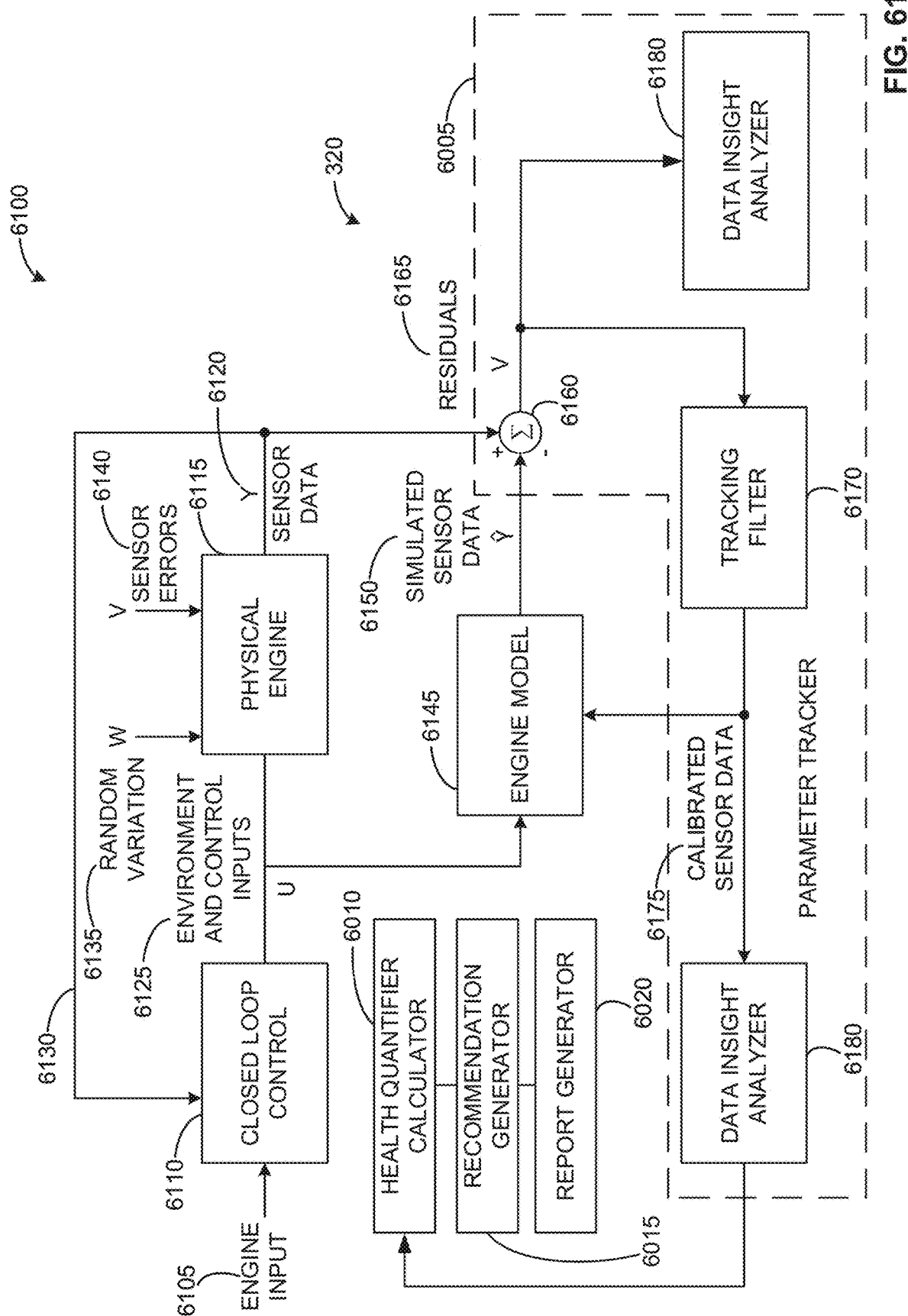
FIG. 61 is a block diagram of an example implementation of the example fielded asset health advisor apparatus of FIG. 60 executing a tracking filter system using data from the turbine engine of FIG. 1 and a digital twin model of the turbine engine of FIG. 1.

FIG. 61 is a block diagram of an example implementation of the example FAHA 320 executing a tracking filter system 6100 using data (e.g., asset sensor data 430 of FIG. 60, etc.) from the engine 102 of FIG. 1 and the physics-based model 452 of FIG. 60 corresponding to the engine 102 to optimize and/or otherwise improve the physics-based model 452. In the illustrated example of FIG. 61, an engine input 6105 is directed to a closed loop control module 6110 to control a physical engine 6115. The physical engine 6115 generates sensor data 6120 based on inputs 6125 (e.g., environment and control inputs, etc.).

In the illustrated example of FIG. 61, the engine input 6105 represents a control input to the physical engine 6115. For example, the engine input 6105 can be a command from a pilot, a command from an automated engine control system, etc., to control the engine 102. For example, the engine input 6105 can correspond to the asset sensor data 430 of FIG. 60. In the illustrated example of FIG. 61, the closed loop control module 6110 represents one or more control algorithms executed by the turbine engine controller 100 of FIGS. 1-2. For example, the closed loop control module 6110 can calculate the control inputs 6125 based on the engine input 6105 and a feedback loop 6130. For example, the closed loop control module 6110 can correspond to the turbine engine controller 100 of FIGS. 1-2. The environment inputs 6125 of the illustrated example represent environmental factors experienced by the physical engine 6115. For example, the environment inputs 6125 can include an ambient temperature of the engine 102 when in a parked flight segment, a taking off flight segment, etc. In another example, the environment inputs 6125 can be an airborne particulate matter, a salt atmosphere content, a humidity atmosphere content, etc.

In the illustrated example of FIG. 61, the physical engine 6115 represents a physical (e.g., an actual, etc.) turbine engine executing a turbine engine operation (e.g., turning a rotor blade at a specified rate, etc.) in response to receiving the environment and control inputs 6125. For example, the physical engine 6115 can correspond to the engine 102 of FIG. 1. The physical engine 6115 of the illustrated example generates the sensor data 6120 based on random variation 6135 and sensor errors 6140. The sensor data 6120 of the illustrated example represents asset sensor data obtained from the sensors 144, 146 of FIGS. 1-2. For example, the sensor data 6120 can correspond to the asset sensor data 430 of FIG. 60. In some examples, the sensor data 6120 corresponds the asset sensor data 430 when the engine 102 is in a steady-state flight segment such as a cruising flight segment. In some examples, the sensor data 6120 corresponds to the asset sensor data 430 when the engine 102 is in a transient flight segment such as a transition between a climbing flight segment and the cruising flight segment.

The random variation 6135 of the illustrated example of FIG. 61 represents variation in asset component operation of the physical engine 6115. For example, the high-pressure turbine 120 of FIG. 1 can operate within a tolerance of 10 PSI, 25 PSI, 50 PSI, etc., due to random environment or operating characteristics of the high-pressure turbine 120 and/or the engine 102. The sensor errors 6140 of the illustrated example represent a variation in a sensor measurement of a condition to the condition. For example, the sensor errors 6140 can be a variation in thermocouple device, a piezoelectric crystal, an integrated circuit chip electrical characteristic, etc., of the sensors 144, 146. In another example, the sensor errors 6140 can be an offset due to an improper calibration, an out-of-date calibration, etc., of the sensors 144, 146.

In the illustrated example of FIG. 61, the tracking filter system 6100 includes an engine model 6145 to simulate the physical engine 6115. For example, the engine model 6145 can be the historical data model 450, the physics-based model 452, the stochastic model 454, the hybrid model 456, etc., of FIG. 60. The engine model 6145 of the illustrated example generates simulated sensor data 6150 based on the environment and control inputs 6125 and calibrated sensor data 6175. The simulated sensor data 6150 of the illustrated example can correspond to the model inputs 335 of FIGS. 3 and/or 60. For example, the engine model 6145 can generate predicted values for the sensor data 6120 based on executing one or more of the models 450, 452, 454, 456 of FIG. 60. For example, the engine model 6145 can generate the simulated sensor data 6150 to represent a simulation of the sensor data 6120 based on similar (e.g., substantially similar, a similar value within a tolerance, etc.) inputs (e.g., the environment and control inputs 6125, etc.) and adjusted simulated sensor data (e.g., the calibrated sensor data 6175, etc.). For example, the engine model 6145 can generate the simulated sensor data 6150 corresponding to a temperature sensor by simulating an ambient temperature substantially similar to an ambient temperature experienced by the engine 102 within a tolerance of 0.5 degrees Rankine.

In the illustrated example of FIG. 61, the tracking filter system 6100 includes the parameter tracker 6005 of FIG. 61 to compare the sensor data 6120 to the simulated sensor data 6150. In the illustrated example of FIG. 61, the parameter tracker 6005 includes a difference calculator 6160 to calculate a difference between the sensor data 6120 and the simulated sensor data 6150 to generate residuals 565. For example, the residuals 565 can be a difference between a temperature sensor measurement obtained from the sensors 144, 146 of FIGS. 1-2 and a simulated temperature sensor measurement corresponding to the sensors 144, 146. The residuals 565 of the illustrated example can be directed, transmitted, etc., to the recommendation generator 6015 to generate a workscope recommendation based on the residuals 565.

In the illustrated example of FIG. 61, the parameter tracker 6005 includes a tracking filter 6170 to generate calibrated sensor data 6175. For example, the tracking filter 6170 can be a classical observer, an inverse Jacobian tracking filter, a least-squares tracking filter, a Kalman Filter (optimal observer), etc. In the illustrated example of FIG. 61, the parameter tracker 6005 uses the tracking filter 6170 to generate the calibrated sensor data 6175 based on steady-state information, transient information, etc., and/or a combination thereof.

In some examples, the tracking filter 6170 is a Kalman filter. In such examples, the tracking filter 6170 assigns a tracking filter adjustment factor such as a Gaussian white noise parameter to each measurement (e.g., each input, each output, etc.). For example, the tracking filter adjustment factor can correspond to a standard deviation of Gaussian white noise. For example, if the tracking filter 6170 assigns a Gaussian white noise standard deviation of zero to a measurement, then the measurement can correspond to an exact value of the measurement without noise. In another example, if the tracking filter 6170 assigns a Gaussian white noise standard deviation of infinite standard deviations, then the tracking filter 6170 can ignore the measurement.

In some examples, the tracking filter 6170 assigns a value for a Gaussian white noise standard deviation to smooth asset parameters based on transient asset information. For example, the engine model 6145 can generate a first efficiency of 0.8 for the low-pressure turbine 124 of FIG. 1 during the climb flight segment 6240 using a climb flight segment model (e.g., the engine model 6145 simulating the engine 102 while in the climb flight segment 6240, etc.). In such an example, the engine model 6145 can generate a second efficiency of 1.2 for the low-pressure turbine 124 during the cruise flight segment 6250 using a cruise flight segment model (e.g., the engine model 6145 simulating the engine 102 while in the cruise flight segment 6250, etc.).

In some examples, however, the first and the second efficiencies should be comparable to simulate real-time operation of the engine 102. To reduce the difference between the first and the second efficiencies, the example tracking filter 6170 can add a value for the Gaussian white noise standard deviation to the first efficiency to yield the second efficiency. For example, the tracking filter 6170 can determine the second efficiency as a sum of the first efficiency and the value for the Gaussian white noise standard deviation. The example tracking filter 6170 can generate the calibrated sensor data 6175 based on the value for the Gaussian white noise standard deviation, which, in turn, can direct the engine model 6145 to generate more accurate simulated sensor data 6150.

In some examples, the tracking filter system 6100 can be executed using steady-state information (e.g., steady-state sensor data, steady-state simulated sensor data, etc.) corresponding to information obtained from the engine 102 when the engine 102 is operating in a steady-state flight segment (e.g., operating in a cruising segment, etc.). In some examples, the tracking filter system 6100 can be executed using transient information (e.g., transient sensor data, transient simulated sensor data, etc.) corresponding to information obtained from the engine 102 when the engine 102 is transitioning flight segments (e.g., transitioning from the climbing flight segment to the cruising flight segment, etc.). For example, the tracking filter 6170 can obtain the sensor data 6120, the simulated sensor data 6150, the residuals 565, etc., based on the physical engine 6115 operating in a steady-state, a transient state, etc., and the engine model 6145 simulating the physical engine 6115 operating in the steady-state, the transient state, etc.

For example, the tracking filter 6170 can obtain the sensor data 6120, the simulated sensor data 6150, etc., based on the physical engine 6115 operating in a steady-state and the engine model 6145 simulating the physical engine 6115 operating in the steady-state. In another example, the tracking filter 6170 can obtain the sensor data 6120, the simulated sensor data 6150, etc., based on the physical engine 6115 operating in a transient state and the engine model 6145 simulating the physical engine 6115 operating in the transient state.

In some examples, the parameter tracker 6005 directs the tracking filter 6170 to select tracking filter data to be processed. For example, the tracking filter 6170 can select the tracking filter data to include the sensor data 6120, the simulated sensor data 6150, etc., corresponding to the physical engine 6115 and the engine model 6145 in a steady-state. In another example, the tracking filter 6170 can select the tracking filter data to include the sensor data 6120, the simulated sensor data 6150, etc., corresponding to the physical engine 6115 and the engine model 6145 in a transient state. In yet another example, the tracking filter 6170 can select the tracking filter data to include a combination of the sensor data 6120, the simulated sensor data 6150, etc., corresponding to (1) the physical engine 6115 and the engine model 6145 in the steady-state and (2) the physical engine 6115 and the engine model 6145 in the transient state.

In some examples, the calibrated sensor data 6175 includes adjusted states and parameters of an asset, an asset component, etc., simulated by the engine model 6145. For example, the calibrated sensor data 6175 can include an adjusted simulated temperature sensor measurement based on comparing the simulated temperature sensor measurement included in the simulated sensor data 6150 to the temperature sensor measurement included in the sensor data 6120.

In the illustrated example of FIG. 61, the parameter tracker 6005 includes a data insight analyzer 6180 to evaluate changes in the residuals 565, the calibrated sensor data 6175, etc., over time. For example, the data insight analyzer 6180 can transmit trend information to the health quantifier calculator 6010 of FIG. 60. In some examples, the data insight analyzer 6180 detects changepoint type shifts after maintenance or operation events (e.g., a water wash of the engine 102, a debris ingestion of the engine 102, etc.). In some examples, the data insight analyzer 6180 determines correlations between parameters (e.g., a correlation between a first and a second transient asset parameter, etc.), performs data comparisons, calculates differences between parameter values for the engine 102 compared to fleet parameter values, etc. In some examples, the data insight analyzer 6180 identifies non-responsive or failing sensors based on executing the tracking filter 6170. In some examples, the data insight analyzer 6180 identifies potential non-responsive or potential failing sensors by identifying slow drifts in sensor values, sudden shifts in sensor values, etc. In such examples, the data insight analyzer 6180 can direct the parameter tracker 6005 to remove, isolate, prevent, etc., the identified non-responsive sensors or the identified potential non-responsive sensors from being used by the tracking filter 6170.

In some examples, the health quantifier calculator 6010 adjusts a calculation of an AHQ based on a trend analysis (e.g., an increase in the residuals 565 over time, a decrease in the calibrated sensor data 6175 over time, etc.) of the calibrated sensor data 6175 obtained from the data insight analyzer 6180. In some examples, the recommendation generator 6015 generates a workscope recommendation for the engine 102 based on a trend analysis of the calibrated sensor data 6175 and the report generator 6020 can generate a report including the workscope recommendation and the trend analysis of the calibrated sensor data 6175.

In the illustrated example of FIG. 61, the example tracking filter system 6100 includes the tracking filter 6170 to compare the simulated sensor data 6150 generated by the engine model 6145 to the sensor data 6120 generated by the physical engine 6115 to optimize and/or otherwise improve the engine model 6145. For example, the engine model 6145 can adjust (e.g., iteratively adjust, etc.) one or more physics-based calculations, regression or statistical calculations, etc., based on the calibrated sensor data 6175. For example, the engine model 6145 can generate the simulated sensor data 6150 to match the sensor data 6120 more accurately based on the calibrated sensor data 6175.

Figure 62:
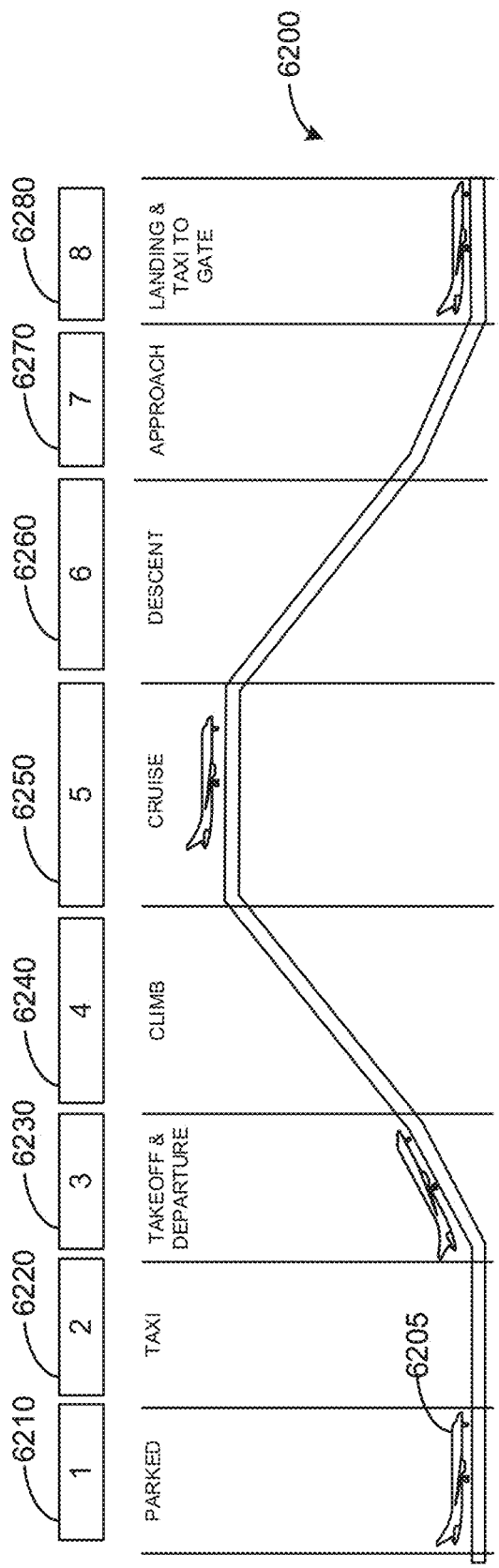
FIG. 62 is a schematic illustration of example flight segments in which the turbine engine of FIG. 1 can be used.

FIG. 62 is a schematic illustration of example flight segments of a flight route 6200 in which the turbine engine 102 of FIG. 1 can be used. In the illustrated example, the engine 102 can be coupled to an aircraft 6205. The flight route 6200 of the illustrated example includes a parked flight segment 6210, a taxi flight segment 6220, a takeoff and departure flight segment 6230, a climb flight segment 6240, a cruise flight segment 6250, a descent flight segment 6260, an approach flight segment 6270, and a landing and taxi to gate flight segment 6280. Additionally or alternatively, there may be fewer or more flight segments in the flight route 6200.

In the example flight route 6200, the engine 102 experiences steady-state and transient flight segments. For example, one or more of the parked flight segment 6210, the taxi flight segment 6220, the cruise flight segment 6250, and the landing and taxi to gate flight segment 6280 can correspond to a steady-state flight segment. In another example, one or more of the takeoff and departure flight segment 6230, the climb flight segment 6240, the descent flight segment 6260, and the approach flight segment 6270 can correspond to a transient flight segment. In some examples, the engine 102 generates steady-state asset data (e.g., steady-state asset sensor data, etc.) when the engine 102 is not transitioning between flight segments. For example, the engine 102 can generate steady-state asset sensor data when the engine 102 is in the parked flight segment 6210, the taxi flight segment 6220, the cruise flight segment 6250, etc., and does not transition to another flight segment. For example, the engine 102 can generate (e.g., iteratively generate, etc.) steady-state asset sensor data when the engine 102 is operating in the cruise flight segment 6250 and does not transition to the descent flight segment 6260.

In some examples, the engine 102 generates transient asset data (e.g., transient asset sensor data, etc.) when the engine 102 is transitioning between flight segments. For example, the engine 102 can generate transient asset sensor data when the engine 102 is transitioning from the taxi flight segment 6220 to the takeoff and departure flight segment 6230, transitioning from the climb flight segment 6240 to the cruise flight segment 6250, etc. For example, the engine 102 can generate (e.g., iteratively generate, etc.) transient asset sensor data when the engine 102 is operating in a transition period between the cruise flight segment 6250 and the descent flight segment 6260.

Flowcharts representative of example machine readable instructions for implementing the example FAHA 320 of FIGS. 3 and/or 60-61 are shown in FIGS. 63-66. In these examples, the machine readable instructions comprise a program for execution by a processor such as a processor 6712 shown in the example processor platform 6700 discussed below in connection with FIG. 67. The program may be embodied in software stored on a non-transitory computer readable storage medium such as a CD-ROM, a floppy disk, a hard drive, a DVD, a Blu-ray disk, or a memory associated with the processor 6712, but the entire program and/or parts thereof could alternatively be executed by a device other than the processor 6712 and/or embodied in firmware or dedicated hardware. Further, although the example program is described with reference to the flowcharts illustrated in FIGS. 63-66, many other methods of implementing the example FAHA 320 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 63-66 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 63:
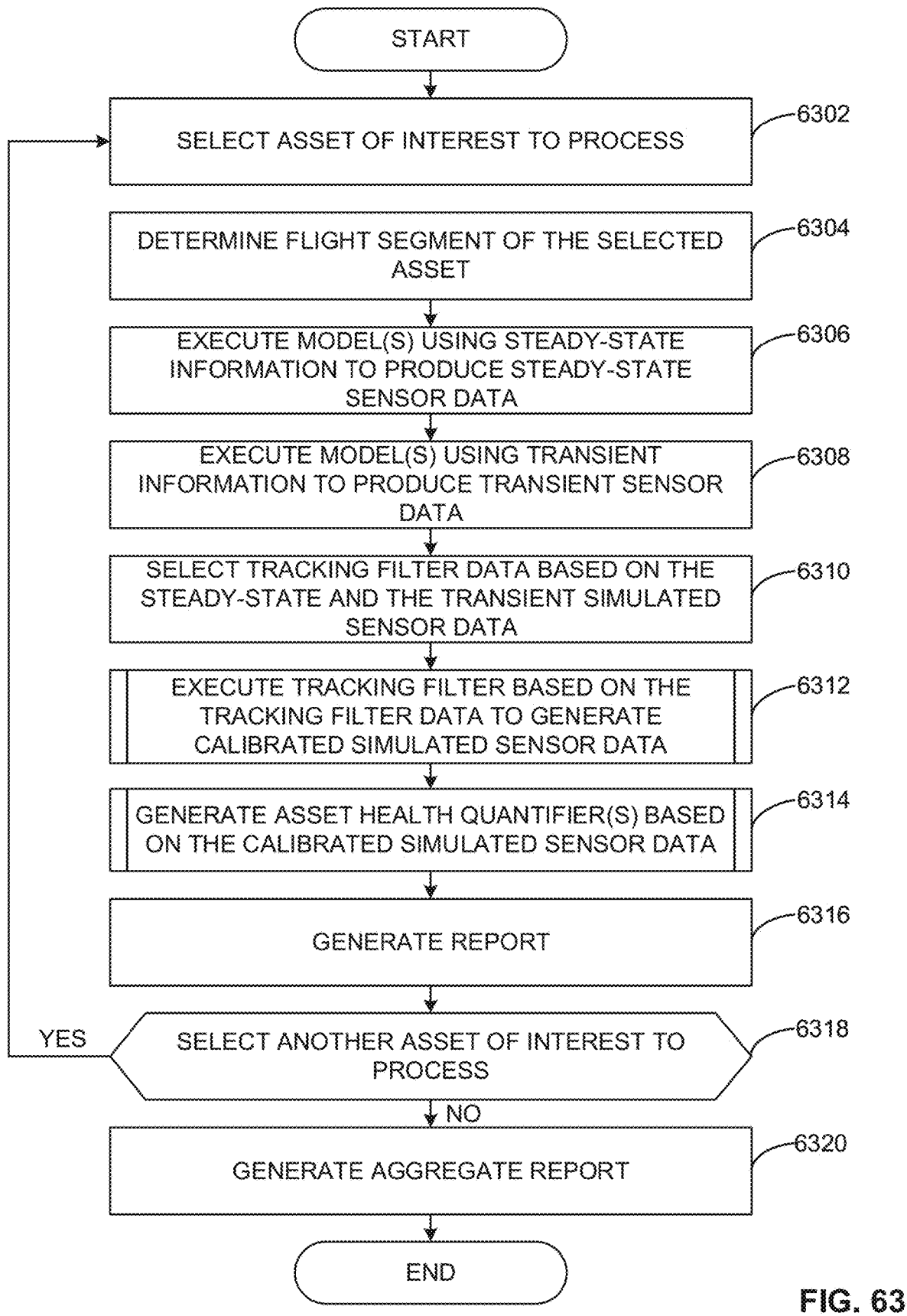
FIGS. 63-66 are flowcharts representative of example methods that can be executed by the example asset workscope generation system of FIG. 3 and/or the example fielded asset health advisor apparatus of FIGS. 3 and/or 60-61 to implement the examples disclosed herein.

FIG. 63 is a flowchart representative of an example method that can be performed by the example FAHA 320 of FIGS. 3 and/or 60-61 to generate a report corresponding to a workscope of the engine 102. The example method begins at block 6302 at which the example FAHA 320 selects an asset of interest to process. For example, the data collection engine 6000 of FIG. 60 can select the engine 102 of FIG. 1.

At block 6304, the example FAHA 320 determines a flight segment of the selected asset. For example, the data collection engine 6000 can determine that the engine 102 is coupled to an aircraft operating in the cruising flight segment 6250. For example, the data collection engine 6000 can obtain information from the engine 102 while the engine 102 is in operation. At block 6306, the example FAHA 320 executes model(s) using steady-state information to produce steady-state sensor data. For example, the parameter tracker 6005 can direct the physics-based model 452 of FIG. 60 to generate the model inputs 335 of FIGS. 3 and/or 60 using steady-state simulated asset sensor data. In another example, the parameter tracker 6005 can direct the engine model 6145 of FIG. 61 to generate the simulated sensor data 6150 of FIG. 61 using steady-state information based on the environment and control inputs 6125 of FIG. 61.

At block 6308, the example FAHA 320 executes model(s) using transient information to produce transient sensor data. For example, the parameter tracker 6005 can direct the physics-based model 452 of FIG. 60 to generate the model inputs 335 of FIGS. 3 and/or 60 using transient simulated asset sensor data. In another example, the parameter tracker 6005 can direct the engine model 6145 of FIG. 61 to generate the simulated sensor data 6150 of FIG. 61 using transient information based on the environment and control inputs 6125 of FIG. 61.

At block 6310, the example FAHA 320 selects tracking filter data based on the steady-state and the transient simulated sensor data. For example, the parameter tracker 6005 can use the tracking filter 6170 of FIG. 61 to select the tracking filter data to include the steady-state simulated sensor data, the transient simulated sensor data, etc., and/or a combination thereof.

At block 6312, the example FAHA 320 executes a tracking filter based on the tracking filter data to generated calibrated simulated sensor data. For example, the parameter tracker 6005 can execute the tracking filter 6170 to generate the calibrated sensor data 6175 of FIG. 61. An example process that can be used to implement block 6312 is described below in connection with FIG. 64.

At block 6314, the example FAHA 320 generates asset health quantifier(s) based on the calibrated simulated sensor data. For example, the health quantifier calculator 6010 can generate an actual AHQ, a projected AHQ, etc., of the engine 102 based on the physics-based model 452 generating simulated asset sensor data (e.g., steady-state simulated asset sensor data, transient simulated asset sensor data, etc.) based on calibrated simulated sensor data (e.g., the calibrated sensor data 6175 of FIG. 61, etc.). For example, the health quantifier calculator 6010 can generate an AHQ of the engine 102 while the engine 102 is in operation. By generating an AHQ of the engine 102 while in service, the FAHA 320 can identify potential maintenance tasks prior to an inspection of the engine 102 and, thus, increase aircraft operator visibility of the engine 102 asset health. Example processes that can be used to implement block 6314 are described below in connection with FIGS. 65-66.

At block 6316, the example FAHA 320 generates a report. For example, the report generator 6020 can generate a report including recommended workscopes targeting the engine 102, an operator of the engine 102, etc. For example, the report generator 6020 can generate a report while the engine 102 is in operation and, thus, enabling greater visibility of the engine 102 asset health prior to performing an inspection of the engine 102. At block 6318, the example FAHA 320 determines whether to select another asset of interest to process. For example, the data collection engine 6000 can determine to select another turbine engine to process.

If, at block 6318, the example FAHA 320 determines to select another asset of interest to process, control returns to block 6302 to select another asset of interest to process. If, at block 6318, the example FAHA 320 determines not to select another asset of interest to process, then, at block 6320, the FAHA 320 generates an aggregate report. For example, the report generator 6020 can generate a report including recommended workscopes targeting a plurality of assets for an operator, a plurality of operators, etc. For example, the report generator 6020 can generate a report including recommended workscopes for 20 turbine engines owned and operated by one aircraft operator. In another example, the report generator 6020 can generate a report including recommended workscopes for 200 turbine engines owned and operated by 10 aircraft operators. In response to the example FAHA 320 generating the aggregate report, the example method concludes.

Figure 64:
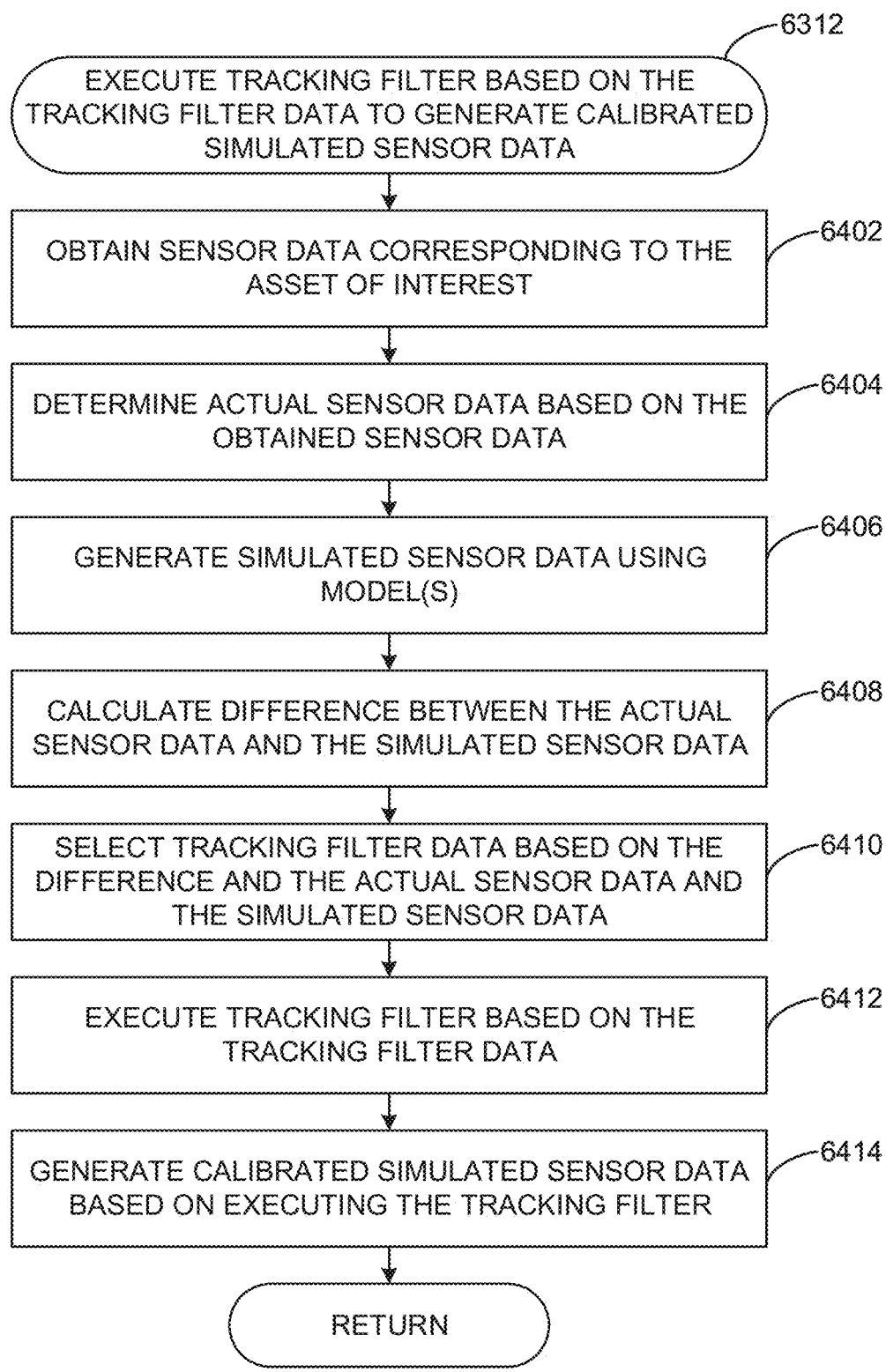

FIG. 64 is a flowchart representative of an example method that can be performed by the example FAHA 320 of FIGS. 3 and/or 60-61 to execute a tracking filter based on the tracking filter data to generate calibrated simulated sensor data. The example process of FIG. 64 can be used to implement the operation of block 6312 of FIG. 63. The example method begins at block 6402 at which the example FAHA 320 obtains sensor data corresponding to the asset of interest. For example, the data collection engine 6000 of FIG. 60 can obtain the asset sensor data 430 of FIG. 60 corresponding to the engine 102 of FIG. 1 while the engine 102 is in operation.

At block 6404, the example FAHA 320 determines actual sensor data based on the obtained sensor data. For example, the parameter tracker 6005 can obtain the sensor data 6120 based on the physical engine 6115 responding to the environment and control inputs 6125, the random variation 6135, and the sensor errors 6140 of FIG. 61.

At block 6406, the example FAHA 320 generates simulated sensor data using model(s). For example, the parameter tracker 6005 can direct the engine model 6145 to generate the simulated sensor data 6150 of FIG. 61. For example, the parameter tracker 6005 can direct the engine model 6145 to generate the simulated sensor data 6150 while the engine 102 is in operation.

At block 6408, the example FAHA 320 calculates a difference between the actual sensor data and the simulated sensor data. For example, the parameter tracker 6005 can direct the difference calculator 6160 to calculate a difference between the sensor data 6120 and the simulated sensor data 6150 of FIG. 61.

At block 6410, the example FAHA 320 selects tracking filter data base on the difference and the actual sensor data and the simulated sensor data. For example, the parameter tracker 6005 can select the tracking filter data to include steady-state actual sensor data, steady-state simulated sensor data, etc. For example, the parameter tracker 6005 can determine to select steady-state asset data compared to transient asset data based on the difference. In another example, the parameter tracker 6005 can determine to select a combination of steady-state asset data and transient asset data based on the difference.

At block 6412, the example FAHA 320 executes a tracking filter based on the tracking filter data. For example, the parameter tracker 6005 can execute the tracking filter 6170 of FIG. 61 based on the steady-state asset data, the transient asset data, etc., and/or a combination thereof. At block 6414, the example FAHA 320 generates calibrated simulated sensor data based on executing the tracking filter. For example, the parameter tracker 6005 can use the tracking filter 6170 of FIG. 61 to generate the calibrated sensor data 6175 of FIG. 61 to optimize and/or otherwise improve the engine model 6145 of FIG. 61 to be used by the health quantifier calculator 6010, and/or, more generally, the FAHA 320 to generate more accurate AHQ. In response to generating the calibrated simulated sensor data based on executing the tracking filter, the example method returns to block 6314 of the example of FIG. 63 to generate asset health quantifier(s) based on the calibrated simulated sensor data.

Figure 65:
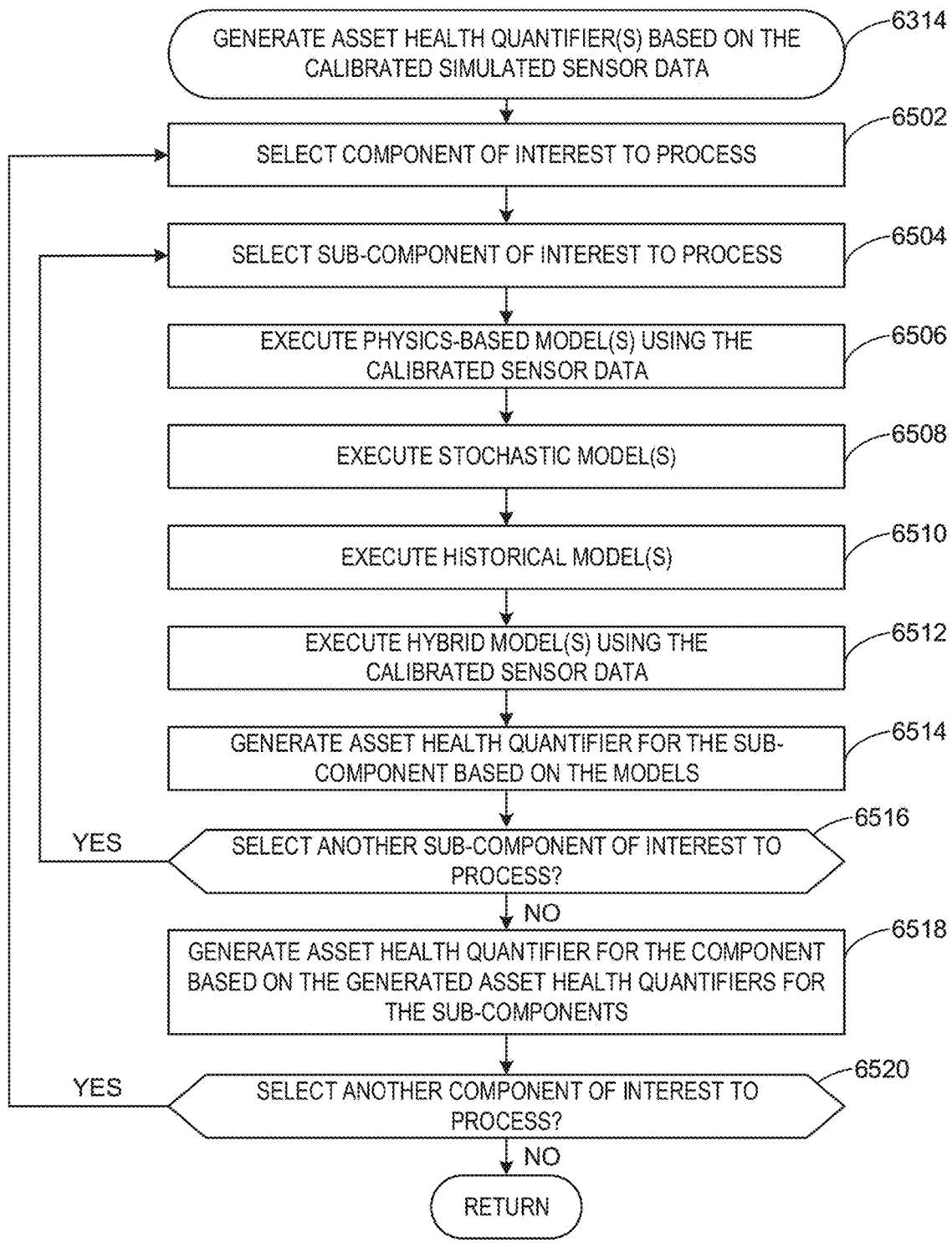

FIG. 65 is a flowchart representative of an example method that can be performed by the example FAHA 320 of FIGS. 3 and/or 60-61 to generate asset health quantifier(s) based on the calibrated simulated sensor data. The example process of FIG. 65 can be used to implement the operation of block 6314 of FIG. 63. The example method begins at block 6502 at which the example FAHA 320 selects a component of interest to process. For example, the data collection engine 6000 can select the fan section 108 of FIG. 1 to process while the fan section 108 is in operation. At block 6504, the example FAHA 320 selects a sub-component of interest to process. For example, the data collection engine 6000 can select a fan blade of the fan section 108 to process.

At block 6506, the example FAHA 320 executes physics-based model(s) using the calibrated simulated sensor data with respect to the sub-component of interest. For example, the health quantifier calculator 6010 can execute the physics-based model 452 of FIG. 60 to simulate an operation of the fan blade of the fan section 108 using the calibrated sensor data 6175 of FIG. 61 while the fan section 108 is in operation. At block 6508, the example FAHA 320 executes stochastic model(s) with respect to the sub-component of interest. For example, the health quantifier calculator 6010 can execute the stochastic model 454 of FIG. 60 to estimate a failure rate of the fan blade of the fan section 108 using a continuous probability distribution.

At block 6510, the example FAHA 320 executes historical model(s) with respect to the sub-component of interest. For example, the health quantifier calculator 6010 can execute the historical data model 450 of FIG. 60 to estimate a failure rate of the fan blade of the fan section 108 using historical data collected for fan blades operating on similar (e.g., substantially similar, etc.) assets as the engine 102.

At block 6512, the example FAHA 320 executes hybrid model(s) using the calibrated simulated sensor data with respect to the sub-component of interest. For example, the health quantifier calculator 6010 can execute the hybrid model 456 to estimate a failure rate of the fan blade of the fan section using the stochastic model 454 and comparing an output of the stochastic model 454 to an output of the physics-based model 452 using the calibrated sensor data 6175 of FIG. 61, the historical data model, etc., and/or a combination thereof.

At block 6514, the example FAHA 320 generates an asset health quantifier for the sub-component. For example, the health quantifier calculator 6010 can calculate an actual AHQ for the fan blade of the fan section 108 based on the model inputs 335 while the fan blade of the fan section 108 is in operation. At block 6516, the example FAHA 320 determines whether to select another sub-component of interest to process. For example, the data collection engine 6000 can determine to select a bearing of the fan section 108 to process.

If, at block 6516, the example FAHA 320 determines to select another sub-component of interest to process, control returns to block 6304 to select another sub-component of interest to process. If, at block 6516, the example FAHA 320 determines not to select another sub-component of interest to process, then, at block 6518, the FAHA 320 generates an asset health quantifier for the component based on the generated asset health quantifiers for the sub-components. For example, the health quantifier calculator 6010 can generate an actual AHQ for the fan section 108 based on actual AHQ of the sub-components (e.g., the fan blade, the bearing, etc.) of the fan section 108 while the fan section 108 is in operation.

At block 6520, the example FAHA 320 determines whether to select another component of interest to process.

For example, data collection engine 6000 can determine to select the booster compressor 114 of FIG. 1 to process. If, at block 6520, the example FAHA 320 determines to select another component of interest to process, control returns to block 6502 to select another component of interest to process, otherwise the example method returns to block 6316 of the example of FIG. 63 to generate a report.

Figure 66:
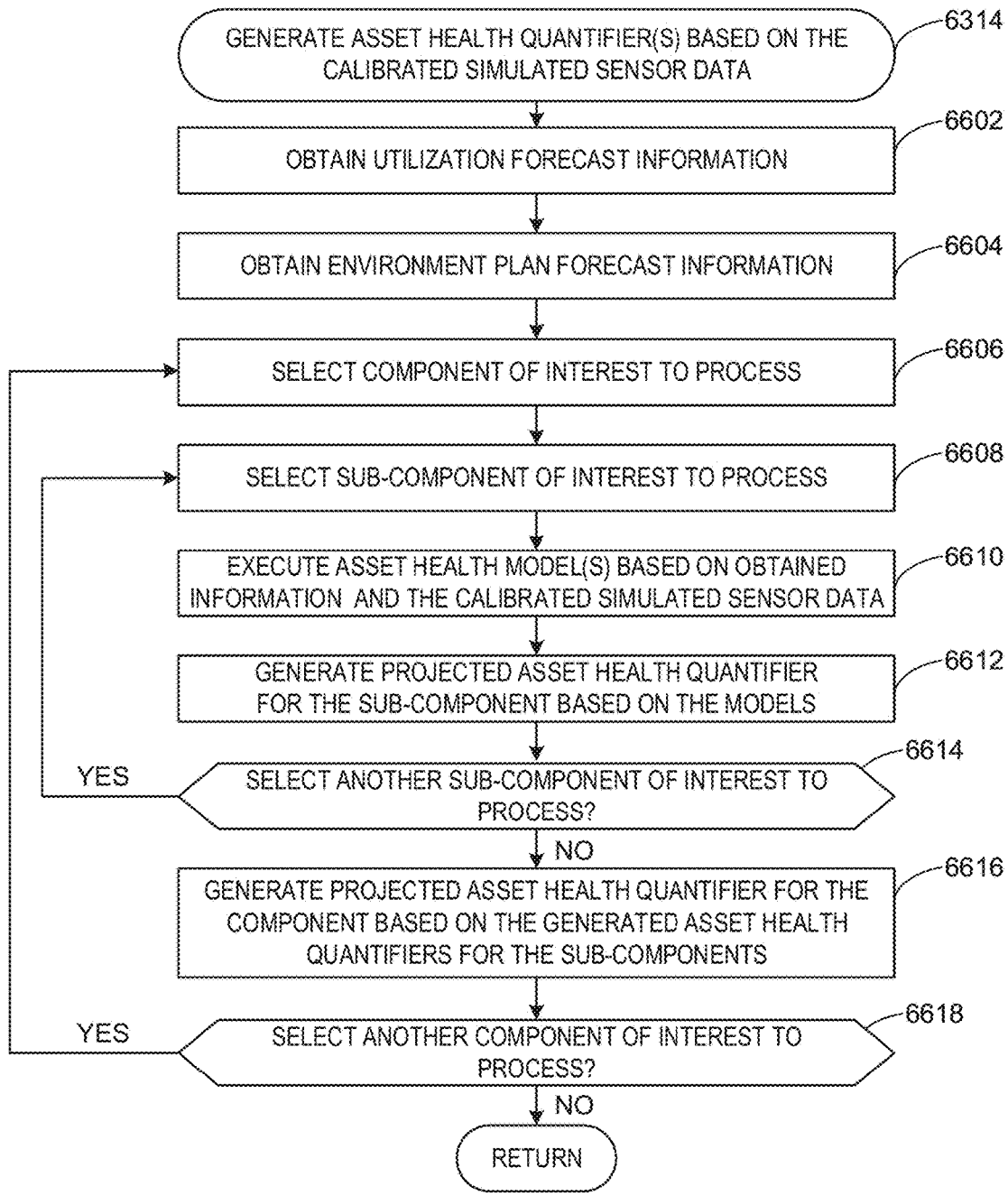

FIG. 66 is a flowchart representative of an example method that can be performed by the example FAHA 320 of FIGS. 3 and/or 60-61 to generate asset health quantifier(s) based on the calibrated simulated sensor data. For example, the method of FIG. 66 can be performed by the FAHA 320 to generate projected asset health quantifier(s) based on the calibrated sensor data. The example process of FIG. 66 can be used to implement the operation of block 6314 of FIG. 63. The example method begins at block 6602 at which the example FAHA 320 obtains utilization forecast information. For example, the data collection engine 6000 can obtain the forecast utilization and environment plan 460 of FIG. 60 for the engine 102.

At block 6604, the example FAHA 320 obtains environment plan forecast information. For example, the data collection engine 6000 can obtain the forecast utilization and environment plan 460 for the engine 102. At block 6606, the example FAHA 320 selects a component of interest to process. For example, the data collection engine 6000 can select the fan section 108 of FIG. 1 to process.

At block 6608, the example FAHA 320 selects a sub-component of interest to process. For example, the data collection engine 6000 can select a fan blade of the fan section 108 to process. At block 6610, the example FAHA 320 executes asset health model(s) based on obtained information and the calibrated simulated sensor data. For example, the health quantifier calculator 6010 can execute one or more of the historical data model 450, the physics-based model 452, the stochastic model 454, the hybrid model 456, etc., using the forecast utilization and environment plan 460 for the engine 102 and the calibrated sensor data 6175 of FIG. 61 while the engine 102 is in operation. For example, the health quantifier calculator 6010 can execute the physics-based model 452 to generate the simulated sensor data 6150 of FIG. 61 based on the calibrated sensor data 6175 of FIG. 61.

At block 6612, the example FAHA 320 generates a projected asset health quantifier for the sub-component based on the models. For example, the health quantifier calculator 6010 can generate a projected asset health quantifier for the fan blade of the fan section 108 based on executing one or more of the models 450, 452, 454, 456 of FIG. 60 while the fan blade is in operation. At block 6614, the example FAHA 320 determines whether to select another sub-component of interest to process. For example, the data collection engine 6000 can determine to select a bearing of the fan section 108 to process. For example, the data collection engine 6000 can determine to select the bearing of the fan section 108 based on comparing the fan section 108 to a configuration file, a part list, etc., in the database 345 of FIGS. 3 and/or 60. For example, the data collection engine 6000 can map the fan section 108 to the configuration file and determine a list of components included in the fan section 108 based on the mapping. For example, the data collection engine 6000 can determine whether the bearing has not been processed based on comparing components of the fan section 108 already processed to components defined in the configuration file, the part list, etc., for the fan section 108 that has not been processed.

If, at block 6614, the example FAHA 320 determines to select another sub-component of interest to process, control returns to block 6608 to select another sub-component of interest to process. If, at block 6614, the example FAHA 320 determines not to select another sub-component of interest to process, then, at block 6616, the FAHA 320 generates a projected asset health quantifier for the component based on the generated asset health quantifiers for the sub-components. For example, the health quantifier calculator 6010 can generate a projected AHQ for the fan section 108 based on projected AHQ of the sub-components (e.g., the fan blade, the bearing, etc.) of the fan section 108 while the fan section 108 is in operation.

At block 6618, the example FAHA 320 determines whether to select another component of interest to process. For example, the data collection engine 6000 can determine to process the low-pressure turbine 124 of FIG. 1. If, at block 6618, the example FAHA 320 determines to select another component of interest to process, control returns to block 6606 to select another component of interest to process, otherwise the example method returns to block 6316 of the example of FIG. 63 to generate a report.

Figure 67:
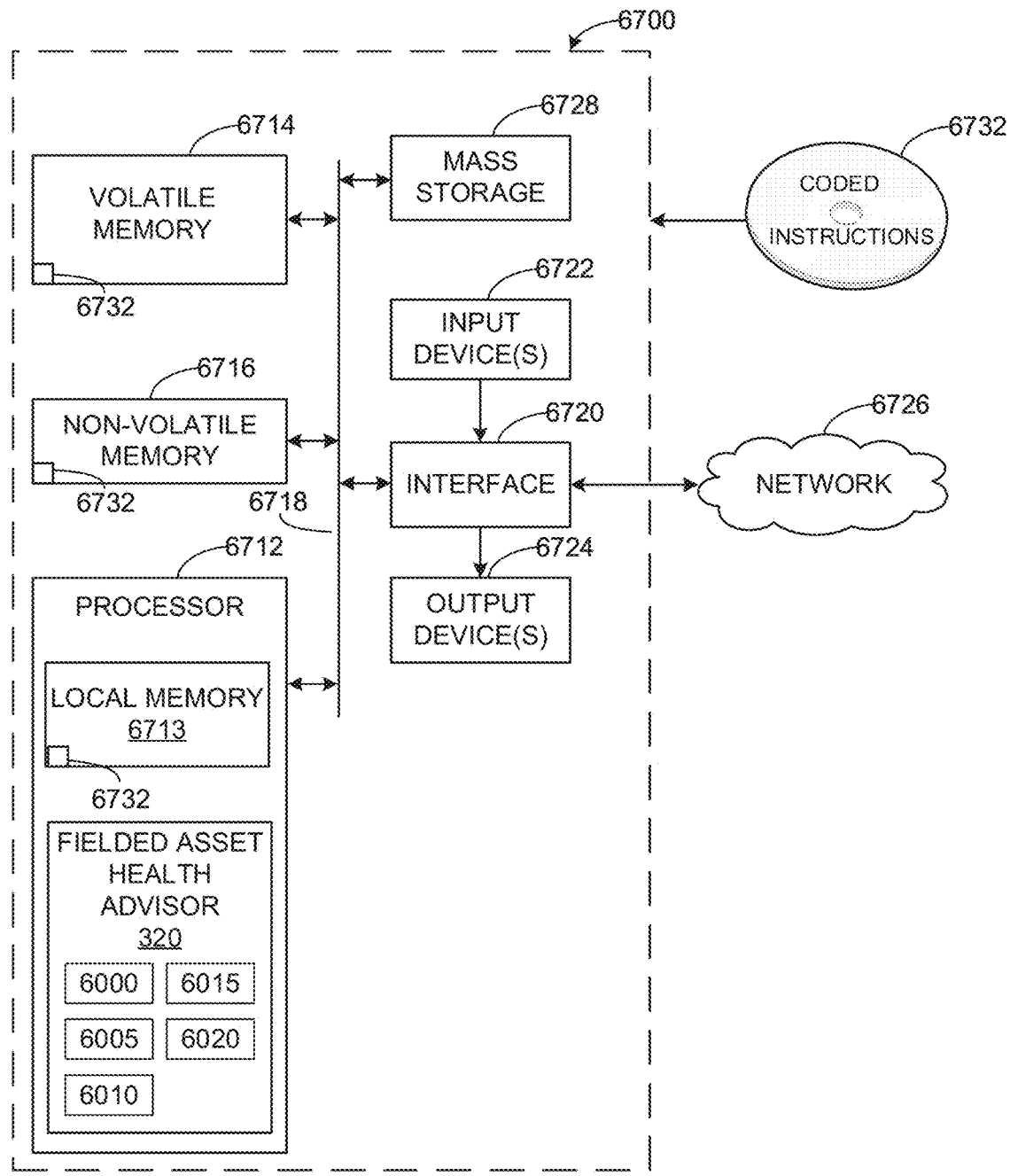
FIG. 67 is a block diagram of an example processing platform structured to execute machine-readable instructions to implement the methods of FIGS. 63-66 and/or the example fielded asset health advisor apparatus of FIGS. 3 and/or 60-61.

FIG. 67 is a block diagram of an example processor platform 6700 capable of executing the instructions of FIGS. 63-66 to implement the FAHA 320 of FIGS. 3 and/or 60-61. The processor platform 6700 can be, for example, a server, a personal computer, a mobile device (e.g., a cell phone, a smart phone, a tablet such as an iPad™), a personal digital assistant (PDA), or any other type of computing device.

The processor platform 6700 of the illustrated example includes a processor 6712. The processor 6712 of the illustrated example is hardware. For example, the processor 6712 can be implemented by one or more integrated circuits, logic circuits, microprocessors or controllers from any desired family or manufacturer. The hardware processor may be a semiconductor based (e.g., silicon based) device. In this example, the processor 6712 implements the example data collection engine 6000, the example parameter tracker 6005, the example health quantifier calculator 6010, the example recommendation generator 6015, and the report generator 6020 of FIG. 60.

The processor 6712 of the illustrated example includes a local memory 6713 (e.g., a cache). The processor 6712 of the illustrated example is in communication with a main memory including a volatile memory 6714 and a non-volatile memory 6716 via a bus 6718. The volatile memory 6714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 6716 may be implemented by flash memory and/or any other desired type of memory device. Access to the main memory 6714, 6716 is controlled by a memory controller.

The processor platform 6700 of the illustrated example also includes an interface circuit 6720. The interface circuit 6720 may be implemented by any type of interface standard, such as an Ethernet interface, a universal serial bus (USB), and/or a peripheral component interconnect (PCI) express interface.

In the illustrated example, one or more input devices 6722 are connected to the interface circuit 6720. The input device(s) 6722 permit(s) a user to enter data and/or commands into the processor 6712. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 6724 are also connected to the interface circuit 6720 of the illustrated example. The output devices 6724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 6720 of the illustrated example, thus, typically includes a graphics driver card, a graphics driver chip, and/or a graphics driver processor.

The interface circuit 6720 of the illustrated example also includes a communication device such as a transmitter, a receiver, a transceiver, a modem and/or network interface card to facilitate exchange of data with external machines (e.g., computing devices of any kind) via a network 6726 (e.g., an Ethernet connection, a digital subscriber line (DSL), a telephone line, coaxial cable, a cellular telephone system, etc.).

The processor platform 6700 of the illustrated example also includes one or more mass storage devices 6728 for storing software and/or data. Examples of such mass storage devices 6728 include floppy disk drives, hard drive disks, compact disk drives, Blu-ray disk drives, redundant array of independent disks (RAID) systems, and DVD drives.

The coded instructions 6732 of FIGS. 63-66 may be stored in the mass storage device 6728, in the volatile memory 6714, in the non-volatile memory 6716, and/or on a removable non-transitory computer readable storage medium such as a CD or DVD.

From the foregoing, it will be appreciated that example methods, apparatus, systems, and articles of manufacture have been disclosed that perform prognostic health monitoring of a turbine engine. Prior methods of performing prognostic health monitoring of a turbine engine were limited due to a lack of visibility for asset related information. Prior methods were unable to determine with a relative level of accuracy when to remove a turbine engine from service due to an inability to incorporate different facets of asset management into calculating asset health quantifiers. As a result, prior methods removed turbine engines from service either based on rudimentary time schedules, cycle counts, or based on inspection results prior to an aircraft flight, where the latter generated increased inconvenience and expense to an aircraft operator. Further, aircraft passengers can be inconvenienced when turbine engines are abruptly removed from service due to results from an inspection prior to a flight.

The above-disclosed fielded asset health advisor apparatus estimates current health states (e.g., actual AHQ, etc.) and forecasts projected health states (e.g., projected AHQ, etc.) of an asset such as a turbine engine by component and sub-component of the asset while in service with limited instrumentation using one or more models such as a digital twin model of the turbine engine. The example fielded asset health advisor apparatus can estimate the current health states and forecast the projected health states with improved accuracy by utilizing a tracking filter.

The example fielded asset health advisor apparatus can use the tracking filter to compare asset sensor data obtained from a turbine engine sensor to simulated asset data generated by the digital twin model. The example fielded asset health advisor apparatus can use the tracking filter to generate calibrated simulated sensor data based on the comparison. The example fielded asset health advisor apparatus can optimize and/or otherwise improve the digital twin model by updating one or more parameters of the digital twin model based on the calibrated simulated sensor data to generate simulated sensor data with improved accuracy compared to the sensor data obtained by the turbine engine sensor. The example fielded asset health advisor apparatus can optimize and/or otherwise improve a time on-wing or a time in operation of the asset while minimizing cost and removal time and while yet achieving a post-repair mission based on forecast utilization information for the asset by calculating asset health quantifiers based on improved accuracy of the digital twin model.

The example fielded asset health advisor apparatus can obtain asset monitoring information corresponding to a turbine engine on-wing of an aircraft while in service. The example fielded asset health advisor apparatus can generate (e.g., iteratively generate) an actual health state of the turbine engine based on generating actual health states of individual components of the turbine engine using one or more computer-generated models corresponding to the turbine engine based on calibrated simulated sensor data. The example fielded asset health advisor apparatus can generate a report including workscope recommendations that identify that the turbine engine is a candidate for removal from service to perform maintenance on one or more components of the turbine engine based on a comparison of one or more of the actual health states to an actual health state threshold. A turbine engine maintenance provider can remove the turbine engine off-wing or from service based on the report, perform the maintenance operation on the removed turbine engine, and re-deploy the turbine engine back to service where the example fielded asset health advisor apparatus can resume monitoring the turbine engine while in service. Alternatively, the example fielded asset health advisor apparatus can determine if the turbine engine should remain on-wing or in service.

Figure 68:
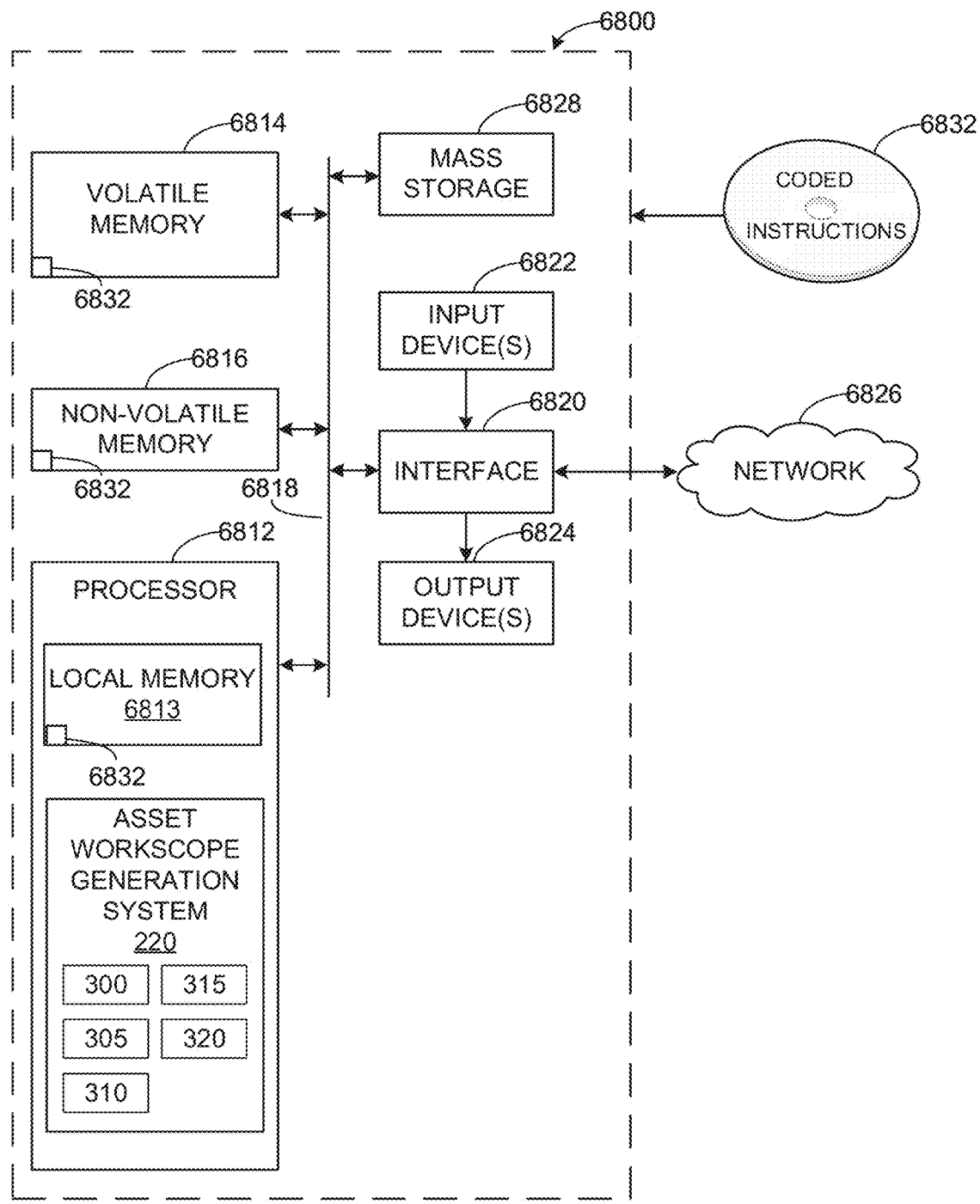
FIG. 68 is a block diagram of an example processing platform structured to execute machine-readable instructions to implement the methods of FIGS. 5-16, 18, 20, 31-34, 44, 46, 47, 56-58, and 63-66 and/or the example asset health calculator apparatus of FIGS. 3-4, the example task generator apparatus of FIGS. 25-26B, the example task optimizer apparatus of FIGS. 36-37, the example workscope effect calculator apparatus of FIGS. 3 and 49, and/or the example fielded asset health advisor apparatus of FIGS. 3 and 60-61.

FIG. 68 is a block diagram of an example processor platform 6800 capable of executing the instructions of FIGS. 5-16, 18, 20, 31-34, 44, 46, 47, 56-58, and 63-66 to implement the AWGS 220 of FIGS. 2 and/or 3. The processor platform 6800 can be, for example, a server, a personal computer, a mobile device (e.g., a cell phone, a smart phone, a tablet such as an iPad™), a personal digital assistant (PDA), or any other type of computing device.

The processor platform 6800 of the illustrated example includes a processor 6812. The processor 6812 of the illustrated example is hardware. For example, the processor 6812 can be implemented by one or more integrated circuits, logic circuits, microprocessors or controllers from any desired family or manufacturer. The hardware processor may be a semiconductor based (e.g., silicon based) device. In this example, the processor 6812 implements the example asset health calculator 300, the example task generator 305, the example task optimizer 310, the example workscope effect calculator 315, and the example FAHA 320.

The processor 6812 of the illustrated example includes a local memory 6813 (e.g., a cache). The processor 6812 of the illustrated example is in communication with a main memory including a volatile memory 6814 and a non-volatile memory 6816 via a bus 6818. The volatile memory 6814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 6816 may be implemented by flash memory and/or any other desired type of memory device. Access to the main memory 6814, 6816 is controlled by a memory controller.

The processor platform 6800 of the illustrated example also includes an interface circuit 6820. The interface circuit 6820 may be implemented by any type of interface standard, such as an Ethernet interface, a universal serial bus (USB), and/or a peripheral component interconnect (PCI) express interface.

In the illustrated example, one or more input devices 6822 are connected to the interface circuit 6820. The input device(s) 6822 permit(s) a user to enter data and/or commands into the processor 6812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 6824 are also connected to the interface circuit 6820 of the illustrated example. The output devices 6824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 6820 of the illustrated example, thus, typically includes a graphics driver card, a graphics driver chip, and/or a graphics driver processor.

The interface circuit 6820 of the illustrated example also includes a communication device such as a transmitter, a receiver, a transceiver, a modem and/or network interface card to facilitate exchange of data with external machines (e.g., computing devices of any kind) via a network 6826 (e.g., an Ethernet connection, a digital subscriber line (DSL), a telephone line, coaxial cable, a cellular telephone system, etc.).

The processor platform 6800 of the illustrated example also includes one or more mass storage devices 6828 for storing software and/or data. Examples of such mass storage devices 6828 include floppy disk drives, hard drive disks, compact disk drives, Blu-ray disk drives, redundant array of independent disks (RAID) systems, and DVD drives.

The coded instructions 6832 of FIGS. 63-66 may be stored in the mass storage device 6828, in the volatile memory 6814, in the non-volatile memory 6816, and/or on a removable non-transitory computer readable storage medium such as a CD or DVD.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   an asset health calculator configured to identify a component of an asset to be removed from operation to perform maintenance based on generating a first asset health quantifier corresponding to a first health status of the asset component by extrapolating data from a computer-generated model, the computer-generated model being configured to simulate an operating condition of the asset;
   a task generator configured to determine a first workscope including a first set of maintenance tasks to perform maintenance on the asset component;
   a task optimizer configured to determine a second workscope including a second set of maintenance tasks for the asset component based on at least one of the first asset health quantifier and the first workscope, the task optimizer further including a workscope strategy analyzer configured to:
   select a set of future workscopes based on an optimal workscope path option among a plurality of workscope path options associated with the asset, the set of future workscopes including the second workscope;
   wherein the optimal workscope path option extends from the beginning to the end of a contract associated with the asset;
   wherein each workscope of the set of future workscopes is associated with a probability of failure, and the workscope strategy analyzer is further configured to:
   select the second workscope based on a mapping of failure modes of workscopes in the set of future workscopes;
   wherein the task optimizer is further configured to:
   generate a second asset health quantifier corresponding to a second health status of the asset component when the second workscope is completed on the asset, the extrapolated data being compared to the second asset health quantifier; and
   update at least one of the asset calculator, the task generator, or the task optimizer, based on the comparison between the extrapolated data and the second asset health quantifier, to improve a determination of at least one of the first and the second workscopes to improve the second asset health quantifier relative to the first asset health quantifier.

2. The system of claim 1, wherein the computer-generated model is at least one of a physics-based model, a historical data model, a stochastic model, or a hybrid model.

3. The system of claim 2, wherein the asset health calculator is to execute the physics-based model by simulating an operation of the asset during a cycle by executing a digital twin model of the asset by simulating a sensor of the asset during the cycle.

4. The system of claim 1, wherein the task optimizer is to determine the second workscope by generating a plurality of workscopes based on at least one of contractual requirements, environmental requirements, and optimization metrics.

5. The system of claim 1, wherein the workscope effect calculator is to update the asset health calculator by improving at least one of a model algorithm, an operator behavior, or a sensor parameter corresponding to a computer-generated model used by the asset health calculator.

6. The system of claim 1, further including the workscope effect calculator to calculate a difference between the first asset health quantifier and the second asset health quantifier, comparing the difference to a workscope quantifier threshold, and determine to update at least one of the asset health calculator, the task generator, or the task optimizer based on the comparison.

7. A method comprising:
   identifying, using an asset workscope generation system (AWGS), a component of an asset to be removed from operation to perform maintenance based on generating a first asset health quantifier corresponding to a first health status of the asset component by extrapolating data from a computer-generated model, the computer-generated model being configured to simulate an operating condition of the asset;

determining, using the AWGS, a first workscope including a first set of maintenance tasks to perform maintenance on the asset component;

selecting a set of future workscopes, the set of future workscopes being selected based on an optimal workscope path option among a plurality of workscope path options from the beginning to the end of a contract associated with the asset;

determining from the set of future workscopes, using the AWGS, a second workscope including a second set of maintenance tasks for the asset component based on at least one of the first asset health quantifier and the first workscope and on a mapping of probability of failure modes of workscopes in the set of future workscopes, generating, using the AWGS a second asset health quantifier corresponding to a second health status of the asset component when the second workscope is completed on the asset, the extrapolated data being compared to the second asset health quantifier;

and updating, using the AWGS, a component of the AWGS, based on the comparison between the extrapolated data and the second asset health quantifier, to improve a determination of at least one of the first and the second workscopes to improve the second asset health quantifier relative to the first asset health quantifier.

8. The method of claim 7, wherein the computer-generated model is at least one of a physics-based model, a historical data model, a stochastic model, or a hybrid model.

9. The method of claim 8, wherein executing the physics-based model includes simulating an operation of the asset during a cycle by executing a digital twin model of the asset by simulating a sensor of the asset during the cycle.

10. The method of claim 7, wherein determining the second workscope includes generating a plurality of workscopes based on at least one of contractual requirements, environmental requirements, and optimization metrics.

11. The method of claim 7, wherein updating the component of the AWGS includes improving at least one of a model algorithm, an operator behavior, or a sensor parameter corresponding to a computer-generated model used by the AWGS.

12. The method of claim 7, further including calculating a difference between the first asset health quantifier and the second asset health quantifier, comparing the difference to a workscope quantifier threshold, and determining to update the component of the AWGS based on the comparison.

13. A non-transitory computer readable storage medium comprising instructions which when executed, cause a machine to at least:

identify, using an asset health calculator, a component of an asset to be removed from operation to perform maintenance based on generating a first asset health quantifier corresponding to a first health status of the asset component by extrapolating data from a computer-generated model, the computer-generated model being configured to simulate an operating condition of the asset;

determine, using a task generator, a first workscope including a first set of maintenance tasks to perform maintenance on the asset component;

determine, using a task optimizer, a second workscope including a second set of maintenance tasks for the asset component based on at least one of the first asset health quantifier and the first workscope, wherein the task optimizer further includes a workscope strategy analyzer configured to select a set of future workscopes, the set of future workscopes being selected based on an optimal workscope path option among a plurality of workscope path options from the beginning to the end of a contract associated with the asset;

select the second workscope from the set of future workscopes based on a mapping of failure modes of workscopes in the set of future workscopes, each workscope in the set of future workscopes being associated with a probability of failure;

generate, using a workscope effect calculator, a second asset health quantifier corresponding to a second health status of the asset component when the second workscope is completed on the asset, the extrapolated data being compared to the second asset health quantifier; and update, using the workscope effect calculator, at least one of the asset health calculator, the task generator, or the task optimizer, based on the comparison between the extrapolated data and the second asset health quantifier, to improve a determination of at least one of the first and the second workscopes to improve the second asset health quantifier relative to the first asset health quantifier.

14. The non-transitory computer readable storage medium of claim 13, wherein the computer-generated model is at least one of a physics-based model, a historical data model, a stochastic model, or a hybrid model.

15. The non-transitory computer readable storage medium of claim 14, wherein executing the physics-based model includes simulating an operation of the asset during a cycle by executing a digital twin model of the asset by simulating a sensor of the asset during the cycle.

16. The non-transitory computer readable storage medium of claim 13, wherein determining the second workscope includes generating a plurality of workscopes based on at least one of contractual requirements, environmental requirements, and optimization metrics.

17. The non-transitory computer readable storage medium of claim 13, wherein updating the asset health calculator includes improving at least one of a model algorithm, an operator behavior, or a sensor parameter corresponding to a computer-generated model used by the asset health calculator.

18. The non-transitory computer readable storage medium of claim 13, further including instructions which when executed, cause the machine to at least calculate a difference between the first asset health quantifier and the second asset health quantifier, compare the difference to a workscope quantifier threshold, and determine to update at least one of the asset health calculator, the task generator, or the task optimizer based on the comparison.

* * * * *